United States Patent [19]

Dahlquist et al.

[11] Patent Number: 4,744,103

[45] Date of Patent: May 10, 1988

[54] COMPUTER CONTROLLED MULTI-LINK COMMUNICATION SYSTEM

[75] Inventors: James E. Dahlquist, Palatine; Peter C. Holtermann, Chicago; Carl P. Rau, Mount Prospect, all of Ill.

[73] Assignee: Rauland-Borg Corporation, Chicago, Ill.

[21] Appl. No.: 803,133

[22] Filed: Nov. 27, 1985

[51] Int. Cl.[4] ........................ H04M 3/22; H04Q 1/30; H04Q 3/545; H04Q 3/64

[52] U.S. Cl. .................................... 379/247; 379/263; 379/265; 379/269; 379/384

[58] Field of Search ............... 379/157, 159, 160, 164, 379/165, 247, 284, 290, 217, 263, 265, 269, 383, 384; 370/96

[56] References Cited

U.S. PATENT DOCUMENTS

| | | | |
|---|---|---|---|
| 2,258,650 | 10/1941 | Herrick | 379/243 |
| 2,261,243 | 11/1941 | Flint | 379/262 |
| 2,883,472 | 4/1959 | Stehlik | 379/159 |
| 2,911,477 | 11/1959 | Gohorel et al. | 379/245 |
| 2,966,554 | 12/1960 | Dubois | 379/210 |
| 3,342,944 | 9/1967 | Barbato et al. | 379/158 |
| 3,350,508 | 10/1967 | Swanson | 379/252 |
| 3,501,596 | 3/1970 | Bierman | 379/208 |
| 3,551,601 | 12/1970 | Sloan et al. | 379/209 |
| 3,553,385 | 1/1971 | Morgan et al. | 379/207 |
| 3,584,151 | 6/1971 | Kielar | 340/825.48 |
| 3,660,610 | 5/1972 | Hestad et al. | 379/203 |
| 3,678,208 | 7/1972 | Eddy | 379/255 |
| 3,697,700 | 10/1972 | Greason, III et al. | 379/274 |
| 3,701,853 | 10/1972 | Duval et al. | 379/208 |
| 3,809,824 | 5/1974 | Dahlquist et al. | 379/48 |
| 4,064,377 | 12/1977 | Regan | 379/342 |
| 4,081,614 | 3/1978 | Dahlquist et al. | 379/49 |
| 4,180,860 | 12/1979 | Driscoll et al. | 364/900 |
| 4,289,934 | 9/1981 | Pitroda et al. | 379/269 |
| 4,351,986 | 9/1982 | Fechalos | 379/163 |
| 4,559,417 | 12/1985 | Komuro et al. | 379/157 |
| 4,570,035 | 2/1986 | Pinede et al. | 379/164 |
| 4,605,825 | 8/1986 | Komuro et al. | 379/165 |

FOREIGN PATENT DOCUMENTS

| | | |
|---|---|---|
| 1238103 | 7/1971 | United Kingdom . |
| 1352238 | 5/1974 | United Kingdom . |
| 1501704 | 2/1978 | United Kingdom . |
| 2060316 | 4/1981 | United Kingdom . |

OTHER PUBLICATIONS

"ROLMphone (Reg. Trademark) Digital Telephones," ROLM Corp., Santa Clara, California (1983) (12 pages).

"ROLMphone (Reg. Trademark) User's Guide," ROLM Corp., Santa Clara, California (1984).

*Primary Examiner*—Thomas W. Brown

*Attorney, Agent, or Firm*—Leydig, Voit & Mayer

[57] ABSTRACT

A multi-link communication system includes a number of stations and interconnecting audio links under the control of a central computer. Each station is addressable by the computer for connecting selected stations to a selected audio link for establishing audio communication between stations. Each station has at least one corresponding access circuit for establishing an audio connection to a selected or preassigned link, and the connection is maintained by a corresponding memory circuit that is addressable by the computer. A group of output lines from the computer are used as select inputs to an analog multiplexer connecting a bidirectional control line to the selected access circuit for connecting or disconnecting the corresponding station and also for receiving connect or disconnect requests from the corresponding station. In a particular embodiment, the stations include multi-link dial and dialless telephones, single-link dialless telephones, and intercom speakers in an automatic private branch exchange. Latching relays provide audio connections for speakers and dialless single-link phones, and unbalanced analog transmission gates provide audio connections for multi-link phones. The capabilities of each station are encoded as predefined attributes stored in electrically alterable memory, and the attributes of a selected station are user-programmable via the touch-tone dial of an administrative telephone. Standard and priority call-ins from dialless phones and intercom speakers are identified on numeric or graphic displays interconnected to the computer via a shielded wire or shielded balanced pair conveying a pulse-width modulated binary signal.

20 Claims, 25 Drawing Sheets

MICROCOMPUTER 55

MICROCOMPUTER 55

DTMF TRANSMITTER - RECEIVERS

MISCELLANEOUS I/O

VCM

VCM

CENTRAL OFFICE ADAPTER

FIG. 19. LCD INTERFACE

FIG. 20 GRAPHIC DISPLAY CIRCUITS
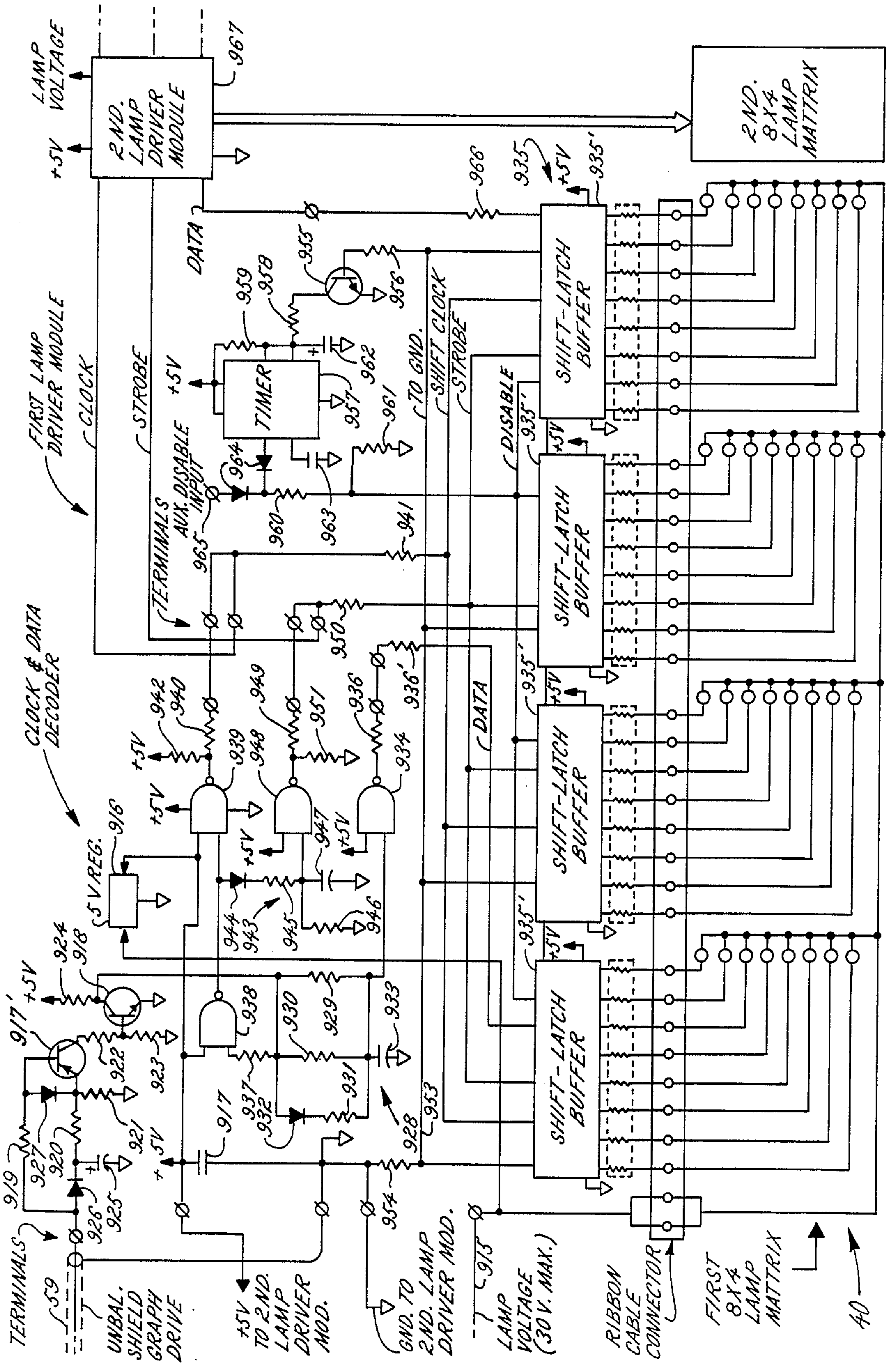

980

| PHYSICAL NO. | LLM #0 | |
|---|---|---|
| 0 | 0 | REC. 1 |
| 1 | 1 | REC. 2 |
| 2 | 2 | VCM #1 |
| 3 | 3 | FEEDBACK ATTENUATOR |
| 4 | 4 | SINGLE LINK PHONES |
| 5 | 5 | ADMIN. DISPLAY PHONE |
| 6 | 6 | VCM #2 |
| 7 | 7 | COA |
| ⋮ | ⋮ | |
| 15 | 15 | |
| | LLM #1 | SC #0 |
| 16 | 0 | 0 |
| 17 | 1 | 1 |
| 18 | 2 | 2 |
| ⋮ | ⋮ | ⋮ |
| 32 | 15 | 15 |
| | LLM #3 | |
| 33 | 0 | 16 |
| 34 | 1 | 17 |
| 35 | 2 | 18 |
| ⋮ | ⋮ | ⋮ |
| 39 | 3 | 23 |
| 40 | 4 | 24 |
| | | SC #1 |
| 41 | 5 | 0 |
| 42 | 6 | 1 |
| 43 | 7 | 2 |
| ⋮ | ⋮ | ⋮ |
| | LLM #31 | SC #19 |
| 510 | 14 | 19 |
| 511 | 15 | 20 |

FIG. 21

ATTRIBUTE TABLE (EEPROM)

| PHYSICAL NO. | ARCHITECTUAL NO. | ATTRIBUTES A | B | (ZONE) Z |
|---|---|---|---|---|
| . | . | . | . | . |
| . | . | . | . | . |
| . | . | . | . | . |
| 16 | 101 | 10000000 | 11111111 | 11111111 |
| 17 | 102 | 01000000 | 00101010 | 10000000 |
| 18 | 103 | 01000000 | 00101010 | 10000000 |
| . | . | . | . | . |
| . | . | . | . | . |
| . | . | . | . | . |
| 500 | | | | |

FIG. 22

ACTIVE LIST OF RECORDS (RAM)

(A UNIQUE RECORD IS CREATED FOR EACH ONE OF THE PHYSICAL NUMBERS CURRENTLY BEING USED IN THE SYSTEM.)

RECORD #1

SUBJECT [PHYSICAL NO. FOR WHICH REC.#1 WAS CREATED]

OBJECT [PHYSICAL NO. FOR CONNECTION TO SUBJECT]

LINK [NO. OF LINK RESERVED FOR CONNECTION]

PROC [NO. OF PROCEDURE USING SUBJECT]

TIME [TIME THAT CURRENT RECORD WAS CREATED]

PARM [16 BITS OF INFORMATION ABOUT STATE OF SUBJECT]

POINTER [POINTER TO NEXT RECORD]

RECORD #2

RECORD #3

FIG. 23

COMPUTER CONTROLLED MULTI-LINK COMMUNICATION SYSTEM

BACKGROUND OF THE INVENTION

1. Field of the Invention

The present invention relates to a multi-link administrative telephone and intercom system having automatic as well as supervised call distribution and PBX capability.

2. Description of the Background Art

Dahlquist et al. U.S. Pat. No. 3,809,824 discloses a multi-link private automatic telephone system including "administrative" dial telephones and "staff" dialless telephones. The lifting of a receiver of a dialless telephone produces a visual indication on an annunciator panel. An administrator must respond by dialing the phone number of the dialless telephone in order to establish a communication link. The administrator may also dial other phone numbers to add other telephones to the link to establish a conference call or to permit a conversation between two dialless telephones.

Dahlquist et al. U.S. Pat. No. 4,081,614 discloses a single link telephone system including an "administrative" tone dialing telephone, "staff" dialless telephones, and intercom speakers. The administrative telephone includes a digital display for sequentially indicating the numbers of call-ins from the staff telephones or intercom speakers. To call the first number on the display, the administrator can merely press a single button on the administrative telephone. When a staff telephone or intercom speaker is called, its number is removed from the digital display. Each staff telephone or intercom speaker can transmit a priority call-in signal which places its phone number in the first display position and activates a visual and audible signal to attract the administrator's attention.

Microcomputer control is now being used for multi-link automatic private or private branch exchange (PBX) telephone systems. The microcomputer is used for assigning links to the system, and for diagnostic and reporting functions. A universal problem encountered when employing a microcomputer in an automatic telephone exchange is the interconnection of the microcomputer to the voice switching positions or circuits which connect the telephones to selected audio links. In addition busy signals, ringing signals, and "off-hook" signals must be conveyed between the microcomputer and the telephones. Also, it is desirable to provide flexibility to vary the size of the system and to modify the functions of the different stations. Typically these capabilities have been provided by complex or relatively expensive interface circuity.

One way of dealing with the microcomputer interface problem is to employ a number of microprocessors which communicate with each other on an asynchronous basis and which are interfaced to an assigned group of stations, as disclosed in Pitroda et al. U.S. Pat. No. 4,289,934. Another known method is to transmit only digital information between the phones as well as the microcomputer, and to provide each phone with audio-to-digital and digital-to-audio converters. This latter technique provides the greatest flexibility, but at a corresponding expense.

SUMMARY OF THE INVENTION

Accordingly, the primary object of the invention is to provide an economical computer controlled multi-link telephone system that provides great flexibility to vary the size of the system and to modify the functions of the different stations.

A related object of the present invention is to provide an economical and highly flexible multi-link administrative telephone and intercom system having automatic as well as supervised call distribution and PBX capability.

Briefly, in accordance with an important aspect of the invention, the multi-link communication system includes a number of stations and interconnecting audio links under the control of a central computer. Each station is addressable by the computer for connecting selected stations to a selected audio link for establishing audio communication between stations. Each station has at least one corresponding access circuit for establishing an audio connection to a selected or preassigned link, and the connection is maintained by a corresponding memory circuit that is addressable by the computer. A group of output lines from the computer are used as select inputs to an analog multiplexer connecting a bidirectional control line to the selected access circuit for connecting or disconnecting the corresponding station and also for receiving connect or disconnect requests from the corresponding station.

In a preferred embodiment, the stations include multi-link dial and dialless telephones, single-link dialless telephones, and intercom speakers, in an automatic private branch exchange. Latching relays provide audio connections for speakers and dialless single-link phones, and unbalanced analog transmission gates provide audio connections for multi-link phones. The capabilities for each station are encoded as predefined attributes stored in electrically alterable memory, and the attributes of a selected station are user-programmable by the touch-tone dial of an administrative telephone. Standard and priority call-ins from dialless phones and intercom speakers are identified on a numeric or a graphic display interconnected to the computer by a shielded wire or a shielded balanced pair conveying a pulse-width modulated binary signal.

BRIEF DESCRIPTION OF THE DRAWINGS

These and other objects and advantages of the invention will become apparent upon reading the following detailed description and upon reference to the drawings, in which:

FIG. 19 is a schematic diagram of a liquid crystal display (LCD) interface;

FIG. 20 is a schematic diagram of a graphic display interface;

FIG. 21 is a table showing the correspondence between the physical numbers, line-link module and line numbers, and speaker control module and line numbers;

FIG. 22 is a table of the attributes stored in electrically alterable memory for defining the capabilities of the stations having certain preassigned physical numbers;

FIG. 23 is a diagram showing the contents of a record in an active list of records which is used by the central computer for supervising the stations in use in the system at any given time;

Figure 1:
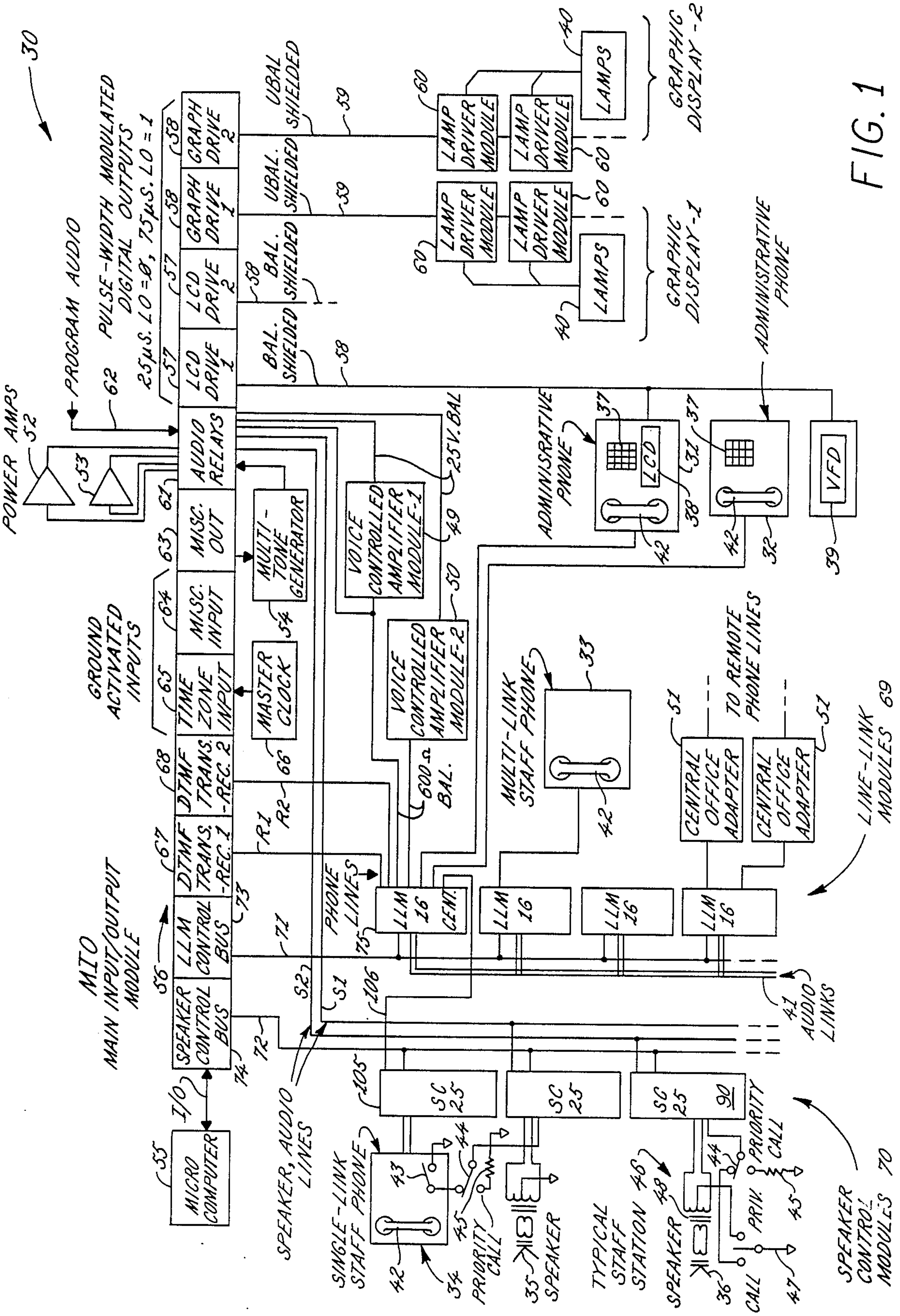
FIG. 1 is a block diagram of a computer controlled multi-link administrative telephone and intercom system according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as defined by the appended claims.

DETAILED DESCRIPTION OF THE PREFERRED EMBODIMENT

Turning now to the drawings, there is shown in FIG. 1 a block diagram of a preferred embodiment of a communication system incorporating the various features of the present invention. This preferred embodiment generally designated 30 is a multi-link communication system providing 16 audio links for direct dialing telephone communication between a number of "administrative telephones" 31, 32; between administrative telephones and "staff telephones" 33, 34; and between administrative telephones and a number of intercom speakers 35, 36. The administrative telephones are telephones equipped with a standard dual-tone push button dial or key pad 37. A staff telephone, however, does not have a dial and can only originate a telephone call or communication by generating a request or "call-in" which is indicated on a liquid crystal display (LCD) 38, a vacuum fluorescent display (VFD) 39, or a graphic display 40. In order for a telephone conversation to be established with a staff phone, the request or call-in must be acknowledged by an "administrator" or operator of an administrative phone 31, 32. Similarly, communication with an intercom speaker must be initiated by an administrative phone 31, 32 in response to a communication request or call-in from the intercom speaker 35, 36.

Two types of staff telephones are available, including multi-link staff phones 33 and single link staff phones 34. To provide up to 16 simultaneous telephone conversations, multi-link staff 33 and the administrative phones 31 are connectable via selected ones of 16 audio links collectively designated 41. Single link telephones, however, share a common communication path. When a single link staff telephone is in use, all of the other single link staff telephones sharing the common link are "busy".

The multi-link staff phones 33 can be provided with conventional telephone ringers for signaling an incoming call from an administrative phone 31, 32. Alternatively, a multi-link staff phone 33 can be associated with an intercom speaker 36 in order to use the intercom speaker for emitting a tone, beep or other signal for indicating an incoming call. In this latter case the multi-link staff phone 33 is used in the same room as the intercom speaker 36 and the system 30 is programmed, as further described below, to associate the intercom speaker 36 with the multi-link staff phone 33.

Single link staff phones 34 are not provided with ringers, and therefore must have an associated intercom speaker 35 for indicating incoming calls.

To generate a communication request to initiate a telephone call, the administrative phones 31, 32 and the multi-link staff phones 33 have conventional "hook" switches or sensors which generate an "off-hook" signal when their respective telephone handsets 42 are lifted. In this regard, the telephones 31, 32, 33, and 34 are constructed in the conventional fashion with touch-tone key pads 37, ringers (not shown), handsets 42 and hook switches 43 (shown only for the single link staff phone 34) so that these phones may use standard components and are therefore relatively inexpensive. As will be further described below in connection with FIG. 19, the administrative phone 31 is provided with additional circuits for the liquid crystal display 38, and otherwise the administrative phone 31 resembles a typical touch-tone telephone.

To generate a communication request or call-in from a single link staff phone 34, the hook switch 43 of the single link staff phone is used in connection with a priority call switch 44. The priority switch 44 can be thrown from its normal position as shown to a "priority call" position in order to generate a "priority call" signal by connecting a resistor 45 into the communication system 30. When the call-ins are displayed on the LCD display 38, VFD display 39 or the graphic displays 40, the priority call-ins are given precedence and emphasized, for example, by being placed first in the display queue and by flashing the numbers of the priority call-ins. The displays 38, 39, 40, in other words, display the phone numbers of the single link staff phones or intercom speakers which generate call-in signals, and the phone numbers corresponding to single link staff phones or speakers generating priority call signals are visually emphasized.

For economy a typical staff station, such as the station generally designated 46, does not have a telephone. Instead, an intercom speaker 36 is provided with a call switch 47 used in lieu of a hook switch 43 to generate a communication request or call-in. The speaker 36 can be used for public address as well as an intercom speaker. An administrator may use an administrative phone 31, 32, for example, to dial a number corresponding to the speaker 36 in order to make an announcement on that particular speaker and also to listen in to the room in which the speaker 36 is placed. The system 30 generates a periodic beeping sound on the activated speaker 36 in order to prevent eavesdropping. Moreover, the call switch 47 can be provided with a privacy position in which the center tap of an impedance matching transformer 48 is grounded. This grounding is detected by the system 30 and is used to inhibit or prevent any audio pickup from the speaker 36.

In order to permit two-way communication between an administrative phone 31, 32 or a multi-link staff phone 33 or a single link staff phone 34 and an intercom speaker 36, the phones are connected to the speaker through a voice controlled amplifier module 49 or 50. The system 30 includes at least one voice controlled amplifier module, and as an option may include two as shown in FIG. 1. The voice controlled amplifiers 49, 50 include power amplifiers for driving the intercom speakers as well as sensitive amplifiers for picking up the sounds in the vicinity of the speakers 36 and transmitting the audio signals to the administrative or staff phones. In other words, the voice controlled amplifier modules 49, 50 include bidirectional amplifiers. The direction of amplification is always controlled by the audio level from the administrative or staff phone. Whenever the operator of the administrative or staff phone speaks, the voice controlled amplifier transmits the speech to the intercom speaker; otherwise, the voice controlled amplifier transmits audio signals from the intercom speaker to the administrative or staff phone.

The communication system 30 shown in FIG. 1 accommodates up to a total of about 500 administrative phones, multi-link staff phones, single-link staff phones, and intercom speakers. As will become clear from the discussion below, the system 30 provides up to 512 stations each of which can receive and transmit audio signals, each of which can generate a request for connection, and each of which has a uniquely assigned number. A particular station may comprise a single administrative phone 31, 32, a single multi-link staff phone 33, a single-link or multi-link staff phone 34 paired with an intercom speaker 35, or a single intercom speaker 36.

It should be apparent that some of the stations, such as the voice controlled amplifier modules 49, 50, are at a central location and others are at remote locations. The location of a telephone typically dictates whether the particular telephone should be a dial or a dialless telephone. If the system is installed in a school, for example, dialless telephones are typically placed in the classrooms, and the administrative telephones are placed in the administrative office areas as well as other locations where supervisory control over the initiation of phone calls is not desired. The system is adapted to provide automatic operation in the sense that any administrative telephone may be used to call any other telephone in the system by raising the handset 42 to receive dial tone, and by entering on the push button dial 37 a three digit "architectural" number of the desired recipient telephone which causes ringing in the recipient telephone, or a beeping at an intercom speaker, or a busy signal if a recipient telephone or common signal link is busy. As will become apparent below, the "architectural" number commonly corresponds to the room number of a remote station. Therefore, calls may be initiated and completed from any administrative phone by using the procedure that is quite similar to the public telephone system.

Supervisory or administrative control over the staff telephones or intercom speakers is provided in the sense that calls initiated from the stations may not be completed without first being cleared or authorized by an administrator since such calls must go through an administrative dial telephone. An administrator responding to an off-hook, unanswered staff phone or an activated call switch from a speaker station may determine who is initiating the call, what the purpose is, as well as the location of the requested recipient station before the administrative person "transfers" the call to the requested recipient station. Thus, it is possible for an administrator in a school to screen unauthorized calls between classrooms.

Typically an administrator is assigned the task of watching a graphic display 40 which may have a unique numbered light corresponding to the number of each telephone or speaker station within the system. The graphic display provides a distinct visual indication for any of these stations that is engaged in a telephone call or, in the case of an unanswered staff phone or speaker having called-in, a visual call-in indication that is different from the visual indication for a busy telephone or speaker station. The graphic display, therefor, is typically located in an administrative area having one or more administrative or dial phones. As mentioned above, call-ins may also be indicated on a liquid crystal display 38 associated with particular administrative phones 31, or on a vacuum fluorescent display 39. The liquid crystal 38 and vacuum fluorescent 39 displays are alphanumeric displays in contrast to the graphic displays which use individual lamps for back lighting respective labels of architectural phone numbers which are grouped in an array or which could be arranged on an architectural or floor plan of a building. Such arrangements of lamps on annunciator panels are well known and the particular arrangement is not a part of the present invention and therefore will not be described in any further detail.

To respond to the staff telephone or speaker station requesting a connection, any of the administrators having an administrative or dial telephone who see the visual indication on a graphic, liquid crystal, or vacuum fluorescent display may pick up their handset 42 and dial the architectural number associated with the staff phone or speaker station to establish a two-way communication. If the administrator responding to the connection request is not the person to which the party at the staff phone or speaker station wishes to talk to, the administrator may connect the staff phone or speaker station to any other non-busy telephone or speaker station in the system by using a call forwarding procedure. For the system 30 shown in FIG. 1 and further described below, the call forwarding procedure requires the administrator to toggle or momentarily depress the hook switch 43, commonly known as sending a "hook flash", in order to obtain the system dial tone. Then, the administrator dials the number of the station where the call is to be forwarded. After obtaining an answer at the newly called station, the administrator informs the new station about the incoming call and hangs up. At this point the other two stations are connected.

The system 30 may also function as a private branch exchange to receive or transmit calls to the outside public telephone system, known as the "central office". To provide this capability, one or more "central office adapters" are provided to interface the system 30 to remote phone lines, known as trunk lines, which lead to the central office. Access to the trunk lines is obtained by calling the architectural or phone number associated with a central office adapter 51. The number 9, for example, is sometimes reserved for this purpose. When called by an administrative phone, the central office adapter 51 will answer with a dial tone generated by the central office, and calls can be placed on the outside line by dialing the touch tone pad 37 of the administrative phone. Upon receiving an answer from the outside line, the administrator may forward the call as if the outside line were any other station in the system.

The system 30 also performs paging functions. Background music or other program audio can be applied to the intercom speakers through switch panels as is conventionally done in intercom systems. Two power amplifiers 52, 53 are provided for driving all of the speakers simultaneously, if necessary. All of the speakers, or selected preassigned groups or "zones" of speakers, can be paged from certain preassigned phones 31, 32. Only certain of the administrative phones are provided with this capability since paging temporarily interrupts any existing communication or conversation involving the speakers.

In addition to voice transmission during paging, an administrative phone having paging capability can be used to dial certain numbers or codes to send selected tones to all of the speakers or selected zones of the speakers. The system 30 uses a multitone generator 54 for generating the selected tones. The multi-tone generator is, for example, a model number MTG-100-A chime tone generator manufacturer and sold by Rauland-Borg Corporation, 3535 W. Addison St., Chicago, Ill. 60618. This model of multi-tone generator provides four different tones including a pulsating tone, a siren, a European warble or steady tone, and electronic chimes. Since multi-tone generators are well known components of intercom systems and the characteristics of the tone generator do not form any part of the present invention, the multi-tone generator 54 will not be frther described.

The telephones in the system 30 have further capabilities, some of which are common in private branch telephone exchanges, such as breaking in on calls and setting up conference calls. The operating instructions for these feaures are included in Appendix I to the present specification.

The capabilities of te communication system 30 are defined by software excuted by a microcomputer 55 interfaced to the system via a specially constructed main input/output module (MIO) generally designated 56. In order to interface to various parts of the system 30, the main input/output module 56 includes a number of input/output ports. To drive the LCD or VFD displays, there are provided two LCD drives 57 connected via respective balanced shielded twisted pairs 58 to one or more LCD or VFD displays connected in parallel. Two separate graphic drives 58 are connected via unbalanced shielded cables 59 to a number of lamp driver modules 60 driving the lamps in the graphic displays 40. A number of audio relays 61 are provided for selectively connecting the power amplifiers 52, 53 to a program audio input 62, the multi-tone generator 54, a selected one of the voice controlled amplifiers 49, 50 and a selected one of two speaker audio lines S1 or S2. The multi-tone generator 54 is interfaced via a number of miscellaneous outputs 63, a single one of the miscellaneous outputs being provided for enabling each tone generated by the multi-tone generator 54. The system further includes a number of miscellaneous inputs 64 which are not presently used. These inputs are ground-activated, for example, by closing a switch to ground. Certain ground-activated inputs 65 are presently used with a master clock 66 to send tone signals to predefined groups or "zones" of intercom speakers.

Specifically for use in schools, the microcomputer 55 is programmed to receive signals from the master clock 66 through the "time zone" input 65. The master clock 66 repetitively compares the time of day to certain preset times corresponding to the changing of classes. When the preset times occur, the audio relays 61 are energized and the multi-tone generator 54 is activated to send tones over the speaker audio lines S1 or S2 to simulate the ringing of bells by activating the speakers 35 in certain classrooms programmed to have the "zone" function or attribute.

In order to permit the microcomputer 55 to communicate with the administrative telephones and also to provide certain automatic dialing functions, the main input/output module 56 has two separate dual-tone multi-frequency transmitter/receivers 67, 68. The first transmitter/receiver uses a phone line R1 and is a preassigned station in the system 30. The second transmitter/receiver 68 has a second phone line R2 and is another preassigned station in the system 30.

In accordance with an important aspect of the invention, each telephone or speaker station has at least one corresponding access circuit for establishing an audio connection to a selected or preassigned audio link. The access circuits for the multi-link administrative or staff phones are provided in a number of "line-link" modules 69, and the access circuits for the single link staff phones and intercom speakers are provided by speaker control modules 70. For selecting stations for connection to selected audio links for establishing audio communication between stations, the audio access circuit for each station is addressable by the microcomputer 55. For this purpose the line-link modules 69 are interconnected via a line-link control bus 71, and the speaker control modules 70 are connected together via a speaker control bus 72. The main input/output module 56 includes interface circuits 73 and 74 for interfacing the microcomputer 55 to the line-link module control bus 71 and the speaker control bus 72, respectively.

Each line-link module 69 provides audio access circuits for 16 different lines. Therefore, the line-link modules are designated by the part number "LLM 16". The system 30 includes at least a central line-link module 75 which is addressable at physical numbers 0 to 15 and includes audio access circuits for the two dual tone multi-frequency transmitter/receivers 67, 68 and the voice controlled amplifier modules 49, 50. The audio access circuit for each line from the line-link modules can establish an audio connection to any selected one of the 16 audio links 41, which are parallel connected to all of the line-link modules 69.

The speaker control modules 70 are designated by the part number "SC 25" since they provide audio access circuits for up to 25 single link staff phones or intercom speakers. Each speaker control module 70 used for speakers is wired to either one or the other of the two speaker audio lines S1, S2. Therefore, all of the audio access circuits in a given speaker control module 70 can be selectively activated by the microcomputer 55 to establish an audio connection from a speaker to only a particular one of the two speaker audio lines S1, S2.

Figure 2:
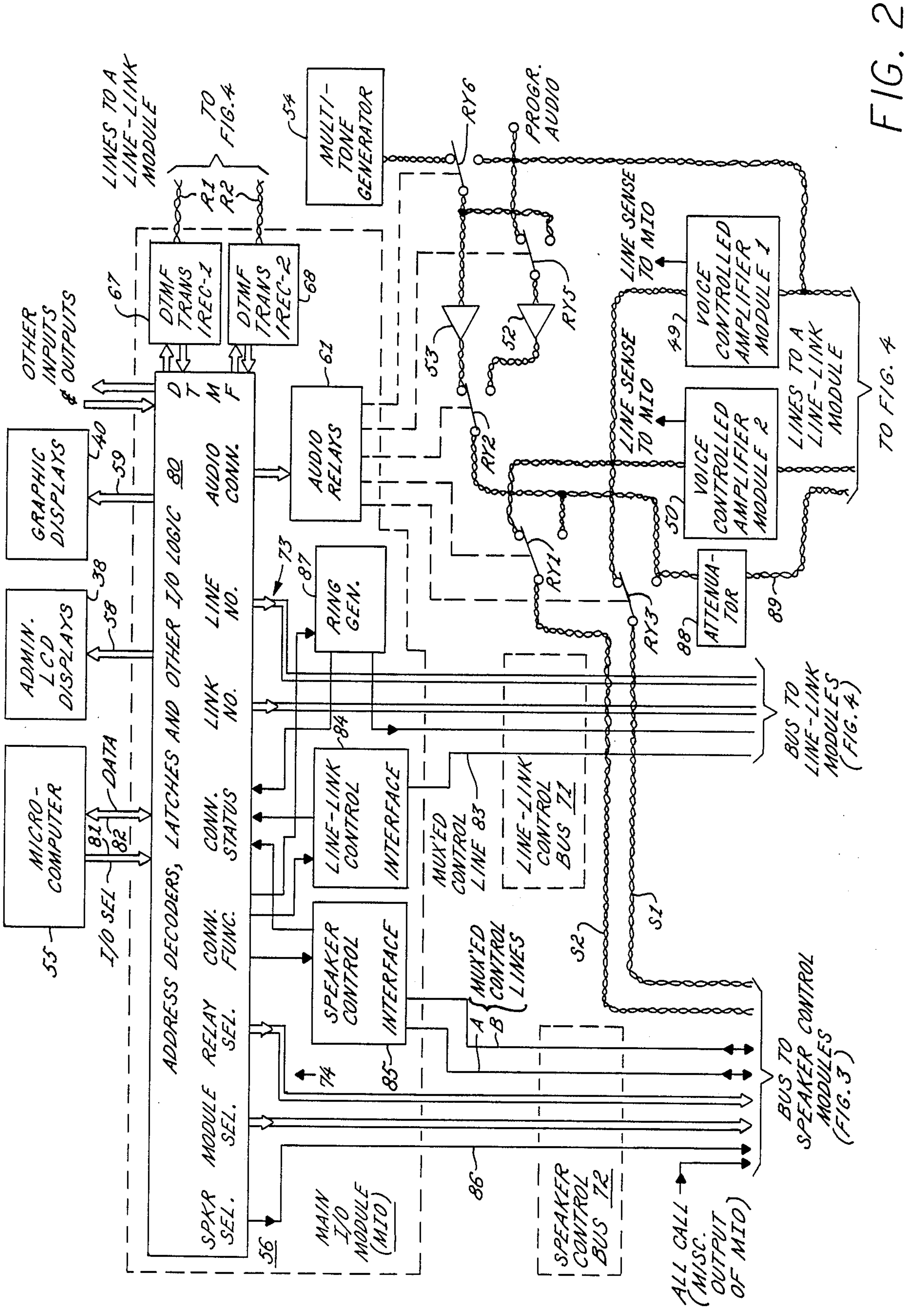
FIG. 2 is a block diagram of the central components of the system of FIG. 1, including the microcomputer, its interface circuits, and circuits for interconnecting telephone lines to shared speaker lines.
Figure 3:
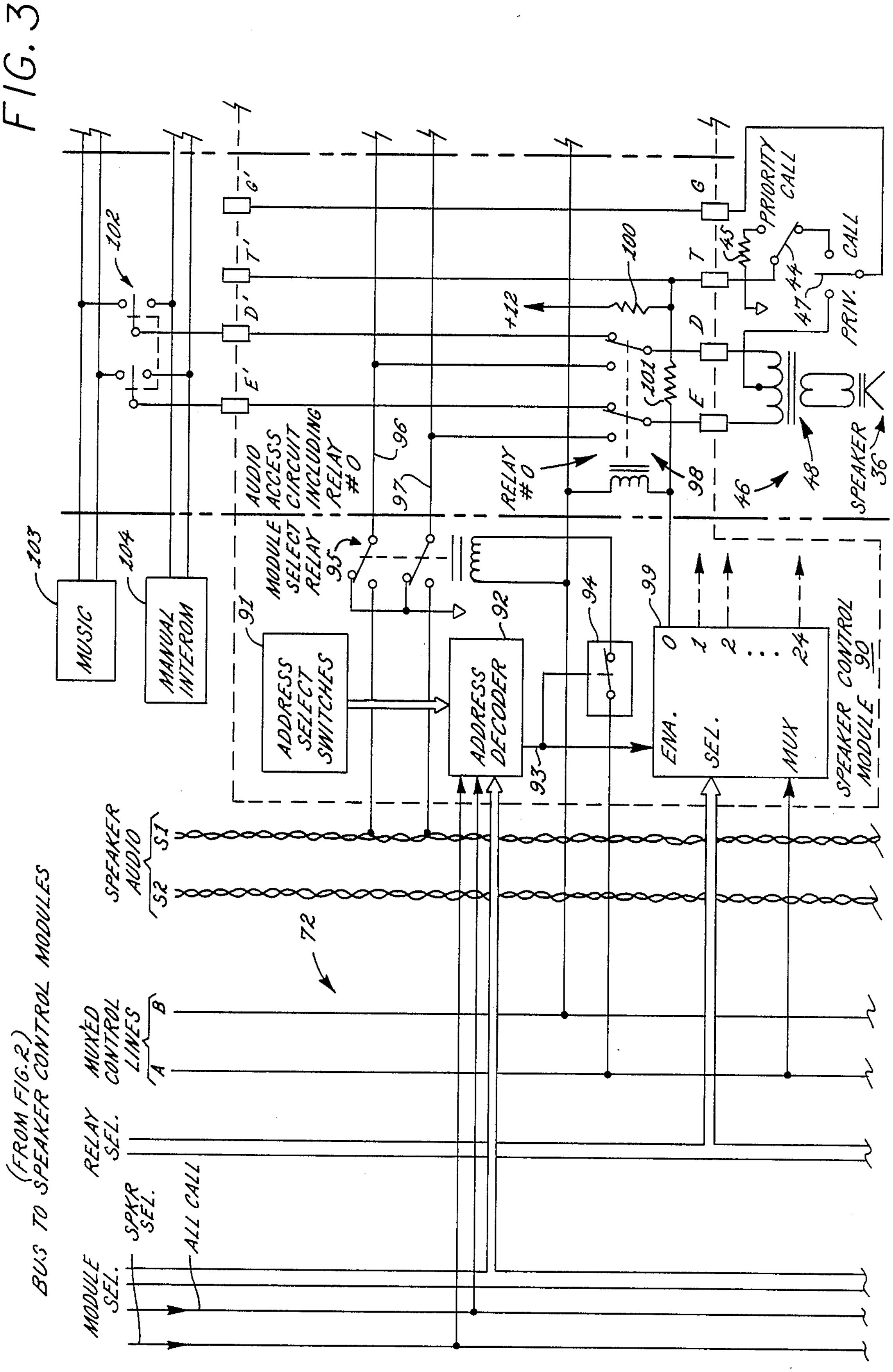
FIG. 3 is an appendage to FIG. 2 and includes a block diagram of a speaker control module.
Figure 4:
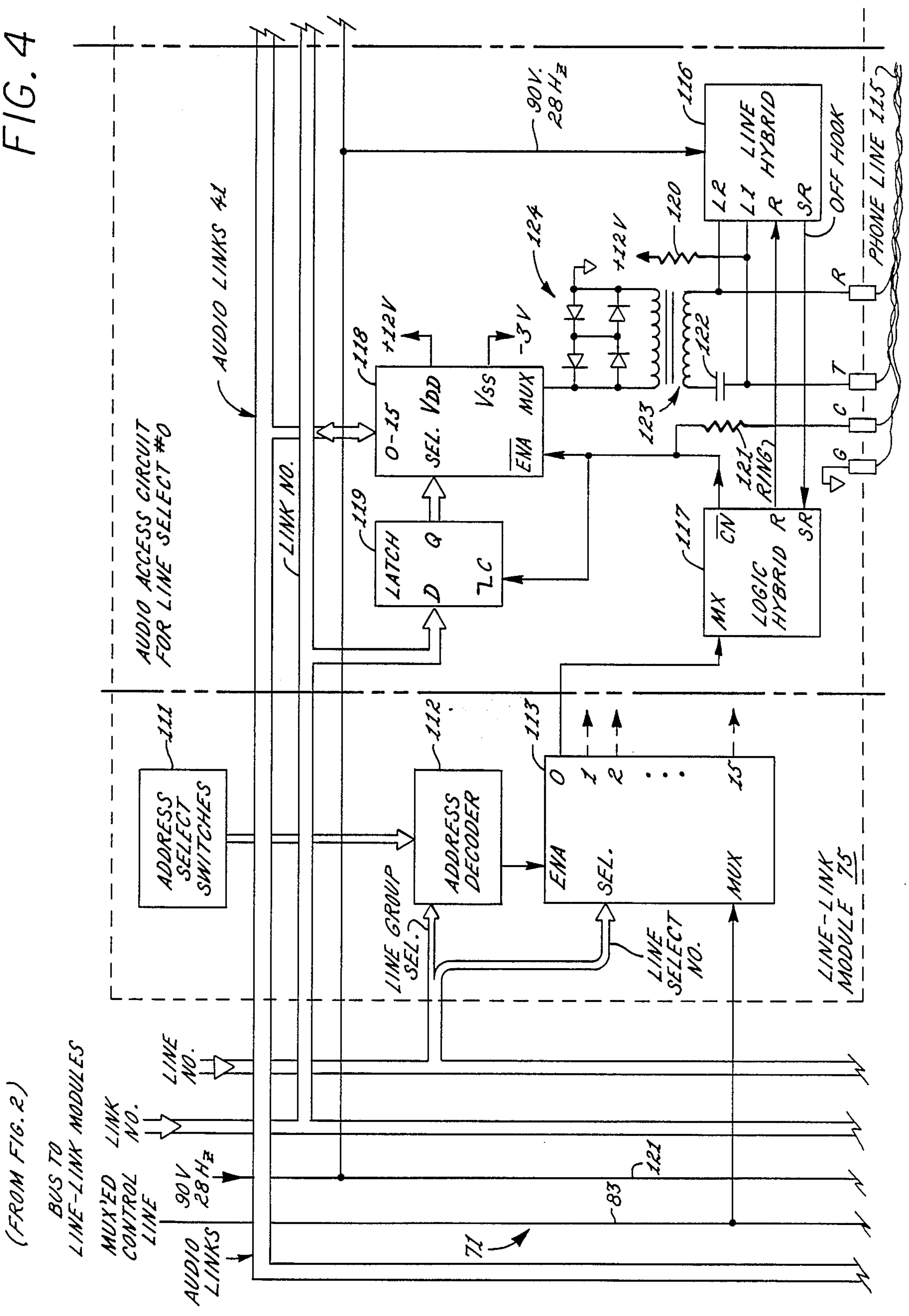
FIG. 4 is an appendage to FIG. 2 and includes a block diagram of a line-link module for interfacing a number of telephones to a number of audio links.

Turning now to FIGS. 2, 3 & 4 there is shown a composite block diagram of the central components of the system 30 of FIG. 1, with emphasis on the connections between the microcomputer 55, the line-link modules 69 and the speaker control modules 70. In order to provide digital inputs and outputs from the microcomputer 55, the main input/output module 56 includes address decoders, latches and other I/O logic generally designated 80 that are addressed by I/O select lines 81 from the microcomputer 55. To provide multi-bit inputs and outputs, a data bus 82 is also provided between the microcomputer 55 and the I/O logic 80. The I/O logic 80, for example, provides a "module select" multi-bit output for selecting a desired speaker control module 70, and a "relay select" multi-bit output for selecting a particular single link staff phone or intercom speaker associated with the selected speaker control module. The I/O logic 80 also has a multi-bit "link number" output and "line number" output for addressing the required audio access circuit for connecting the specified line to a specified one of the 16 audio links 41 through the line-link module 69 associated with the selected line number.

In accordance with an important aspect of the present invention, bidirectional multiplexed control lines are used for interconnecting the microcomputer 66 to the audio access circuits for both conveying connection and disconnection commands from the microcomputer to the audio access circuits, and also for conveying connection requests from the access circuits to the microcomputer. A single bidirectional multiplexed control line 83 is used for controlling the audio access circuits in the line-link modules and the bidirectional control line is a particular one of the lines in the line-link control bus 71. In order to interface and multiplex the bidirectional signals on the control line 83 to the binary inputs and outputs of the I/O logic 80, there is provided a line-link control interface 84 which provides a few binary inputs forming part of a "connect status" multi-bit input, and which receives a few bits of a multi-bit "connect function" output.

In a similar fashion, two bidirectional multiplexed control lines A, B convey connection and disconnection commands from the microcomputer to the audio access circuits in the speaker control modules 70, and also convey connection requests from the audio access circuits in the speaker control modules to the microcomputer 55. These two bidirectional multiplexed control lines A, B are two particular lines in the speaker control bus 72. As will become apparent below, the two lines A, B are used instead of a single line in order to provide balanced lines for energizing latching relays in the speaker control modules 70. A speaker control interface 85 is provided to receive a few bits from the multi-bit "connect function" output and multiplex them as connection and disconnection commands transmitted over the bidirectional multiplexed control lines A, B, and to receive connection requests from the speaker control modules 70 and translate them to a few single bit inputs forming part of the multi-bit "connection status" input.

For addressing stations having both a single link staff phone (34 in FIG. 1) and an intercom speaker (35 in FIG. 1), the phones and speakers are serviced by respective different speaker control modules which are programmed to respond to the same respective physical numbers corresponding to respective module and relay select numbers. So that the microcomputer 55 can selectively address the phones instead of the speakers and vice versa even though they have the same physical numbers, a speaker select line 86 is used to convey a single bit of information from the microcomputer 55 to select either speakers or phones.

As noted above, the single link staff phones do not ring but instead an incoming call is announced over their corresponding intercom speakers. The multi-link phones, however, are rung in the conventional fashion by an alternating polarity ringing voltage selectively applied to the ringers in the phones. For this purpose, the alternating polarity ringing voltage is generated by a ring generator 87 and the ringing voltage is fed over the line-link control bus 71 to all of the line-link modules. Each line-link module includes a switching means such as a triac for selectively applying the ringing voltage only to the phones having incoming calls. The ring generator 87 can be attenuated by a single bit from the multi-bit "connect function" output of the I/O logic 80, and the ring generator sends a single bit signal to the multi-bit "connect status" input for indicating ring current.

For switching audio connections to the speaker audio lines S1, S2, there are provided seven separate double-pole double-throw relays 61. Double-pole relays are used since the lines from the line-link module as well as the speaker audio lines S1, S2 are balanced pairs of conductors, so that each conductor in each line is switched by a respective pole of the relay switching the line. The preferred method of using the relays is shown in FIG. 2, and this method leaves two of the seven relays unused and available for selecting other audio sources at the user's option. The unused relays, which are not shown in FIG. 2, are relays RY4 and RY7.

Relays RY1 and RY3 have their common contacts wired to the speaker audio lines S2 and S1, respectively, and are used by the microcomputer 55 to select either an intercom mode by connecting the speaker audio lines to the voice controlled amplifiers 50 and 49, or select a paging mode by connecting the speaker audio lines to the output of a selected audio amplifier 52 or zone amplifier 53. Relay RY2 provides the selection of the audio amplifier output. Relays RY5 and RY6 select the source of the paging audio. Relay RY6 selects either a multitone generator 54 for tones, or a certain balanced line from the central line-link module (75 in FIG. 1.) for paging from a telephone having called a telephone number corresponding to a paging function, as further described below. The relay RY5 is used to select the source of the audio amplifier 52 and either connects the input of the audio amplifier 52 to the common contacts of the relay RY6 or selects a source of program audio. The program audio is supplied, for example, from an FM radio tuner.

For intercom operation, the voice controlled amplifier modules 49, 50 sense whether they have been connected to at least one speaker. This information is signaled to the microcomputer 55 by "line sense" inputs to the I/O logic 80 of the main I/O module 56. As will be shown below the connection of a speaker is sensed by determining whether a small unbalanced current can flow through the speaker audio lines S1, S2.

When a paging or time zone announcement is made, a conversation between a phone and an intercom speaker may be interrupted. In this situation the announcement is also fed through an attenuator 88 and fed back via a phone line 89 to the interrupted phone. The microcomputer connects the phone line 89 to the phone line of the interrupted phone.

Turning now to FIG. 3 there is shown a block diagram of a speaker control module 90 and its connections to the speaker control bus 72.

So that the microcomputer can distinguish a particular speaker control module from the other speaker control modules in the system, each speaker control module has a set of address select switches generally designated 91 for supplying a particular module number in binary code to an address decoder 92. The address decoder compares the binary code to the module select output of the I/O logic 80 in the main I/O module 56 (see FIG. 2). The address decoder 92 is also responsive to the speaker select signal and an "all call" signal. The speaker select signal functions as an additional bit corresponding to one address select switch. The "all call" signal, however, partially overrides the address decoding comparison so that the speaker control module 90 is selected regardless of the values of the two most significant bits in the module select number. Therefore, four different modules can be addressed at once by using the "all call" signal. The selection of the speaker control module 90 is indicated on an output line 93 of the address decoder 92 which activates an electronic switch such as an analog transmission gate 94 for energizing a module select relay 95. The module select relay 95 connects a preselected one of the speaker audio lines S1, S2 to an internal speaker audio bus comprising a pair of conductors 96 and 97.

In order to connect a selected speaker 36 to the speaker audio line S1, another relay 98 corresponding to the speaker 36 must also be energized. In accordance with an important aspect of the invention, the relay corresponding to the speaker is a latching relay and therefore functions as a memory element to retain the connection or disconnection of its corresponding speaker to the internal speaker audio bus 96, 97. The module select relay 95 is also a latching relay, and in practice the module select relay 95 is energized for connection or disconnection at the same time that a relay such as the relay 95 is energized for connection or disconnection of a speaker serviced by the speaker control module. The speaker control relays are, for example, part No. 327-21C200 sold by Midland-Ross Co., N. Mankato, Minn.

In accordance with another important aspect of the invention, the connection and disconnection.of the selected speaker 36 as well as the signaling of the connection requests from the call switch 47 or priority switch 44 corresponding to the station 46 is provided by a means for selectively connecting a bidirectional control line such as the multiplexed control line A to the addressed access circuit for the station. For the speaker station 46, the access circuit includes the relay 98 providing a means for selectively connecting and disconnecting the station to the audio link provided by the internal speaker audio bus 96, 97 and the speaker audio line S1, and the access circuit also includes the wiring to the call switch 47 and the priority switch 44. The call switches 44, 47 provide a means for requesting a connection to the audio link, and the wiring which includes a pull-up resistor 100 and a series resistor 101, is that part of the access circuit providing means for receiving a request for connection from its respective station.

As shown in FIG. 3, the means for selectively connecting the control line to the addressed access circuit is provided by an analog multiplexer 99 which is enabled by the output signal 93 from the address decoder 92 and has twenty-five outputs numbered 0 to 24, a particular one of which is selected by a corresponding relay select number from the I/O logic 80 of the main I/O module 56 (see FIG. 2). When the multiplexer 99 is enabled, the selected output line in connected to the common or MUX terminal of the multiplexer, which receives the bidirectional control line A. Since the relay 98 is wired to the multiplexer output labeled 0, it is also designated relay number 0. Similarly, the audio access circuit for the station 49 shown in FIG. 3 is labeled "audio access circuit including relay number 0". It should be understood that the audio access circuits for the other twenty-four stations serviced by the speaker module 90 are identical to the circuit shown for relay number 0. Therefore, this circuit has been set off by dividing lines from the common circuits in the speaker control module 90.

Although not part of the speaker control module 90, when the speaker control module is used to service intercom speakers rather than single link staff phones, each audio access circuit also includes a double-pole, double-throw center off switch generally designated 102 for selecting an audio source when the speaker 36 is disconnected from the internal speaker audio bus 96, 97. The audio source is, for example, an FM radio 103 for providing background music, or a conventional manually operated intercom 104.

When a speaker control module is used for controlling single link staff phones, the terminals E′, D′, T′, and G′ are all unconnected, so that the staff phone is dead when it is disconnected from the internal speaker audio bus 96, 97. The terminals E′, D′, T′, and G′ appear on the front edge of a circuit board for the speaker control module, and the terminals E, D, T, and G appear on the back of the circuit board. With this arrangement it is possible to wire the front of the board to the back of another board so that a group of phones or speakers could have access to both of the speaker audio lines S1, S2 being connected at different architectural numbers. This could provide additional flexibility in special situations, although such a need has not yet arisen due to the flexibility otherwise available in the system. Also when the speaker control module is used for phones as shown for the module 105 in FIG. 1, the module select relay 95 connects the internal audio bus 96, 97 to a shared phone line 106 from the central line-link module 75, instead of one of the speaker audio lines S1 or S2.

Turning to FIG. 4, there is shown a block diagram of the line-link module 75. So that the microcomputer may select the particular line-link modules 75, the module has a set of address select switches 111 and an address decoder 112. When a module or "line group select" number matches the binary code programmed by the address select switches 111, the address decoder 112 enables a multiplexer 113. The multiplexer 113 receives the multiplexed control line 83 from the line-link control bus generally designated 71 and connects it to a selected audio access circuit corresponding to the line select number. Each line-link module includes a total of 16 audio access circuits, each being similar to the audio access shown in FIG. 4 for the line select number zero. The audio access circuit includes a "line hybrid" circuit 116 for applying electrical and ringing signals to the phone line 115, a "logic hybrid" circuit 117 receiving connect and disconnect signals from the multiplexer 113, a link select multiplexer 118 for providing an audio connection between the phone line 115 and a selected one of the audio links 41, and a latch 119 for storing the number of the selected audio link.

The line hybrid 116 has two terminals L1 and L2 connected to the "tip" and "ring" wires from the phone line 115. The line hybrid 116 as well as a resistor 120 supply current to the tip wire and sink current from the ring wire. In order to ring the phone, the line hybrid 116 receives a 90 volt, 28 hertz ring signal from a line 121 in the line-link control bus 71 extending from the ring generator (87 in FIG. 2). The line hybrid 116 applies the ring signal to the ring wire of the phone line 155 in response to an input on its ring terminal R. The line hybrid 116 also senses whether the phone connected to the phone line 115 is on or off hook by sensing whether current can flow between the tip and ring wires of the phone line. When current flows between the tip and ring lines, the line hybrid 116 generates an active "off-hook" signal on its SR terminal.

The logic hybrid 117 generates the ring signal on its ring terminal R which is applied to the ring terminal R of the line hybrid 116. This ring signal is generated in response to a connection request from the multiplexer 113 which is received on the MX terminal of the logic hybrid. The logic hybrid 117 also receives on its SR terminal the off hook signal from the line hybrid 116. To determine the status of the phone connected to the phone line 115, the microcomputer (55 in FIG. 2) addresses the audio access circuit for the line select number 0 by writing the line number for the phone line over the line-link control bus 71 so that the address decoder 112 is enabled and the multiplexer 113 connects the multiplexed control line 83 to the MX terminal of the logic hybrid 117. Then, the logic hybrid 117 sends a connection request responsive to the off-hook signal over the multiplexed control line 83 of the line-link control bus 71 back to the micro" computer 55.

The logic hybrid 117 also has a memory element for its corresponding audio circuit. The connection status is asserted active low on a terminal CN and is fed to an enable input of the link select multiplexer 118. Also, when the connection signal goes active low, the latch 119 is clocked to receive the link number asserted by the microcomputer (55 in FIG. 2) on the line-link control bus 71.

To simplify multiplexing of the audio signals in the audio links 41, these audio signals are not balanced with respect to ground. An isolation transformer 123 provides the balanced to unbalanced conversion and a capacitor 122 prevents DC line current from flowing into the transformer. The secondary of the transformer is shunted by a diode bridge 124 to protect the link select multiplexer 118 form high amplitude transients.

Figure 5:
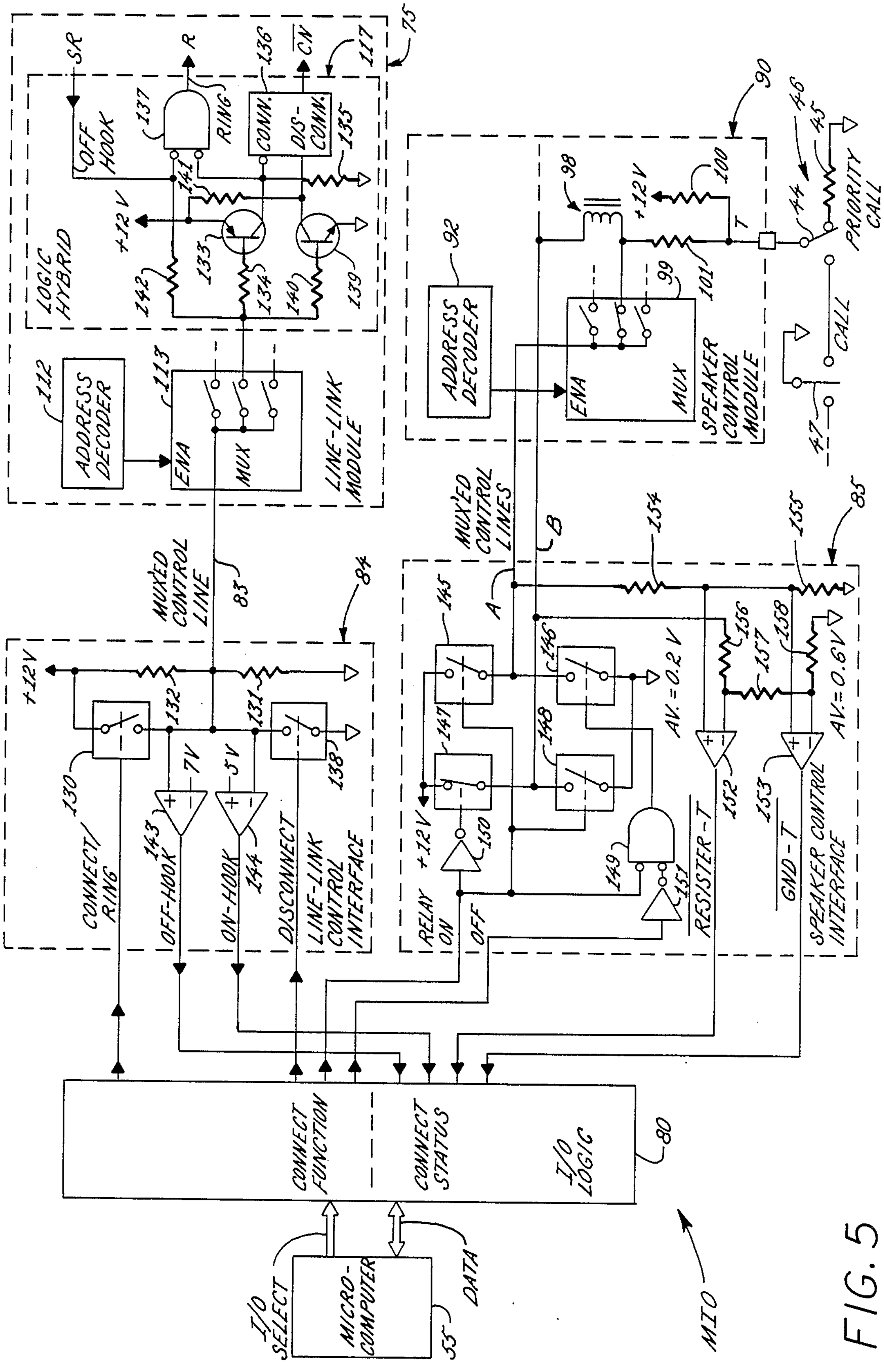
FIG. 5 is a block diagram showing the use of multiplexed bidirectional control lines for transmitting signals to connect and disconnect a selected phone or speaker, and for receiving signals indicating whether a selected telephone is "on-hook" or "off-hook", and for determining whether a low priority call-in or a high priority call-in has been sent from a selected intercom station.

Turning now to FIG. 5, the transmission of connection and disconnection requests in a bidirectional fashion over the multiplexed control lines is shown in greater detail. For connection and disconnection of the audio access circuits in the line-link module 75, the microcomputer 55 transmits, by use of the I/O logic 80, separate binary connect/ring and disconnect signals to the line-link control interface 84. An active connect/ring signal closes an electronic switch 130 to transmit a connect/ring command along the multiplexed control line 83 to the line-link module 110. The multiplexed line 83 is normally held at about 6 volts by a pair of resistors 131, 132. When the switch 130 closes, however, the voltage on the multiplexed control line 83 is increased to about 12 volts.

When selected by the address decoder 112 and the multiplexer 113, the logic hybrid 117 in the line-link module 75 senses the connect/ring command by use of a PNP transistor 133 working in connection with a current limiting resistor 134 and a load resistor 135. The transistor 133 is normally on, and turns off in response to the connect/ring command to. thereby generate an active low logic signal for setting a flip-flop or memory element 136 and enabling a gate 137 to ring the corresponding telephone unless the phone is already off hook.

The flip-flop 136 presents an active connect signal until it is reset in response to a disconnect signal from the microcomputer 55. The disconnect signal originates as a single bit signal from the I/O logic 80 and turns on an electronic switch 138 which causes a disconnect signal of about 0 volts to be transmitted along the multiplexed control line 83 to the line-link module 75. It is assumed that the microcomputer 55 addresses the line-link module 75 so that the address decoder 112 enables the multiplexer 113 and the multiplexer selects the particular logic hybrid 117. Then the disconnect signal is sensed by a NPN transistor 139 working in connection with a current limiting resistor 140 and a load resistor 141. The transistor 139 is normally on, so that it presents an inactive logic low to the flip-flop 136. However, in response to the disconnect signal on the multiplexed control line 83, the transistor 139 turns off, so that an active logic high is applied to reset the flip-flop 136 and thereby disconnect the corresponding telephone. In order that the microcomputer 55 may receive a connection request from the logic hybrid 117, the microcomputer 55 must periodically scan the logic hybrids 117. During a scan, the address decoder 112 enables the multiplexer 113 so that the multiplexed control line 83 is connected to the logic hybrid 117. Then, in response to the off-hook signal from the SR terminal of the logic hybrid 117, current through a current limiting resistor 142 causes the voltage on the multiplexed control line 83 to be indicative of the off hook signal. To generate binary off-hook and on-hook signals for input to the microcomputer 55, a first comparator 143 compares the voltage on the multiplexed control line 83 to a seven volt reference to provide the off-hook input signal, and a second comparator 144 compares the voltage on the multiplexed control line to a five volt reference to provide the on-hook input signal. Two comparators rather than a single comparator are used to provide independent on-hook and off-hook input signals. If no logic hybrid circuit such as the circuit 117 is addressed, for example, the microcomputer 55 will neither receive an off-hook input signal nor an on-hook input signal.

The multiplexed control lines A and B in the speaker control bus operate in a similar fashion to the multiplexed control line 83 in the line-link control bus except that the multiplexed control lines A and B provide balanced connect and disconnect signals for directly energizing the latching relays 98. In order to generate the balanced connect and disconnect signals, a bridge including four electronic switches 145, 146, 147, and 148 is provided along with a logic gate 149 and inverters 150 and 151 which insure that the electronic switches do not cause a short circuit between the 12 volt supply voltage and ground. In the quiescent state, an electronic switch 147 is activated so that the B multiplexed control line is at about 12 volts. In order to turn on a particular latching relay 98 to connect its respective speaker to its respective one of the speaker audio lines S1, S2, the microcomputer 55 first addresses the speaker control module 90 so that the address decoder 92 enables the multiplexer 99 and the microcomputer further addresses the particular relay 98 so that the multiplexer 99 connects the A multiplexed control line to the relay 98. Then the microcomputer 55 activates the I/O logic 80 to transmit an active high "relay on" signal to the speaker control interface 85. This signal causes the inverter 150 to turn off the electronic switch 47, and the electronic switches 145 and 148 are turned on. Therefore, current flows from the A control line through the coil of the latching relay 98 to the control line B. This polarity of current causes the relay 98 to connect its corresponding speaker to its preassigned speaker audio line (S1 in FIG. 3).

In order to turn off the latching relay 98, a current pulse is set in the opposite direction through the coil of the relay. For this purpose the microcomputer 55 activates the I/O logic 80 to send an active high "relay off" signal to the speaker control interface 85. This signal causes a gate 149 to turn on the electronic switch 146. At this time the electronic switch 147 is already on. Therefore, current flows from the B control line through the coil of the relay 98 to the A control line. The latching relay 98 retains its on or off state between the occurrence of the relay on or the relay off command signals.

In order for the microcomputer 55 to receive a connection request from the staff station 46, the microcomputer 55 periodically scans each staff station. To scan the staff station 46, for example, the microcomputer 55 activates the address decoder 92 to enable the multiplexer 99 and, as shown, causes the multiplexer to connect the A control line to the coil of the latching relay 98. As shown, the priority call switch 44 is generating a priority call request by grounding the T terminal through the resistor 45. In connection with resistors 100 and 101, the current drawn through the resistor 55 is indicated by a drop in the voltage on the B control line from the voltage on the A control line. This drop in voltage is sensed by a first comparator 152 and is indicated by an active low binary input to the I/O logic 80.

In order to distinguish the priority call request from a normal call request, the normal request is generated by grounding of the T terminal directly to ground. This causes the voltage on the B control line to drop even further from the voltage on the A control line. This further drop is sensed by a second comparator 153 and is indicated by an active low signal to the I/O logic 80. Therefore, the normal call is indicated by both of the comparators 152, 153 generating active low signals, and the priority call request is indicated by only the comparator 152 generating an active low signal. The threshold levels for the two comparators 152, 153 are set by a resistor network including resistors 154, 155, 156, 157, and 158.

At this point the communication system 30 has been described in the general terms of how the various modules are connected together and the functions performed by each of the modules. This communication system has been reduced to practice and will be further described in detail so as to enable anyone of ordinary skill in the art to make and use this working embodiment. The working embodiment will be described in terms of electrical schematics shown in FIGS. 6–20 using the specific component numbers and values tabulated in Appendix III, and in terms of the computer code listed in Appendix IV. After discussion of the schematic diagrams for the circuits, the computer programming will be further described in connection with FIGS. 21–25.

Figure 6:
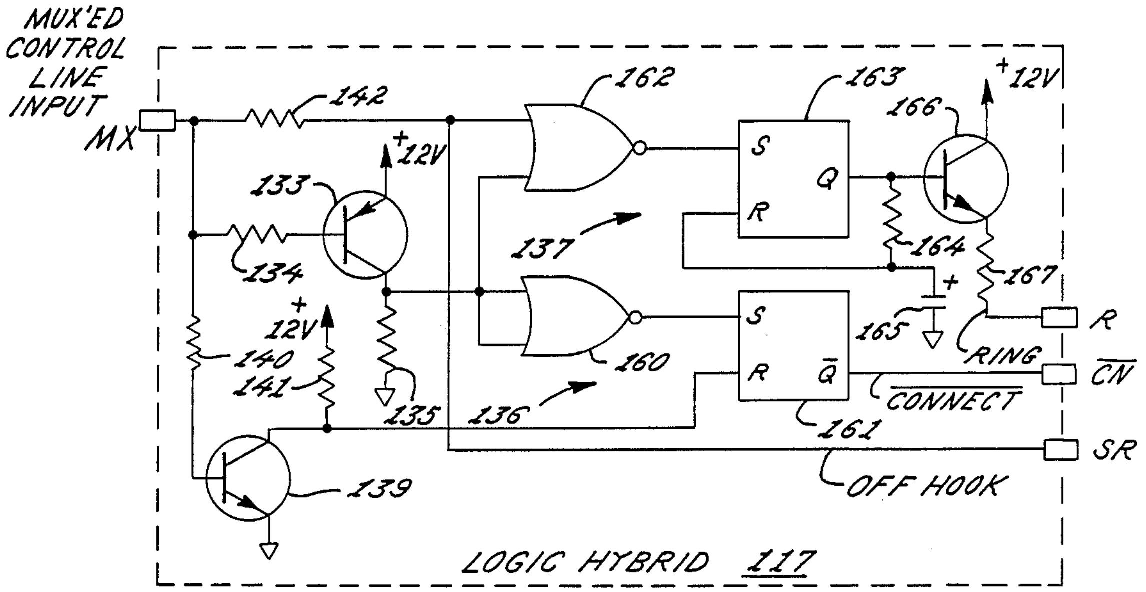
FIG. 6 is a schematic diagram of a "logic hybrid" used in a line-link module for interfacing a multiplexed bidirectional control line to each telephone line.

Turning now to FIG. 6, there is shown a schematic diagram of the logic hybrid generally designated 117. The flip-flop 136 is comprised of a NOR gate inverter 160 and a set-reset flip-flop 161. The gate 137 is comprised of a NOR gate 162 working in connection with a one shot and driver circuit comprising a set-reset flip-flop 163, an R-C delay circuit including a resistor 164 and capacitor 165, a transistor 166, and a current limiting resistor 167. Due to the feedback from the Q output to the reset input of the flip-flop 163, the flip-flop 163 acts as a one-shot to extend the ring signal for about half of a second after being set or triggered by a relatively narrow pulse representing the connect command from the microcomputer 55.

For generating the connect signal CN asserted low, the flip-flop generally designated 136 includes a NOR gate inverter 160 and a set-reset flip-flop 161.

Figure 7:
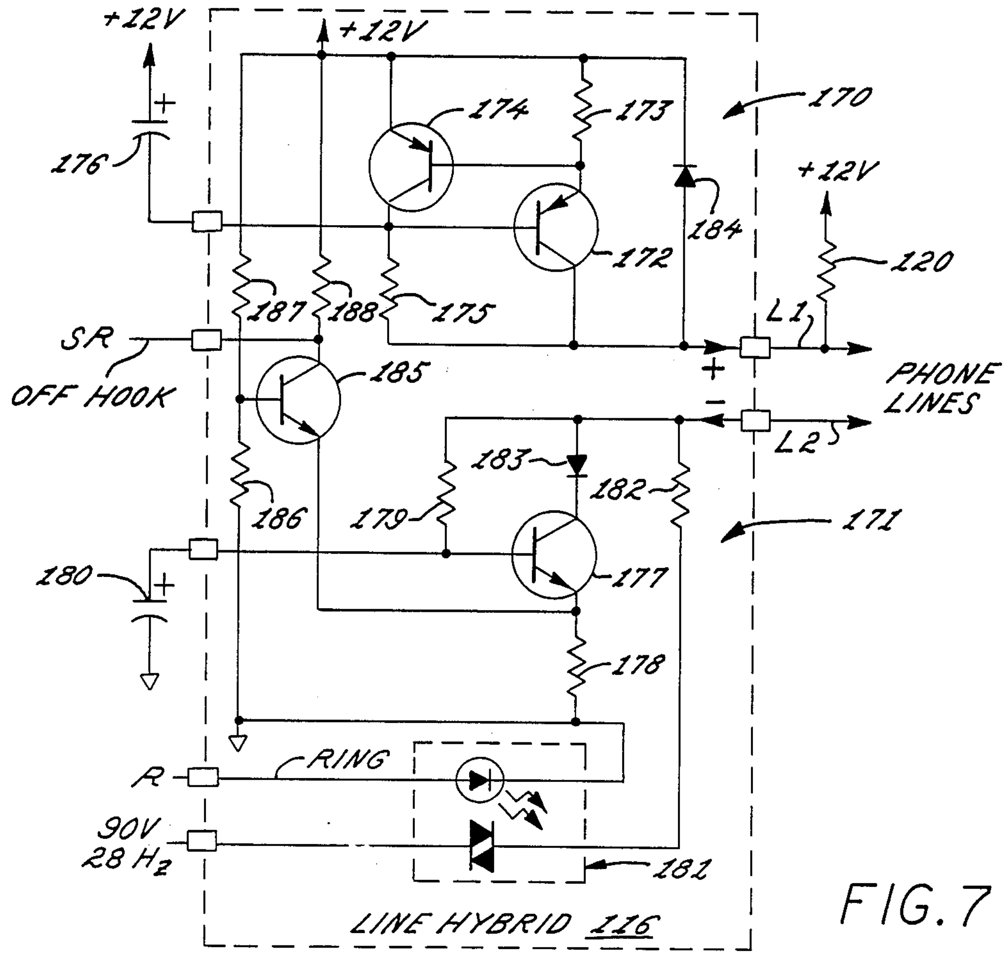
FIG. 7 is a schematic diagram of a "line hybrid" used in the line-link module for applying power and ring signal to a respective pair of phone wires.

Turning now to FIG. 7 there is shown a schematic diagram of the line hybrid 116. The line hybrid is provided to supply a DC current to the phone lines L1, L2 to maintain a dynamic impedance balance between the phone lines, to supply a ringing signal to the phone lines, and to determine whether the phone connected to the phone lines is on or off hook. DC current is sourced to the phone line L1 and is sinked from the phone line L2 by a transistor current source circuit generally designated 170 and by a transistor current sink circuit generally designated 171. The current sink circuit 171 has a dynamic impedance of approximately 1200 ohms. The current source circuit 170 has a much higher dynamic impedance, and therefore the resistor 120, having a value of 1200 ohms, is used to balance the phone lines L1, L2. The current source 170 includes a current sourcing transistor 172, a current setting resistor 173, a current limiting transistor 174, a biasing resistor 175, and an AC bypass capacitor 176. The resistor 173 has a value of about 11 ohms, the resistor 175 has a value of about 12 K ohms, and the capacitor 176 has a value of about 22 microfarads.

The current sink circuit 171 includes a current sinking transistor 177, a current setting resistor 178, a biasing resistor 179, and an AC bypass capacitor 180. The resistor 178 has a value of about 11 ohms, the biasing resistor 179 has a value of about 6.8 K ohms, and the capacitor 180 has value of about 220 microfarads. The capacitor 180 has about ten times of the capacitance as the capacitor 176 so that the current sinking resistor 177 will provide a high dynamic impedance at the 28 hertz frequency of the ringing signal, which is applied to the phone line L2 through a triac optocoupler 181 and a current limiting resistor 182 having a value of 470 ohms. A directional diode 183 is inserted in series with the collector of the current sinking transistor 177 to block current sourcing by the transistor 177 when the ringing signal causes the voltage at the phone line L2 to assume a negative value with respect to ground. For the current source circuit 170, however, it is desirable to prevent the phone line L1 from assuming a voltage value in excess of the 12 volt supply voltage so that the ringing signal will cause a ringing current to flow through the phone lines L1, L2. For this purpose a directional diode 184 has its anode connected to the phone. line L1 and its cathode connected to the 12 volt supply. Therefore, ringing current flows through the triac 181, the current limiting resistor 182, the phone line L2 to the phone, the phone line L1 from the phone, and through the directional diode 184 to the 12 volt supply. In the reverse direction the ringing current flows through the resistor 173 and transistor 172, but the flow of current through the resistor 173 and transistor 172 is limited to about 50 milliamperes by the transistor 174.

In order to sense whether the phone connected to the phone lines L1, L2 is off-hook, a transistor 185 functions as a common base amplifier to sense the voltage across the current sink resistor 178. The transistor 185 works in connection with biasing resistors 186, 187 and a load resistor 188. The resistors 186 and 187 have values of about 1.5 K ohms and 22 K ohms, respectively. The load resistor 188 has a value of about 10 K ohms. Therefore, the voltage at the base of the transistor 185 is about 0.75 volts, which is just sufficient to turn on the transistor when the voltage across the current sinking resistor 178 is zero, and is insufficient to turn the transistor 185 on when the current through the current sinking resistor exceeds about 10 milliamperes.

Figure 8:
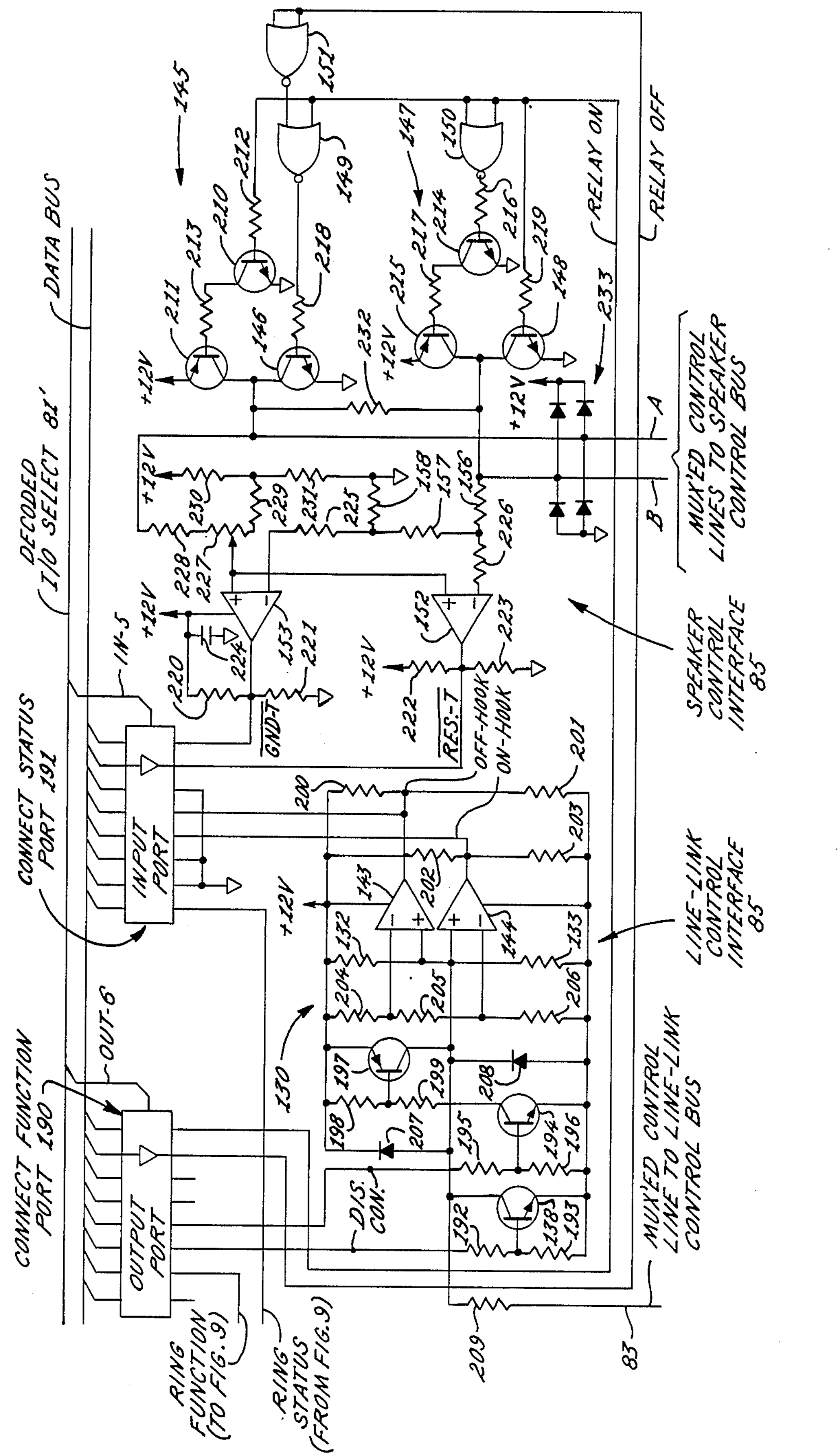
FIG. 8 is a schematic diagram of a speaker control interface and a line-link control interface used for interfacing respective speaker and line-link multiplexed bidirectional control lines to a central computer.

Turning now to FIG. 8, there is shown a schematic diagram of the line-link control interface 84 and the speaker control interface 85 and their associated I/O logic. The I/O logic includes a connect function output port 190 and a connect status input port 191. The ports 190, 191 receive and transmit data to the data bus 82 and are enabled for data transfer at certain microcomputer addresses in response to respective I/O select signals OUT6 and IN5. The I/O select signals are generated by an address decoder shown and further described below in connection with FIG. 15. The disconnect signal is applied to the transistor 138 through a resistive voltage divider comprising resistors 192 and 193. Similarly the connect signal is applied to a transistor 194 through a resistive voltage divider comprising resistors 195 and 196. The switch generally designated 130 which applies the connect signal to the multiplexed control line 83 further comprises a transistor 197 and resistors 198 and 199.

Associated with the comparators 143 and 144 for generating the off-hook and on-hook signals are output load resistors 200, 201, 202 and 203. The seven volt and five volt references are provided by a resistive voltage divider comprising resistors 204, 205, and 206. The positive inputs to the comparators 143 and 144 are protected by directional diodes 207, 208 which clamp the inputs of the comparators to within the 12 volt supply voltage and the 0 volt ground potential. Current to the clamping diodes is also limited by a resistor 209 in series with the multiplexed control line 83.

The electronic switches 145, and 147 in the speaker control interface 85 are provided by transistors 210, 211 and current limiting resistors 212, 213. Similarly the electronic switch 147 is provided by transistors 214, 215 and current limiting resistors 216 and 217. Moreover, current limiting resistors 218, and 219 are used in connection with the electronic switches 146 and 148 which are transistors.

Associated with the comparators 152, 153 for sensing grounding of the T terminal are output load resistors 220, 221, 222 and 223, as well as a power supply decoupling capacitor 224. The negative inputs to the comparators 152, 153 are wired in series with resistors 225 and 226. The resistive voltage divider network for the positive inputs to the comparators is slightly more complex than as is shown in FIG. 5. The network includes a potentiometer 227 for adjusting the thresholds, as well as fixed resistors 228, 229, 230, and 231.

In order that a GND-T or RES.-T signal will not be generated by the comparators 153, 152 when a line-link module or telephone is not addressed by the microcomputer, the multiplexed control lines A, B are shunted together through a resistor 232. Also, a bridge of four diodes 233 is used to clamp the multiplexed control lines A, B to within the 12 volt supply potential and ground to provide protection for the comparators 152, 153.

Figure 9:
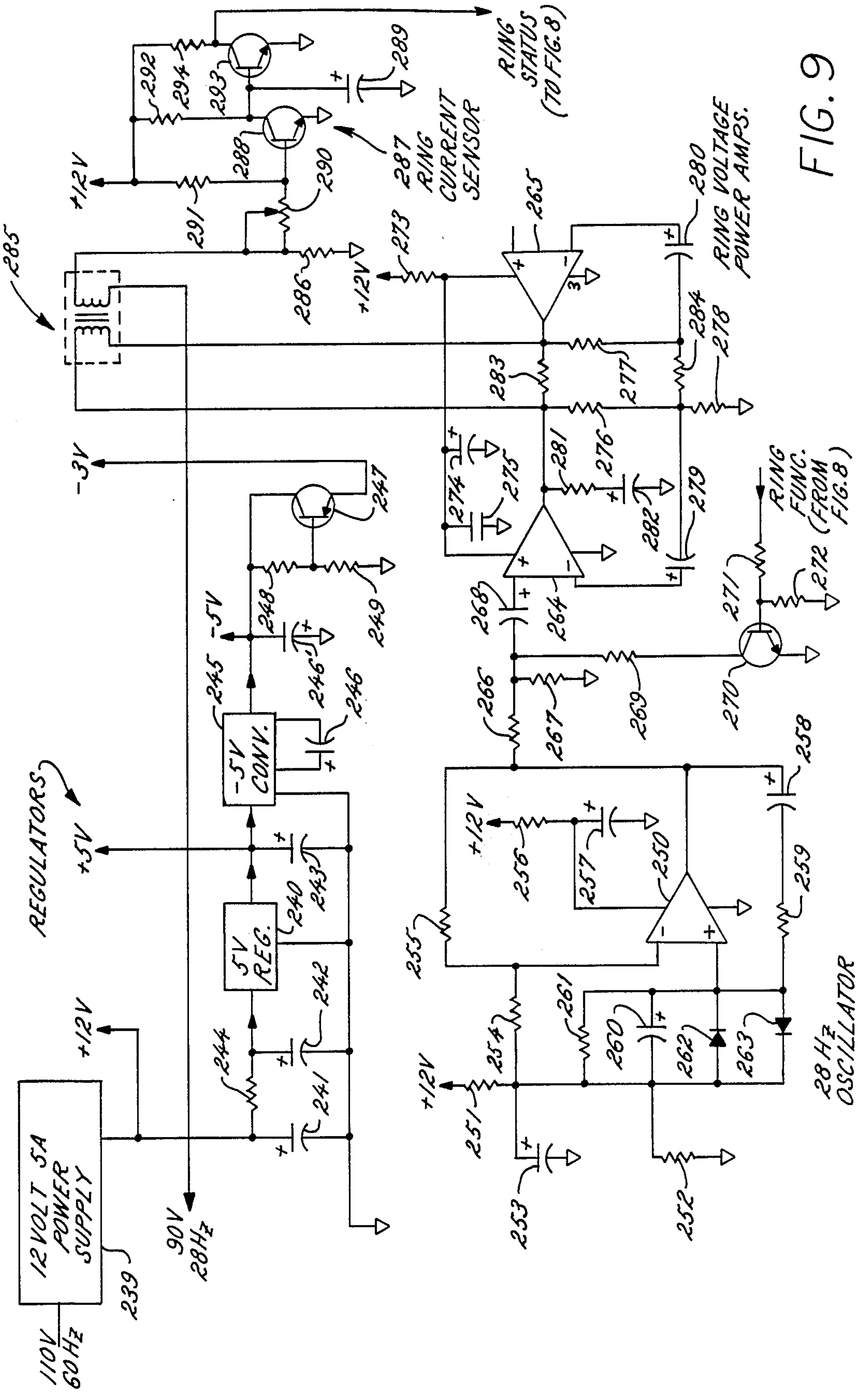
FIG. 9 is a schematic diagram of the power supply and ring generator circuits.

Turning now to FIG. 9, there is shown a schematic diagram of the power supply and ring generator circuits. A twelve volt DC, five ampere switching mode power supply 239 provides power for the communication system, exclusive of the power amplifiers 52, 53 for public address (see FIGS. 1 and 2) which are powered directly from the 110 VAC 60 Hz utility lines.

A supply voltage of +5 volts for the microcomputer is provided by a five volt regulator 240 which works in connection with electrolytic capacitors 241, 242, and 243 as well as a series resistor 244. A supply voltage of minus three volts is used by the link multiplexers 118 in the audio access circuits of the line-link modules 69. The minus three volt supply is provided by a minus five volt converter 245 working in connection with electrolytic capacitors 246, 246', and an emitter follower voltage divider comprising a transistor 247 and bias resistors 248 and 249.

The 28 hertz frequency for the ring signal is generated by a 28 hertz oscillator comprising an operational amplifier 250 working in connection with a supply decoupling network comprising resistors 251 and 252 and a capacitor 253, negative feedback resistors 254 and 255, a power supply decoupling resistor 256 and capacitor 257, and a positive feedback network comprising an electrolytic capacitor 258 and a resistor 259 as well as a shunt capacitor 260, a resistor 261 and signal limiting diodes 262 and 263.

The output of the oscillator is fed to a ring voltage power amplifier comprising push-pull amplifiers 264 and 265. The output signal from the oscillator, however, passes to the power amplifier 264 through an electronic switching network comprising a series resistor 266, a shunt resistor 267, a coupling capacitor 268, as well as a second shunt resistor 269 which is selectively connected to ground by a transistor 270. The transistor 270 is turned on and off by a ring control signal from the connect function port (190 in FIG. 8) which passes through a voltage divider network comprising resistors 271 and 272 before being applied to the base of the transistor 270.

Associated with the ring voltage power amplifiers 264 and 265 are a power supply decoupling resistor 273, power supply decoupling capacitors 274 and 275, negative feedback resistors 276, 277, 278, as well as negative feedback capacitors 279 and 280. Also associated with the power amplifiers 264 and 265 is a frequency compensating network including a resistor 281 and capacitor 282, as well as resistors 283 and 284 which cross couple the two power amplifiers 264 and 265.

The differential output of the power amplifiers 264, 265 is boosted from 6 volts to 90 volts by a step-up transformer generally designated 285. The secondary of the transformer 285 is wired in series to ground through a current sensing resistor 286 which is part of a circuit generally designated 287 for sensing whether ring current is actually flowing through a telephone. The ring current sensor 287 comprises a first transistor 288 for discharging a smoothing capacitor 289 in the presence of ring current. The sensitivity of the transistor 288 is determined by a variable resistor 290 working in connection with a biasing resistor 291. The recovery time of the ring current sensor is determined by a resistor 292 for charging the smoothing capacitor 289. The state of charge of the smoothing capacitor is sensed by a second transistor 293 having a load resistor 294. The ring status signal is generated at the collector of the second transistor 293.

Figure 10:
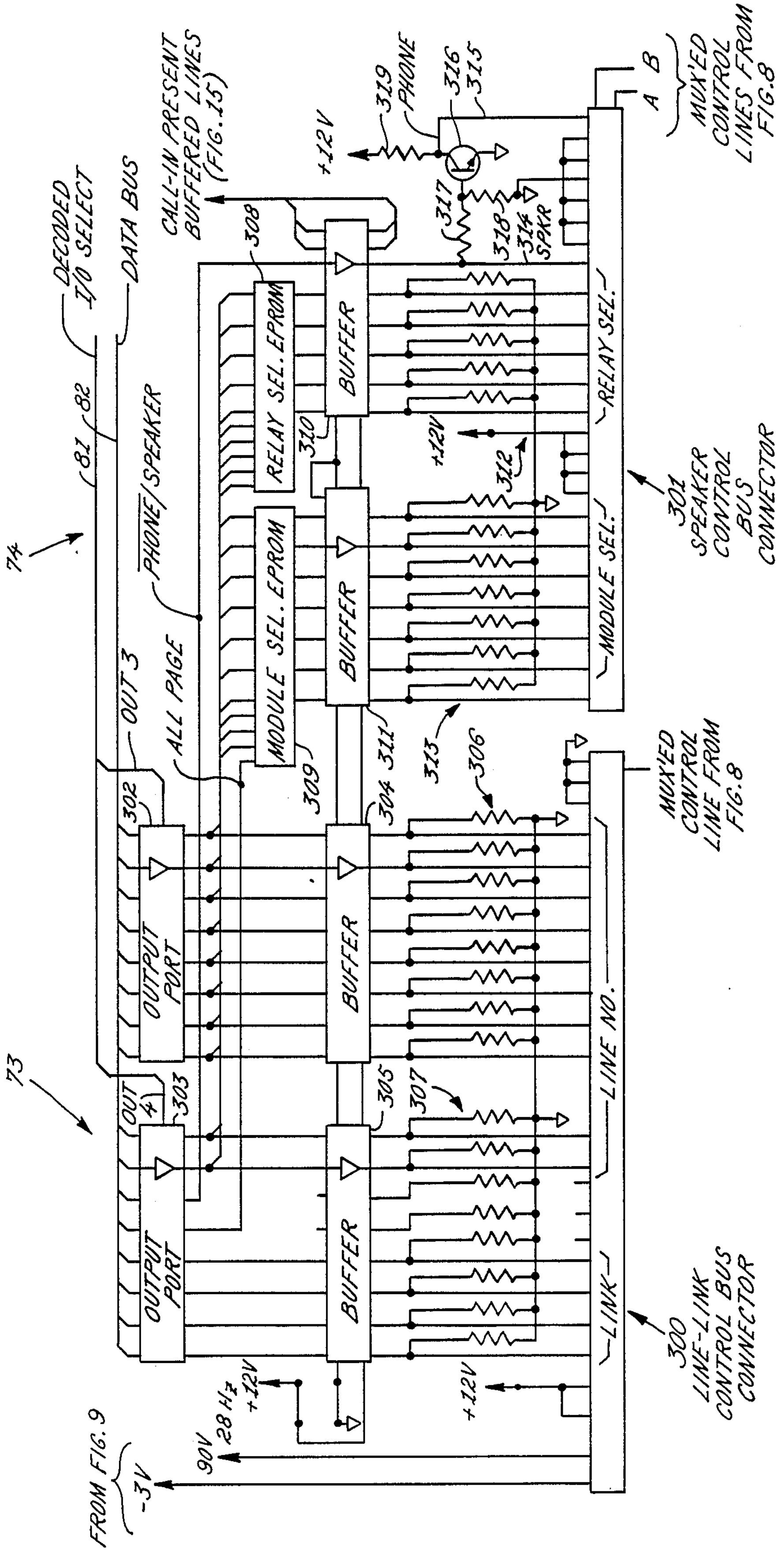
FIG. 10 is a schematic diagram of the input/output circuits between the microcomputer and the line-link control bus and the speaker control bus.

Turning now to FIG. 10 there is shown a schematic diagram of a portion of the input/output logic between the microcomputer and the line-link control bus 71 and the speaker control bus 72. During assembly the line-link control bus is connected to a line-link connector 300 and the speaker control bus 72 becomes connected to a speaker control bus connector 301.

The I/O logic 73 for the line-link control bus and the I/O logic 74 for the speaker control bus share two common output ports 302, 303 which receive data from the data bus 82 when selected by the signals OUT3 and OUT4, respectively, from the I/O select lines 81. It should be noted that the output signals from the output ports 302, 303 are simultaneously transmitted over the line-link control bus and the speaker control bus, and a line-link module or a speaker control module or both may respond depending on whether a line-link module or a speaker control module has its address select switches set for the module select number or the line group select number being transmitted over its respective control bus. This will be further described below in connection with FIG. 21.

The data from the output ports 302, 303 correspond to the line number and link number in binary code. Therefore, the data from the output ports 302, 303 are fed directly to drivers 304, 305 and are asserted on the line-link control bus connector 300. The drivers 304, 305 work in connection with lK ohm pull-down resistor packs generally designated 306, 307.

The module select number and the relay select number, however, do not correspond to portions of the binary code for the data from the output ports 302, 303. Rather, they are a predetermined function of this data. The translation of the output port data to the module select number and relay select number is performed by a "relay select" electrically programmable ROM 308 and a "module select" electrically programmable ROM 309. These ROMs are programmed to provide the correspondence between the module select number, relay select number, link number and line select number as shown in FIG. 21 and further described below. The outputs of the relay select ROM and module select ROM are asserted on the speaker control bus connector 301 by buffers 310, 311 which work in connection with 1 K ohm pull-down resistor packs generally designated 312 and 313.

One bit of the data output from the output port 303 is provided to select speakers or phones. This bit is asserted on a line 314 to the speaker control bus connector 301. To simplify decoding at the speaker control modules, the complement of this bit is also asserted on a second line 315 through the speaker control bus connector 301. The complement bit is provided by a resistor-transistor inverter including a transistor 316, input resistors 317 and 318, and a load resistor 319.

Figure 11:
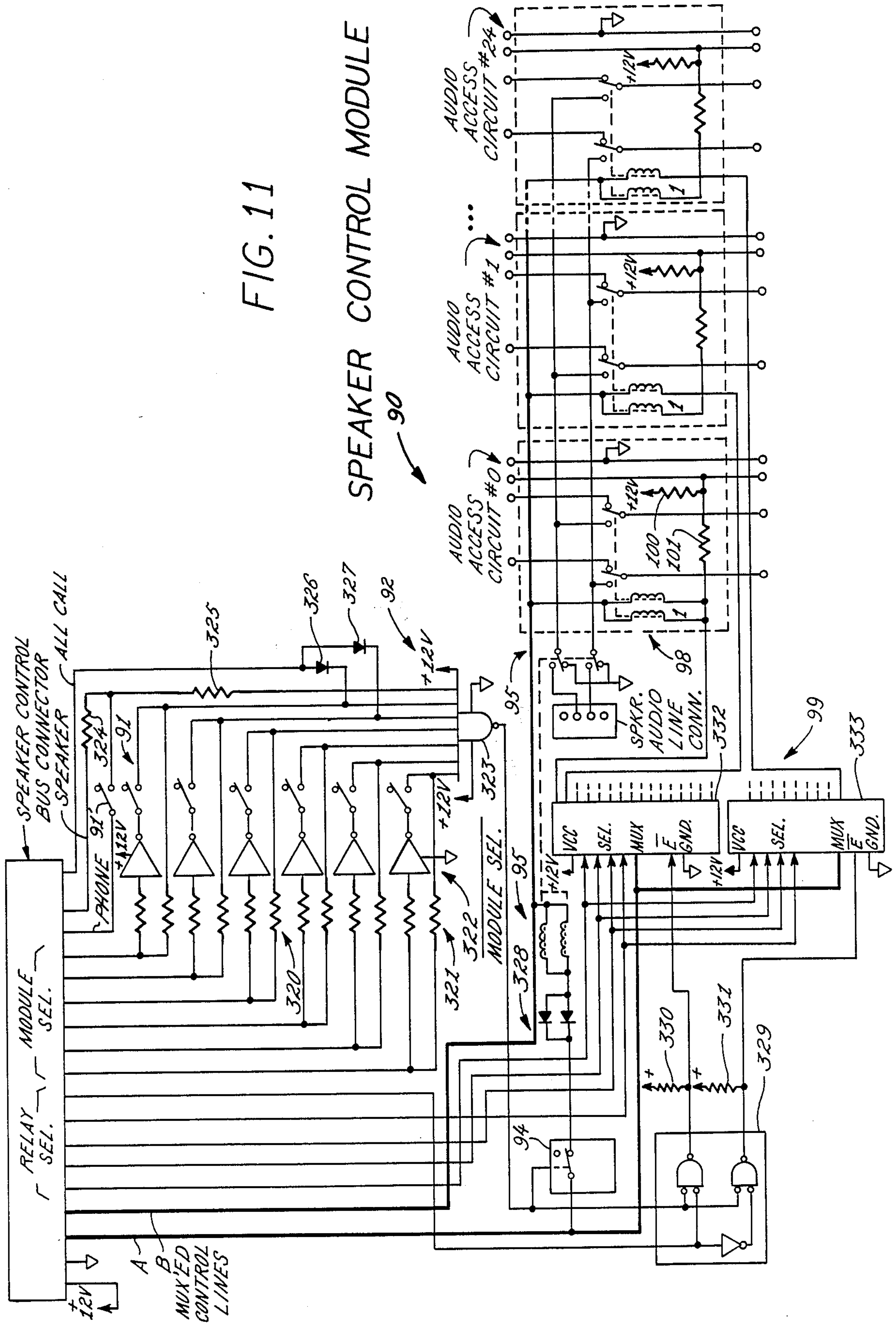
FIG. 11 is a schematic diagram of a speaker control module.

Turning to FIG. 11, there is shown a detailed schematic of a speaker control module 90. The module select signals are fed in series through 100 K ohm resistors in resistor packs 320 and 321. The complements of the module select signals are obtained by inverters generally designated 322. The module select switches 91 determine whether a complement or true value of each module signal is applied to the address decoder 92 which comprises an eight input NAND gate 323. The address decoder 92 also receives a speaker select signal (from line 314 of FIG. 10) through a resistor 324 or a staff phone selection (from line 315 of FIG. 10) through an addresses select switch 91'. The selected signal is fed to the gate 323 through another resistor 325.

For calling a large number of the intercom speakers and single link staff phones, an "all call" signal is sent across the speaker control bus. The "all call" signal is applied to the address decoder 323 through two directional diodes 326 and 327 so that the two most significant bits of the module select number are forced to values for enabling the address decoder gate 323. This means that four speaker control modules having different address can be called simultaneously to speed up the "all call" process.

As shown in FIG. 11, a pair of directional diodes generally designated 328 are connected in series between the electronic switch 94 and the module select relay 95. The diodes 328 isolate the coil of the module select relay when the microcomputer is sensing whether a connection request is present. For this reason the module select relay was not shown in FIG. 5. Also, the speaker select multiplexer 99 is comprised of a two-bit decoder 329, pull-up resistors 330 and 331, a first 16-bit analog multiplexer 332, and a second 16-bit analog multiplexer 333.

Figure 12:
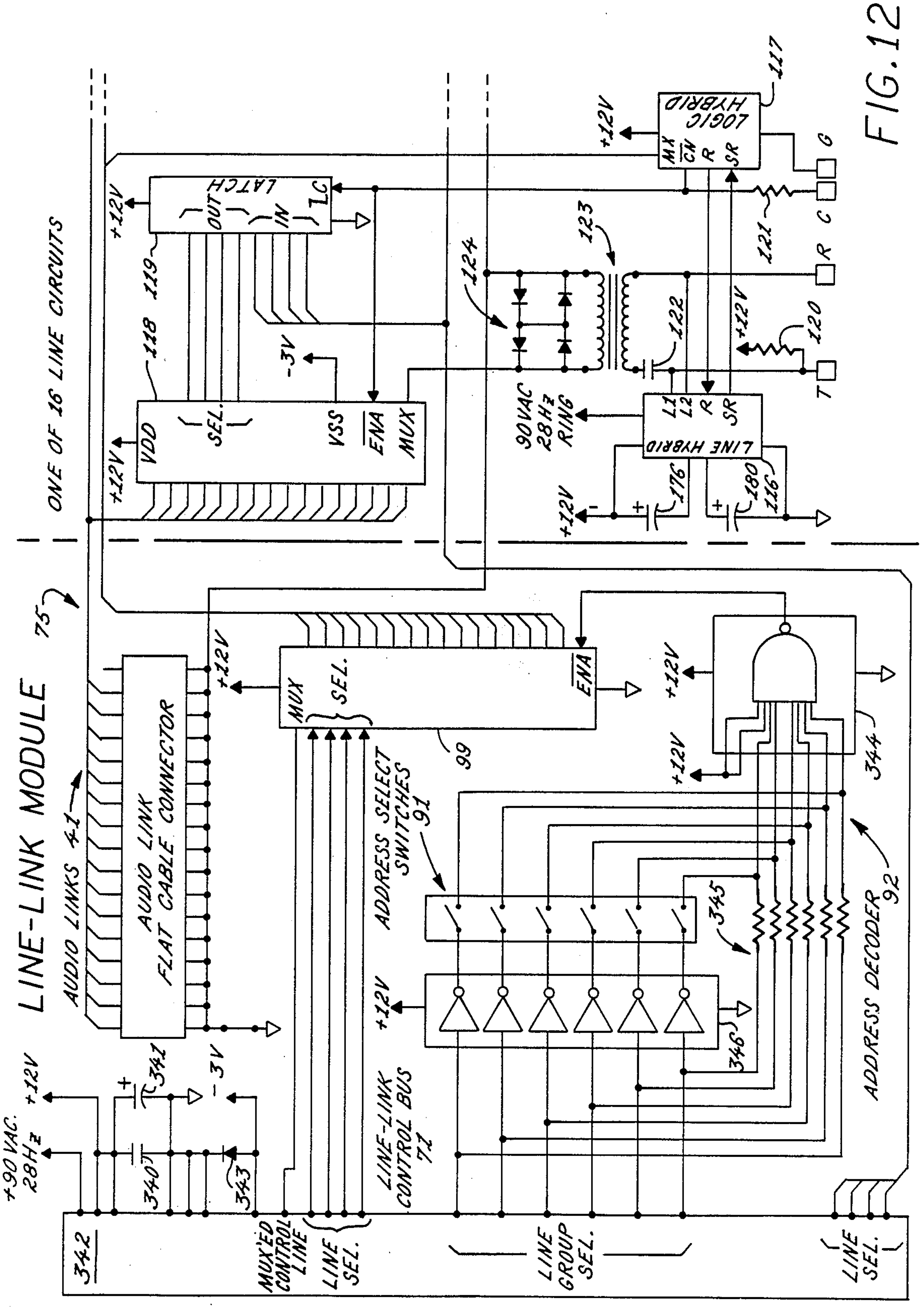
FIG. 12 is a schematic diagram of a line-link module.

Turning to FIG. 12 there is shown a detailed schematic diagram of the line-link module 75. Since the line-link module includes the edge triggered latch 119, power supply decoupling capacitors 340 and 341 condition the 12 volt supply voltage received from the line-link control bus connector 342. Also, the minus 3 volt supply line is protected by a directional diode 343.

The address decoder 92 comprises an eight input NAND gate 344 working in connection with a 100 K ohm resistor pack 345 and a set of inverters 346.

Figure 13A:
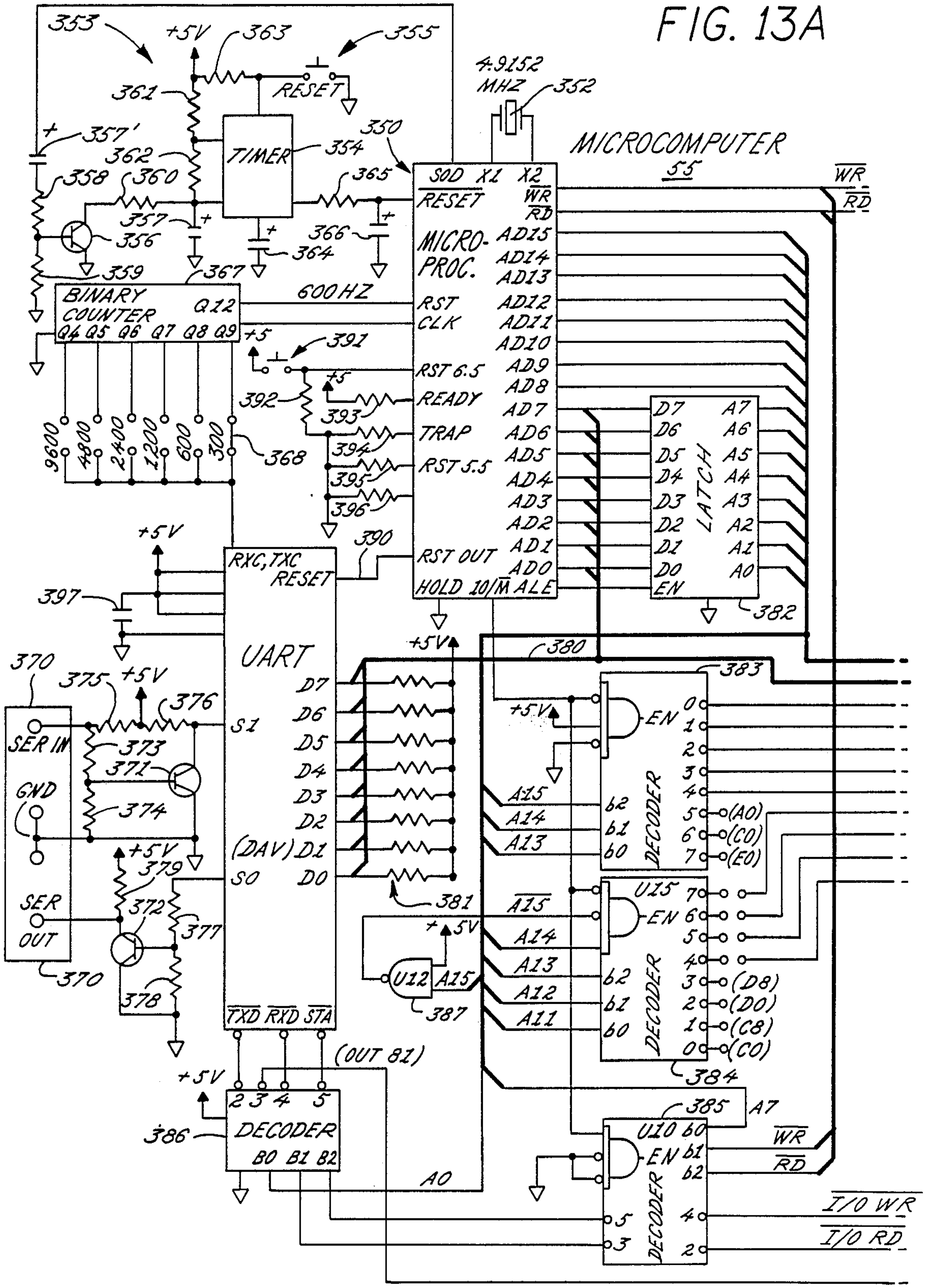
FIGS. 13A, 13B, and 13C together comprise a schematic diagram of the central circuits of the microcomputer including a microprocessor, read-only memory, random access memory, electrically alterable memory, and associated control circuits.
Figure 13B:
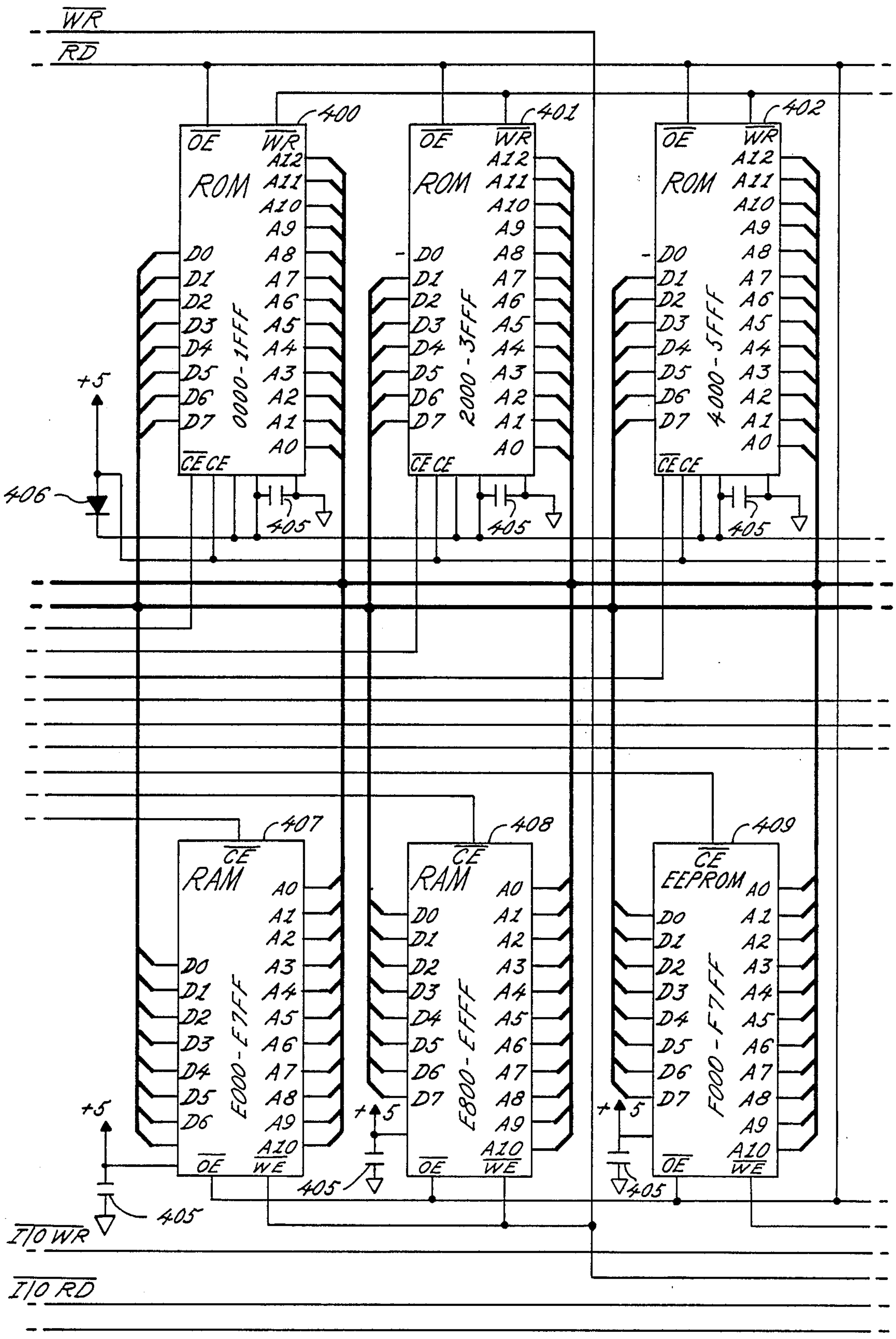
Figure 13C:
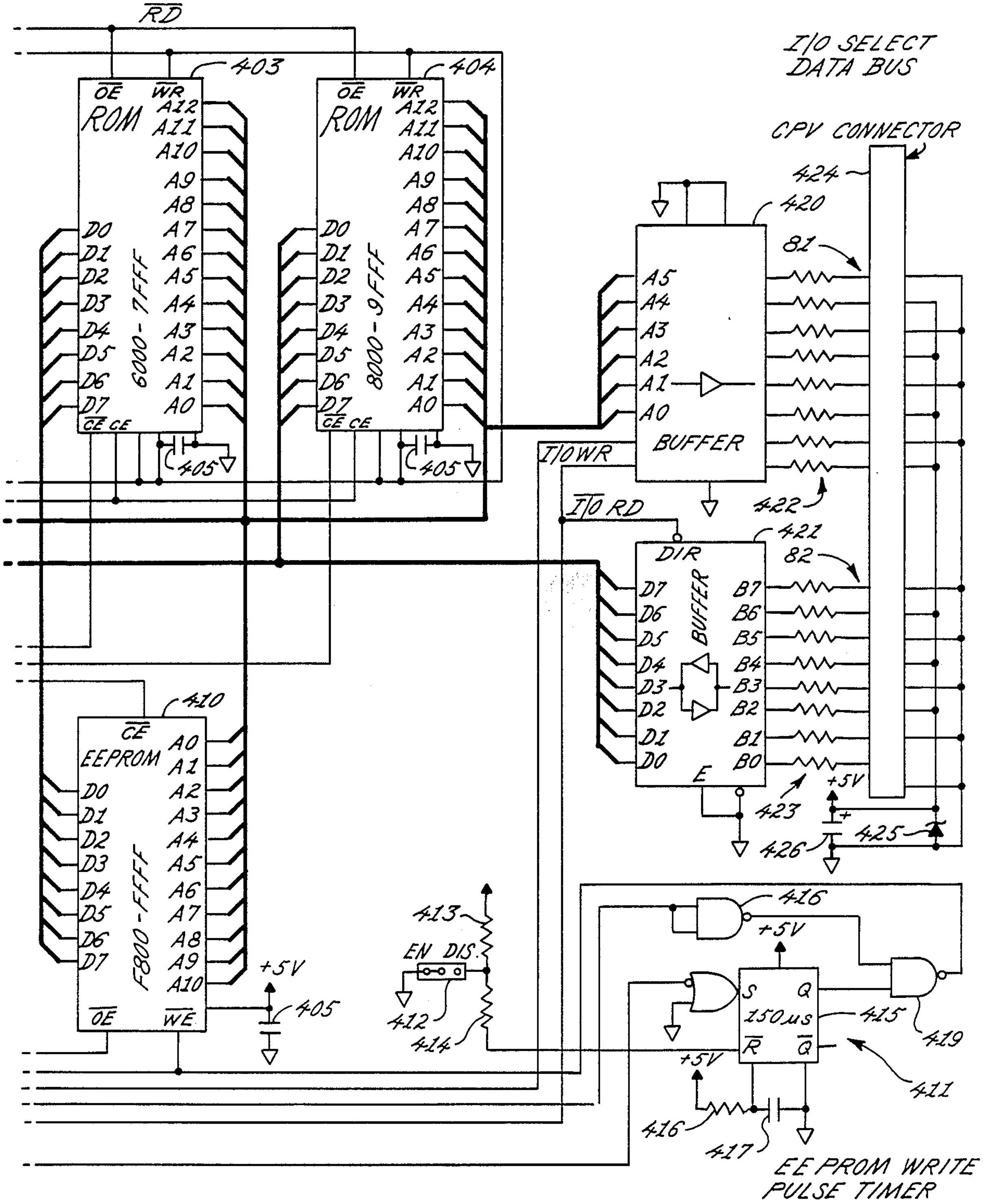

Turning to FIGS. 13A, 13B and 13C, there is shown a detailed schematic diagram of the microcomputer 55. The microcomputer 55 is based upon an Intel 8085 microprocessor generally designated 350 in FIG. 13A. The microprocessor 350 is clocked by a 4.9152 megahertz quartz crystal 352 and has a watchdog timer circuit generally designated 353 including a type 555 timer 354, a reset switch 355, and a transistor 356 for discharging a timing capacitor 357 in response to the SOD microcomputer output which is periodically pulsed during normal operation. The transistor 356 works in conjunction with an input capacitor 357' and resistors 358 and 359, as well as a discharge current limiting resistor 360. The timer 354 works in connection with a load resistor 361, a discharge current limiting resistor 362, a reset switch pull-up resistor 363, a capacitor 364, an output resistor 365, and a pulse shaping capacitor 366.

The microprocessor 350 is periodically interrupted by 600 hertz signal applied to its RST input and generated by a binary counter 367. An output of the binary counter 367 is also selected by a jumper 368 in order to provide a desired baud rate for a UART 369. The UART provides a serial port at a connector 370 for providing communication between the microcomputer 355 and an external terminal (not shown) which presently is not used. The UART 369 is connected to the serial port connector 370 by transistor converters comprising transistors 371, 372 and resistors 373, 374, 375, 376, 377, 378, 379. The microprocessor 350 exchanges data with the UART 369 over a tri-state bus 380 connected to a pack of 4.7 K ohm pull-up resistors generally designated 381.

The microprocessor 350 shares its lower eight address bit output with the data bits, and therefore uses an external latch 382 to separate these address bits from the data. The most significant address bits are used to enable the various memory chips in the microcomputer 55 via address decoders 383, 384, 385, 386. The decoder 384 works in connection with a NAND inverter 387 and the decoder 386 also enables various functions of the UART 369.

The UART 369 has a reset line 390 from the microprocessor 350. Its reset function is controlled in part by a push button switch 391, working in connection with a resistor 392. The microprocessor 350 also works in connection with resistors 393, 394, 395 and 396. The UART also has a power supply decoupling capacitor 397.

The microcomputer 55 has various memory chips shown in FIGS. 13B and 13C. The microcomputer has read only memory (ROM) chips 400, 401, 402, 403, and 404 for storing the program of the microcomputer 55. This program is listed in Appendix IV. The ROM chips 400–404 are labeled with the respective address ranges of their stored data and provide 40k bytes of memory capacity. The ROM chips 400–404 are part number 2764 and work in connection with power supply decoupling capacitors 405, and a directional diode 406.

The microcomputer 55 has random access memory (RAM) chips 407 and 408 in order to store intermediate results. The RAM chips 407, 408 are part number 2016 and provide 4k bytes of memory capacity.

In order to provide user-programmable functions or attributes for the various stations in the communication system, the microcomputer 55 includes electrically alterable memory chips 409, 410 providing 4k bytes of non-volatile user programmable memory capacity. They are initially programmed with data as shown in Appendix V. The electrically alterable memory 409, 410 are part number 2816 and work in connection with a 150 microsecond write pulse timer generally designated 411. For protection of the electrically *alterable memory 409, 410 against loss of power or a computer "crash", the microcomputer must first trigger the write pulse timer and then send a write command to the electrically alterable memory within the 150 microsecond interval, in order to alter the information stored in the electrically alterable memory.

The write pulse timer can be disabled by a jumper 412 working in connection with resistors 413 and 414 to prevent the users of the communication system from changing the functions or attributes once the functions or attributes have been programmed. The write pulse timer 411 also includes a one-shot generally designated 415 working in connection with a pulse time setting resistor 416 and capacitor 417, as well as a NAND inverter 418 and a NAND gate 419.

In order to interface the microcomputer 55 to the main input/output module 56, the microcomputer includes a buffer generally designated 420 for driving the I/O select bus 81 and a bidirectional buffer 421 for driving the data bus 82. The buffers 420, 421 work in connection with 100 ohm current limiting resistor packs 422 and 423. The I/O select bus 81 and data bus 82 extend from a CPU connector 424 for a 34 pin flat cable linking the microcomputer 55 to the main input/output module 56. The CPU connector 424 also supplies 5 volt power to the microcomputer, and the power connection includes a zener protection diode 425 and a power supply decoupling capacitor 426.

Figure 14:
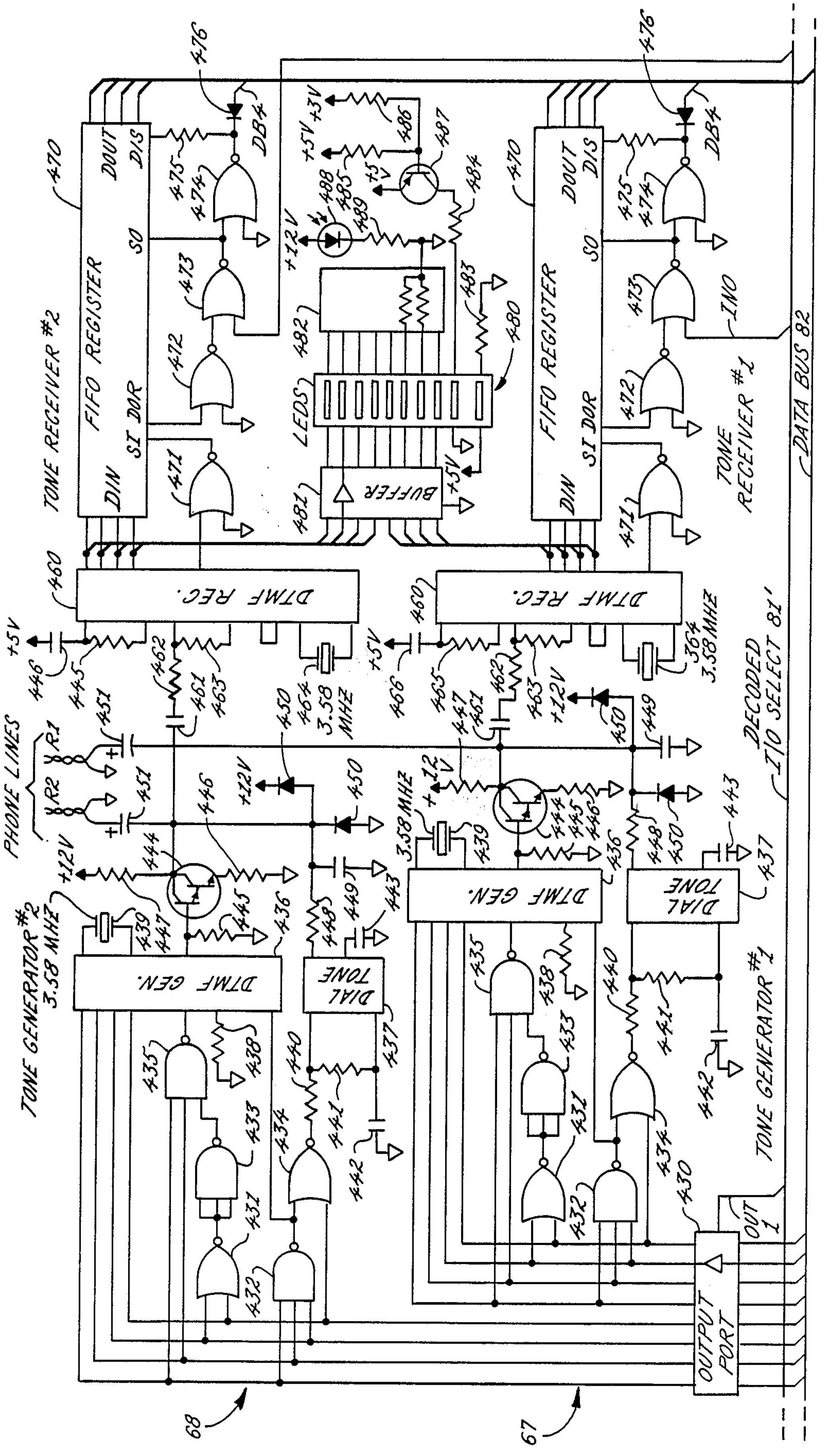
FIG. 14 is a schematic diagram of dual-tone multi-frequency (DTMF) transmitter/receivers which enable dial telephones to transmit alphanumeric symbols to the microcomputer and also enable the microcomputer to communicate with outside trunk lines via a central office adapter.

Turning now to FIG. 14 there is shown a schematic diagram of the dual-tone multi-frequency transmitter-receivers 67, 68. The data to be transmitted is received from the microcomputer on an output port 430 selected by the signal OUT1. Each transmitter or tone generator includes tone selection logic gates 431, 432, 433, 434 and 435, a DTMF generator 436, and a dial tone generator 437. Each DTMF generator 436 works in connection with a resistor 438 and a quartz crystal 439. Each dial tone generator 437 works in connection with input resistors 440, 441 and capacitors 442 and 443.

In order to drive the phone lines R1, R2, there is associated with each line a driver circuit including a Darlington transistor 444 working in connection with resistors 445, 446 and 447. The dial tone is mixed in through a resistor 448 and harmonic frequencies are limited by a shunt capacitor 449. For each phone line there is provided a pair of protection diodes 450 and an AC coupling capacitor 451.

Each dual-tone multi-frequency receiver comprises a DTMF receiver integrated circuit 460 coupled to the respective phone line R2, R1 through a coupling capacitor 461 and resistors 462 and 463. The DTMF receivers 460 each work in connection with a quartz crystal 464, a resistor 465 and a capacitor 466.

In order to interface each DTMF receiver 460 with the microcomputer 55, each DTMF receiver is provided with a first-in first-out register 470 working in connection with NOR gates 471, 472, 473, and 474 as well as a resistor 475 and a directional diode 476.

To indicate the data received by the DTMF receiver, there is provided an array of lightemitting diodes generally designated 480 which is driven by a buffer circuit 481. The light-emitting diodes 480 work in connection with a current limiting resistor pack 482. Two of the light-emitting diodes 480 indicate whether the supply voltages are present, and they work in connection with resistors 483, 484, 485, and 486, and also a transistor 487. A separate light-emitting diode 488 and current limiting resistor 489 are provided for indicating whether the plus 12 volt supply voltage is present.

Figure 15:
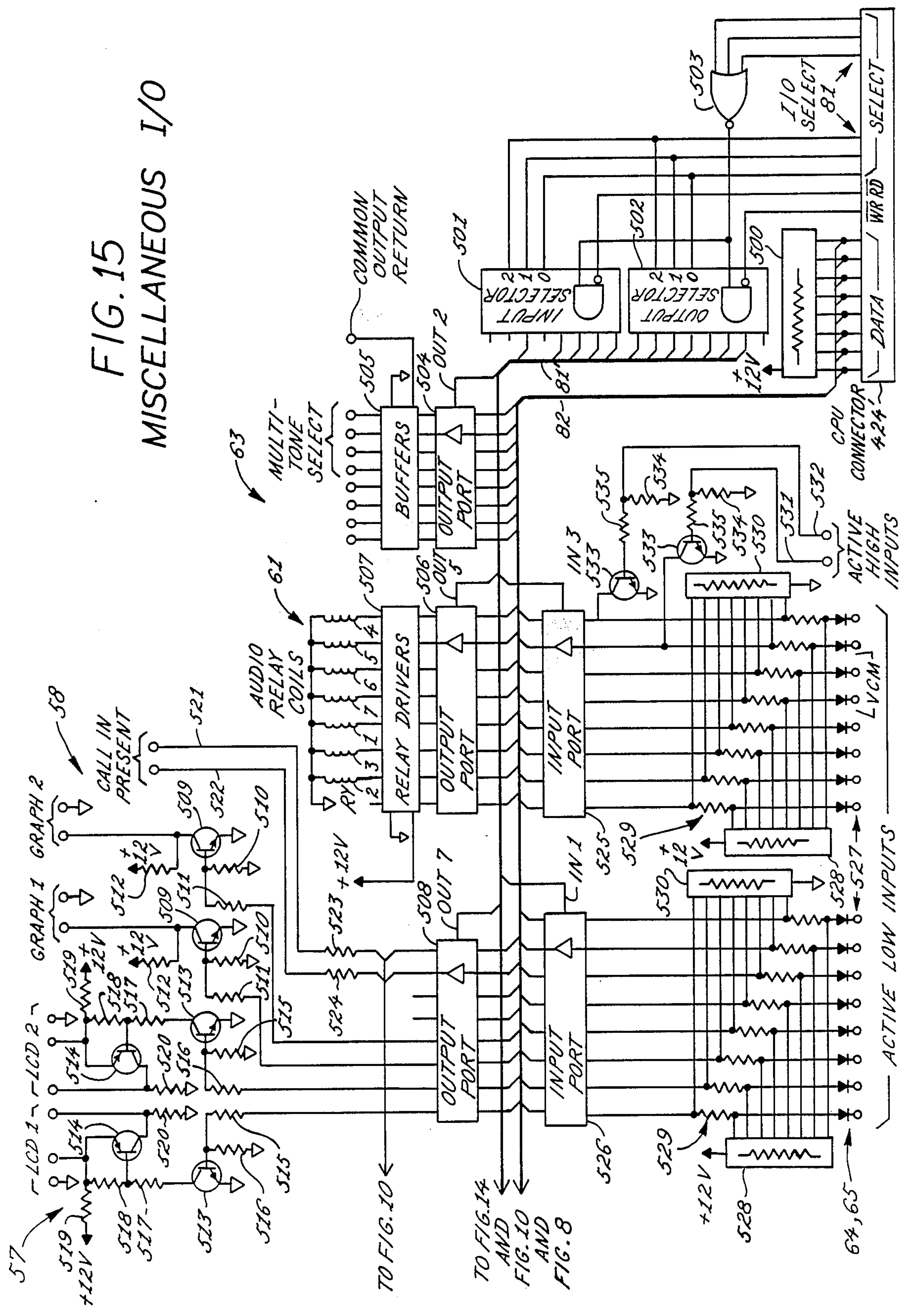
FIG. 15 is a schematic diagram of miscellaneous input/output circuits including drivers to liquid crystal, vacuum fluorescent and graphic displays.

Turning now to FIG. 15, there is shown a schematic diagram of input/output circuits 57 for the LCD displays, the input/output circuits 58 for the graphic displays, the output circuits 61 for the audio relays, and the miscellaneous input and output circuits 63, 64 and 65.

Data and address lines are received from the microcomputer 55 from a CPU connector 424'. The data lines are connected to a pull-up resistor pack 500 and are also connected to the various input and output ports in the main input/output unit. For enabling the various input and output ports, I/O select line signals on the I/O select bus 81 are decoded in an input selector 501 and an output selector 502 working in connection with a tripleinput NOR gate 503.

Miscellaneous outputs 63, some of which are used for activating the multi-tone generator 54 (see FIG. 1) are provided by an output port 504 selected by the OUT2 select signal and are buffered by a buffer circuit 505.

The audio relays 61 are driven by an output port 506, selected by the OUT5 select signal, and are buffered by a buffer circuit 507. The graphic displays, LCD and VFD displays are driven by an output port 508 selected by the OUT7 signal. Transistor circuits for driving graphic displays include transistors 509 and resistors 510, 511 and 512. Similarly, transistor circuits used for driving the LCD or VFD displays include transistors 513, 514 and resistors 515, 516, 517, 518, 519, and 520. Associated with the graphic displays and LCD or VFD displays are two outputs 521 and 522 for indicating whether a normal call-in or a priority call-in is present. These signals are buffered by the buffer circuit 310 in FIG. 10 and by current limiting resistors 523 and 524 in FIG. 15.

The miscellaneous inputs 64, 65 are received by input ports 525 and 526 which are enabled by select signals IN3 and IN1, respectively. Active low input terminals to these input ports are provided by directional diodes 527, pull-up resistors 528, series resistors 529, and pull-down resistors 530. Two active high inputs are provided on lines 531 and 532 by transistors 533 and input resistors 534 and 535.

Figure 16A:
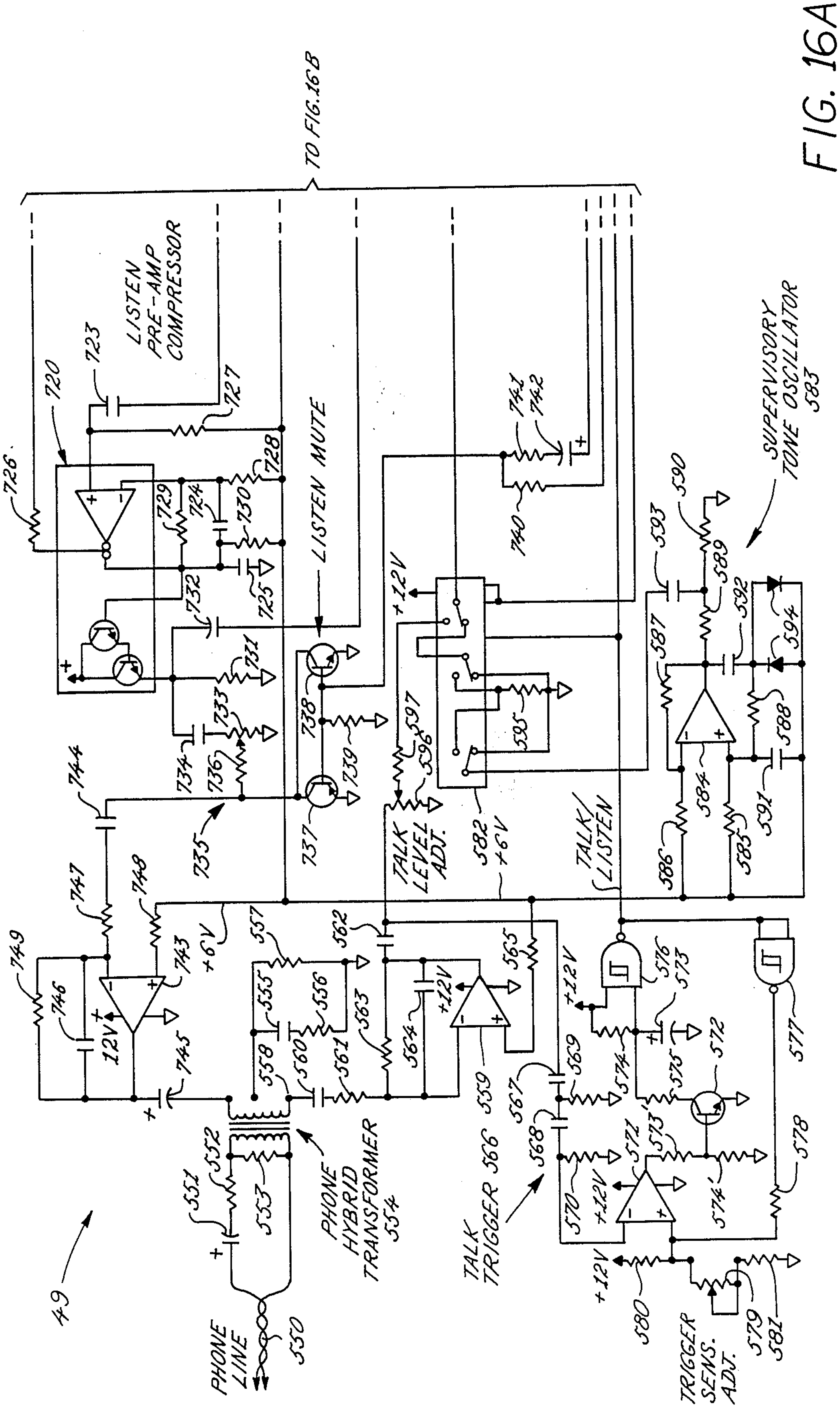
FIGS. 16A and 16B together comprise a schematic diagram of a voice controlled amplifier module (VCM) which is used to provide bidirectional communication between intercom speakers and telephones.
Figure 16B:
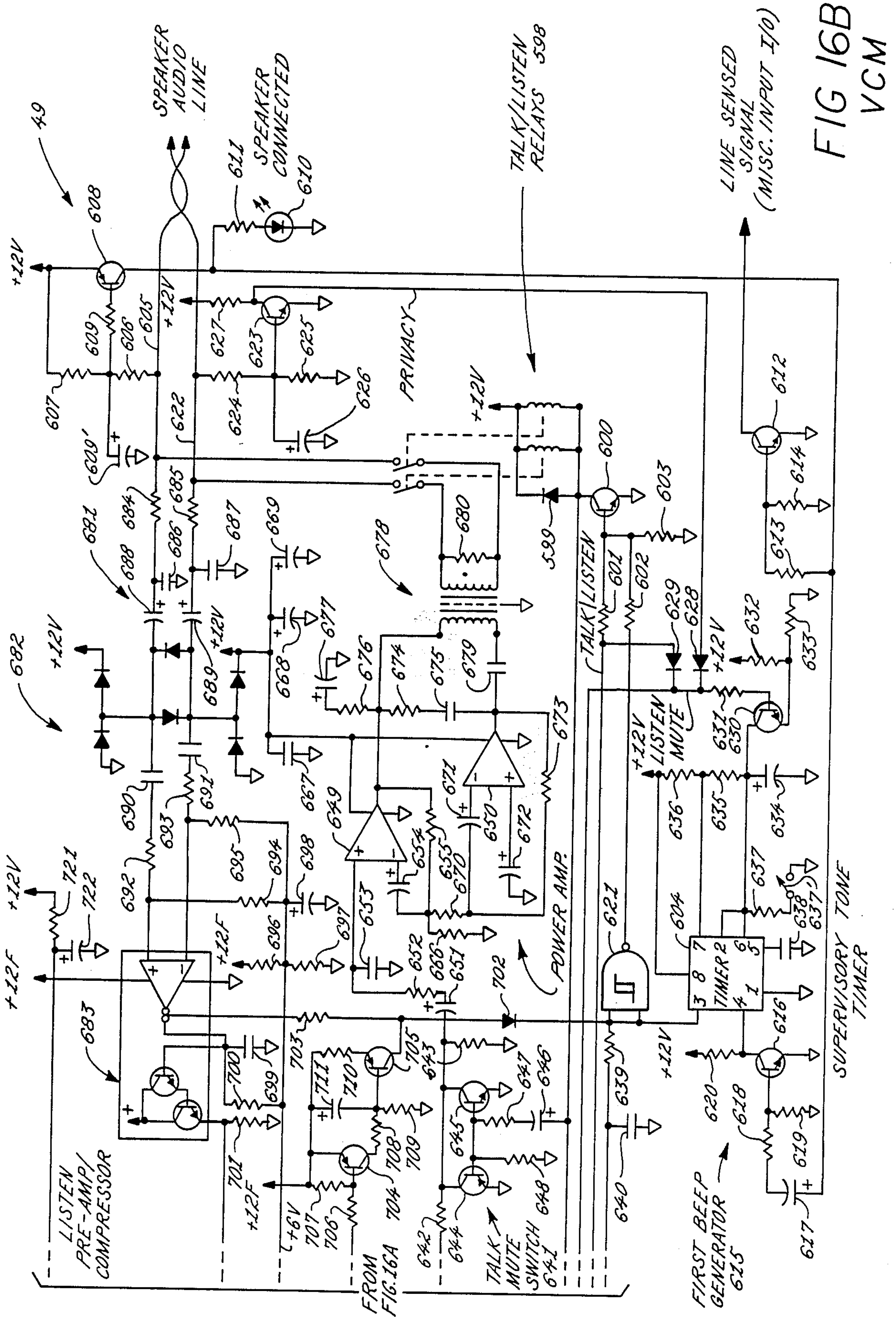

Turning now to FIGS. 16A and 16B, there is shown a schematic diagram of one voice controlled amplifier module 49. The VCM receives a phone line 550 which is connected to an AC bypass capacitor 551, a series resistor 552, a shunt resistor 553, and a phone hybrid transformer 554. The center tap of the phone hybrid transformer 554 is shunted to ground through a frequency compensating network comprising a capacitor 555 and resistors 556 and 557.

The phone hybrid transformer 554 has a secondary tap 558 used to receive audio signals from the phone line 550. The secondary tap 558 is connected to a preamplifier 559 working in connection with an input capacitor 560, an input resistor 561, an output capacitor 562, a negative feedback resistor 563 and a negative feedback capacitor 564. The purpose of the phone hybrid transformer 554 is to prevent any audio signal from an intercom speaker (and which passes through amplifier 743) from feeding into the preamplifier 559. The phone hybrid transformer is part No. 671-1208 sold by the Midcom Division of Midland-Ross Co. The preamplifier 559 is biased through a resistor 565 connected to a 6 volt supply.

The output of the preamplifier 559 is fed to a talk trigger generally designated 566 for controlling the direction of the conversation between the telephone and the intercom speaker presently using the VCM. The talk trigger 566 includes a high pass filter having capacitors 567, 568 and resistors 569 and 570. The signal from the high pass filter is fed to a capacitor 571 which turns on and off a transistor 572 for discharging a capacitor 573 which is charged through a resistor 574. Associated with the transistor 572 are input resistors 573', 574' and a current limiting resistor 575. A Schmitt trigger NAND gate 576 senses the voltage on the capacitor 573 in order to generate a TALK/LISTEN signal. A second NAND gate 577 provides negative feedback to the comparator 571 through a resistor 578. The sensitivity of the talk trigger is set by an adjustable resistor 579 working in connection with fixed resistors 580 and 581.

The TALK/LISTEN signal activates solid-state switches 582 for controlling the direction of amplification through the VCM 49 and also for sending a supervisory tone to the intercom speaker presently connected to the VCM when the intercom speaker is sending audio signals back to the phone line 550. The supervisory tone is generated by a supervisory tone oscillator generally designated 583 which comprises an operational amplifier 584 working in connection with resistors 585, 586, 587, 588, 589, 590, and capacitors 591, 592, and 593. The supervisory tone oscillator 583 also includes a pair of amplitude limiting directional diodes 594.

To prevent leakage of the supervisory tone through the electronic switch 582, the supervisory tone must pass through two of the switches 582 which are connected to an intermediate shunt resistor 595. Electronic switches 582 also receive the signal from the preamplifier 559 after passing through a potentiometer 596 for setting the talk level and a series resistor 597.

Continuing now on FIG. 16B, the TALK/LISTEN signal is used to control talk/listen relays generally designated 598 for further controlling the direction of sound transmission through the VCM. The relays 598 include a damper diode 599 and are turned on and off by a transistor 600 working in connection with resistors 601, 602, and 603. The transistor 600 is also responsive to whether a supervisory tone is present. The supervisory tone is transmitted to the speaker for a certain time period after connection of the speaker. This certain time period is determined by a supervisory tone timer generally designated 604.

To detect when a speaker is connected, one of the speaker audio lines 605 is connected to the plus 12 volt supply through resistors 606 and 607. Current flows through these resistors when a speaker is connected, and the voltage across the resistor 607 current is sensed by a transistor 608 working in connection with a resistor 609 and noise filtering capacitor 609'. When the speaker is connected, the transistor 608 turns on and the speaker connection is indicated by a light-emitting diode 610 working with connection with a current limiting resistor 611. The connection with the speaker is also signaled to the microcomputer 55 by a transistor 612 working in connection with resistors 613 and 614.

When a speaker is first connected by the microcomputer, the supervisory tone timer 604 is activated by a first beep generator generally designated 615. The first beep generator includes a transistor 616 working in connection with an input capacitor 617, input resistors 618 and 619, and a pull-up resistor 620. For the time that the timer 604 is activated, the transistor 600 is activated through resistor 602 by a NAND inverter 621 so that the supervisory tone will be sent to the intercom speaker.

The privacy position of any privacy switch at the speaker connected to the speaker audio line is indicated by the DC voltage on the conductor 622. This voltage is sensed by a transistor 623 working in connection with resistors 624, 625, 627 and a noise filtering capacitor 626. Closing of the privacy switch causes the average voltage on line 622 to drop to about zero, thereby turning off transistor 623.

When the transistor 623 is turned off by a privacy switch or when the TALK/LISTEN signal is active, the LISTEN/MUTE signal is active because of directional diodes 628 and 629. When the LISTEN/MUTE signal is active, a transistor 630 turns on to inhibit the supervisor tone timer 604. The transistor 630 operates in connection with an input resistor 631 and resistors 632 and 633. The transistor 630 is connected to the timing capacitor 634 of the timer 604 which operates in connection with resistors 635, 636, 637 and a capacitor 638. Resistors 632 and 633 insure that transistor 630 only partially discharges the capacitor 634 so that the "off" time of the timer 604 is not appreciably increased once transistor 630 is deactivated. Resistor 637 is connected to a jumper or switch 637' which can be closed to ground to stop repeating of the supervisory tone after the first beep.

The supervisory tone timer 604 controls the electronic switches 582 which enable the supervisory tone and which operate in connection with a time delay resistor 639 and capacitor 640.

In addition to controlling the talk/listen relays 598, the transistor 600 controls a talk/mute switch generally designated 641. The talk/mute switch 641 includes a series resistor 642, a shunt resistor 643, and shunting transistors 644 and 645 which operate in connection with a capacitor 646 and resistors 647 and 648.

The output of the talk/mute switch 641 is connected to a push/pull power amplifier including separate amplifiers 649 and 650. The amplifier 649 operates in connection with a coupling capacitor 651 and resistor 652, a shunt capacitor 653, a negative feedback capacitor 654 and resistors 655 and 656, and power supply decoupling capacitors 667, 668, and 669. The amplifier 650 operates in connection with a cross-coupling resistor 670, input capacitors 671 and 672, and a negative feedback resistor 673. The outputs of the two amplifiers 649 and 650 are coupled by a resistor 674 and capacitor 675. The output of the first amplifier 649 is shunted to ground by a resistor 676 and a capacitor 677. The amplifiers 649, 650 drive the primary of a step-up transformer 678 through a coupling capacitor 679.

The secondary of the transformer 678 is shunted by a resistor 680 and is selectively connected to the conductors 605, 622 of the speaker audio line by the talk/listen relays 598. The transformer 678 has a 1:4.55 turns ratio to give 25 VRMS across the secondary. The amplifiers 649, 650 provide up to 12 watts of audio power. An intercom speaker (36 in FIG. 1) is driven with ½ watts of audio power, for example, when the impedance matching transformer 48 presents an impedance of about 1200 ohms to the 25 VRMS audio signal.

The passage of audio signals from the phone line 550 to the speaker has been described. In order for an audio signal from the speaker to pass to the phone line 550, the signal on lines 605, 622 passes through a filter generally designated 681 and a diode protection network 682, and is picked up by a preamplifier generally designated 683. The filter 681 includes resistors 684, 685 and capacitors 686, 687, 688, and 689. The preamplifier 683 works in connection with input capacitors 690, 691 and resistors 692, 693 and bias resistors 694, 695. The bias resistors 694, 695 are connected to a six volt supply provided by a voltage divider including resistors 696, 697 and a decoupling capacitor 698. The preamplifier 683 also works in conjunction with a shunt capacitor 699, a resistor 700, and an emitter follower load resistor 701. The preamplifier 683 is muted by a signal from the supervisory tone timer 604 fed through a directional diode 702 and a resistor 703. The preamplifier 683 is also partially muted in response to a feedback signal processed by transistors 704 and 705 which provide audio compression for signals from the speaker. The transistors 704 and 705 operate in connection with resistors 706, 707, 708, 709, 710 and a capacitor 711.

Returning to FIG. 16A the output of the preamplifier 683 is fed to the input of a second amplifier generally designated 720. The two amplifiers 683, 720 share a common integrated circuit and a common power supply a designated plus 12 F representing a filtered supply voltage obtained from a series resistor 721 and a decoupling capacitor 722, shown in FIG. 16B.

Returning to FIG. 16A, the second amplifier 720 operates in connection with capacitors 723, 724, 725 and resistors 726, 727, 728, 729, 730, and 731. Feedback for audio compression is obtained from a capacitor 732. The listen level is set by a potentiometer 733 working in connection with a coupling capacitor 734.

The signal from the second amplifier 720 is muted by an electronic switch 735 which comprises a series resistor 736 and shunt transistors 737 and 738 which operate in connection with resistors 739, 740, 741 and a capacitor 742.

In order to drive the phone hybrid transformer 554, an amplifier 743 receives the signal from the electronic switch 735. The amplifier 743 operates in connection with coupling capacitors 744 and 745, a feedback capacitor 746, an input resistor 747, a biasing resistor 748, and a feedback resistor 749. This completes the description of the voice controlled amplifier module 49.

Figure 17:
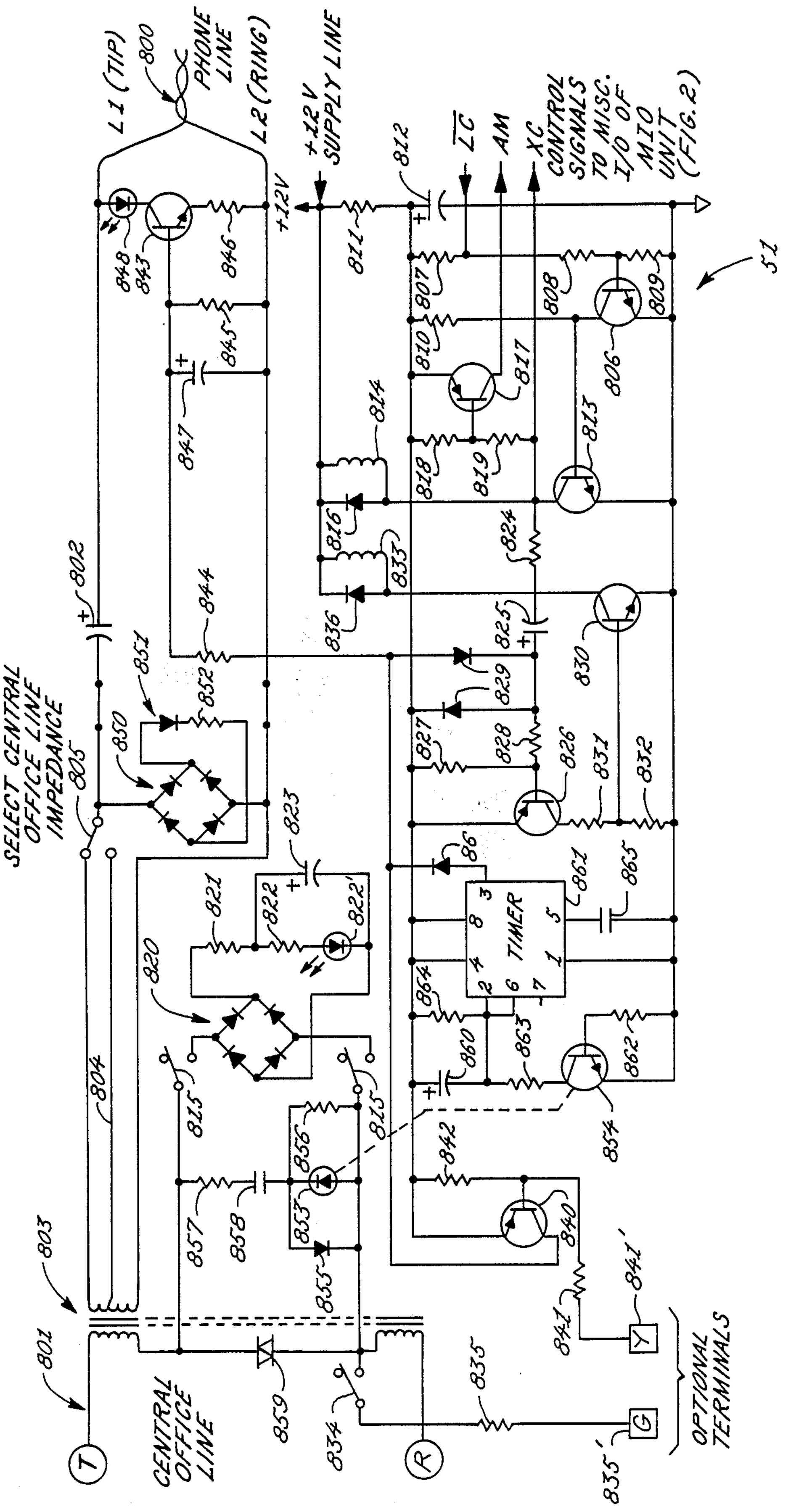
FIG. 17 is a schematic diagram of the central office adapter.

Turning now to FIG. 17 there is shown a schematic of the central office adapter 51 for connecting a phone line 800 from a line-link module to the central office or trunk lines generally designated 801. For the transmission of voice signals, the phone line 800 is connected to the central office line 801 by a coupling capacitor 802 and an isolation transformer 803. The primary of the transformer 803 has a tap 804 so that a jumper 805 may be used to select either a 600 ohm or 900 ohm impedance for the central office line 801. As shown, a 600 ohm impedance is selected, for which the isolation transformer has a 1:1 turns ratio from the central office line 801 to the phone line 800.

In order to initiate a phone call out to the central office line, the microcomputer sends a line connect signal LC to the central office adapter 51. This signal turns off a transistor 806 which operates in connection with input resistors 807, 808, 809 and a pull-up resistor 810 energized through a power supply decoupling resistor 811 and capacitor 812. When transistor 806 turns off, a second transistor 813 turns on and energizes a relay coil 814 closing relay contacts 815 to establish a connection across the T and R wires of the central office line 801. The relay coil 814 operates with a damper diode 816, and also the connection is signaled back to the microcomputer by a signal XC active low and a signal AM active high. The AM signal is generated by a transistor 817 operating in connection with resistors 818 and 819. When the relay contacts 815 close, the current through the central office T and R wires is directed through a bridge rectifier 820 and resistors 821, 822 to illuminate a light-emitting diode 822' shunted by a capacitor 823.

Some central office trunks also require a "ground start" pluse to initiate a connection. In such a case a "G" terminal 835' is grounded. In order to signal the beginning of a connection for "ground start", the central office adapter 51 closes a connection to the G wire of the central office line 801. For this purpose a pulse is generated from the signal XC by a resistor 824 and a capacitor 825. The pulse turns on a transistor 826 working in connection with resistors 827, 828, and a clamp diode 829. The transistor 826 turns on another transistor 830 operating in connection with resistors 831 and 832. The transistor 820 turns on for a limited period of time and energized a relay coil 833 causing closure of relay contacts 834 which are connected to the G terminal 835' through a resistor 835. The relay coil 833 is shunted by a damper diode 836.

For receiving an incoming call from certain PBX systems, a ground signal on the Y terminal 841' turns on a transistor 840 operating in connection with resistors 841 and 842. When transistor 840 turns on, another transistor 843 turns on to connect the Ll and L2 wires of the phone line 800. The transistor 843 operates in connection with resistors 844, 845, 846 and a capacitor 847. The connection is signaled by a light-emitting diode 848.

For the phone line 800 to receive an incoming call from the central office line 801, a ringing signal appears across the T and R wires. In this regard it should be noted that large amplitude signals are suppressed from the phone line 800 by a bridge rectifier generally designated 850, a directional diode 851, and a ten ohm resistor 852. The ringing signal is detected by a light-emitting diode 853 in an optical coupler which activates a phototransistor 854. The light-emitting diode 853 operates in connection with a return diode 855, a shunt resistor 856, and a series resistor 857 and capacitor 858. The light-emitting diode 853 is protected from voltage surges by a varistor 859.

Activation of the phototransistor 854 charges a capacitor 860 to activate a timer 861. The phototransistor 854 operates in connection with resistors 862 and 863. The timer 861 operates in connection with a resistor 864 and a capacitor 865. The timer output appearing on its pin number 3 is logically OR'ed with the output of the transistor 840 with a directional diode 866 to turn the transistor 843 on for a certain period of time after the timer 861 is activated by the phototransistor 854. Therefore, a call may be signaled to the phone line 800 due to a ringing signal across the T and R wires of the central office line 801 as well as a signal on the Y terminal 841'. This completes the description of the central office adapter 51.

Figure 18:
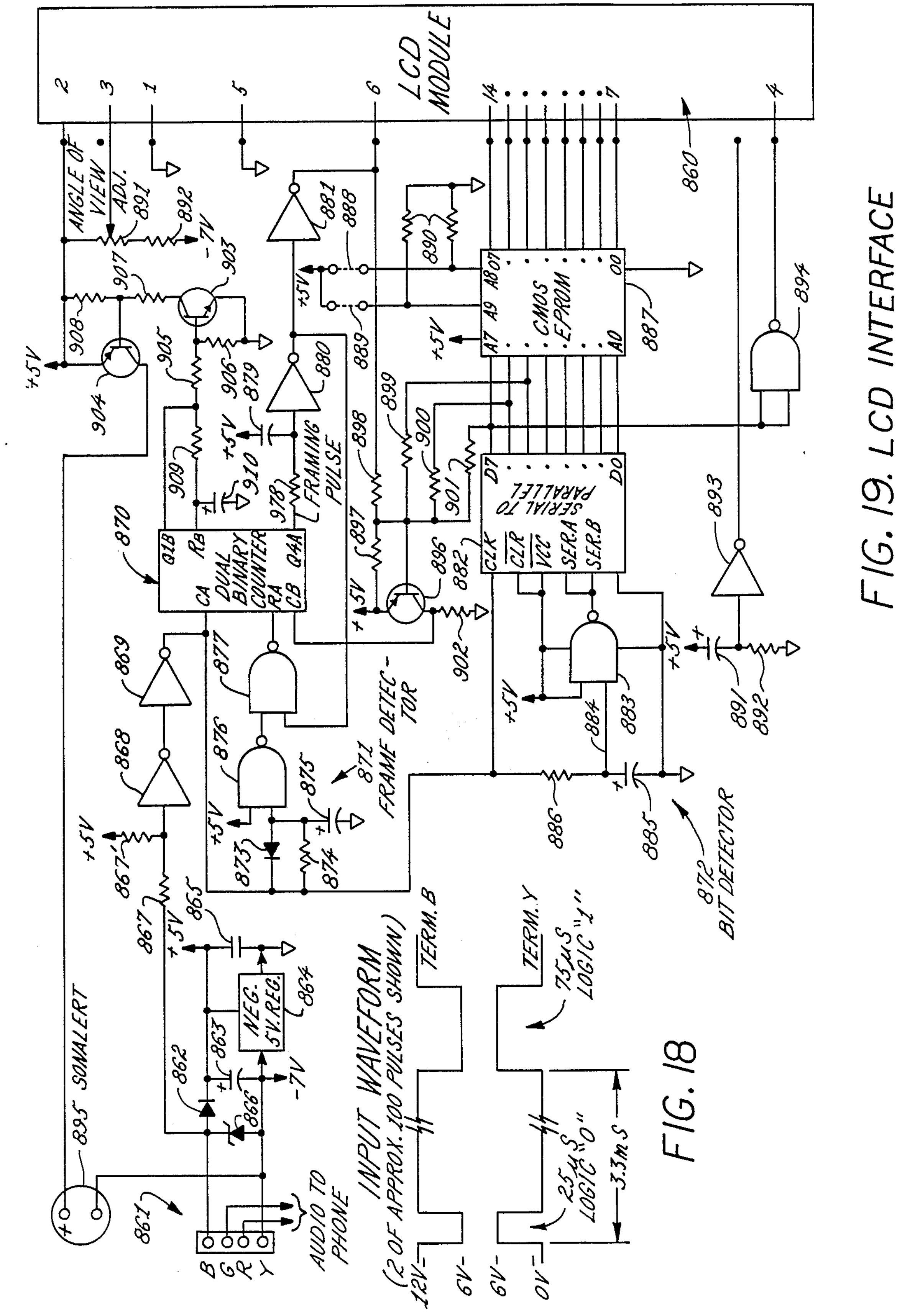
FIG. 18 is a timing diagram of the pulse-width modulated binary signal used for transmitting data to the liquid crystal, vacuum fluorescent and graphic displays.

Turning now to FIG. 18, there is shown a timing diagram illustrating binary signals used for transmitting data between the main input/output module 56 and either a liquid crystal display 38, a vacuum fluorescent display 39 or a graphic display 40 (see FIG. 1). As shown in FIG. 18, a logic zero is indicated by a pulse having a width of 25 microseconds. A logic one is indicated by a pulse having a width of 75 microseconds. The pulses have a repetition period of 3.3 milliseconds, and a typical message includes about 100 pulses. By using this modulation technique, the LCD, VFD or graphic displays can be located up to one thousand feet from the main input/output module 56. Also, power can be transmitted at the same time over the same wires from the main input/output module to the LCD, VFD, or graphic display.

Turning now to FIG. 19 there is shown an LCD interface used in the administrative phone 31 for receiving the pulse-width modulation shown in FIG. 18 in order to display call-ins and other data from the microcomputer 55. The circuit shown in FIG. 19 is essentially the same circuit used for the vacuum fluorescent display 39 except that a VFD display module is used instead of the LCD display module generally designated 860. The LCD module 860 is, for example, a FEMA Co. part No. MDL-16166.R-I. A suitable VFD module uses a fluorescent display tube such as Nippon Electric Co. part No. DC 1612E2-R2.

The pulse-width modulation shown in FIG. 18 is transmitted over the B and Y wires of the phone line 861 extending form the main input/output module (56 in FIG. 1.) to the administrative phone (31 in FIG. 1). Power for the circuits in FIG. 19 is obtained by a rectifier diode 862, a filter capacitor 863, a negative 5 volt regulator 864, and a capacitor 865. The circuits are protected from transients by a zener diode 866 shunting the B and Y wires of the phone line 861.

To detect the binary data, the signal from the B wire of the phone line 861 is translated from the range −7 to +5 V, to the range 0 to +5 V by resistors 867 and 867', and is passed through two inverters 868 and 869 in order to square up the pulse-width modulated signal. The signal from the last inverter 869 is used to clock a framing counter in a dual binary counter generally designated 870, and is also applied to a frame detector generally designated 871 and a bit detector generally designated 872. The A side of the dual binary counter 870 generates a framing pulse for every 8 bits and is reset by the frame detector 871. The frame detector includes a directional diode 873, a resistor 874 and a capacitor 875. The time constant of the resistor 874 and capacitor 875 is about 22 milliseconds so that a NAND gate 876 is deactivated at the beginning of the very first pulse and remains deactivated throughout the entire message. A second NAND gate 877 insures that the A side of the dual binary counter 870 is reset when the gate 876 is active or by the framing pulse. A resistor 878 and capacitor 879 insure that the width of the framing pulse is about 10 microseconds. An inverter 880 insures that the required logic polarity is fed back to the reset terminal RA, and a second inverter 881 provides a square framing pulse to pin 6 of the LCD module 860. The framing pulse causes the LCD module 860 to read in eight bits of data from its pins 7-14 to display that data as a new alphanumeric character. The LCD module includes memory to display a number of characters at the same time.

In order to detect the individual bits from the squared pulse-width modulated signal from the inverter 869, a serial-to-parallel shift register 882 is clocked by the pulse-width modulated signal. The serial input to the shift register 882, however, is provided by a NAND gate 883 having an input 884 responsive to the voltage on a capacitor 885. The capacitor 885 is charged and discharged by the current flowing through a resistor 886 in response to the pulse-width modulated signal. The time constant of the capacitor 885 and resistor 886 is selected to be 75 microseconds to give a response time of about 50 microseconds. Therefore, the capacitor 885 becomes charged above the threshold of the gate 883 in response to a logic 1, but does not become charged above the threshold in response to a logic 0, so that the serial-to-parallel shift register 883 receives decoded data in its serial inputs.

The parallel outputs D0–D7 are fed to the address inputs A0–A7 of a CMOS EPROM 887 which is programmed for the particular LCD module used. In other words, it converts the code presented on its address inputs A0–A7 to the required code for the LCD module. It is convenient to program the CMOS EPROM 887 for a number of different modules and to wire jumpers such as the jumpers 888 and 889 to the high order address inputs A8 and A9 to select the portion of memory for the desired LCD module 860. The jumpers 888 and 889 work in connection with pull-down resistors 890.

The LCD module 860 has an adjustable view angle responsive to a potentiometer 891. The potentiometer 891 works in connection with a fixed resistor 892.

The LCD module includes memory for remembering and continuously displaying a number of characters. Therefore, it is desirable to reset or clear the memory at particular times. If the LCD module has a reset input, a power-on reset can be provided by a capacitor 891', a resistor 892' and an inverter 893. Alternatively, the memory in the LCD module 860 may be reset in response to data from the microcomputer. The LCD module 860, for example, has an active low input on pin 4 for specifying whether the code received on its inputs 7–14 should be interpreted as a certain number of control commands, one of which clears the display. For this purpose the output D7 of the serial to parallel shift register 882 is inverted by a gate 894 and applied to pin 4 of the LCD module 860. The bit D7, therefore, specifies a control command.

It is desirable to alert the administrator using the administrative phone when a new call-in or other message is displayed on the LCD module 860. For this purpose a sonalert 895 is provided to generate an audible signal in response to a special control command. A transistor 896 is turned off by the simultaneous occurrence of the framing pulse and all of the data bits D5–D7 in order to clock the B side of the dual binary counter 870. The transistor 896 works in connection with resistors 897, 898, 899, 900, 901, and 902. The output Q1B of the counter is fed to a pair of transistors 903 and 904 which drive the sonalert 895. The transistors 903 and 904 operate in connection with resistors 905, 906, 907, and 908.

So that the sonalert 985 will turn off a certain time after being activated by the special control command, the reset RB to the B side of the counter 870 is connected to the Q1B output through a resistor 909 and a shunt capacitor 910. The R-C time constant is about 130 milliseconds so that the sonalert will beep for about 100 milliseconds in response to each occurrence of the special control command. This completes the description of the LCD interface.

Turning now to FIG. 20 there is shown a schematic diagram of the circuits for a graphic display 40. The graphic display uses a separate power supply (not shown) providing a lamp voltage of up to 30 volts on line 915. A 5 volt regulator 916 is used to power the logic circuits and works in connection with a decoupling capacitor 917.

A pulse-width modulated signal such as is shown in FIG. 18 is received on the unbalanced shielded cable 59 from the main input/output module (56 in FIG. 1). The pulse-width modulated signal is passed to a threshold detector having an adaptive threshold and including transistors 917' and 918 which work in connection with resistors 919, 920, 921, 922, 923, and 924 as well as a capacitor 925 and directional diodes 926 and 927.

The data bits are detected by a timing circuit generally designated 928 including a resistor 929, a timing resistor 930, a discharge resistor 931, a directional diode 932, and a timing capacitor 933. The time constant of the network 968 is approximately 75 microseconds to obtain a threshold time of about 50 microseconds. The voltage on the capacitor 933 is compared to the threshold of a CMOS gate 934 in order to obtain the decoded data, which is used as the serial input to a 32-bit shift register generally designed 935 and including 8-bit shift registers and buffers each designated 935'. The gate 934 is connected to the serial input of the shift register 935 through two series resistors 936 and 936'.

In order to obtain a shift clock for the register 935, the pulse-width modulated signal is fed through a resistor 937 and through gates 938 and 939 and resistors 940 and 941. A pull-up resistor 942 is also used.

In order to provide a strobe or framing pulse, the pulse-width modulated signal from the gate 938 is applied to a second timing circuit generally designated 943 which includes a directional diode 944, a series resistor 945, a shunt resistor 946, and a timing capacitor 947. The time constant of the timing circuit 943 is about 100 milliseconds so that the data is strobed about 70 milliseconds after transmission. The voltage on the timing capacitor 947 is sensed by the threshold of a gate 948 to generate the strobe signal which is passed through resistors 949 and 950 to the shift register 935.

To provide protection from short circuits in the lamp matrix 40, 22 ohm resistors generally designated 952 are wired in series with the lamps 40. Moreover, the ground return for the lamp current is fed to a common line 953 including a 0.51 ohm 2 watt current sensing resistor 954. The voltage across the resistor 954 is sensed by a transistor 955 working in connection with a current limiting resistor 956 and which is used to trigger a timer 957 to shut off the lamp current for about five seconds in the event of a short circuit. The timer 957 operates in connection with resistors 958, 959, 960, and 961, as well as capacitors 962 and 963. A pair of directional diodes 964 is used to provide an auxiliary disable input 965.

For making a graphic display 40, a number of lamp driver modules and lamp matricies are connected in series as shown in FIG. 20. The serial output of the last shift-latch buffer 986 is fed through a resistor 966 to the data input of the first shift-latch buffer in the second lamp driver module 967. Any number of lamp driver modules can be cascaded in series in this fashion. This completes the description of the graphic display circuits of FIG. 20.

Turning now to FIG. 21 there is shown a table generally designated 980 showing the correspondence between the physical number provided by the microcomputer 55 to the main input/output module 56 (see FIG. 1) and the line-link module address and the speaker module address. There is a binary relationship between the physical number and the line-link module number and line number. The line-link module number, for example, is obtained as the integral portion of the quotient of the physical number and the number sixteen, and the line number for the module is given as the remainder. The correspondence between the physical number and the speaker control module number and speaker number for each module, however, is somewhat different due to the fact that there are twenty-five speakers or single link staff phone stations per speaker control module and also the first sixteen physical numbers are reserved for the central line-link module 75 servicing special stations such as the first and second dual-tone multi-frequency receivers 67, 68, the feedback attenuator 88, the shared line 106 for single link phones, a line permanently reserved for an administrative display phone 31, the first and second voice controlled amplifiers 49 and 50, and the central office adapter 51.

A line-link module and a speaker control module may occupy the same range of physical numbers. In this case the physical numbers should represent physical locations having intercom speakers paired with respective multi-link phones. The microcomputer is programmed to direct an incoming call either to the phone or to the speaker, as specified by an attribute of the physical number as further described below. A conversation being conducted with such a speaker is automatically transferred to the corresponding phone when the phone is taken off-hook during the conversation. This technique frees up the speaker audio line S1 or S2 for use by other stations. For the case of the single-link staff phones, two speaker control modules are programmed to have the same module number, but a separate address select switch (91' in FIG. 11) is provided to indicate that one board is connected to the intercom speakers and the other board is connected to the single link staff phones. Therefore, the microcomputer 55 can selectively address the speaker control module having phones or the other module having speakers which share the same physical numbers.

So that the microcomputer 55 may know whether a particular physical number corresponds to an administrative phone, multi-link staff phone, single-link staff phone, or a sole intercom speaker, the attributes of each physical number are stored in an attribute table in the electrically alterable read only memory (409 in FIG. 13B.). In addition to these basic attributes, each physical number is assigned an architectural number or phone number used to dial up the station, as well as other attributes designated as "A" attributes, "B" attributes, and zone or "Z" attributes. The A attributes designate whether there is an administrative phone, multi-link staff phone, or single link staff phone associated with the physical number, and also specify particularly important attributes associated with the phone or line, such as whether outside calls will ring the phone, whether the station is a central office adapter ("called dial-in access"), whether the line is connected to an auxiliary paging system, and whether the phone is in a particular "hunt" group so that another phone will be rung in the event that the phone corresponding to the physical number is busy.

The B attributes have different meanings depending whether the phone corresponding to the physical number is an administrative phone or a staff phone. For an administrative phone, the attributes specify whether outside local telephone call can be made from the phone, whether outside toll calls can be made without restriction, whether the phone can make zone announcements over any given group of speakers, whether the phone can make announcements over all of the speakers at once, whether the phone can send selected tones over all of the speaker at once, whether the phone can break into ongoing conversations, whether the phone can answer call-ins displayed on the first LCD module, and whether phone can answer call-ins displayed on the second LCD module.

If the phone corresponding to the physical number is a staff phone, the B attributes specify whether direct ground signals from the phone will be treated as priority call-ins, whether call-ins can be cancelled by holding down the call switch or the phone hook switch for about seven seconds and releasing, whether the call-ins are displayed on the first LCD module, whether the call-ins will be displayed on the second LCD module, whether call-ins from the priority switch will be recognized as priority call-ins, whether priority call-ins can be cancelled by holding down the priority switch for about seven seconds and releasing (recommended only for locking switches), whether call-ins from the priority switch will be displayed on the first LCD module, and whether call-ins from the priority switch will be displayed on the second LCD module.

The zone or Z attributes specify whether the speaker corresponding to the physical number is a member of any one or more of eight different groups or zones. An administrative phone, for example, may be programmed to have the capability of sending a paging message or tone to all of the speakers in a selected zone.

In accordance with an important aspect of the invention, the attributes are stored and displayed as flags so that an administrator can use the dial of his phone to easily change the attributes associated with a given architectural number or physical number. The the administrator calls a phone number "#99" reserved for programming, dials the physical number followed by "#", enters "A" to change attributes, and then toggles the appropriate A attribute bits on and off by dialing corresponding numbers. The attribute bits that are set are indicated on the LCD display by the corresponding numbers, in sequence; the attribute bits that are clear are indicated as blanks in the display sequence. The A attribute bit sequence "10111011", for example, is displayed as "A:1_345_78". Dialing the number "2", for example, will change the second A attribute bit resulting in the display of "A:12345_78". Dialing "#", will switch entry to the "B" attributes. Dialing "#" again switches to "Z" attributes. The administrator may also change the architectural numbers associated with any given physical number. As noted above, however, the microcomputer 55 is given a jumper (412 in FIG. 13C) that can be wired to prevent anyone from changing the attributes or architectural number associated with the physical numbers, or from changing any other user-programmable features of the system. The preferred method of programming attributes is further described in detail in Appendix II.

During the placement of telephone calls in the communication system, the microcomputer 55 must keep track of the state of the system at all times. In particular, the microcomputer must know which of the physical numbers correspond to active stations, and the precise step being performed for each of the active stations.

Turning now to FIG. 23, there is shown the contents of an active list of records which is used to keep track of the step currently being performed for each active station in the system. A unique record is created for each one of the physical numbers that are currently being used in the system, and that record is erased when the physical number is no longer active.

Each record in the active list of records includes an entry called the "subject" designating the physical number for which the record was created. A second entry called the "object" designates the physical number that will be or is connected to the subject physical number. An entry called "link" designates the number of the link that is reserved or being used for connecting the stations corresponding to the subject and object physical numbers.

The steps used in providing connections or other service to the stations are grouped into a limited number of predefined procedures or program blocks which are executed in a predefined sequence, one after another. A procedure can, for example, create a new active list record or erase an active list record, as well as specify operations to be performed in connection with the subject physical number of the record for which the procedure is currently being executed. Another way of looking at the procedure is that at any given time a particular procedure is being executed for each subject. This procedure is specified by a "proc" or procedure entry in each active list record.

Each record has an entry called "time" which specifies the time that the current record was created. The time entry is used, for example, to ring the telephone in ring bursts every seven seconds.

In addition to the procedure entry, an entry called "param" may further define the state of the line corresponding to the subject physical number. The param entry, for example, may specify information about the physical number that must be saved for continued execution after an interruption or for execution by a new procedure for the physical number. In other words the microcomputer 55 must time share its supervision over all of the active physical numbers in the system, and the param entry may be used to store information about an unfinished operation for a certain active station so that the operation can be resumed when execution returns to servicing of the active station.

The final entry for an active record is a pointer which points to the next active record. As will become apparent below, the microcomputer 55 successively reads one active record after another periodically to service all of the active stations in the system.

Figure 24:
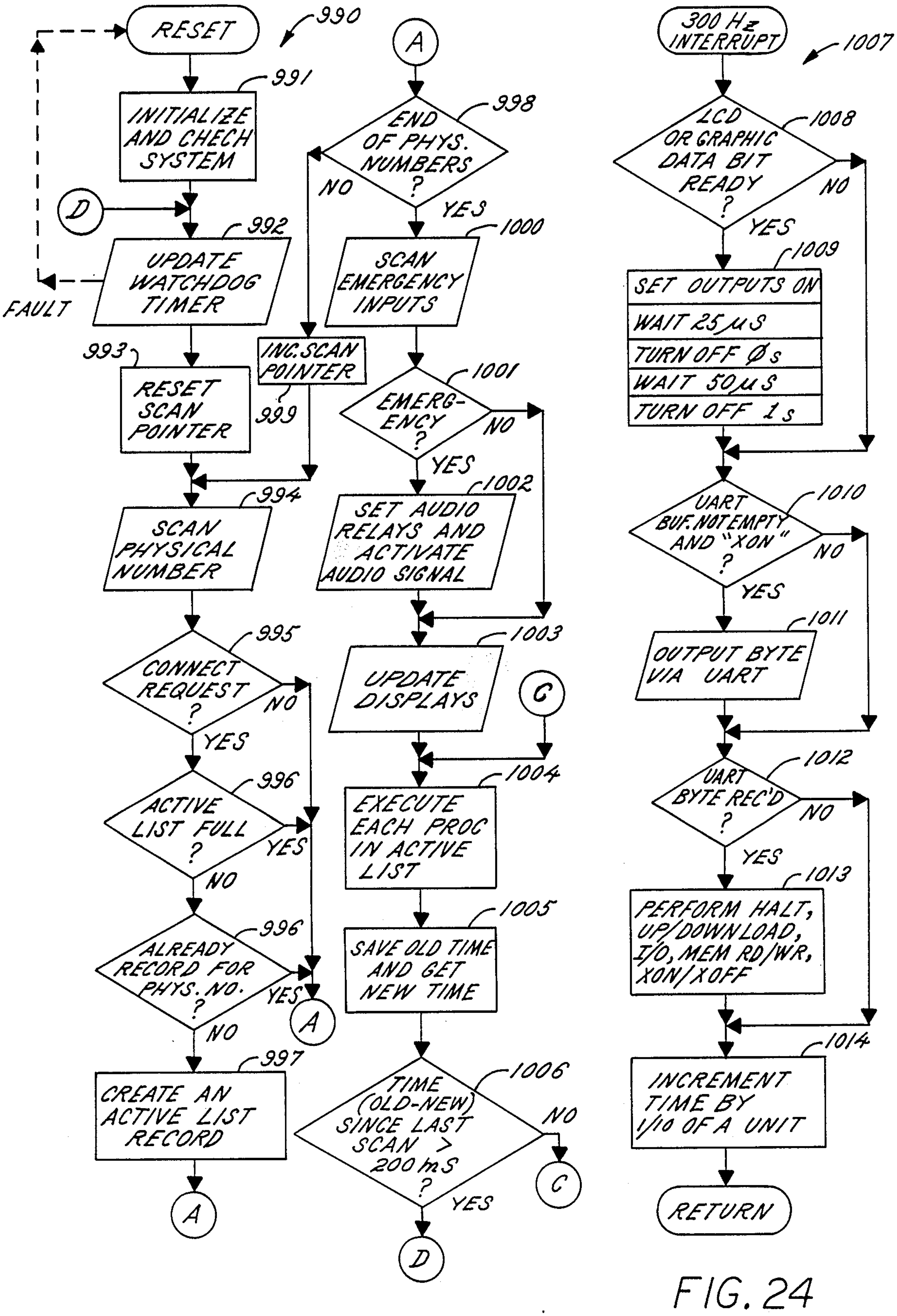
FIG. 24 is a flowchart of the executive program and interrupt program for the central computer.

Turning now to FIG. 24 there is shown a flowchart generally designated 990 of an executive program for the microcomputer 55. Upon reset of the microcomputer (for example when it is turned on or by means of the reset switch 335 in FIG. 13A) the microcomputer first performs a step 991 of initializing and checking the system. Then in step 992 the watch dog timer (354 in FIG. 13A) is updated (by writing a pulse to the SOD output of the microprocessor 350 in FIG. 13A). Then, is step 993 a scan pointer, which is a memory location in RAM, is reset. The scan pointer points to a particular one of the 512 physical numbers in the system. It is, for example, reset to zero in step 993.

The microcomputer must periodically scan each of the physical numbers in order to service connection requests. Therefore, in step 994 the microcomputer reads the connect function code from the connect function status port (191 in FIG. 8).

In step 995, execution branches depending upon whether there is a connection request. If there is a connection request, it is desirable to create an active list record (FIG. 23) to further process the connection request unless it is impossible to do so. The connection request cannot be recognized if the active list is already full. The active list can contain up to sixty-four records. It should be evident, for example, that if all of the stations were to request a connection, they could not be serviced immediately, and the sixty-four record limit on the maximum number of active records is not at all serious in view of the limited number of links in the system. Therefore, in step 996, execution branches if the active list is full.

If the active list is not full, then it is checked in step 996 to determine whether a record for the physical number already exists. If there is not already a record of the physical number, an active list record is created in step 997. As will be further described below, when an active list record is created in response to a connection request, the initial procedure is called "dispatch".

After the active list record is created in step 997, then in step 998 the scan pointer is compared to a value of 511 to determine whether the end of the physical numbers has been reached. If not, execution jumps to step 999 wherein the scan pointer is incremented and scanning continues in step 994 at the next physical number.

If the end of the physical numbers is reached in step 998, then certain emergency inputs are scanned in step 1000. These emergency inputs may include particular ones of the active low inputs (on the input port 525 or 526 in FIG. 15). If these emergency inputs indicate an emergency as tested in step 1001, then in step 1002 the audio relays (61 in FIG. 2) are set for paging and the multi-tone generator (54 in FIG. 2) is activated to generate an emergency audio signal. After step 1001 or 1002, the displays are updated in step 1003 by loading a RAM buffer used for data transmission to the displays. Data transmission, however, is performed during a periodic interrupt as further described below.

The servicing of the active stations is performed in step 1004 by executing each procedure in the active list. Then in step 1005, the current time is updated by saving the old time and reading the new time from a certain random access memory location which is periodically updated by an interrupt procedure that is further described below. Then in step 1006, the old time is compared to the new time to determine whether the time since the last scan is greater than 200 milliseconds. If not, execution jumps to step 1004 to reexecute the procedures in the active list. Otherwise, execution jumps back to step 992 to iterate the executive procedure.

The periodic interrupt introduced above is illustrated by a flowchart generally designated 1007 in FIG. 24. The first step 1008 is executed 300 times a second after interruption of the execution of the executive program 990 in response to a hardware interrupt of the microprocessor (350 in FIG. 13A). In the first step 1008, the microcomputer checks the RAM buffer mentioned above to determine whether there is an LCD or graphic data bit that is ready for transmission. If so, the data bit is transmitted in step 1009 by setting the corresponding outputs on, waiting 25 microseconds, turning off the outputs corresponding to logical zeroes, waiting 50 microseconds, and turning off all of the outputs corresponding to logical ones. Then in step 1010 the UART buffer is checked and a "XON" or "transmit on" UART flag is checked to determine whether a byte should be transmitted via the UART. If so, then in step 1011 the byte is transmitted via the UART. Next, in step 1012, a UART data received flag is checked to determine whether the UART has received a byte. If so, this byte is used to change the program for the control system. This change may include a halt operation, an up or down load, an input or output operation, a memory read or write, or turning the UART on or off for transmission.

The final step 1014 is to increment the timer memory location in RAM by 1/5 of a unit. One fifth of a unit, therefore, corresponds to the period of the 300 hertz interrupt, so that each time unit corresponds to 1/60 of a second. Execution then returns from the 300 hertz interrupt and continues in the executive program 990.

Figure 25:
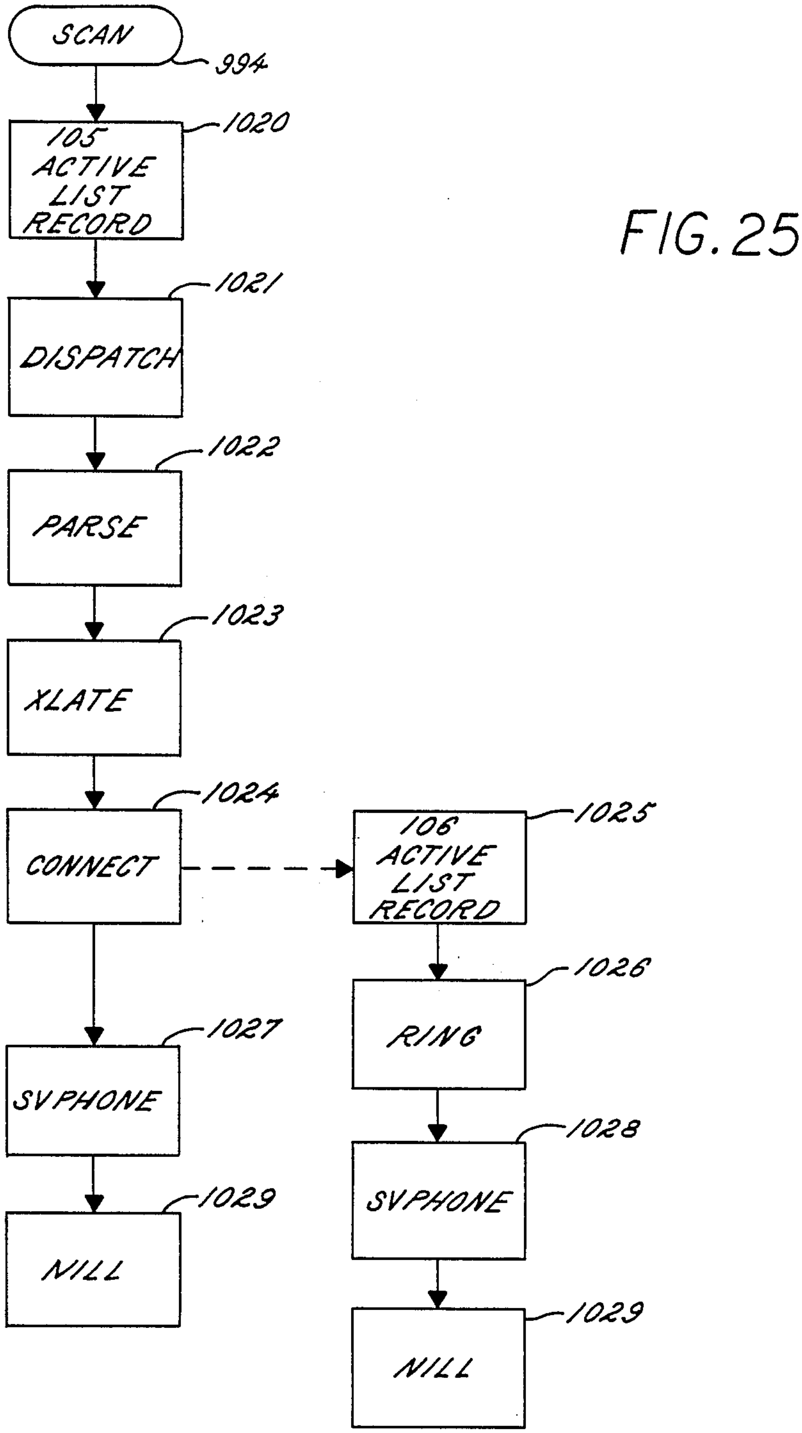
FIG. 25 is a flowchart of the procedure executed by the central computer when one multi-link telephone calls another multi-link telephone.

It should be noted that a majority of the software for the microcomputer 55 is contained in the procedures or procs executed in step 1004 of the executive program 990. Turning now to FIG. 25 there is shown the sequence of procs that is executed to place a telephone call through the communication system. In response to a scan in step 994 of FIG. 24, the microcomputer determines that the physical number 105 has an off-hook condition. Also, it is determined that the active list is not full and therefore in step 1020 of FIG. 25 an active list record is created for the physical number 105. As noted above, when such an active list record is created in response to a connection request, a procedure called "dispatch" is executed for the physical number.

The initial procedure DISPATCH is executed in step 1021 and this initial procedure looks at the A attribute in the attribute table (FIG. 22) for the subject physical number 105 to determine the line type and assigns a new proc based upon the type of service required. During execution of this new proc, if the line type is a staff phone or intercom speaker, the call-in is displayed on the graphic display or the LCD display, if it is not already displayed there. For an administrative phone, a link is assigned to the administrative phone and the administrative phone is connected to the link. Also, a dual-tone multi-frequency receiver is assigned and connected to the link, and a dial tone is transmitted over the link for requesting the destination number of the requested call. Finally, the procedure is changed to an appropriate supervisory or interconnecting procedure.

For a call from an administrative phone, the appropriate exit procedure from the DISPATCH procedure is the PARSE procedure executed in step 1022. During execution of the PARSE procedure, the microcomputer receives and interprets the dialing information from the dual-tone multi-frequency receiver. Based upon the number received from the administrative phone, the number is interpreted as an architectural number for a particular phone or intercom speaker or a paging request. The number 1025 designates an all page request. Numbers 1026 through 1029 request a specific frequency from the multi-tone generator. The numbers 1031 through 1038 request a zone page to zones 1 through 8 respectively. Other numbers listed in Appendix II are reserved for user programming and diagnostic functions. Otherwise, the number is treated as an architectural number for a specific station and the PARSE procedure changes the proc to a XLATE to translate the number that was dialed from the administrative phone to the object physical number. This is done in step 1023, and at the end of the translation process the procedure is changed to CONNECT.

The CONNECT procedure is executed in step 1024 to create a second active list record for the object physical number having been obtained by translation. If the active list is full, the CONNECT procedure must wait until space is available in the active list. Then a new active list record is created for the object number. The procedure for this new active list record depends upon whether the object is a multi-link phone or a single-link phone or an intercom speaker. For a multi-link phone, the new procedure is RING in order to ring the multi-link phone. For an intercom speaker, the new procedure would be INTERCOM to "ring" the staff station by sending tones to the speaker. The CONNECT procedure, however, also checks whether the line being called is busy. If so, the new procedure is BUSY to send a busy signal to the administrative phone having initiated the call. In this case, the administrative phone having initiated a call has a physical number of 105, and its object physical number being called is 106. Therefore, the proc for the active list record of the subject 105 would change to BUSY.

As shown in in FIG. 25 the line to the physical 106 was not busy so that in step 1025 an active list record was created for the physical number 106, and in step 1026 the procedure RING is executed for the subject number 106. Then, contemporaneous with the execution of the RING procedure for subject number 106, the proc for the subject number 105 is changed to SVPHONE in step 1027 in order to supervise the connection the physical numbers 105 and 106. Contemporaneous with this, the procedure for the subject number 106 changes from RING to SVPHONE in step 1028 once the phone at the physical number 106 is answered. The procedures SVPHONE for the numbers 105 and 106 continue to be executed until one of telephones hangs up. As shown in FIG. 25, the phone at physical number 105 hangs up first, causing its procedure to be changed from SVPHONE to NILL which is executed in step 1029 in order to cause the active record for the physical number 105 to be erased from the active list. Similarly, once the phone having the physical number 106 hangs up, the procedure for the subject number 106 is changed to NILL in step 1029 to erase the active list record for the subject 106.

The supervisory procedure for a multi-link phone is SVPHONE, as was used in FIG. 25. For an intercom speaker, the supervisory procedure is SVSPEAK. Similarly a single link staff phone has its own procedure SVSTAF. The paging operation also has its own supervisory procedure called SVSC25. Moreover, calls coming in from the central office are assigned there own special procedures.

The procedures themselves may call certain software function in order to obtain status information from the connect status port (191 in FIG. 8) or to change the connect status via the connection function port (190 in FIG. 8). Five different software functions are provided in particular. The function LSEL(PHYS, LINK) is used to select a line and to obtain status information about the line. The two 16 bit parameters PHYS and LINK are supplied as parameters to the function whenever it is invoked. The LSEL(PHYS, LINK) function or program is built into the microcomputer software, and it uses these two parameters to formulate two eight bit bytes of information to be transmitted to the two output ports (302 and 303 in FIG. 10) which address a physical number by sending a link number, line module, module select number, and relay select number across the line-link control bus and the speaker control bus as illustrated in FIG. 21.

The parameter LINK is a four bit number representing one of the sixteen available audio links in the system. These four bits are transmitted to the most significant bits of the output port 303 in FIG. 10. From there they are transmitted across the link select lines of the line-link control bus to the latch 119 and the link select multiplexer 118 in the line-link module (see FIG. 4.)

The parameter PHYS is a sixteen bit number including nine least significant bits specifying the 512 different physical number for stations. The least significant eight bits are sent to the output port 302 in FIG. 10, and the next most significant two bits are sent to the least significant two bit position on the output port 303 in FIG. 10. Bit 10 of the parameters PHYS selects either speakers or phones. (Bit zero is the least significant bit.) If bit 10 is set, the speaker control module for the speakers is not addressed, and instead the speaker control module for the corresponding single link phones is addressed. The physical number may also include a bit 11 to provide "all call" for the intercom speakers or single link staff phones. Without the all call, 12 milliseconds is required to turn each relay, or about 6 seconds for 500 relays. By using the all call, 4 relays can be turned on every 12 milliseconds to cut down the all call access time by a factor of 4. Bits 12–15 of the parameter PHYS are not used.

The PHYS number is also applied directly to the line-link module bus and results in the turning on of an analog switch path to the corresponding audio access circuit of the physical number. Therefore, regardless of whether the physical number corresponds to a multi-link phone, single link phone or intercom speaker, the status of the physical number is fed back to the connect status input port 191 in FIG. 8 and is available to indicate whether a priority call-in or normal call-in is being sent by a single-link staff phone or intercom speaker or whether a multi-link phone is on or off hook. This status information is mapped into the 16 bit return value "S" returned by the function LSEL(PHYS, LINK).

The second of the five basic software functions is CONN(). Once the link and physical numbers are present on the line-link control bus by the use of the LSEL(-PHYS, LINK) function, the CONN() function can be called to put a 50 microsecond, 12 volt pulse on the bidirectional multiplexed control line 83 (see FIG. 8). This connect signal will be transmitted through the analog switch selected by the LSEL(PHYS, LINK) function and will therefore turn on the flip-flop in the logic hybrid (117 in FIG. 4) corresponding to the selected audio access circuit. If, however, the selected phone line's hook sense circuit sends an on-hook condition, then the logic in the logic hybrid 117 also triggers the flip-flop 116 as well as the flip-flop 161 (see FIG. 6) to cause a three second ring signal. The CONN() function is called a number of times successively to cause the phone to ring for a number of half-second intervals until the phone is answered.

The third basic function is the DISC() function. This is a function like the CONN() function but the 50 microsecond pulse is a zero volt disconnect pulse which is transmitted over the bidirectional multiplexed control line 83 to the line-link modules. The disconnect signal is received by the line-link module and the logic hybrid circuit having been addressed by the LSEL(PHYS, LINK) function and causes the flip-flop 161 (see FIG. 6) to be reset to disconnect the phone corresponding to the physical number PHYS.

The fourth basic software function is RYON(). This function is used to turn on the relay to connect the speaker that was addressed by the LSEL(PHYS, LINK) function. If the physical number selected by the LSEL(PHYS, LINK) function included the bit 11, corresponding to a value of 2048 added to the basic physical number, then four instead of just one relay can be energized during the relay on pulse.

The fifth and final basic function is RYOFF() for turning off the relays. The function RYOFF() operates in a similar manner to the function RYON() except that the polarity of the pulse transmitted over the multiplex control lines A and B to the speaker control modules is reversed, so that the selected relay is turned off.

In view of the above, there has been provided an economical computer controlled multi-link telephone system that provides great flexibility to vary the size of the system and to modify the functions of the the different stations. In particular there has been described an economical and highly flexible multi-link administrative telephone and intercom system having automatic as well as supervised call distribution and PBX capability. The relative numbers of administrative phones, multi-link staff phones, single-link staff phones, and intercom speakers can be easily selected by providing the required number of line-link modules and speaker control modules. The modules are easily connected to their respective line-link control bus or speaker control bus, and their address select switches are set to allocate the locations of the line-link modules and speaker control modules within the space of physical numbers as shown in FIG. 21. Then, the attributes of the physical numbers are easily programmed in the electrical memory by using the attribute programming method described in detail in Appendix II. After programming, the jumper 412 in FIG. 13C can be wired to prevent changing of the attributes, or the jumper can be left as shown to permit administrators to change the attributes of the phones.

The communication system also has great flexibility in the layout of the administrative phones to permit the acknowledgement of call-in requests. An administrative phone may be provided with its own LCD display to provide interactive user programming and to display the call-ins from a selected group of staff phones or intercom speakers. Due to the pulse-width modulation format, the administrative phone having the liquid crystal display may be displaced up to at least 1000 feet from the microcomputer even though standard phone line is used. Moreover, since the graphic displays also use the pulse-width modulation format for transmission, they can be located at least up to 1000 feet from the microcomputer.

APPENDIX 1 OPERATING INSTRUCTIONS

Administrative Stations

WHAT YOUR PHONE CAN DO:

All Administrative Phones Can:

--Receive calls from other administrative stations.

--Call any other station in the system (staff or administrative).

--Forward calls to any other station.

--Set up conference calls.

Optional (any administrative phone can be set up to do one or more of the following):

--Answer call-ins in the order in which they were stored in the system's memory.

--Receive and make outside calls (if the system is connected to an outside telephone line and the station is programmed for this).

--Break in on calls in progress ("Executive Override").

--Page individual zones (groups of staff speakers).

--Page all staff speakers.

--Send special tone signals to all staff speakers.

Phones with Displays can also:

--Display the list of waiting call-ins.

--Answer the call-ins in any order.

--Cancel all call-ins (including priority call-ins).

Note: Depending upon how it has been programmed, a given display phone may receive call-ins from only certain staff stations or from all of them; its authority to cancel call-ins would extend to the same staff stations.

SETTING THE DISPLAY:

When the system is first turned on, only part of the display may be activated. To activate the full display, dial: [#] [2] [0].

TALKING ON THE PHONE:

To Another Phone: Carry on a two-way conversation, just as you would in any normal telephone conversation.

To a Speaker: This is an intercom mode of operation controlled by your voice. Speak directly into the mouthpiece of the receiver to "Talk," and stop talking to "Listen." (When you are "Listening," you will hear room noise and the other person will hear a "beep" at regular intervals.)

Note: If a paging announcement or tone signal (see below) is sent to the speaker you are talking to, your conversation will be temporarily interrupted. You will hear the announcement or the tone while it lasts, then you will be reconnected to your call.

ANSWERING CALLS:

Ringing (All Administrative Phones): This announces a call from an administrative station, an outside telephone (if the system is connected to an outside line and your phone is programmed to receive outside calls), or a specially programmed phone that rings your phone directly.

Answer by picking up the receiver and talking.

Six Quick Beeps (in the receiver, after answering): This alerts the user of an operator phone or a key phone that he has just been reconnected to an outside call that was transferred to ring another phone in the system but received no answer.

ANSWERING CALL-INS:

Single Beep (Display Phones only): This announces a normal call-in from a staff station.

Series of Beeps (Display Phones only): This signifies a priority call-in. A priority call-in will replace all other call-ins on the display, and will be further emphasized by the letters "EMER" ("Emergency").

Rules for Answering Call-ins:

(a) Any phone programmed to receive call-ins can answer: pick up the receiver and dial a star (*).
(b) A display phone has the added option of previewing the numbers that have called in--normal and priority--and of dialing any of these numbers back. (The previewing functions will be described at the end of these operating instructions for administrative phones.)

(c) To move on to the next call-in:

Alternate 1: If the system is programmed for repeat single-button dialing, you can push the star again after answering one call-in. This will immediately connect the next call-in.

Note: While in use, repeat single-button dialing ties up one of the two units that give dial tone. This could cause other callers to have to wait during busy periods.

Alternate 2: If the system is not programmed for repeat single-button dialing or if tying up a dial-tone unit is a concern, hang up momentarily, then dial a star or the number you want to answer next.

CANCELING CALL-INS:

Dialing [#] [2] [1] will cancel all the call-ins, including the priority call-ins, that your station is programmed to handle.

Note: There is no direct method of canceling an individual call-in. However, the normal methods of calling back (pressing the star or dialing the number) automatically remove the call-in from the system's memory, whether or not the station answers.

CALLING ANOTHER STATION:

Dial Tone: Dial the number of the station.

Remember: All regular numbers must have the same amount of digits. For instance, to reach Architectural Number 55, dial "055" (if the system is set for three-digit numbers) or "0055" (if the system is set for four-digit numbers).

Four Quick Beeps, followed by Silence: The station is busy.

A Single Long Beep:

(a) There is no station with the number that you dialed.

(b) The call cannot be completed (for example, because the system is busy or this type of call is restricted).

Buzzes at Four-Second Intervals: The station's telephone is ringing.

Room Noise: You have reached a staff speaker and can listen through it or begin talking (see "Talking" above).

Speaker in the Privacy Mode: When a speaker is in this mode, you cannot listen through it, and so you will not hear anything when you are connected to it. However, you can speak through it and ask the person there to switch into the normal mode or pick up the telephone (if there is one there).

Intercom Lines Busy: You will automatically be put on hold. As soon as an intercom channel is available, you will be put through to the speaker.

BREAKING IN ON CALLS ("Executive Override"):

After the "busy" signal has ended, dial a star (*). The system will sound a beep that tells you and the others that you have been connected into their conversation.

FORWARDING A CALL:

(1) Hookflash: you should hear dial tone.

(2) Dial the number of the station where the call is to be forwarded --just as in "Calling Other Stations" above.

(3) After informing the station about the call, hang up. The other two stations are now connected.

SETTING UP A CONFERENCE CALL:

(1) Establish contact with the first party by answering his call or dialing his station.

(2) Hookflash: the other party will be put on "Hold" and you will hear dial tone.

(3) Dial another party. After making contact, hookflash once; this will connect both of you to the first party.

(4) Any of the parties may hang up at any time; the other parties will remain connected.

PAGING:

This is making announcements over speakers. Your phone must be programmed to do this. It may be programmed to page either or both of the following:

(a) The speakers in any zone (one zone at a time).

(b) All of the speakers simultaneously ("All-Page").

To Page an Individual Zone:

(1) Pick up the receiver and dial:

[#] [0] plus the number of the zone ("1" through "8").

(2) Pause for a moment, then begin speaking directly into the mouthpiece.

To Page All Zones ("All-Page"):

(1) Pick up the receiver and dial:

[#] [0] [0]

(2) Pause for a moment, then begin speaking directly into the mouthpiece.

Note: Paging temporarily interrupts intercom calls. When the paging has been completed, the calls will be reconnected. (Intercom calls to zones not being paged will not be affected.)

SENDING SPECIAL TONE SIGNALS TO ALL SPEAKERS:

This can be done only on a phone that has been programmed to page all zones. Each organization will assign its own meanings to these tones.

| DIALING: | PRODUCES: |
|---|---|
| [#] [1] [1] | Pulsating Tone. |
| [#] [1] [2] | Siren. |
| [#] [1] [3] | European Warble OR Steady Tone (depending upon how the system has been wired). |
| [#] [1] [4] | Electronic Chimes. |

The tones will continue until you hang up.

Note: Like paging, sending a tone signal temporarily interrupts calls involving the speakers.

PREVIEWING CALL-INS (Display Phones Only):

You may use the display to see which stations have called in. Take this example:

The Display:

| 132 212 179 :225 |*

(The first three call-ins.)

(The colon indicates that the number to its right is the last number dialed by your phone or another display phone.)

The CALL-IN Numbers Stored in the System's Memory:

```
.....
: 132 :
: 212 :
: 179 :
: 152 :
: 107 :
: 200 :
: 172 :
: 317 :
: 145 :
: 326 :
: 149 :
: 198 :
: 216 :
:.....:
```

To Preview the Next Four Call-Ins:

| DIALING: | PRODUCES: |
|---|---|
| [#] [2] [2] | \| 152 107 200 172 \| |

To Preview Additional Call-Ins (four at a time):

| DIALING: | PRODUCES: |
| --- | --- |
| [*] | 317 145 326 149 |

Each time that you press the star (*), you will see four additional numbers until you reach the end of the list. A blank display indicates that no further numbers are stored in the memory.

To Leave the Preview Mode: Hookflash: you should hear dial tone again and be able to answer the call-ins or perform other functions..

---

* This is for a system set for three-digit Architectural Numbers. With four-digit numbers, the display will show only three numbers at a time.

OPERATING INSTRUCTIONS

Staff Stations

In general, all calls* originate from administrative stations, because only they can directly dial a staff station. However, an administrative station can forward calls from another station or even an outside telephone (if the system is connected with an outside telephone line).

ANSWERING CALLS:

Ringing: Pick up the telephone receiver and talk, just as you would in a normal telephone conversation.

Beeping:

(a) You can use the speaker like an intercom to carry on a "hands-free" conversation. Make sure that the speaker switch is not in the "Privacy" position (see "Using the Special Speaker Switches," below). Simply face the speaker and talk in a normal speaking voice.

Note:

(1) The caller's voice controls the system, so you will have to wait until that person pauses momentarily before you can speak.

(2) If your conversation is interrupted by a paging announcement or a tone signal, you will be reconnected with your call immediately afterwards.

(b) If there is a telephone, you can answer by picking up the receiver: this will automatically transfer the call to the telephone for a more private, two-way conversation.

Note: If the speaker continues to beep at regular intervals but the caller makes no announcements, this means that the room is being monitored.

CALLING IN:

All call-ins go to an administrative phone. The person there can talk or forward your call.

Once you have placed a call-in, it will remain in the system's memory until your station is called back. However, if you do not answer when you are called back, your call-in will then be canceled.

Placing a Call-In:

(a) With a "Call" Switch: Press it momentarily.

(b) With a Telephone: Hold it off-hook momentarily; then:

(1) Hang up and wait to be called back; OR (2) Continue holding the receiver until someone comes on-line (at any time you still have the option of hanging up and waiting to be called back).

Talking with Other Staff Stations:

Placing the Call: Call in to an administrative phone and ask to be connected to the other station. If you are using a phone, continue holding the receiver until you are connected.

Talking:

(a) If both of you are using telephones, talk just as you would in any normal telephone conversation.

(b) If one of you is using a speaker, then the system is controlled by the voice of the phone-user. Therefore:

(1) The person using the phone has to speak directly into the mouthpiece to "Talk," and to stop speaking to "Listen."

(2) The person using the speaker has to wait to talk until the phone-user pauses.

USING THE SPECIAL SPEAKER SWITCHES:

"Call": See "Calling In," above.

"Emergency" (or "Priority"): This call-in goes to an administrative phone ahead of all regular call-ins, including those already waiting to be answered. It remains in the system's memory and continues to signal an "emergency" until your station is dialed back.

Sending a Priority Call: Press the switch momentarily.

"Privacy": This means that no one can listen to the room through the speaker, though a caller can still speak through it. Since the switch "locks" when set to this position, you must reset the switch to the "Normal" position to talk through the speaker.

"Normal": (This may not be marked, but it is the position to which a two-or three-way switch normally returns when it is not locked in the "Privacy" position.) This means that you can be heard through the speaker when it is dialed by an administrative phone. The presence of a listener is signaled by a "beep" sounded at regular intervals.

APPENDIX II.

PROGRAMMING

The user programming falls into two parts: the "Attributes" and the "Location Codes." The former primarily affect the way individual lines function; the latter primarily affect system-wide operations. Some functions are entered with a single setting; others may involve several settings. There may also be wiring requirements (these are noted in the descriptions of the settings). Programming requires the use of an administrative display phone.

ATTRIBUTES:

These are the functions that can be assigned to each line in the system. They are controlled by "flags"--settings that can be toggled "on" and "off." They appear on the display as three sets ("A," "B," and "Z") of eight digits (numbered "1" through "8"). If a flag's number appears on the display, its corresponding function will be activated; if the number does not appear, the function will not be operative for that line.

The attributes are listed immediately below; the instructions for doing the programming follow this list.

Note: The first four "A" flags work as a set, not independently. Thus, although a "1" without a "2," "3," or "4" designates an administrative phone, adding a "2" (i.e., changing the set to "12") designates a single-link staff phone. The remaining flags each designate a distinct attribute.

"A" Attributes

| | |
|---|---|
| A: [No numbers] | The line is not programmed to do anything and so will be completely dead so far as making or receiving calls and call-ins is concerned. However, a speaker on this line would still receive paging and tone signals. |
| A: 1 | Administrative phone (must be wired to an LLM board). |

A: 2 Multi-link staff phone (must be wired to an LLM board).

A: 12 Single-link staff phone (is ordinarily wired to an SCC25 board, but can be wired to an LLM board). Calls to this line are automatically routed to the speaker first.

A: 3 Called "AAI" ("Attendant Answer Interconnect") from its principal function: routing outside calls to ring the "attendant phone" (specified at Location Code 64000). This attribute can also be used for a hot line (a multi-link staff phone that directly rings the attendant phone by going off-hook).

A: 1 3 Called "DIA" ("Dial-In Access"), this is for a special line carrying calls from outside the system (e.g., from a telephone company, a PBX, or another Telecenter system). The outside caller will get the system's dial tone and be able to make calls within it.

A: 23 "Special Page": A line that controls an auxiliary paging system. Any number of lines can be assigned to a corresponding number of auxiliary systems. Access to these lines can be restricted in a hierarchical manner through the use of the lines' "B" attributes and the "M" and "N" Location Codes (64112-64190).

A: 123 Called "DIR" ("Direct Access"): outside calls coming over this line will directly ring a designated phone (the designated phone's physical number is entered in place of this line's "Architectural Number").

A: 4 [Not used yet.]

[End of "combination" attributes."]

A: 5 [Not used yet.]

A: 6 [Not used yet.]

A: 7 Route incoming calls to the speaker (for a station that has a speaker and a multi-link phone; without this attribute, a call will ring the phone).

This attribute is not needed for a staff station with a single-link phone and a speaker, because the system automatically sends calls to its speaker.

A: 8 Hunt Group: If a line with this attribute is busy, the system will try the one with the next highest physical number (therefore, all the lines in the group must have consecutive physical numbers, and the line with the highest physical number will not have this attribute).

This attribute can be used by administrative and multi-link staff phones (to receive calls) and by Telecenter IV lines connecting with outside lines.

Administrative "B" Attributes

Note: These are the meanings of the "B" attributes on administrative lines (that is, those with the "A1" or "A13" attributes). The meanings of the "B" attributes on staff stations are given following these.

B: 1 Can make outside local telephone calls (which numbers can be dialed are specified with the "#96" function) and calls to any Area Codes entered at Location Codes 65280-84 (up to three Area Codes may be entered).

B: 2 Can make outside toll calls without restrictions.

B: 3 Zone Announce: Can make announcements over any group of speakers.

B: 4 All-Page: Can make announcements over all of the speakers at once.

B: 5 Can send signal tones over all the speakers at once.

B: 6 Executive Override: Can break into ongoing conversations.

B: 7 Can answer call-ins to the first LCD module.

B: 8 Can answer call-ins to the second LCD module.

Staff "B" Attributes

Note: These are the meanings of the "B" attributes on staff stations (that is, stations with phones and the "A12" or "A2" attributes, or those with speakers and the "A7" attribute). The meanings of the "B" attributes for administrative phones are given immediately above.

B: 1 Changes a normal call-in (pressing the "Call" switch or lifting the receiver off-hook) into a priority call-in.

B: 2 Call-ins can be canceled with the "Call" switch or the phone hookswitch. (This is not recommended for stations with phones; it is especially useful for stations with switches that lock in the "Call" position.)

B: 3 Call-ins from the "Call" switch or the phone hook switch are sent to the first LCD module.

B: 4 Call-ins from the "Call" switch or the phone hook switch are sent to the second LCD module.

B: 5 Call-ins from the "Priority" switch will be recognized as priority call-ins.

B: 6 Call-ins can be canceled with the "Priority" switch.

B: 7 Call-ins from the "Priority" switch will be sent to the first LCD module.

B: 8 Call-ins from the "Priority" switch will be sent to the second LCD module.

"Z" Attributes

Announcements and time signals can be sent to individual groups (or "Zones") of speakers. Each speaker can be assigned to anywhere from one to eight zones, or be left out of all zones (however, the latter would still receive All-Page announcements and general tone signals). These zone assignments can be set with either the "#97" or the "#99" function.

PROGRAMMING ARCHITECTURAL CODING

"Architectural Coding" specifies most of the common working parameters of staff and administrative stations: their architectural numbers (dialing numbers), attributes (functions), and zones.

The following abbreviations and symbols will appear on the display in the course of architectural coding:

| | |
|---|---|
| "ARCH" | Architectural Number. |
| "PHYS" | Physical (changes the meaning of "n"--see below). |
| "A" | "A" Attributes. |
| "B" | "B" Attributes. |
| "Z" | "Z" Attributes. |
| "n" | Number (architectural unless "PHYS" is on display). |
| "*" | Automatically changes architectural number or attributes in accordance with preceding physical number's. Sometimes acts like "#." |
| "#" | Go to the next display; leave the present one as is. |
| "Q" | Quit; changes to the last line have been effected. |

To program a station, you must know its physical number (the wiring location, which the system uses to identify the station--see the chapter on "Physical Numbers"). You may be able to look up physical numbers on a special list. If not, you can get the information from the system itself:

Looking Up a Station's Physical Number (1) Dial [#] [7] [2] ⟶ | ARCH? |

This asks for the "Architectural Number" (the number used to dial the station).

(2) Dial the number, just as if you were calling the station. → `0321=076` *

In this example, dialing "321" produces this display, which tells you that the station's physical number is "76." (If the architectural number that you dial has not been assigned to any physical number, the spaces to the right of the equal sign will be blank.)

(3) Hang up. → `126 :315`

The display reverts to showing call-in and calling activities.

Changing the Architectural Number (1) Dial [#] [9] [9] → `PHYS (n,*,#,Q)?`

(2) Dial the station's physical number. → `076=321 (n,*,#)`

The physical number appears on the left; (if no architectural number has been assigned to this physical number, the spaces between the equal sign and the opening parenthesis will be blank.) The characters within the parentheses indicate the options you can take. Two are pertinent here: "n" and "*," which are discussed in the next step.

---

*The numbers printed here are examples; those on your display will vary, depending upon what has been recorded and what you dial.

(3) Option "n": ~~Dia~~[redacted]~~he~~ new architectural number; [redacted]will appear to the right of the equal sign, replacing any previous number.

> Option "*": Dialing a "*" will automatically assign an architectural number by copying that of the preceding physical number, then adding "1" to it.

Suppose Physical Number 75 had Architectural Number 278:

[*] → `076=279 (A,*,#)`

(The "A" offers the option of changing the station's attributes. This will be explained below.)

(Hanging up at this point will erase the new architectural number and keep the former one in the system.)

(4) To complete the change to the new architectural number:

[#] ⟶ PHYS (n,*,#,Q)?

Note that this is also Step 1's display. The "Q" means that you may now "quit" (by hanging up) because the new number has now been recorded in the system.

(5) To continue programming additional numbers:

Options "#" and "*": Dialing either will bring up the next highest physical number (whether or not it is wired to any equipment).

Option "n": Dial another physical number.

(6) After changing the last architectural number, make sure that a "Q" is on the display, then hang up (hanging up sooner will not permanently record the last change).

Programming Attributes (1) If necessary, look up the physical number of the station to be reprogrammed (see "Looking Up a Physical Number" in this chapter).

(2) Dial [#] [9] [9] ⟶ PHYS (n,*,#,Q)?

(3) Dial the appropriate physical number. ⟶ 076=321 (n,*,#)

(4) Options "n" and "*": Change the Architectural Number by typing in a new one or by dialing a "*" (the latter will automatically assign a new number). These steps are explained more fully above, under "Changing an Architectural Number."

Option "#": Leave the architectural number unchanged by dialing "#."

In either case, the display will look like this (except for the architectural number):

076=321 (A,*,#)

(5) Option "*": To automatically give the station the same "A," "B," and "Z" attributes as those of the station with the preceding physical number:

| | |
|---|---|
| [*] → | PHYS (n,*,#,Q)? |

Jump to Step 14 below.

Option "A": To manually enter the attributes:

| | |
|---|---|
| ABC 2 → | 321 A: |

(The "A" calls up the "attributes.")

(6) Option 1: To leave the "A" attributes unchanged:

Jump to Step 7.

Option 2: To change one or more attributes:

Type in any attributes that you want by dialing the appropriate numbers from "1" to "8" (see the attribute lists at the beginning of this section). The numbers will appear on the display as they are dialed.

Delete any attributes that you do not want by dialing them. The numbers will disappear from the display as they are dialed.

Note: The numbers "toggle" on and off: dialing a number that is not on the display causes it to appear; dialing one that is there causes it to disappear.

(7) Dial [#] → | 321 B: |

(8) Option 1: To leave the "B" attributes unchanged:

Jump to Step 9.

Option 2: Change one or more of the "B" attributes:

Repeat Step 6, Option 2.

Note: The meanings of the "B" attributes depend upon whether the "A" attributes have defined the station as "Administrative" or "Staff" (see the "Attributes" section of this chapter).

(9) Dial [#] → | 321 Z: |

(The "Z" attributes determine the "zones" to which a speaker belongs.)

(10) Option 1: To leave the "Z" attributes unchanged:

Jump to Step 11.

Option 2: To change the "Z" attributes:

Repeat Step 6, Option 2.

(11) Dial [#] → [076=321 (A,*,#)]

This is your chance to review or change the attributes before they are made effective. (Hanging up at this point would erase your changes and restore the earlier attributes.)

(12) Option "A": To review or change the attributes you have just set:

Dial [ABC 2] → Returns you to Step 6.

| |
|---|
| Option "*": To automatically insert the same attributes as those stored with the preceding physical number:<br><br>Dial a "*" (see Step 5, Option "*"). |

Option "#": To finalize your changes:

Proceed to Step 13.

(13) When you are ready to effect the changes you have made:

Dial [#] → [PHYS (n,*,#,Q)?]

Note that this is Step 1's display.

The changes have now been recorded in the system.

(14) Option "Q" ("Quit"):

Hang up (the changes have been entered into the system).

Options "#" and "*": Start to program additional lines by:

Dialing "#" or "*," which will bring up the next highest physical number, OR

Option "n": Start to program another line by:

Dialing another physical number.

Programming "Z" Attributes Only (1) Dial [#] [9] [7] → [ARCH?]

(2) Dial the architectural number.

E.g., [7] [2] [1] → `721 Z: 123`

(3) Option 1: Leave the zones unchanged:

Hang up or go to Step 4.

Option 2: Change the zones:

The numbers toggle on and off: when dialed, a number not displayed will appear; one already displayed will disappear.

E.g., [2] [6] → `721 Z: 1 3 6`

This erased "2" and added "6." Hanging up now would restore the original settings. To record your changes, go to Step 4.

(4) To record any changes and go on to another number:

Option 1: Go on to the next consecutive architectural number:

Dial [#] → `722 Z:`

Return to Step 3. (If no station has the next consecutive number, the display will appear as in "Option 2" below.)

Option 2: Go on to a non-consecutive architectural number:

Dial [*] → `ARCH?`

Return to Step 2.

PROGRAMMING LOCATION CODES

Together with the attributes, these constitute the user-programmable features of the system. Broadly speaking, the location codes address system-wide conditions, whereas the attributes address the features of individual lines.

To Enter New Location Codes

1) Dial [#] [9] [8] → `LOC?`

2) Dial in the address ("Location") in the system's memory that handles the feature you are interested in. (The locations are listed in the next part of this section.)

For example: "64000" → `64000= 5`

(If this feature has already been programmed, the information will appear to the right of the location number; otherwise, the space to the right of the equal sign will be blank.)

3) Dial in the information needed (in this case, the physical number of the telephone that is to act as the new "Attendant Phone").

For example: "10" → | 64000= 5 |

The display remains unchanged. If you hang up, hookflash, or dial a star (*) at this point, the system will keep the previous setting.

4) To establish (or "enter") the new programming:

Dial [#] → | 64000= 010 |

5) To program at another location:

Option 1: Move to the next consecutive Location Number:

Dial [*] → | 64002= 4 |

Option 2: Jump to a non-consecutive Location Number:

Dial the desired Location. For example:

"64014" → | 64014= 300 |

Note: To leave a Location unchanged, dial "pound" ("#"); if you have not dialed in any new information, this action will leave the Location unchanged. Then you can follow Option A or B above.

6) To leave this programming mode, hang up. The normal display will return.

THE LOCATIONS AND THE INFORMATION NEEDED THERE

64000 The physical number of the system's attendant phone. This phone will be rung by incoming "AAI" calls. The calls could also originate from multi-link staff telephones programmed as "hot lines" (merely picking up the telephone receiver at these stations will ring the attendant phone). See the "A3" Attribute.

64002 Time-Zone Tone: This determines which tone will be sounded by an optional master clock or programmer. The tones are the same as those that can be dialed by an administrative phone with the "B5" attribute:

(1) Pulsating Tone (2) Siren (3) European Warble OR Steady Tone (depends upon how the system has been wired)

(4) Electronic Chimes

64004 Listing the physical number of an administrative phone here enables it to pick up an outside call connected to the attendant key phone (by dialing "#41" through "#49" and "#40" [the latter comes after "49" here, just as "0" is the highest dialing digit], depending upon the key line involved). If a "0" is entered here, all administrative phones will be given this capability.

64006 The ASCII Code for an extra character to be used in the data-sending function. The character is sent by [*] [*] [*] [0].

64008 The physical number of the line dedicated to single-link phones. This number _must_ correspond with the LLM terminal to which the SCC25 phone boards are wired (normally, physical number 4).

64010 Entering a "4" will give the system four-digit dialing (that is, all architectural numbers [those used to dial individual stations] will have four digits--e.g., "0009," "0123," "1124"). Any other setting (or none at all) will result in three-digit dialing.

64012 To prevent the system from being tied up by off-hook phones, you can limit the length of time that it will give dial tone to an off-hook phone. If the caller does not begin dialing during this time, the dial tone will cease and the caller will have to hook-flash or hang up to get dial tone again and, therewith, the ability to dial). The time limit is set in 60ths of a second ("60" = 1 second). A value lower than "120" (2 seconds) will disable this function. The normal setting is "900" (15 seconds).

64014 Hookflash Time Limit, set in 60ths of a second. This determines how long you have to hold down the hookswitch to completely disengage a connection. If you hold the hookswitch down for less than this time, the system will interpret your action as a conference call and place the line you have been connected to on hold. The normal setting is "45" (3/4 second).

64016-64034 One-Digit Dialing: The line whose physical number has been entered at one of these locations will be accessed by dialing the digit shown next to the location number listed immediately below. Two common uses for this feature are:

(1) A phone that can be dialed directly (e.g., "0" for "Operator").

(2) A line leading to outside telephone lines (a telephone-company central office, a switchboard, etc.). One common application is assigning "9" for dialing outside numbers.

_Note_: You cannot use the same digit for _both_ single-digit dialing _and_ the first digit of an architectural number. For instance, if you were to enter a physical number at "64018," as soon as you dialed a "1," the system would begin trying to connect you to that physical number; thus, you could not dial an architectural number like "106."

| Location Code | Digit |
| --- | --- |
| 64016 | 0 |

| | |
|---|---|
| 64018 | 1 |
| 64020 | 2 |
| 64022 | 3 |
| 64024 | 4 |
| 64026 | 5 |
| 64028 | 6 |
| 64030 | 7 |
| 64032 | 8 |
| 64034 | 9 |

Entering "2000" at any of these locations will disable this dialing function for the corresponding digit.

64036 "Keep-Alive Time": when an outside telephone must resort to the "keep-alive" procedure to avoid being disconnected. Under this procedure, the caller periodically receives a warning signal (two quick beeps) that he is about to be disconnected; he must then push any button on a DTMF phone to remain connected (see "64038" immediately below). The length of time between these warnings is set here, in 60ths of a second. The normal setting is "1200" (20 seconds). The "keep-alive" procedure applies to "DIA" calls to speakers (see the "A13" attribute).

64038 "Response Time": After receiving the warning beeps that he is about to be disconnected (see "64036" immediately above), the outside caller to a speaker via an "A13" line has to respond by dialing any push button within the length of time set at this location (in 60ths of a second). The normal setting is "300" (5 seconds).

64040-64080 Tells the system where the voice-control modules (VCMs, used for conversations involving speakers) are wired in. (The system comes with one, but additional VCMs may be purchased--as many as one for each SC25 or SCC25 board dedicated to speakers.) Each VCM is wired between an LLM line and one or more speaker boards. In programming, for each speaker board, you must find its location number and enter there the physical number dedicated to its VCM.

| Location | Speaker Board* |
|---|---|
| 64040 | 48 |
| 64042 | 0 |
| 64044 | 1 |
| 64046 | 2 |
| 64048 | 3 |
| 64050 | 4 |
| 64052 | 5 |
| 64054 | 6 |
| 64056 | 7 |
| 64058 | 8 |
| 64060 | 9 |

| Location | Speaker Board |
|---|---|
| 64062 | 10 |
| 64064 | 11 |
| 64066 | 12 |
| 64068 | 13 |
| 64070 | 14 |
| 64072 | 15 |
| 64074 | 16 |
| 64076 | 17 |
| 64078 | 18 |
| 64080 | 19 |

*For the switch settings of these boards, consult the physical number charts. Normally, all are set to physical number 2.

64082-64096 The minimum duration for tone signals set off by an optional master clock or programmer (the clock or programmer can prolong the signal beyond this minimum time). Set in 60ths of a second. ("60" = 1 second).

| Location | Time Zone |
|---|---|
| 64082 | 1 |
| 64084 | 2 |
| 64086 | 3 |
| 64088 | 4 |
| 64090 | 5 |
| 64092 | 6 |
| 64094 | 7 |
| 64096 | 8 |

64098 Determines how long the system keeps an outside line dead upon the completion of a call (to allow proper disconnection with a telephone-company or PBX line). Set in 60ths of a second. Recommended setting: "180" (3 seconds).

64100 "Monitor Lock"--A "zero" entry here permits a service representative to "freeze" the system in mid-action so that its operations can be examined with a computer. The normal setting is "255."

64102 The interval between the "beeps" that announce a priority call-in. Set in 60ths of a second. The normal setting is "60" (1 second).

64104 The interval between the "beeps" that announce a normal call-in. Set in 60ths of a second. The normal setting is "600" (10 seconds).

64106 "Single-Button Dialing"--A "1" here enables administrative phones that are programmed to answer call-ins to disconnect themselves from one call-in and answer the next one by simply dialing a star (*). While in use, this function limits the system's traffic capacity by tying up a DTMF receiver.

64108 Not used yet.

64110 "Remote Hookflash": For use when the system is interconnected with a PBX or another Telecenter system. Dialing a hookflash plus a star tells your system that the hookflash signal is intended for the other system. The normal setting is "30" (1/2 second).

64112-64174 The "N0" through "N31" settings that specify hierarchical restrictions on the use of a special paging system.

64176-64190 The "M0" through "M7" settings that specify hierarchical restrictions on the use of a special paging system.

64192 "Attendant Ring-Back": The attendant phone can transfer an outside call to ring a phone in the system. This setting determines how long the other phone will ring before the call is transferred back to the attendant phone. The normal setting is "1200" (20 seconds).

and wherein only one of said pulses is generated each (d) receiving a third number dialed from said multi- 65280-65284 Any Area Code entered here can be called by an administrative phone whose outside-call authorization is otherwise restricted to local calls ("B1" attribute). Up to three Area Codes may be entered here (one per location).

SUMMARY OF PROGRAMING FOR ARCHITECTURAL NUMBERS AND ATTRIBUTES

To change the architectural (dialing) number of any phone or speaker, you must find out the PHYSICAL number of that line. One way to do this is to dial "#72." Then when you see the display question "ARCH?", dial in the the number as you would in calling the line. The system will then tell you the PHYSICAL number. Note the number and then hang up.

Pick up a display phone and dial "#99." Proceed from DISPLAY 1 through DISPLAY 4 and choose the commands as outlined below. The letters within the parentheses on the display indicate your options:

DISPLAY 1: `PHYS ( n, *, #, Q)`

COMMANDS:

(n) --- Enter the physical number of the line that you want to change (e.g., "076").

(Q) --- When you are through with your changes, do not hang up until you see the "Q" ("quit") or your changes will not be saved. To get the "Q," just press "#" a couple of times.

(#) --- For viewing a series of physical numbers, you may press this key instead of the number to see the next one (expert option).

DISPLAY 2: `076=789 (n,*,#)` (Note: "789" is arch. no.)

COMMANDS:

(n) --- A number entered here becomes the new ARCH. number for this line (e.g., "765").

(*) --- Causes the architectural number for this line to be set to 1 + the architectural number of the previous line (for experts).

(#) --- Keeps the architectural number the same as shown and advances to the next display.

DISPLAY 3: `076=765 (A,*,#)`

COMMANDS:

(#) --- Keep the attributes as is for this line and go back to the first screen to quit or select another physical number.

(*) --- Set attributes "A," "B," and "Z" to the same flags as those of the preceding physical number (for experts).

(A) --- Review or modify attributes "A," "B," and "Z" for this line. Go to DISPLAY 4.

DISPLAY 4: `776 A: 123 78`

(Note: "A," "B," or "Z" may appear in the display as required to denote the type of attribute.)

COMMANDS:

(n) --- If you press any button from "1" to "8," you will reverse the state of the corresponding flag (digit). Keep pressing these eight buttons until you see the flags that you want in the display.

(#) --- This will store the the attributes as displayed and bring the next set into the display. You will see "A," "B," and "Z"; when you press "#" the third time, you will be returned to the previous screen so that you will be able to either:

(a) review the attributes again by pressing "A," OR (b) exit by pressing "#" and quitting when you see the "Q" in the display.

QUICK REFERENCE CHART

```
LINE TYPE            ADMIN        STAFF        PAGE     LOCATIONS          DIAL CODES
A:      NOTHING      B:1 INTERCN  | GND PRIOR  | N b0   64000 ATTNDNT      #00 ALL-PG
A:1     ADMIN        B:2 TOLL     | CANCEL     | N b1   64002 TZ4=CHIME    #01 ZONE 1
A:2     STAFF 16     B:3 ZONE     | DISP 1     | N b2   64004 #4X AUTH     #11 TONE 1
A:12    STAFF 1      B:4 ALL-PG   | DISP 2     | N b3   64006 DATA CHAR    #14 CHIME
A:3     INT AAI      B:5 TONES    | RES PRIOR  | N b4   64008 1LK STAFF    #20 INIT DISP
A:13    INT DIA      B:6 EX OVER  | CANCEL     | M b0   64010 3 OR 4 DIG   #21 CAN CALLS
A:23    SP PAGE      B:7 DISP 1   | DISP 1     | M b1   64012 DTMF TIME    #22 REV CALLS
A:123   INT DIR      B:8 DISP 2   | DISP 2     | M b2   64014 HK FLASH     #23 DAT ENT
A:4     FUTURE TYPE                                     64016 DIAL '0'     #30 NITE ANS
A:14      "    "                          STATS         64034 DIAL '9'     #31 NITE SW
A:24      "    "     DATA COLLECTION  57344 RESETS      64036 KEEP-ALIVE   #40-49 CLL PKP
A:124     "    "                      57346 SCAN OUT    64038 * RESPNSE    #70 VERS, CKSM
A:34      "    "          # - SPACE   57348 ADM CLLS    64040 :48 SC25     #71 EEPRM CKSM
A:134     "    "         ## - BK SP   57350 DIA INCM    64042 :00 SC25     #72 PHYS LKUP
A:234     "    "        ### - CANCEL  57352 AAI/DIR     64080 :19 SC25     #73 I/O DIAG
A:1234    "    "         *1 - "."     57354 CALL-INS    64082 TZ1 DURA     #75 LLM DIAG
A:5     N.A.            **1 - BEEP    57356 OUTG INT    64098 future       #96 TOLL PFX
A:6     N.A.           ***1 - NEW LINE 57358 MX LINKS   64100 0 OK HALT    #97 ZONE CHG
A:7     SPKR FIRST       *0 - Q       57360 MX ACTIV    64102 PR BEEP      #98 LOC EDIT
A:8     HUNT GROUP      **0 - Z                         64104 NRM BEEP     #99 ARCH CODE
                       ***0 - SP CHAR                   64106 1 REP SBD
                                                        64108 future
DIP SWS: UP = SPKR                                      64110 REM HK FL
1ST DISPY PHONE: LINE 5                                 64112 N0 TO N31
#73: PHYS-LINK-PORT-INP-ACTIV                           64176 M0 TO M7
                                                        64192 ATND RBK TM
                                                        65280 3 AREA CDS
```

APPENDIX III
Component Numbers and Values
(Resistors are 10% tolerance and ¼ watt unless otherwise noted)

| REFERENCE | TYPE | DESCRIPTION |
|---|---|---|
| 45 | 1500 ohm ½ W 10% | Resistor |
| 94 | 4053 | CMOS Electronic Switch |
| 100 | 1K ohm 5% | Resistor |
| 101 | 15K ohm 5% | Resistor |
| 113 | 4067B | CMOS Multiplexer |
| 118 | 4067B | CMOS Multiplexer |
| 119 | 4042B | CMOS Latch |
| 120 | 1200 ohm | Resistor |
| 121 | 1200 ohm | Resistor |
| 122 | 0.47 uF 200 V | Capacitor |
| 123 | LM0096 | Transformer |
| 124 | IN457A | Diode Bridge |
| 131 | 470 ohm | Resistor |
| 132 | 470 ohm | Resistor |
| 133 | MPSA55 | Transistor |
| 134 | 100K ohm | Resistor |
| 135 | 10K ohm | Resistor |
| 138 | MPSA18 | Transistor |
| 139 | MPS6515 | Transistor |
| 140 | 100K ohm | Resistor |
| 141 | 10K ohm | Resistor |
| 142 | 100K ohm | Resistor |
| 143-144 | LM393 | High Speed Comparator |

-continued

APPENDIX III
Component Numbers and Values
(Resistors are 10% tolerance and ¼ watt unless otherwise noted)

| REFERENCE | TYPE | DESCRIPTION |
|---|---|---|
| 145 | MPSA05 | Transistor |
| 148 | MPSA05 | Transistor |
| 149-151 | 4001B | CMOS NOR Gate |
| 152-153 | LM393 | High Speed Comparator |
| 156 | 220 ohm 5% | Resistor |
| 157 | 13 ohm 5% | Resistor |
| 158 | 1.5K ohm 5% | Resistor |
| 160 | 4001B | CMOS NOR Gate |
| 161 | 4043B | CMOS Set-Reset Flip-Flop |
| 162 | 4001B | CMOS NOR Gate |
| 163 | 4043B | CMOS Set-Reset Flip-Flop |
| 164 | 2.2 Meg. ohm | Resistor |
| 165 | 0.47 uF | Electrolytic Capacitor |
| 166 | MPS6515 | Transistor |
| 167 | 680 ohm 20% | Resistor |
| 172 | MPSA55 | Transistor |
| 173 | 11 ohm | Resistor |
| 174 | MPSA55 | Transistor |
| 175 | 12K ohm | Resistor |
| 176 | 22 uF 16 V | Electrolytic Capacitor |
| 177 | 2N5832 | Transistor |
| 178 | 11 ohm | Resistor |
| 179 | 6.8 0.5 W | Resistor |

-continued

APPENDIX III
Component Numbers and Values
(Resistors are 10% tolerance and ¼ watt unless otherwise noted)

| REFERENCE | TYPE | DESCRIPTION |
|---|---|---|
| 180 | 220 uf 6 V | Electrolyic Capacitor |
| 181 | MOC3010 | Triac Optocoupler |
| 182 | 470 ohm 0.25 W | Resistor |
| 183-184 | 1N4002 | Diode |
| 185 | MPS6515 | Transistor |
| 186 | 1.5K ohm | Resistor |
| 187 | 22K ohm | Resistor |
| 188 | 10K ohm | Resistor |
| 190 | 74HC273 | Output Port |
| 191 | 74HC244 | Input Port |
| 192-193 | 10K ohm | Resistor |
| 194 | MPSA18 | Transistor |
| 195-196 | 10K ohm | Resistor |
| 197 | MPSA55 | Transistor |
| 198-199 | 10K ohm | Resistor |
| 200 | 10K ohm | Resistor |
| 201 | 6.8K ohm | Resistor |
| 202 | 10K ohm | Resistor |
| 203 | 6.8K ohm | Resistor |
| 204 | 2.4K ohm 1% | Resistor |
| 205 | 470 ohm 5% | Resistor |
| 206 | 2.41K ohm 1% | Resistor |
| 207-208 | 1N4002 | Diode |
| 209 | 100 ohm | Resistor |
| 210 | MPSA18 | Transistor |
| 211 | MPSA55 | Transistor |
| 212 | 39K ohm | Resistor |
| 213 | 1K ohm | Resistor |
| 214 | MPSA18 | Transistor |
| 215 | MPSA55 | Transistor |
| 216 | 39K ohm | Resistor |
| 217 | 1K ohm | Resistor |
| 218 | 330 ohm | Resistor |
| 219 | 1.2K ohm | Resistor |
| 220 | 10K ohm | Resistor |
| 221 | 6.8K ohm | Resistor |
| 222 | 10K ohm | Resistor |
| 223 | 6.8K ohm | Resistor |
| 224 | 0.01 uF | Capacitor |
| 225-226 | 4.7K ohm | Resistor |
| 227 | 500K ohm | Potentiometer |
| 228 | 1.3 M ohm 5% | Resistor |
| 229 | 1.3 M ohm 5% | Resistor |
| 230 | 3.3K ohm | Resistor |
| 231 | 10K ohm | Resistor |
| 232 | 47K 5% | Resistor |
| 233 | 1N914B | Diode |
| 240 | 7805 | 5 V. Regulator |
| 241 | 6800 uF 25 V | Electrolytic Capacitor |
| 242 | 10 uF 25 V | Electrolytic Capacitor |
| 243 | 0.1 uF 35 V | Electrolytic Capacitor |
| 244 | 5 ohm 5 W | Resistor |
| 245 | S177661 | −5 V. Converter |
| 246-246' | 10 uF 25 V | Electrolytic Capacitor |
| 247 | MPSA55 | Transistor |
| 248 | 2.7K ohm | Resistor |
| 249 | 12K ohm | Resistor |
| 250 | 741 | Operational Amplifier |
| 251-252 | 1K ohm | Resistor |
| 253 | 100 uf 25 V | Electrolytic Capacitor |
| 254 | 68K ohm | Resistor |
| 255 | 180K ohm | Resistor |
| 256 | 220 ohm | Resistor |
| 257 | 10 uF 25 V | Electrolytic Capacitor |
| 258 | 0.1 uF 35 V | Electrolytic Capacitor |
| 259 | 68K ohm | Resistor |
| 260 | 0.1 uF 35 V | Electrolytic Capacitor |
| 261 | 68K ohm | Resistor |
| 262-263 | 1N4002 | Diode |
| 264-265 | TDA 2003 | Power Amplifier |
| 266 | 22K ohm | Resistor |
| 267 | 4.7K ohm | Resistor |
| 268 | 2.2 uF 20 V | Electrolytic Capacitor |
| 269 | 1K ohm | Resistor |
| 270 | MPS 6515 | Transistor |

-continued

APPENDIX III
Component Numbers and Values
(Resistors are 10% tolerance and ¼ watt unless otherwise noted)

| REFERENCE | TYPE | DESCRIPTION |
|---|---|---|
| 271-272 | 2.2K ohm | Resistor |
| 273 | 1.5 ohm 2 W | Resistor |
| 274 | 470 uF 16 V | Electrolytic Capacitor |
| 275 | 0.05 uF | Capacitor |
| 276 | 220 ohm | Resistor |
| 277 | 560 ohm | Resistor |
| 278 | 16 ohm | Resistor |
| 279-280 | 10 uF 25 V | Electrolytic Capacitor |
| 281 | 1 ohm | Resistor |
| 282 | 0.1 uF 35 V | Electrolytic Capacitor |
| 283 | 150 ohm 2 W | Resistor |
| 284 | 16 ohm | Resistor |
| 286 | 100 ohm | Resistor |
| 288 | MPS6515 | Transistor |
| 289 | 1 uF 25 V | Electrolytic Capacitor |
| 290 | 1.5K ohm | Potentiometer |
| 291 | 22K ohm | Resistor |
| 292 | 1 M ohm | Resistor |
| 293 | MPS6515 | Transistor |
| 294 | 10K ohm | Resistor |
| 302-303 | 74HC273 | Output Port |
| 303-305 | 6118 | Octal Buffer |
| 306-307 | 1K ohm | Resistor |
| 308-309 | 2716 | EPROM |
| 310-311 | 6118 | Octal Buffer |
| 312-313 | 1K ohm | Resistor |
| 316 | MPS6515 | Transistor |
| 317 | 10K ohm | Resistor |
| 318-319 | 4.7K ohm | Resistor |
| 320-321 | 100K ohm | Resistor |
| 322 | 4049 | Hex Inverter |
| 323 | 4068 | 8-input NAND |
| 324 | 470K ohm 5% | Resistor |
| 325 | 1K ohm 5% | Resistor |
| 326-328 | 1N914B | Diode |
| 329 | 4053 | Analog Switch |
| 330-331 | 10K ohm | Resistor |
| 332-333 | 4067 | CMOS Analog Multiplexer |
| 340 | 0.05 uF | Capacitor |
| 341 | 2.2 uF 35 V | Electrolytic Capacitor |
| 343 | 1N4002 | Diode |
| 344 | 4068B | 8-input NAND |
| 345 | 10K ohm | Resistor |
| 346 | 4049 | Hex Inverter |
| 350 | 8085 | Intel. Corp. Microprocessor |
| 352 | 4.9152 MHz | Quartz Crystal |
| 354 | 555 | Timer |
| 356 | MPS 6515 | Transistor |
| 357 | 1 uF 35 V | Tantalum Capacitor |
| 357 | 0.47 uF 35 V | Electrolytic Capacitor |
| 358-359 | 4.7K ohm | Resistor |
| 360 | 100 ohm | Resistor |
| 361 | 2.2 M ohm | Resistor |
| 362 | 220K ohm | Resistor |
| 363 | 1 uF 35 V | Tantalum Capacitor |
| 364 | 0.1 uF 35 V | Electrolytic Capacitor |
| 365 | 1K ohm | Resistor |
| 366 | 0.01 uF | Capacitor |
| 367 | 74HC4040 | Binary Counter |
| 369 | AY31015D | UART |
| 371-372 | MPS6515 | Transistor |
| 373 | 3.3K ohm | Resistor |
| 374 | 1K ohm | Resistor |
| 375 | 18K ohm | Resistor |
| 376 | 10K ohm | Resistor |
| 377 | 2.2K ohm | Resistor |
| 378-379 | 1K ohm | Resistor |
| 381 | 4.7K ohm | Resistor |
| 382 | 74HC373 | Octal Latch |
| 383-386 | 74HC138 | 3-bit Decoders |
| 387 | 47HC00 | 2-input NAND |
| 400-404 | 2764 | EPROM |
| 405 | 0.01 uF | Capacitor |
| 406 | 1N4002 | Diode |
| 407-408 | 2016 | RAM |

APPENDIX III
Component Numbers and Values
(Resistors are 10% tolerance and ¼ watt unless otherwise noted)

| REFERENCE | TYPE | DESCRIPTION |
|---|---|---|
| 409–410 | 2816 | EEPROM |
| 413–414 | 10K ohm | Resistors |
| 415 | 4528 | Monostable |
| 416 | 100K ohm | Resistor |
| 417 | 0.01 uF | Capacitor |
| 418–419 | 74HC00 | 2-input NAND |
| 420 | 74HC244 | Octal Buffer |
| 421 | 74HC245 | Octal Bidirectional Buffer |
| 422–423 | 100 ohm | Resistors |
| 425 | 1N4735 | Zener Diode |
| 426 | 100 uF 10 V | Electrolytic Capacitor |
| 430 | 74HC273 | Output Port |
| 431 | 4001 | 2-input NOR |
| 432–433 | 4023 | 3-input NAND |
| 434 | 4001 | 2-input NOR |
| 435 | 4023 | 3-input NAND |
| 436 | TP53130 | DTMF Generator |
| 437 | 555 | Timer |
| 438 | 220 ohm | Resistor |
| 439 | 3.58 MHz | Quartz Crystal |
| 440 | 100K ohm | Resistor |
| 441 | 160K ohm | Resistor |
| 442 | 0.01 uF | Capacitor |
| 443 | 0.01 uF | Capacitor |
| 444 | MPSA14 | Darlington Transistor |
| 445 | 1K ohm | Resistor |
| 446 | 300 ohm | Resistor |
| 447 | 680 ohm | Resistor |
| 448 | 10K ohm | resistor |
| 449 | 0.01 uF | Capacitor |
| 450 | 1N4002 | Diode |
| 451 | 2.2 uF 35 V | Electrolytic Capacitor |
| 460 | M8870 | DTMF Receiver |
| 461 | 0.01 uF | Capacitor |
| 462–463 | 100K ohm | Resistor |
| 464 | 3 . . . 58 MHz | Quartz Crystal |
| 465 | 300K ohm | Resistor |
| 466 | 0.1 uF | Capacitor |
| 470 | 40105 | FIFO Register |
| 471–474 | 74HCO2 | 2-input NOR |
| 475 | 10K ohm | Resistor |
| 476 | 1N4002 | Diode |
| 481 | 74HC244 | Octal Buffer |
| 482 | 300 ohm | Resistor |
| 483 | 180 ohm | Resistor |
| 484 | 150 ohm | Resistor |
| 485 | 470 ohm | Resistor |
| 486 | 4.7K ohm | Resistor |
| 487 | MPSA55 | Transistor |
| 489 | 560 ohm | Resistor |
| 500 | 1.8K ohm | Resistor |
| 501–502 | 74HC138 | Address Decoder |
| 503 | 4025 | 3-input NOR |
| 504 | 74HC273 | Output Port |
| 505 | ULN28038 | Open Collector Buffer |
| 506 | 74HC273 | Output Port |
| 507 | 2982 | Relay Driver |
| 508 | 74HC273 | Output Port |
| 509 | MPS6515 | Transistor |
| 510 | 2.2K ohm | Resistor |
| 511 | 2.2K ohm | Resistor |
| 512 | 150 ohm ½ W | Resistor |
| 513 | MPS6515 | Transistor |
| 514 | MPSA55 | Transistor |
| 515–516 | 10K ohm | Resistor |
| 517 | 3.3K ohm | Resistor |
| 518 | 10K ohm | Resistor |
| 519 | 83 ohm | Resistor |
| 520 | 82 ohm | Resistor |
| 523–524 | 100 ohm | Resistor |
| 525–526 | 74HC244 | Input Port |
| 527 | 1N4002 | Diodes |
| 528–530 | 1K ohm | Resistor |
| 533 | MPS6515 | Transistor |
| 434–535 | 4.7K ohm | Resistor |

APPENDIX III
Component Numbers and Values
(Resistors are 10% tolerance and ¼ watt unless otherwise noted)

| REFERENCE | TYPE | DESCRIPTION |
|---|---|---|
| 551 | 2.2 uF 35 V | Electrolytic Capacitor |
| 552 | 270 ohm 5% | Resistor |
| 553 | 680 ohm 5% | Resistor |
| 555 | 0.22 uf | Capacitor |
| 556 | 1K ohm 5% | Resistor |
| 557 | 240 ohm 5% | Resistor |
| 559 | 741 | Operational Amplifier |
| 560 | 0.022 uF | Capacitor |
| 561 | 33K ohm | Resistor |
| 562 | 0.1 uF | Capacitor |
| 563 | 56K ohm | Resistor |
| 564 | 330 pF | Capacitor |
| 565 | 33K ohm | Resistor |
| 567–568 | 0.01 uF | Capacitor |
| 569–570 | 33K ohm | Resistor |
| 571 | LM358 | Operational Amplifier |
| 572 | MPS6515 | Transistor |
| 573 | 1 uF 35 V | Electrolytic Capacitor |
| 573' | 10K ohm | Resistor |
| 574 | 820K ohm 5% | Resistor |
| 574' | 100 ohm | Resistor |
| 575 | 100 ohm | Resistor |
| 576–577 | 4093 | 2-input Schmitt NAND |
| 578 | 220K ohm 5% | Resistor |
| 579 | 1.5K ohm | Potentiometer |
| 580 | 620K ohm 5% | Resistor |
| 581 | 1.3K ohm 5% | Resistor |
| 584 | LM358 | Operational Amplifier |
| 585 | 33K ohm | Resistor |
| 586 | 39K ohm | Resistor |
| 587 | 100K ohm | Resistor |
| 588 | 33K ohm | Resistor |
| 589 | 6.8K ohm | Resistor |
| 590 | 1.8K ohm | Resistor |
| 591–592 | 0.005 uF | Capacitor |
| 593 | 0.033 uF | Capacitor |
| 594 | 1N457A | Diode |
| 595 | 100K ohm | Resistor |
| 596 | 10K ohm | Potentiometers |
| 597 | 1K ohm | Resistor |
| 599 | 1N4002 | Diode |
| 600 | MPSA05 | Transistor |
| 601–602 | 4.7K ohm | Resistor |
| 603 | 10K ohm | Resistor |
| 604 | 555 | Timer |
| 606 | 1.58K ohm 1% ½ W | Resistor |
| 607 | 430 ohm 5% | Resistor |
| 608 | MPS6517 | Transistor |
| 609 | 220 ohm | Resistor |
| 609' | 47 uF 10 V | Electrolytic Capacitor |
| 611 | 1K ohm | Resistor |
| 612 | MPS6515 | Transistor |
| 613 | 22K ohm | Resistor |
| 614 | 2.2K ohm | Resistor |
| 616 | MPS6515 | Transistor |
| 617 | 0.47 uF 35 V | Electrolytic Capacitor |
| 618 | 470K ohm | Resistor |
| 619 | 220K ohm | Resistor |
| 620 | 10K ohm | Resistor |
| 621 | 4093 | 2-input Scmhitt NAND |
| 623 | MPS6515 | Transistor |
| 624 | 1.58K ohm 1% ½ W | Resistor |
| 625 | 430 ohm 5% | Resistor |
| 626 | 47 uF 10 V | Electrolytic Capacitor |
| 627 | 1.5K ohm 5% | Resistor |
| 628–629 | 1N457A | Diode |
| 630 | MPS6515 | Transistor |
| 631 | 47K ohm | Resistor |
| 632 | 22K ohm | Resistor |
| 633 | 10K ohm | Resistor |
| 634 | 6.8 uF 35 V | Electrolytic Capacitor |
| 635 | 22K ohm | Resistor |
| 636 | 2.7 M ohm | Resistor |
| 637 | 1 M ohm | Resistor |
| 638 | 0.01 uF | Capacitor |

-continued

APPENDIX III
Component Numbers and Values
(Resistors are 10% tolerance and ¼ watt unless otherwise noted)

| REFERENCE | TYPE | DESCRIPTION |
|---|---|---|
| 639 | 1K ohm | Resistor |
| 640 | 0.05 uF | Capacitor |
| 642 | 10K ohm | Resistor |
| 643 | 100K ohm | Resistor |
| 644 | MPS6517 | Transistor |
| 645 | MPS6515 | Transistor |
| 646 | 1 uF 35 V | Electrolytic Capacitor |
| 647 | 10K ohm | Resistor |
| 648 | 2.2K ohm | Resistor |
| 649–650 | TDA2003 | 6 W. Power Amplifier |
| 651 | 2.2 uF 35 V | Electrolytic Capacitor |
| 652 | 2.2K ohm | Resistor |
| 653 | 0.001 uF | Capacitor |
| 654 | 10 uF 25 V | Electrolytic Capacitor |
| 655 | 200 ohm 5% | Resistor |
| 666 | 36 ohm 5% | Resistor |
| 670 | 36 ohm 5% | Resistor |
| 671 | 10 uF 25 V | Electrolytic Capacitor |
| 672 | 2.2 uF 35 V | Electrolytic Capacitor |
| 673 | 430 ohm 5% | Resistor |
| 674 | 1 ohm 2 W | Resistor |
| 675 | 0.22 uF | Capacitor |
| 676 | 1.1 ohm 5% | Resistor |
| 677 | 0.1 uF 35 V | Electrolytic Capacitor |
| 679 | 330 uF 16 V | Nonpolarized Electrolytic Cap. |
| 680 | 2.2K ohm | Resistor |
| 682 | 1N457A | Diode |
| 683 | LM13600N | Operational Amplifier |
| 684–685 | 1K ohm 5% | Resistor |
| 686–687 | 0.05 uF | Capacitor |
| 688–689 | 1 uF 35 V | Electrolytic Capacitor |
| 690–691 | 0.1 uF | Capacitor |
| 692–693 | 330 ohm 5% | Resistor |
| 694–697 | 1.89K ohm 5% | Resistor |
| 698 | 100 uF 16 V | Electrolytic Capacitor |
| 699 | 820 pF | Capacitor |
| 700 | 27K ohm %% | Resistor |
| 701 | 4.7K ohm | Resistor |
| 702 | 1N457A | Diode |
| 703 | 6.8K ohm 5% | Resistor |
| 704–705 | MPS6519 | Transistor |
| 706 | 4.3K ohm 5% | Resistor |
| 707 | 15K ohm 5% | Resistor |
| 708 | 100 ohm | Resistor |
| 709 | 1 M ohm | Resistor |
| 710 | 10K ohm 5% | Resistor |
| 711 | 2.2 uF 35 V | Electrolytic Capacitor |
| 720 | LM13600N | Operational Amplifier |
| 721 | 10 ohm | Resistor |
| 722 | 100 uF 16 V | Electrolytic Capacitor |
| 723 | 0.01 uF | Capacitor |
| 724 | 47 pF | Capacitor |
| 725 | 220 pF | Capacitor |
| 726 | 27K ohm 5% | Resistor |
| 727–278 | 100K ohm | Resistor |
| 729 | 390K ohm 5% | Resistor |
| 730 | 27K ohm 5% | Resistor |
| 731 | 390 ohm | Resistor |
| 732 | 0.47 uF 35 V | Electrolytic Capacitor |
| 733 | 10K ohm | Potentiometer |
| 734 | 0.22 uF | Capacitor |
| 736 | 10K ohm | Resistor |
| 737 | MPS6517 | Transistor |
| 738 | MPS6515 | Transistor |
| 739 | 2.2K ohm | Resistor |
| 740–741 | 10K ohm | Resistor |
| 742 | 1 uF 35 V | Electrolytic Capacitor |
| 743 | LM13600N | Operational Amplifier |
| 744 | 0.022 uF | Capacitor |
| 745 | 2.2 uF 20 V | Electrolytic Capacitor |
| 746 | 330 pF | Capacitor |
| 747–748 | 33K ohm | Resistor |
| 749 | 57K ohm 5% | Resistor |
| 802 | 2.2 uF 20 V | Electrolytic Capacitor |
| 806 | MPS6515 | Transistor |

-continued

APPENDIX III
Component Numbers and Values
(Resistors are 10% tolerance and ¼ watt unless otherwise noted)

| REFERENCE | TYPE | DESCRIPTION |
|---|---|---|
| 807, 808 | 100K ohm | Resistor |
| 809 | 47K ohm | Resistor |
| 810 | 10K ohm | Resistor |
| 811 | 22 ohm 2 W | Resistor |
| 812 | 100 uF 25 V | Electrolytic Capacitor |
| 813 | MPS6515 | Transistor |
| 816 | 1N4002 | Diode |
| 817 | MPS6519 | Transistor |
| 818–819 | 10K ohm | Resistor |
| 820 | JR0108 | Bridge Rectifier |
| 821 | 10 ohm 2 W 5% | Resistor |
| 822 | 180 ohm 2 W | Resistor |
| 823 | 22 uF 35 V | Electrolytic Capacitor |
| 824 | 10K ohm | Resistor |
| 825 | 2.2 uF 20 V | Electrolytic Capacitor |
| 826 | MPS6519 | Transistor |
| 827 | 100K ohm | Resistor |
| 828 | 1 M ohm 5% | Resistor |
| 829 | 1N4002 | diodes |
| 830 | MPS6515 | Transistor |
| 831–832 | 33K ohm | Resistor |
| 835 | 150 ohm 2 W | Resistor |
| 836 | 1N4002 | Diodes |
| 840 | MPS6519 | Transistor |
| 841–842 | 10K ohm | Resistor |
| 843 | MJE51 | Transistor |
| 844–845 | 10K ohm | Resistor |
| 846 | 100 ohm | Resistor |
| 847 | 10 uF 25 V | Electrolytic Capacitor |
| 850 | JR0108 | Bridge Rectifier |
| 851 | 1N4002 | diode |
| 852 | 10 ohm | Resistor |
| 853–854 | 4N25 | Optocoupler |
| 855 | 1N4002 | Diode |
| 856 | 1.5K ohm | Resistor |
| 857 | 10K ohm ½ W | Resistor |
| 858 | 0.47 uF 250 V | Capacitor |
| 859 | JR0109 | Varistor V220ZA05 |
| 860 | 2.2 uF 20 V | Electrolytic Capacitor |
| 861 | 555 | Timer |
| 862 | 100K ohm | Resistor |
| 863 | 1K ohm | Resistor |
| 864 | 2.2 M ohm 5% | Resistor |
| 865 | 0.01 uF | Capacitor |
| 866 | 1N4002 | diode |
| 862 | 100 uF 20 V | Electrolytic Capacitor |
| 863 | 100 uF 20 V | Electrolytic Capacitor |
| 864 | 79L05ACP | Neg. 5 V Regulator |
| 865 | 0.1 uF | Capacitor |
| 866 | 1N4744A | Zener Diode |
| 867 | 10K ohm 5% | Resistor |
| 867′ | 6.8K ohm 5% | Resistor |
| 868–869 | CD40106B | Inverter |
| 870 | CD4520 | Dual Binary Counter |
| 873 | 1N914 | Diode |
| 874 | 2.2 M ohm | Resistor |
| 875 | 0.01 uF 5% | Capacitor |
| 876–877 | CD4093 | 2-input NAND |
| 878 | 10K ohm | Resistor |
| 879 | 0.001 uF | Capacitor |
| 880–881 | CD40106B | Inverter |
| 882 | 74HC164 | Serial to Parallel Shift Reg. |
| 883 | CD4093 | 2-input NAND |
| 885 | 0.001 uF 1% | Capacitor |
| 886 | 75K ohm 5% | Resistor |
| 887 | 27C16 | CMOS EPROM |
| 890 | 100K ohm | Resistor |
| 891 | 4.7 uF 10 V | Electrolytic Capacitor |
| 891′ | 25K ohm | Potentiometer |
| 892 | 68K ohm | Resistor |
| 892′ | 4770 ohm | Resistor |
| 893 | CD0106B | Inventer |
| 894 | CD4093 | 2-input NAND |
| 895 | US0143 | Sonalert |
| 896 | MPS6517 | Transistor |

-continued

APPENDIX III
Component Numbers and Values
(Resistors are 10% tolerance and ¼ watt unless otherwise noted)

| REFERENCE | TYPE | DESCRIPTION |
|---|---|---|
| 897–901 | 100K ohm | Resistor |
| 902 | 10K ohm | Resistor |
| 903 | MPS6515 | Transistor |
| 904 | MPS6517 | Transistor |
| 905–908 | 10K ohm | REsistor |
| 909 | 270K ohm | Resistor |
| 910 | 0.47 15 V | Electrolytic Capacitor |
| 916 | 7805 | 5 Volt Regulator |
| 917 | 0.05 | Capacitor |
| 917' | MPS6517 | Transistor |
| 918 | MPS6516 | Transistor |
| 919 | 10K ohm | Resistor |
| 920 | 3.3K ohm | Resistor |
| 921 | 2.7K ohm | Resistor |
| 922 | 22K ohm | Resistor |
| 923 | 33K ohm | Resistor |
| 924 | 1K ohm | Resistor |
| 925 | 1 uF 25 V | Electrolytic Capacitor |
| 926 | 1N457A | Diode |
| 927 | 1N457A | Diode |
| 929 | 18K ohm | Resistor |
| 930 | 100K ohm | Resistor |
| 931 | 1K ohm | Resistor |
| 932 | 1N457A | Diode |
| 933 | 0.0047 uF | Capacitor |
| 934 | CD4093B | 2-input NAND |
| 936 | 100 ohm | Resistor |
| 936' | 1K ohm | Resistor |
| 937 | 10K ohm | Resistor |
| 938–939 | CD4093B | 2-input NAND |
| 940 | 100 ohm | Resistor |
| 941 | 1K ohm | Resistor |
| 942 | 4.7K ohm | Resistor |
| 944 | 1N457A | Diode |
| 945 | 2.2K ohm | Resistor |
| 946 | 2.2 M ohm | Resistor |
| 947 | 0.0047 uF | Capacitor |

-continued

APPENDIX III
Component Numbers and Values
(Resistors are 10% tolerance and ¼ watt unless otherwise noted)

| REFERENCE | TYPE | DESCRIPTION |
|---|---|---|
| 948 | CD4093B | 2-input NAND |
| 949 | 100 ohm | Resistor |
| 950 | 1K ohm | Resistor |
| 951 | 4.7K ohm | Resistor |
| 952 | 22 ohm | Resistor |
| 954 | 0.51 ohm 2 W | Resistor |
| 955 | MPS6515 | Transistor |
| 956 | 100 ohm | Resistor |
| 957 | 555 | Timer |
| 936 | 100 ohm | Resistor |
| 936' | 1K ohm | Resistor |
| 937 | 10K ohm | Resistor |
| 938–939 | CD4093B | 2-input NAND |
| 940 | 100 ohm | Resistor |
| 941 | 1K ohm | Resistor |
| 942 | 4.7K ohm | Resistor |
| 944 | 1N457A | diode |
| 945 | 2.2K ohm | Resistor |
| 946 | 2.2 M ohm | Resistor |
| 947 | 0.0047 uF | Capacitor |
| 948 | CD4093B | 2-input NAND |
| 949 | 100 ohm | Resistor |
| 950 | 1K ohm | Resistor |
| 951 | 4.7K ohm | Resistor |
| 952 | 22 ohm | Resistor |
| 954 | 0.51 ohm 2 W | Resistor |
| 955 | MPS6515 | Transsitor |
| 956 | 100 ohm | Resistor |
| 957 | 555 | Timer |
| 958 | 10K ohm | Resistor |
| 959 | 1K ohm | Resistor |
| 960 | 100 ohm | Resistor |
| 961 | 10K ohm | Resistor |
| 962 | 4.7 uF 15 V | Capacitor |
| 963 | 0.01 uF | Capacitor |
| 964 | 1N457A | Diode |
| 966 | 1K ohm | Resistor |

APPENDIX IV.

MICROCOMPUTER ROM PROGRAMMING

```
:20000000C33F0009E8C32768000000000000000000000000000000000000000000000000009B
:20002000000000000000000000000000000000000000C32A0500C3260500C32A013EB4
:2000400054D38031FFEF1100004A212301E5D17BFE23C2F0007AFE01C2F0002120E8CD0015
:2000600001C2F0000C2120E0CD0001C2F0000C210020CDF800CAF0000C210040CDF800CA58
:20008000F0000C210060CDF800CAF0000C3A00F0FE55C29F000C3AFFFFFEAAC29F000C79A8
:2000A000C630D3803A00E03C3200E0F33E00D3063E09303EDB3220E03EC93222E02118E06F
:2000C0003600233600233600233600233600233600233600D307233602CDD104AF3226E016
:2000E0003225E03224E03223E0CDB308FBC3937579C630D380C3F5007EBEC02CC2F900C9EA
:20010000C5E501D807110000EB7EEB7723130B78B1C2080101D807110000E1EB7EEBBEC29E
:2001200028010B78B1C21B01C1C9F5E5C5D5CD8101211FE035C240013602CD2303CD880857
:200140002116E035C25901360A2A14E0232214E0218FE47E23B6C4EA37D1C1E1F1FBC93A6E
:2001600024E0FE7FCA5F01F33C3224E03A25E0C54F06002127E009C13CE67F3225E070FBE1
:20018000C9DB81E601C83A23E087C03A24E087C83D3224E03A26E05F16002127E0193CE68F
:2001A0007F3226E07ED380C9C5210400395E2356EB7EB7CACE01FE0AC2C401E5060DCD5F88
:2001C00001E13E0A47E5CD5F01E123C3B101C1C9FBC5210400394E23237ED303237EE60FFD
:2001E000477907070707E6F0B0D3043E093DC2ED01AF676FDB056FC1C9C5F53E20D306063D
:200200000A05C201023E00D306F1C1C9C5F53E20D306060A05C214023E10D306060A05C29C
:200220001E023E00D306F1C1C9C5210400394E23237E2118E0B7C23F027EE6F0C34802792A
:20024000878787874F7EE60F8177D301C1C9C5210400393A1DE0B6D306016C03CD6C023A9C
:200260001DE0D306019000CD6C02C1C90B78B1C26C02C9210200397E3221E0CD20E06F26B6
:2002800000B7C92A09E82235E82104047DD3037CD3041E071DC29402DB05E61B3237E8EEFB
:2002A00002E60ACAAE02220FE8E5CD2A92E1237CFE06C28C02C92102000395E2356237EF3E7
:2002C000EBD38177FBC93EC030C50E100DC2CC023E4030C1C9C5210400394E2346CDEC0229
:2002E000CDF902CD0F03AF676A82C1C9211CE05678E620C82119E056C978E606C20103515E
:20030000C9E604C20A0379B257C9792FA257C978E620C21C037AD305321CE0C97AD302327D
:2003200019E0C921A7E0AF7723772AABE0444DCD8703696022ABE02ACBE0444DCDDE036903
```

:200340006022CBE02AF3E0444DCD3504696022F3E02AF5E0444DCD7304696022F5E021A7C2
:20036000E07EB7C83A1EE04FB6D307E3E37E23A6B1D307E6F0C8CD8003CD800379D307C997
:2003800060305C28203C92AA9E0E93AAFE0B7C821D603175F1600195E2356EB22ADE02A21
:2003A000ADE07E2322ADE0FE00C2B703AF32AFE0218B0322A9E0C94F060821C00322A9E067
:2003C00079B7174FD2CD03CDB704C3D003CDB10405C0219F03C3B3032305B1E013052AC980
:2003E000E0E93ACFE0B7C8212D04175F1600195E2356EB22CDE02ACDE07E2322CDE0FE00FF
:20040000C20E04AF32CFE021E20322C9E0C94F060821170422C9E079B7174FD22404CDC35A
:200420004C32704CDBD0405C021F603C30A042305D1E013053AF1E0B0C251043AE9E0B70F
:20044000C8AF32E9E0473E4032F1E02AEDE022F7E078B7C264042AF7E04E2B22F7E0060898
:2004600021F1E0350579B7174F112000D2C60453C3C6043AF2E0B0C28F043AEBE0B7C8AFC9
:2004800032EBE0473E4032F2E02AEFE022F9E078B7C2A2042AF9E04E2B22F9E0060821F273
:2004A000E0350579B7174F111000D2C60453C3C604118000C3C604118080C3C604114000E2
:2004C000C3C60411404021A8E07EB2772B7EB377C921E9E011FF04060ECDF604218B032268
:2004E000A9E021E20322C9E021CBE0CDF10421ABE0110D0506061A77231305C2F604C900E8
:200500000000000000000000000000000000000013050300CBCCCDCECFD0D1D2D3D4D5D6D723
:20052000D8D900C9E000F3E32BE3F3E322BBE1E3F5C5D5E53E0132C6E1CDA305CD7B053A7E
:2005400064FAB7CA52050100800B78B1C24905C31C0821000022BDE1CD2708CDC405C2671D
:200560005CDE005C35205CDB405C258052ABDE129292929290922BDE1C358053ABCE1CD8488
:2005800053ABBE1F50F0F0F0F0FE60F4F060021E105097ECD4E08F1E60F4F21E105097ECDC4
:2005A0004E08C93E20CD4E08C93E0DCD4E083E0ACD4E08C921F005010F00BEC82B0DF2BAA0
:2005C00005B737C921F105BECAD805477EB778CADE05232323C3C705235E2356EBC9B7C91C
:2005E000E93031323334353637383941424344454460D1606201D063D37065528062E3E0695
:2006000047550649750 64F8206580E08528F06535907487D0800CDA905CD7B05C9CD2F0635
:200620002ABBE12322BBE1C92ABBE12B22BBE12ABBE17ECD8405C92ABDE122BBE1C9D38195
:200640002ABBE13ABDE1772322BBE121E8032B7DB4C24E06C93A64FAB7C02ABDE1E52ABBBC
:20066000E1CDE00522BDE1E13ABEE1CD84053ABDE1CD8405C93ABBE132C0E1CDBFE1CD84B9
:2006800005C93ABBE132C3E13ABDE1CDC2E1C93A64FAB7C0F33AC6E1F53E0232C6E1CD4DC4
:2006A00007FE3ACAAE06FE0ACA9E06C31E07CDC602AF320BE2CD3607DA1E075FCD3007CD83
:2006C0003607DA1E0732BCE1CD3007CD3607DA1E0732BBE1CD3007CD3607DA1E07C2160748
:2006E000CD3607DA1E072ABBE1D381772322BBE1CD3007CDC6021DC2E006CD3607DA1E0718
:200700004F3A0BE22FC601B9C21E07CD3607FE0DC21E07C39E06CD3607F132C6E1C93E157A
:20072000CD4E083E15CD4E08CD4D07F132C6E1C9210BE28677C9CD4D07CDB405D879878792
:20074000878757CD4D07CDB405D87A81C9DB81E602CA4D07DB80E67FC93ABBE1E6E032BB7D
:20076000E13ABDE1E61FCA7F07473E2090473ABDE18032BDE1D27F073ABEE13C32BEE12168
:20078000BBE13ABDE1BEC29107233ABEE1BECADA07CDA9053E3ACD4E083E2032C5E1CD84CB
:2007A00005CD7B0521BCE13AC5E1862B8632C5E1AFCD84051E202ABBE17E572322BBE1215A
:2007C000C5E186777ACD8405CDFC071DC2B6073AC5E12F3CCD8405C37F07CDA9053E3ACD90
:2007E0004E08AFCD8405AFCD8405AFCD84053E01CD84053EFFCD8405CDA905C9DB81E602E4
:20080000C8DB80E67FFE13C03E013223E0C93AC6E1B7C8FE023E0032C6E1C8E13E0032C6EC
:20082000E1E1D1C1F1FBC9CD9708DB81E602CA2708DB80E67FFE13C242083E013223E0C3F2
:200840002708FE11C24E08AF3223E0C32708F5CD9708DB811FD24F083A23E0B7C26308F155
:20086000D380C9CD9708DB81E602CA6308DB80E67FFE11C26308AF3223E0C34F083A64FAE5
:20088000B7C03E0232C6E1C92100003922C7E12AC9E1F9E1D1C1C9C5D5E53AC6E1B7CAA74A
:2008A0008CDC602C393082100003922C9E12AC7E1F9C93EDB32BFE13ED332C2E13EC93279
:2008C000C1E132C4E12152052209E22103E222C9E13E0032C6E1C923093209 2C0A4109641D
:2008E0000969098209A009BE09D209E109F009630A770A5D0BFF09180A4F0A8B0A590AA44F
:200900000AB30A710BC20AD60AEA0A080B260B3F0B4E0B8A0B990BA80BBC0BDA0BE90BF889
:200920000B020C00090016F7F0B0B041C800C0C03FF1B000901151C101004E67F007F01185F
:2009400083090905188307070218830000111883010113188302021218830303 1E188304E7
:20096000004241883007F04188309090692 1C08080F162307070E4321060620A226007F0580
:2009800018830009061 51C1010073E1D1111041883080B07171D0C0C07171D007F06188375
:2009A000000907151C101008471E0B0B08F41D0C0C08211E111106921C007F07188302 02E0
:2009C000091A1F0C0C06F9200B0B06961E007F08188301080 93E1F0C0C0A2C1F007F091830
:2009E0008301080A591F0C0C0B081F007F0A188301080B741F0C0C08731E007F0B188300FE
:200A0000090F151C0B0B10A7231010104923111104188 3007F0F18830009101 51C0C0C0FA6
:200A2000CF230B0B10A723007F1018830000 04C6670101044168 02020C43210303 0D3269A8
:200A40000404253269050515 3269007F0218830008118844007F111883010413 9E45007F3B
:200A6000131883000 90C151C1010048821111041883007F0C188300090D151C1010046EF5
:200A800069111104188 3007F0D1883000004262F0101045B1402021 4E01403031 88671001 6
:200AA0007F121883 0B0B14A01511110418 83007F14188300091515 1C101017CD6C007F15E9
:200AC000188300091715 1C0C0C04236D101004236D007F1718830009181073 0B0B19188328
:200AE0000C0C1C1883007F1818830000182D7301011 83A73020918477 30B0B1A18830C0CB6
:200B00001C1883007F191883000018A7730101183E74020918 67730B0B1B18830C0C1C15D8
:200B200083007F1A18830000 18B47301011 86074020918877 30C0C1C1883007F1B188300B0
:200B40000B18A7740C0C1D1883007F1C1883000B18E6740C0C185975007F1D18830009 0E88
:200B6000151C101016D4211111041883007F0E1883010816741F0B0B0E23220C0C163722 8E
:200B800010100E4321007F1618830000 04C68201011FA124007F1E1883000C1F0D251111AA
:200BA00041883007F1F188300092 0151C101021E82611110418 83007F201883000921 81DE
:200BC000270C0C21ED270B0B20C5261010 20C52614142 21428007F2118830909206 32806D1
:200BE00006233A28007F2218830909 2079280606 20C526007F231883000904AB40007F246C
:200C000018830009251 51C1010048870111104188 3CD9E9AFEFF696036002336 00CDF2984C

:200C2000116400CD2699C2380CC34A0CC5CDF29823D1CDFD98C31D0CCDF2982929EB210C75
:200C4000E21936FF2336FFC32C0C21FFFF22A6E321FFFF22A8E321FBE0E5214000E521FF34
:200C6000FFE5210000E5CDE42CD1D1D1D1213BE1E5214000E521FFFFE5210000E5CDE42C1A
:200C8000D1D1D1D12178E1E5214000E521FFFFE5210000E5CDE42CD1D1D1D1210100E52115
:200CA000FBE0E5CDF02ED1D1210200E5217BE1E5CDF02ED1D1210000229CE3CDE49A0200E1
:200CC000CD9E9AFEFF69603600233600CDF298116400CD2699CAEB0CCDF2982929EB210CE0
:200CE000E219CDF99821FFFFCD2099C2FD0CC3620DC5CDF29823D1CDFD98C3CC0CCDF29895
:200D00002929EB210CE2192323CDEC9821060009CDF498CD1899CA390DCDF2982929EB210B
:200D20000CE219232323CDEC9821080009CDF498CD11991110000CD2099CA5F0D210A0009EF
:200D4000E5CDF4982BD1CDFD98CD9499CA5F0DCDF2982929EB210CE219CDF498C3650DC3BA
:200D6000F10C21FFFF7CB5CDE49A0200CD9E9AFEFF69603600233600CDF298116400CD30B6
:200D800099CA970DCDF2982929EB210CE219CDF99821FFFFCD2099C2A90DC3180EC5CDF2A8
:200DA0009823D1CDFD98C3780DCDF2982929EB210CE219CDF998210A0009CDF498CD1899D8
:200DC000CA150ECDF2982929EB210CE2192323CDEC98210000CD2099CAE10D210000C37B15
:200DE0000F21080009CDF498110100CD1199110000CD2099CA120E21FBE0E5214000E52107
:200E00000A0009CDF498E5210000E5CDE42CD1D1D1D1C3180EC39D0DCDF298116400CD1853
:200E200099CA2A0E21FFFFC37B0FCDF2982929EB210CE219E5210A0009CDF498D1CDFD984A
:200E4000CDF2982929EB210CE219232323E521080009CDF498D17D12CDF2982929EB210CDC
:200E6000E2192323E521060009CDF498D17D1221080009CDF498110100CD1199B5CABA0E08
:200E8000210100E5210100E5210100E5210100E5CDC00CD1D1D111FFFFCD2099EB21060083
:200EA00009CDF498CD0399B5CAB10E210200C3B40E210100E5CD8D2CD1D121080009CDF45F
:200EC00098110200CD1199B5CA050F210200E5210100E5210200E5210100E5CDC00CD1D104
:200EE000D111FFFFCD2099EB21060009CDF498CD0399B5CAFC0E210200C3FF0E210100E52C
:200F0000CD8D2CD1D121080009CDF498110100CD1199110000CD2099CA780F21060009CDB0
:200F2000F4987CB5CA2D0F213BE1C3300F21FBE0E5214000E5210A0009CDF498E5210100F4
:200F4000E5CDE42CD1D1D1D121060009CDF4982BCD9499CA5D0F2A9CE323229CE321010018
:200F6000E52A9CE37CB5CA6F0F213BE1C3720F21FBE0E5CDF02ED1D12100007CB5CDE49ADE
:200F80000200CD9E9AFAFF69603600233600CDF298116400CD2699CAAD0FCDF2982929EB87
:200FA000210CE219CDF99821FFFFCD2099C2BF0FC3B711C5CDF29823D1CDFD98C38E0FCD4C
:200FC000F2982929EB210CE219CDF998210E0009CDF498CD1899CAF90FCDF2982929EB212E
:200FE0000CE219232323CDEC98210C0009CDF498CD1199110000CD2099CAB41121040009D6
:20100000E5CDF2982929EB210CE2192323CDE698D1CDFD98210A0009CDF498CD9499CA2EEC
:201020001021040009CDF498110000CD2099C2B711210C0009CDF498110100CD11991100CF
:2010400000CD2099CAA41021040009CDF4987CB5CA5910213BE1C35C1021FBE0E5214000F3
:20106000E5210E0009CDF498E5210000E5CDE42CD1D1D1D121040009CDF4982BCD9499CA78
:2010800089102A9CE32B229CE3210100E52A9CE37CB5CA9B10213BE1C39E1021FBE0E5CD90
:2010A000F02ED1D121020009E5CDF298D1CDFD9821020009CDF498116300CD2699C2D310AB
:2010C000C3651121020009E5CDF49823D1CDFD98C3B01021020009CDF4982929EB210CE2C3
:2010E00019E521020009CDF49823292 9EB210CE219CDF498D1CDFD9821020009CDF49829AB
:2011000029EB210CE219232323E521020009CDF49823292 9EB210CE219232323CDE698D1B3
:201120007D1221020009CDF4982929EB210CE2192323E521020009CDF49823292 9EB210CF9
:20114000E2192323CDE698D17D1221020009CDF4982929EB210CE219CDF49823CD9499C281
:201160006511C3C310210100E5210100E5210100E5CDC00CD1D1D123CD9499CA8B1121019D
:2011800000E5210000E5CD8D2CD1D1210100E5210200E5210100E5CDC00CD1D1D123CD9496
:2011A00099CAB111210200E5210000E5CD8D2CD1D1C3B711C3B30FCDE49A0600CD9E9AF876
:2011C000FF2AAEE3110000CD2099C27A1369603601233600CDF298110300CD2699C2EF115D
:2011E000C37A13C5CDF29823D1CDFD98C3D411CDF2982B29EB21AAE319CDF498CD9499CA0B
:20120000771321020009E5210100E5CDF298E5210100E5CDC00CD1D1D1D1CDFD9811FFFF9B
:20122000CD2099CA7E12CDF298E5217F13E5210000E5CD0126D1D1D1CDF298E52102000925
:20124000CDF498E5210500E5CD8913D1D1D12A0AFA110400CD2099CA7B12CDF298E52102EA
:2012600000E5CDF298E5210100E5CDC00CD1D1D1E5210900E5CD8913D1D1D1C3041321046B
:20128000000936012336002A0AFA110400CD1899CA9912210300C39C12210400EB210400B5
:2012A00009CDF498CD2699C2BD12C3041321040009E5CDF49823D1CDFD98C38712CDF29860
:2012C000E521040009CDF498E5CDF298E5210000E5CDC00CD1D1D1E521040009CDF4982BD8
:2012E000E52A0AFA110400CD1899CAF312210500C3F612210400D1CD9F99E5CD8913D1D19D
:20130000D1C3AD122A0AFA110400CD1899CA2213CDF298E5218513E5210A00E5CD0126D10B
:20132000D1D121060009E52A0AFA110400CD1899CA3913210B00C33C13210C00D1CDFD9881
:20134000CDF298E5218713E521060009CDF498E5CD0126D1D1D1CDF298E5CDF2982B29EB0A
:2013600021A6E319CDF498E521060009CDF49823E5CD8913D1D1D1C3E311CDE49A080045B0
:201380004D45522000020003A00CD739A21080009CDF498E521060009CDF49811FFFFCD2020
:2013A00099CAB31321060009CDF498E5CD6222D1C3B61321FFFFE521040009CDF498E5CDA8
:2013C000C713D1D1D1C1C9CD9E9AFAFF210C0009CDF49823CD9499CAFE13C52A0AFA1104A9
:2013E00000CD1899CAED13214414C3F013214A14E5210200E5CDAA93D1D1D1C32814C52A8F
:2014000000AFA110400CD1899CA1114214F14C3141421 5514E5210C0009CDF498E5210300D0
:20142000E5CDAA93D1D1D1210E0009CDF498E5C5210A0009CDF498E5CD0126D1D1D1CD98
:20144000E49A06002020202020002020202000253034642000253033642000CD9E9AF8FFD3
:20146000C5CD5F2BD1CDFD982102000936002336002 1020009CDF498110200CD2699C294E8
:2014800014C3D81421020009E5CDF49823D1CDFD98C371142106000 9E5210100E5CDF2980E
:2014A000E521020009CDF498E5CDC00CD1D1D1D1CDFD9811FFFFCD2099CAD51421060009 26
:2014C000CDF498E5CDF298E5210100E5CD820FD1D1D1C39414C38414CDBC11CDE49A080007
:2014E000CD9E9AFEFFC5CD5F2BD1CDFD9821060009CDF498E5CD6825D1CD9499C29B152175
:20150000000300E5CDF298E5210100E5CDC00CD1D1D111FFFFCD2099CA561521060009CDF4D9

:201520009829EB219EE319E52A0AFA110400CD1899CA3A15210200C33D15210300D1CDFD8E
:2015400098210600009CDF49829EB21A2E31936012336O0C38F1521060009CDF49829EB21E2
:201560009EE319E52A0AFA110400CD1899CA7615210300C37915210400D1CDFD98210600E2
:201580009CDF49829EB21A2E319360023360021060009CDF498E5CDA015D1CDE49A020079
:2015A000CD9E9AF4FFC5CD5F2BD1CDFD9821020009E521100009CDF49829EB21A2E319CDA0
:2015C000F498D1CDFD9821020009CDF498110000CD2699C266172104009E521100009CDD1
:2015E000F49829EB219EE319CDF498D1CDFD9821040009CDF498E5CDF298E521020009CD63
:20160000F498E5CDC00CD1D1D123CD9499CA451621100009CDF49829EB21A2E319E5CDF4FF
:20162000982BD1CDFD982104000936012336002102009E5CDF4982BD1CDFD98110000CD50
:201640002699C2661721060009E52A0AFA110400CD1899CA5C16210300C35F16210400D128
:20166000CDFD98210800093600233600210200 09CDF4982BCD9499CAB31621060009E52ACB
:201680000AFA110400CD1899CA9116210100C39416210200D1CDFD98210800093605233697
:2016A00000CDF298E5216B17E5210000E5CD0126D1D1D1210A0009E521040009CDF498D188
:2016C000CDFD9821040009CDF498EB21060009CDF49819EB210A0009CDF498CD2699C2F4DA
:2016E00016C34817210A0009E5CDF49823D1CDFD98C3C316CDF298E5210A0009CDF498E5A0
:20170000CDF298E521020009CDF498E5CDC00CD1D1D1E521080009CDF498E5CD8913D1D1B7
:20172000D121080009E5CDF498E52A0AFA110400CD1899CA3C17210500C33F17210400D170
:2017400019D1CDFD98C3E41621100009CDF49829EB219EE319E5CDF498EB21060009CDF404
:201760009819D1CDFD98CDE49A0C00454D45523A00CD9E9AFEFF69603600233600210800 48
:2017800009CDF498CD9499CACA1721060009CDF498110004CD1199110000CD2099CAA7170E
:2017A00069603601233600210600 09CDF498110008CD1199110000CD2099CAC717C5CDF2F4
:2017C000982323D1CDFD98C3071821060009CDF498110040CD1199110000CD2099CAE71766
:2017E0006960360123360021060009CDF498110080CD1199110000CD2099CA0718C5CDF2FB
:20180000982323D1CDFD98CDF2987CB5CDE49A0200CD739A21060009CDF498CD9499CA4675
:201820001821040009CDF498110001CD1199110000CD2099CA3D18210100C3681821000044
:20184000C36818C3681821040009CDF498110010CD1199110000CD2099CA6218210100C323
:201860006818210000C368187CB5C1C9CD9E9AFCFF69603600233600CDF298110002CD2614
:2018800099C29318C3DA18C5CDF29823D1CDFD98C37818CDF2981100419E5210000E5CD8B
:2018A000D001D1D1111800CD1199111800CD2099CAB918CDF901C3D71821020009E5CDF282
:2018C00098E5CD6677D1D1CDFD9821020009CDF4981109001936 00C38718CDE49A0400CD71
:2018E0009E9AFEFF21060009CDF498110000CD2099CA4819210A0009E5CDF49823D1CDFD38
:20190000982BEB21C4E319CDE698E521080009E5CDF49823D1CDFD982BE5CD8602D1D121EA
:20192000060009E5CDF4982BD1CDFD98C52A14E0D1CDFD98CDF298E5CD4D19D1110200CDC6
:201940002699C23419C3E418CDE49A0200CD739A2A14E0EB21040009CDF498CD8199B5C1E6
:20196000C92A07E8110A00019E52A14E0D1CDFD98C9CD739A2A07E8110A0019CDF498E5CD20
:201980004D19D1EB21040009CDF498CD4299CA971921FFFFC39A192100007CB5C1C9CD9EA0
:2019A0009AFAFF2A09E429EB21C9E319CDF998210000CD2099CABE1921FFFFC3581A210266
:2019C0000009E52A09E4D1CDFD98696036002336 00CDF298111000CD2699C2ED19C33A1A94
:2019E000C5CDF29823D1CDFD982BC3D11921040009E52A09E4EBCDF29819111000EBCDC37C
:201A000099EBD1CDFD9829EB21C9E319CDF498CD9499CA271A21040009CDF498EB21020022
:201A20009CDF498CD2099CA371A21040009CDF4982209E4C33A1AC3E0192A0BE423220BD1
:201A4000E4EB2A0EE0CD2699CA511A2A0BE4220EE021020009CDF4987CB5CDE49A0600CDE1
:201A6000739A21080009CDF49829EB21C9E319E5CDF498EB21060009CDF49819D1CDFD98D6
:201A80002108009CDF49829EB21E9E319E5CDF498EB21040009CDF49819D1CDFD9821087C
:201AA0000009CDF49829EB21C9E319CDF998210000CD2799CAC91A21080009CDF49829EB72
:201AC00021C9E3193600233600210800 09CDF49829EB21E9E319CDF998210000CD2799CA16
:201AE000F41A21080009CDF49829EB21E9E31936002336002108 0009CDF49829EB21C9E333
:201B000019CDF498CD9499CA111B2A0BE42B220BE421080009CDF49829EB21C9E319CDF4C8
:201B20098CD9499CA391B2A09E429EB21C9E319CDF998210000CD2099CA461B2108000982
:201B4000CDF4982209E4C1C9CD9E9AFEFF69603600233600CDF298111000CD2699C2701BE8
:201B6000C38F1BC5CDF29823D1CDFD982BC3541BCDF29829EB21C9E3193600233600CDF28A
:201B80009829EB21E9E3193600233600C3631B2100002209E4210000220BE4CDE49A020014
:201BA000CD9E9AFEFF69603600233600CDF298110200CD2699C2C81BC3E61BC5CDF298232D
:201BC000D1CDFD982BC3AC1BCDF29829EB210DE4193600233600CDF298E5210F00E5CD29B1
:201BE0002D1D1C3BB1BCDE49A0200CD754E210020E5CDD502D1210000E5CDD502D1C9CD1F
:201C0000739A21040009CDF498E5210F00E5CD2902D1D1C1C9CD739A21040009CDF498E5CC
:201C2000210F00E5CD2902D1D121040009CDF49829EB211DE419E521040009CDF49829EB9F
:201C4000211DE419CDF498110A00CD9F99E521040009CDF498EB2131E819CDE698D119D120
:201C6000CDFD9821040009CDF49829EB2121E419E5CDF4982BD1CDFD98CD9499CA901C21FB
:201C80001000E521040009CDF498E5CD827ED1D1C1C9CD739A21040009CDF498E5CD68254A
:201CA000D1CD9499C2BF1C21FFFF2213E421FFFF2211E421040009CDF498E5CDEC1CD1C17B
:201CC000C9CD739A21080009CDF498E521060009CDF498E5CDC41DD1D1CD5F2BE5210400D2
:201CE0009CDF498E5CD0429D1D1C1C9CD739A21040009CDF498E5210300E521071DE5CD31
:201D0000C11CD1D1D1C1C95048595320286E2C2A2C232C51293F00CD739A21040009CDF49C
:201D20009829EB211DE419E52A13E423D1CDFD9821040009CDF498E5CD3E1DD1C1C9CD9E06
:201D40009AFEFF21060009CDF49829EB211DE419CDF4982213E411FF01CD3999CA731D2177
:201D60001100E521060009CDF498E5CD827ED1D1C3B61D2A13E4E5CD6222D12211E4210694
:201D80000009CDF498E52A0AFA110400CD1899CA981D210400C39B1D210300E5CDC41DD194
:201DA000D1CD7124CD5F2BE521BB1DE5210800E5CD0126D1D1D1CDE49A020020286E2C2A08
:201DC0002C232900CD739A21060009CDF49829EB211DE4193600233600210600 09CDF498C1
:201DE00029EB2121E419E521040009CDF498D1CDFD98C1C9CD739A21040009CDF49829EBF2

:201E0000211DE419E52A13E42BE5CD6222D123D1CDFD9821040009CDF498E5CD471ED1C1C9
:201E2000C9CD739A21040009CDF49829EB211DE419E52A11E4D1CDFD9821040009CDF4986B
:201E4000E5CD471ED1C1C9CD739A210000E5CDAF1ED121040009CDF49829EB211DE419CD22
:201E6000F498211E421040009CDF498E5CD731ED1C1C9CD739ACD7124CD5F2BE5218D1E56
:201E8000E5210800E5CD0126D1D1D1C1C92028412C2A2C232900CD739A21FFFFE5CDAF1E8F
:201EA000D121040009CDF498E5CDF920D1C1C9CD9E9AFEFF2A13E4EB21060009CDF49819F4
:201EC000110500CD9F99EB2100F0191104001 9CDE6982219E4C52A13E4EB21060009CDF478
:201EE0009819E5CDF822D1D1CDFD98CDF29811FF00CD11992215E4CDF298110800CD609932
:201F00002217E4CDE49A0200CD739A215A00E5211 9E4E5CDDB1FD1D1C1C9CD739A214100EB
:201F2000E52115E4E5CDDB1FD1D1C1C9CD739A214200E52117E4E5CDDB1FD1D1C1C9CD7374
:201F40009A214100E52115E4E521040009CDF498E5CD8F1FD1D1D1C1C9CD739A214200E59B
:201F60002117E4E521040009CDF498E5CD8F1FD1D1D1C1C9CD739A215A00E52119E4E5211E
:201F8000040009CDF498E5CD8F1FD1D1D1C1C9CD739A21060009CDF498E521060009CDF445
:201FA00098E521040009CDF498EB2131E819CDE6982B110100CD6D99EBE1CDF498CD0A99EF
:201FC000D1CDFD9821080009CDE698E521060009CDF498E5CDDB1FD1D1C1C9CD739ACD5F05
:201FE0002BE52A11E4E5210000E5CDC713D1D1D121B4E3E5211C20E521060009CDE698E56E
:20200000210300E5CDAA93D1D1D1D121040009CDF498CDF498E5CD2220D1C1C92025633A58
:202020002000CD9E9AFEFF69603601233600CDF298110900CD2699C24920C39020C5CDF206
:202040009823D1CDFD98C32E20CDF29811070019EB2180E319E521060009CDF49811010 0C1
:20206000CD1199B5CA7120CDF298113000 19C37420212000D17D1221060009E521060009EB
:20208000CDF498110100CD6099D1CDFD98C33D202100007D32C0E3CD5F2BE521B0E3E5CDA7
:2020A0000429D1D1CDE49A02002A11E4110001EBCDF599EB7D32C4E32A11E4110001EBCD63
:2020C000F5997D32C5E32A15E47D32C6E32A17E47D32C7E32A19E47D32C8E3210000E52A71
:2020E00013E4110500CD9F99EB2100F019E5210500E5CDDF18D1D1D1C9CD739ACDA9202138
:20210000040009CDF498E5CDEC1CD1C1C92105002213E4210500E5CD6222D12211E42100A0
:2021200000E5CDAF1ED12A15E411C000CD11992322 15E42A17E411C0FFCD03992217E4CD5E
:20214000A920C9CD739A21040009CDF498E5CD6825D1CD9499C28021 21040009CDF498E5B3
:202160002A0AFA110400CD1899CA7221210400C37521210300E5218221E5CDC11CD1D1D1F4
:20218000C1C9415243483F00CD739A21040009CDF49829EB211DE419CDF498211 1E421B067
:2021A000E3E521CE21E52A11E4E5210300E5CDAA93D1D1D1D1CD5F2BE52A11E4E5CD7E225A
:2021C000D1E5210500E5CDC713D1D1D1C1C9253034753D00CD739A21040009CDF49829EBEA
:2021E000211DE419CDF498211E4E5CD7E22D12213E423CD9499CA0D2221 1000E5210400A7
:20220000 09CDF498E5CD827ED1D1C3212221 0000E5CDAF1ED121040009CDF498E5CD081F31
:20222000D1C1C9CD739ACDA9202104000 9CDF498E5CD4321D1C1C9CD739ACDA9202A13E44A
:202240002322 13E4E5CD6222D12211E4210000E5CDAF1ED121040009CDF498E5CD081FD182
:20226000C1C9CD739A21040009CDF498110500CD9F99EB2100F019CDF4987CB5C1C9CD9EC4
:202280009AFEFF696036032 33600CDF298110002CD2699C2A522C3EE22C5CDF29823D1CD1D
:2022A000FD98C38A22CDF298110500CD9F99EB2100F019CDF99821060009CDF498CD18992E
:2022C000CAE222CDF298110500CD9F99EB2100F0192323CDF998210F00CD1199110700CD79
:2022E0002099CAEB22CDF298C3F122C3992221FFFF7CB5CDE49A0200CD739A21040009CD31
:20230000F498110500CD9F99EB2100F0192323CDF4987CB5C1C9CD739A21040009CDF49846
:20232000E5CD6825D123CD9499CA422321040009CDF498E5210500E5214423E5CDC11CD1E2
:20234000D1D1C1C94C4F433F00CD9E9AFEFF21060009CDF49829EB211DE419CDF4982213CC
:20236000E4C52A13E4D1CDFD9821060009CDF498E5210500E5CDC41DD1D1CDF298CDEC98EF
:2023800021FF00CD1199E5CDF29823CDEC9821FF00CD1199110001CD9F99D1192211E4CD7A
:2023A0003D24CDE49A0200CD739A21040009CDF49829EB211DE419E52A13E42323D1CDFDD8
:2023C0009821040009CDF498E5CD4923D1C1C9CD739A21040009CDF49829EB2121E419CDE4
:2023E000F998210500CD2099CA2A2421040009CDF49829EB211DE419CDF498211 1E411FF32
:2024000000CD11997D32C4E32A11E4110800CD75997D32C5E3210000E52A13E4E521020056
:20242000E5CDDF18D1D1D1CD3D2421040009CDF498E5210500E5CDC41DD1D1C1C921B0E34D
:20244000E5216924E52A13E4E52A11E4E5210400E5CDAA93EB210A0039F9EBCD5F2BE52156
:20246000B0E3E5CD0429D1D1C92535753D253575002180E3E5219B24E52A13E4E521030 01C
:20248000E5CDAA93D1D1D1D1CD5F2BE52A11E4E5210400E5CDC713D1D1D1C9253033753DA2
:2024A00000CD9E9AFEFF21060009CDF498E5CD6825D1CD9499C2F324C5CD5F2BD1CDFD985F
:2024C000CDF298E521F824E5210000E5CD0126D1D1D1CDF298E52A6CFACD9499CAE5242177
:2024E0000625C3E824210A25E5210D00E5CD0126D1D1D1CDE49A02004E49474854 20414EBD
:2025000053574552 20004F4646004F4E00CD9E9AFEFFC52A6CFAD1CDFD98CDF298110000F0
:20252000CD2099CA302569603600233600C33725696036012 33600CDF2987D32C4E3210058
:20254000007D32C5E3210000E5216CFAE5210200E5CDDF18D1D1D121060009CDF498E5CD38
:20256000A124D1CDE49A0200CD9E9AFCFFC52A07E82323CDF498D1CDFD982A1BE411FFFF90
:20258000CD2099CA90252A1BE4EBCDF298CD2099C2A22521020009E5CD5F2BD1CDFD98CD54
:2025A0009499CABC25211100E521080009CDF498E5CD827ED1D1210000C3FA25CDF29822D1
:2025C0001BE421020009CDF4982B29EB21AAE319360323360 02A07E811060019E5CDF4935E
:2025E000E521020009CDF498110100CD6E9923D1CD0399D1CDFD9821FFFF7CB5CDE49A045C
:2026000000CD739A21040009CDF498EB21B0E319E521060009CDF498E5CD4D98D1D12108D1
:2026200000 09CDF498E521B0E3E5CD0429D1D1C1C9CD9E9AFEFF21060009CDF498CD94990F
:20264000CA5326C5210000E5CD7302D1D1CDFD98C36026C5210200E5CD7302D1D1CDFD98CA
:20266000CDF298111000CD1199110000CD2099CA782621FF00C39B26C5CDF298110F00CDBF
:202680001199D1CDFD98CDF298110A00CD1899CA9826210000C39B26CDF2987CB5CDE49A6D
:2026A0000200CD739A21040009CDF498E5CD6825D1CD9499C2C32621040009CDF498E5CDC9
:2026C000C526D1C1C9CD739A21040009CDF498E5210300E521E026E5CDC11CD1D1D1C1C982
:2026E0005052454649583F00CD739A21040009CDF49829EB211DE419CDF4982213E4CD944A

```
:2027000099CA1827211400E521040009CDF498E5CD827ED1D1C394272A13E411C800CD38A5
:2027200099C22D272A13E411E703CD3999CA4427211000E521040009CDF498E5CD827ED1DA
:20274000D1C394272106FFE5213200E52A13E41138FF19E521FFFFE5CDE42CD1D1D1D12239
:2027600011E421B0E3E52A11E47CB5CA7427219627C3772721A227E52A13E4E5210300E5F9
:20278000CDAA93D1D1D1D1CD5F2BE521B0E3E5CD0429D1D1C1C92533752041 4C4C4F57453F
:2027A00044002533752052455354524943544544 00CD739A2A11E4232211E4110100CD11CC
:2027C0009922 11E42106FFE5213200E52A13E41138FF19E52A11E4E5CDE42CD1D1D1D12159
:2027E00004 0009CDF498E5CDE826D1C1C9CD739A21040009CDF49829EB211DE419E5CDF402
:2028000009823D1CDFD9821040009CDF498E5CDE826D1C1C9CD739A21040009CDF498E521C1
:20282000 0300E5212F28E5CDC11CD1D1D1C1C9414C4C4F5720414C4C3F00CD739A210400F6
:2028400009CDF498E5210300E5215528E5CDC11CD1D1D1C1C95245535452494354 20414CE1
:202860004C3F00CD739A21040009CDF498E521FF00E5CD8F28D1D1C1C9CD739A21040009CA
:20288000CDF498E5210000E5CD8F28D1D1C1C9CD9E9AFCFF69603600233600CDF298116420
:2028A0000 0CD2699C2B628C3F328C5CDF29823D1CDFD98C39B2821080009CDF498E5CDF2E7
:2028C00098EB2106FF19E5CDB602D1D121020009E52A14E0D1CDFD9821020009CDF498E55E
:2028E000CD4D19D1110200CD2699C2D828CDC602C3AA28210A0009CDF498E5CDC526D1CD81
:20290000E49A0400CD9E9AF5FF21110009CDF498110300CD1899CA2E2921020009360123 6F
:202920003600210400093603233600C34F2921020009E521110009CDF498D1CDFD98210469
:2029400000 09E521110009CDF49823D1CDFD98211 10009E521020009CDF498D1CDFD9821A6
:20296000110009CDF498EB21040009CDF498CD2799C28729C3B12A21110009E5CDF4982339
:20298000D1CDFD98C35F2921060009E5210F0009CDF498D1CDFD9821080009E52111000 98D
:2029A000CDF4982B111900CD9F99EB2129E419D1CDFD9821080009E5CDF49823D1CDFD9839
:2029C0002B36C921080009E5CDF49823D1CDFD982B36802106 0009CDF498CDE698117E00C3
:2029E000CD1899CAF32921060009E5CDF49823D1CDFD98696036002 33600CDF298111000DF
:202A0000CD2699C2152AC3922AC5CDF29823D1CDFD98C3FA29CDF298110800CD1899CA4159
:202A20002A21080009E5CDF49823D1CDFD982B36C921080009E5CDF49823D1CDFD982B3655
:202A400088210A0009E521060009CDF498CDE698D17D12210A0009CDE698CD9499CA692ACB
:202A6000210A00093620C3762A21060009E5CDF49823D1CDFD9821080009E5CDF49823D141
:202A8000CDFD982BE5210A0009CDE698D17D12C3092A21080009CDF49836002111000 9CD26
:202AA000F4982B29EB2125E4193601233600C37729CDE49A0B00CD9E9AFEFF696036002395
:202AC0003600CDF298110200CD2699C2DD2AC35A2BC5CDF29823D1CDFD98C3C22ACDF29841
:202AE000CD9499CAEC2A2AAFE0C3EF2A2ACFE0CD9499CA072BCDF29829EB2125E419CDF924
:202B000098210000CD2099CA572BCDF298CD9499CA192B21B1E0C31C2B21D1E0E5CDF29801
:202B200011 1900CD9F99EB2129E419E5CD4D98D1D1CDF298CD9499CA432B21020022AFE09E
:202B4000C3492B21020022CFE0CDF29829EB2125E41936002 33600C3D12ACDE49A02002AD8
:202B600007E82323CDF498E5CDF822D1E5CD1F93D1C9CD9E9AFCFF6960360023 3600CDF215
:202B800098110200CD2699C2992BC3882CC5CDF29823D1CDFD98C37E2B21020009E5CDF253
:202BA00098CD9499CAAD2B2AAFE0C3B02B2ACFE0D1CDFD98CD9499CA852CCDF29829EB217D
:202BC0005BE419CDF4982BCD9499CAE72BCDF29823E5CDC22CD1CDF29829EB215BE419363E
:202BE00002 33600C3852CCDF29829EB215BE419CDF498110200CD1899CA342CCDF2982990
:202C0000EB215FE419CDF498E5CD4D19D1EB2A66FACD2699CA312CCDF29823E5CDC22CD1F7
:202C2000CDF29829EB215FE419E52A14E0D1CDFD98C3852C210100E5CDF29823E5210000 7B
:202C4000E5CDC00CD1D1D111FFFFCD2099CA682CCDF29829EB215FE419CDF498E5CD4D1937
:202C6000D1EB2A68FACD2699CA852CCDF29823E5CDC22CD1CDF29829EB215FE419E52A140F
:202C8000E0D1CDFD98C38D2BCDE49A0400CD739A21060009CDF4982B29EB215BE419E52136
:202CA00004 0009CDF498D1CDFD9821060009CDF4982B29EB215FE419E52A14E0D1CDFD9800
:202CC000C1C9CD739A21040009CDF4982BCD9499CADC2C21010022AFE0C3E22C210100222A
:202CE000CFE0C1C9CD9E9AF8FF210E0009CDF498110000CD2699CA6B2DC5210C0009CDF453
:202D000098CD9499CA0D2D210000C3102D21FFFFD1CDFD98210200093600233600211000BE
:202D2000 09CDF498110100CD6099EB21020009CDF498CD2699C24C2DC3682D21020009E5B9
:202D4000CDF49823D1CDFD982BC31D2D21020009CDF49829EB21120009CDF49819E5CDF2A1
:202D600098D1CDFD98C33B2DC3E22E21040009E5210E0009CDF498110F00CD1199D1CDFDB4
:202D80009869603601233600210 40009CDF498110000CD2799C2AC2DC3BD2D21040009E5C2
:202DA000CDF4982BD1CDFD9823C3882DC5CDF298110100CD6E99D1CDFD98C39B2D210400DC
:202DC00009E5210E0009CDF498110400CD6099D1CDFD9821020009E521040009CDF49829A5
:202DE000EB21120009CDF49819CDF998CDF298CD1199B5CAFC2D210100C3FF2D210000D163
:202E0000CDFD98210C0009CDF49811FFFFCD2099CAE22E210C0009CDF498CD9499CA4C2E85
:202E200021060009E521040009CDF49829EB21120009CDF49819E5CDF298CD8D99EBE1CD6C
:202E4000F498CD1199D1CDFD98C36F2E21060009E521040009CDF49829EB21120009CDF42F
:202E60009819CDF998CDF298CD0399D1CDFD9821120009CDF498EB2100F0CD3999CAA02E88
:202E800021040009CDF49829EB21120009CDF49819E521060009CDF498D1CDFD98C3E22E75
:202EA00021060009CDF49811FF00CD11997D32C4E321040009CDF498110800CD60997D3297
:202EC000C5E3210000E521040009CDF49829EB21120009CDF49819E5210200E5CDDF18D179
:202EE000D1D121020009CDF4987CB5CDE49A0800CD739A21060009CDF4982B29EB21EDE097
:202F000019E521040009CDF498113F0019D1CDFD9821060009CDF4982B29EB21E9E019368F
:202F2000012 33600C1C921030022AFE021030022CFE0CDBC11C9CD9E9AFEFF696036002 35C
:202F40003600CDF298110200CD2699C25D2FC38D2FC5CDF29823D1CDFD98C3422FCDF2987B
:202F600029EB210DE419CDF498CD9499CA8A2FCDF2982265E4CD9E192263E411FFFFCD2091
:202F800099CA8A2F210000C3902FC3512F21FFFF7CB5CDE49A02002A07E811080019E52A38
:202FA00063E4D17D122A07E82323CDF49811000419E52A63E4E5CDD001D1D1CD0C022A659F
:202FC000E429EB210DE41936012336002A65E411000419E52A63E4E5CDD001D1D12A63E4B1
:202FE000E5210200E5210100E5CD5F1AD1D1D12A65E4E5210E00E5CD2902D1D1CD0C022A19
```

```
:2030000065E4E5CD3126D111FF00CD2099C2FF2F2A65E4E52A0AFA110400CD1899CA2630CE
:203020002104000C32930210300E5CDC41DD1D12A07E8110600193600233600 2A65E4EB219F
:203040002FE81936002A07E811090019E52A65E4CD9499CA5C30210300C35F30210400D1AA
:203060007D12CD6119C9CD9E9AFCFF21020009E52A07E82323CDF498D1CDFD982102000989
:20308000CDF498E5CDF822D1110F00CD1199110500CD1899CA9D30210000C30531C52A0768
:2030A000E811080019CDE698D1CDFD9821020009CDF49811000419E5CDF298E5CDD001D135
:2030C000D1111800CD1199111800CD2099CA0231210100E5CDB439D1CD5A8221020009CD9F
:2030E000F498E5CDA042D111FFFFCD2099CAFC302A07E811090019360 2CD611921FFFFC3A7
:203100000531210000 7CB5CDE49A0400CD9E9AFAFF21040009E52A07E82323CDF498D1CD71
:20312000FD98C521040009CDF498E5CDA042D1D1CDFD9821020009E5CDF298110500CD9F2C
:2031400099EB2167E4192323CDE698D1CDFD982A07E811040019E5CDF298110500CD9F9904
:20316000EB2167E419232323CDF498D1CDFD982A07E811080019E521020009CDF498D17DE7
:203180001221040009CDF49811000419E521020009CDF498E5CDD001D1D1111800CD119939
:2031A000111800CD2099CAC6312A0EFAE5CD7119D123CD9499CAC331210100E5CDB439D1F3
:2031C000CDF842C3D531CD0C02CDF8422A07E811090019360CCDE49A0600CD9E9AFAFF213F
:2031E00002000 9E52A07E811060019CDF498D1CDFD98CD663023CD9499CA273221020009 3B
:20320000CDF49811FF00CD1199110100CD2F99CA243221020009CDF498110800CD6099E5BE
:20322000CD2A7FD1C3D63321020009CDF49811FF00CD1199C3C333CD5A82C5CD8B36D1CD1C
:20324000FD98CDF29823CD9499C2D6332A07E811060019E5CDF298110800CD6E9923D1CD67
:20326000FD98CDF298E5210A0009CDF4987CB5CA7832217F00C37B32215500E5CDD238D138
:20328000D1CD6119213A00E5CD7119D1CD9499C2D6332A07E811060019E5CDF49823D1CDA1
:2032A000FD9821020009CDF498110800CD6099E5CD3126D111FF00CD2099C2A232CD6119C8
:2032C00021040009E52A07E811040019CDF498D1CDFD98212C01E5CD7119D123CD9499C2CE
:2032E0002A33210A0009CDF4982BCD9499C22A3321040009CDF498E5CD2637D1CD9499C27D
:203300002A332A07E82323CDF498E5CDA042D111FFFFCD2099C22A3321040009CDF498E513
:20332000CDA042D111FFFFCD2099CA45332102 0009CDF498110800CD6099E5CD2A7FD1CDD9
:20334000548CC3D633C521020009CDF498110800CD6099E5CD3126D1D1CDFD98110B00CDA2
:203360002099CA6E33CDF298110C00CD2099C2D633CDF298110C00CD1899CA89332A07E8D3
:20338000110900193 61CC3AB332A07E82323CDF498E5CDF822D1110020CD1199CD9499C24E
:2033A000D6332A07E811090019361D2A07E811060019E5CDF4981100FFCD1199D1CDFD9824
:2033C000C3D633CD349A03000200C032010084320000 3732D633CDE49A0600CD9E9AF8FF19
:2033E000C52A07E811060019CDF498D1CDFD9821020009E52A07E82323CDF498D1CDFD9837
:20340000CDF29811FF00CD1199C3103521060009E52A07E811040019CDF498E52A09E8E52C
:20342000CD6677D1D1D1CDFD982A07E811080019CDE698E521FEFFE521FFFFE5CD5F1AD174
:20344000D1D121040009E521060009CDF49811080019CDE698D1CDFD982A07E81108001933
:20346000E521040009CDF498D17D1221020009CDF49811000419E521040009CDF498E5CDAF
```

```
:20348000D001D1D1CD0C02CDF298110800CD60991100041 9E521040009CDF498E5CDD0018B
:2034A000D1D1CD0C0221040009CDF498E5210200E5210100E5CD5F1AD1D1D12A07E811062B
:2034C0000019E5CDF49823D1CDFD98CDF298110800CD6099E5210700E5CDD238D1D1CD6170
:2034E00019C31F35211C00E5CD7119D123CD9499CA0D35CDF298110800CD6099E5CD2A7F98
:20350000D121020009CDF498E5CD1288D1C31F35CD349A02000100E434000 00C341F35CD0A
:20352000E49A0800CD9E9AFAFFC52A07E811060019CDF498D1CDFD9821020009E52A07E843
:2035400011040019CDF498D1CDFD98CDF29811FF00CD1199C30436210 20009CDF498E5CD9F
:203560007437D1E52A07E811080019CDE698E5CDD001D1D1CD0C02CDF298110800CD279957
:20358000E5210500E5CDD238D1D1CD61192A07E811060019E5CDF49823D1CDFD98211C0061
:2035A000E5CD7119D123CD9499CA013621040009E521020009CDF498E52A09E8E5CD6677B9
:2035C000D1D1D1CDFD9821020009CDF498E5CD7437D1E521040009CDF49811080019CDE612
:2035E00098E5CDD001D1D1CD0C02CDF298110800CD6099E5CD2A7FD12A07E81109001936 4F
:203600001BC31336CD349A020001009D3500005735133 6CDE49A0600CD9E9AFEFF2A07E8D2
:2036200011040019CDF49823CD9499C24736C5CDA68BD1CDFD9823CD9499CA47362106002 6
:2036400009CDF498CD9499CA81362A07E811060019360023 36002A07E811090019E52A0753
:20366000E811040019CDF49823CD9499CA7536212000C37836210B00D17D1221FFFFC384A5
:2036800036CDF2987CB5CDE49A0200CD9E9AFCFF21020009E52A07E811080019CDE698D1A7
:2036A000CDFD98696036002336 00CDF298110200CD2699C2C536C31C37C5CDF29823D1CDAA
:2036C000FD98C3AA36CDF29829EB210DE419CDF498CD9499CA1937CDF29829EB210DE41919
:2036E000360123360 0CDF29811000419E521020009CDF498E5CDD001D1D1CD0C0221020028
:2037000009CDF498E5210100E5210000E5CD5F1AD1D1D1CDF298C31F37C3B93621FFFF7CDF
:20372000B5CDE49A0400CD9E9AFEFFC521060009CDF498E52A09E8E5CD6677D1D1D1CDFD69
:2037400098CDF29811090019CDE698C35A3721FFFFC36D3721 0000C36D37CD349A03000EEE
:20376000004E370F004E370C004E3754377CB5CDE49A0200CD9E9AFEFFC521060009CDF4DE
:2037800098E52A09E8E5CD6677D1D1D1CDFD98CDF29811090019CDE698C3D03721060 0095E
:2037A000CDF49811000419C3E3372A08FA11000419C3E33721060009CDF498E5CDD659D133
:2037C00029EB2128FA19CDF49811000419C3E337CD349A03000E00B4370F00AA370C009CE6
:2037E00037E3377CB5CDE49A0200CD9E9AFEFF69603600233600CDF298110200CD2699C2E8
:203800001138C3CD38C5CDF29823D1CDFD98C3F637CDF298EB218FE419CDEC98210000CD07
:203820002099CACA38CDF298EB2191E419CDEC98210000CD2099CA4C38CDF298EB2191E4F4
:2038400019E5CDE6982BD17D12C3CA38CDF29829EB2193E419CDF498CD9499CA6838CDF237
:2038600098EB218FE4193600CDF29829EB2193E419CDF998210100CD1199110000CD209938
:20388000CA9338CDF298E5210D00E5CD2902D1D1C3A038CDF298E5210F00E5CD2902D1D124
:2038A000CDF29829EB2193E419E5CDF29829EB2193E419CDF998210100CD7499D1CDFD985E
:2038C000CDF298EB2191E4193606C30538CDE49A0200CD739A21060009CDF49829EB219343
```

```
:2038E000E419E521040009CDF498D1CDFD9821060009CDF498EB218FE4193601C1C92A0719
:20390000E811080019CDE69829EB21E9E319CDF498CD9499CA1E39CD2D3923CD9499CA2773
:203920003921FFFFC32A392100007CB5C9CD9E9AFCFF21020009E52A07E811080019CDE6DF
:2039400098D1CDFD98696036002336000CDF298110800CD2699C26739C3AA39C5CDF2982301
:20396000D1CDFD98C34C39CDF298110500CD9F99EB2167E4192323CDEC9821020009CDF466
:2039800098CD1899CA9E39CDF298110500CD9F99EB2167E419CDF99821FFFFCD2099CAA71A
:2039A00039CDF298C3AD39C35B3921FFFF7CB5CDE49A0400CD739A2A07E82323CDF498E561
:2039C0002A07E811080019CDE698E521040009CDF498E5CD613CD1D1D1210000E5CD6A9353
:2039E000D12A07E81109001936FFC1C9CD9E9AF2FF210A0009360123360021080009E52AF0
:203A000007E82323CDF498D1CDFD9821040009E52A07E811040019CDF498D1CDFD982104DA
:203A20000009CDF49823CD9499C2413AC521080009CDF498E5CDA042D1D1CDFD9823CD945E
:203A400099C25C3C21020009E52A07E811080019CDE698D1CDFD9821060009E5CDF298111C
:203A60000500CD9F99EB2167E4192323CDE698D1CDFD98CDF84221020009CDF498EB2A97D0
:203A8000E4CD1899CAA43A21020009CDF498E521060009CDF498E5210100E5CD2952D1D153
:203AA000D1C35C3C21080009CDF498E521020009CDF498E5210100E5CD613CD1D1D12A07EB
:203AC000E811080019E521060009CDF498D17D122A07E811040019E5CDF298110500CD9FF9
:203AE00099EB2167E419232323CDF498D1CDFD9821120009CDF498CD9499CA193B210800F2
:203B000009CDF4981100419E521060009CDF498E5CDD001D1D1CD0C02210C0009E5210467
:203B20000009CDF498E52A09E8E5CD6677D1D1D1CDFD98210C0009CDF49811090019CDE64A
:203B400098C3CE3B21040009E521040009CDF498E5CDD659D129EB2128FA19CDF498D1CD4E
:203B6000FD98210A000936002336000C3ED3B21060009CDF498E521FFFFE5210000E5CD5F5E
:203B80001AD1D1D1C35C3C21040009E52A08FAD1CDFD98C3ED3B2104000936022336002100
:203BA0000A000936002336000C3ED3B210C0009CDF49811060019CDF998210200CD2099CAE8
:203BC000CB3B210A000936002336000C3ED3BCD349A06000D00AB3B06009F3B1300963B0FCA
:203BE00000873B14006E3B0E00443BED3B210C0009CDF49811090019CDEC9821FFFFCD2072
:203C000099CA5C3C21040009CDF498E521020009CDF498E521060009CDF498E5210A000931
:203C2000CDF498E5CD6454D1D1D1D1210C0009CDF49811080019E521060009CDF498D17D00
:203C40001221040009CDF498EB2A08FACD1899CA5C3C21060009CDF498221DE8CDE49A0ECB
:203C600000CD739A21080009CDF4981100419E5210000E5CDD001D1D1CDF901210600098F
:203C8000CDF498E521FFFFE521040009CDF498CD8899E5CD5F1AD1D1D1C1C9CD9E9AF0FF51
:203CA00021040009E52A07E811060019CDF498D1CDFD9821060009E521040009CDF498116F
:203CC000FF00CD1199D1CDFD98C521040009CDF498110800CD6099110300CD1199D1CDFDEA
:203CE0009821020009E521040009CDF498110A00CD6099D1CDFD9821080009E52A07E8113F
:203D00000040019CDF498D1CDFD98210A0009E52A07E811080019CDE698D1CDFD98CD6630B5
:203D20023CD9499CA7F3D21060009CDF498CD9499CA743D210E0009E521080009CDF4983A
:203D4000E52A09E8E5CD6677D1D1D1CDFD98210E0009CDF49811090019 36FF210A0009CD05
:203D6000F498E521FFFFE5210000E5CD5F1AD1D1D1C37C3DCDF298E5CD2A7FD1C3A6402146
:203D80000060009CDF49811000CD2099CAA73D2A0CFA117800CD2F99CAA73D2A0CFAE5CD98
:203DA0007119D123CD9499CAB83DCDF298E5CD2A7FD121060009360323360021060009CD87
:203DC000F498C38F40C5CD8B36D1CDFD9823CD9499C2A640CDF298E5210F00E5CD2902D160
:203DE000D1CDF298E5CD3126D111FF00CD2099C2E13DCD6119210E0009E521080009CDF4F4
:203E000098E52A09E8E5CD6677D1D1D1CDFD98210E0009CDF49811090019360D210800096D
:203E2000CDF49811000419E5210A0009CDF498E5CDD001D1D1CD0C022A0CE023220CE02A18
:203E400007E811060019E5CDF498E5CDF298110800CD6E9923D1CD0399D1CDFD98C3A640A3
:203E600021040009E5CDF298E5CD3126D1D1CDFD9811FF00CD1899C2A64021040009CDF4A6
:203E800098CD9499CAA33ECDF298E5CD2A7FD12A07E811060019E5CDF4982323D1CDFD9862
:203EA000C3A64021040009CDF4982BCD9499CAC93E2A07E811060019E5CDF498110004CD73
:203EC000399D1CDFD98C3FC3ECDF29829EB211DE419E521040009CDF498D1CDFD98CDF212
:203EE0009829EB2104E0193601233602A07E811060019E5CDF49823D1CDFD98CD6119C381
:203F0000A64021040009E5CDF298E5CD3126D1D1CDFD9811FF00CD1899C2A640CDF298298E
:203F2000EB211DE419E5CDF29829EB211DE419CDF498110A00CD9F99EB21040009CDF498E5
:203F400019D1CDFD98CD6119CDF29829EB2104E019E5CDF49823D1CDFD98110300CD209917
:203F6000C2A640CDF298E5CD2A7FD121020009CDF498CD9499CAA83F21040009E52106FFAD
:203F8000E5213200E5CDF29829EB211DE419CDF498113BFF19E521FFFFE5CDE42CD1D1D16B
:203FA000D1D1CDFD98C3254021040009360023360021 0C0009360023360021 0C0009CDF45C
:203FC00098110300CD2699C2DD3FC325402 10C0009E5CDF49823D1CDFD98C3BA3FCDF298C6
:203FE00029EB211DE419E5210C0009CDF49829EB2100FF19CDF998E1CDF498CD1899C213C6
:2040000040CDF29829EB211DE419CDF498112003CD1899CA2240210400093601233600C302
:204020002540C3CD3F21040009CDF49811 0000CD2099CA45402A07E82323CDF498E5CD1263
:2040400088D1C3A64021080009CDF498E5210A0009CDF498E5210000E5CD613CD1D1D12178
:204060000E0009E521080009CDF498E52A09E8E5CD6677D1D1D1CDFD98210E0009CDF498C4
:20408000110600193603233600CD2346C3A640CD349A040003000454002000 23F0100603E76
:2040A0000000C53DA640CDE49A1000CD9E9AF8FF21040009E52A07E82323CDF498D1CDFD5B
:2040C00098210C0009CDF498E5CD2A7FD1C521040009CDF498E5CDA042D1D1CDFD9811FF99
:2040E000FFCD2099CAEF40CDF298E5CDF041D12A04FACD9499C204412A04FAE5CD8288D159
:2041000023CD9499CADF4121020009E5210C0009CDF498EB2131E819CDE698D1CDFD98211B
:2041200020009CDF498CD9499CA38412102000936 0A233600C34541210200 09E5CDF49866
:204140002BD1CDFD9821020009E5CDF498EB2A00FA19D1CDFD9821060009E521020009CD2E
:20416000F498E52A09E8E5CD6677D1D1D1CDFD9821060009CDF49811090019CDE698110C2B
:2041800000CD1899CADF4121060009CDF4981109001936 00C521060009CDF49811080019 45
:2041A000CDE698D1CDFD98CDF298E521FFFFE521FFFFE5CD5F1AD1D1D121060009CDF498FB
```

```
:2041C0001108001936FF2A07E811080019CDE698E5CDF298E5210100E5CD2952D1D1D121DE
:2041E000040009CDF498E5CD1288D1CDE49A0800CD9E9AFCFFC52A07E82323CDF498D1CDCE
:20420000FD9821020009E521080009CDF498110500CD9F99EB2167E4192323CDE698D1CDB3
:20422000FD98CDF842CDF298E52A07E811080019CDE698E521020009CDF498E5210000E5BB
:20424000CD6454D1D1D1D12A07E811080019E521020009CDF498D17D122A07E81104001939
:20426000E521080009CDF498110500CD9F99EB2167E419232323CDF498D1CDFD982102002B
:2042800009CDF498E521FFFFE5210000E5CD5F1AD1D1D1CDF298E5CD1288D1CDE49A040051
:2042A000CD9E9AFEFF69603600233600CDF298110800CD2699C2C742C3EE42C5CDF29823AB
:2042C000D1CDFD98C3AC42CDF298110500CD9F99EB2167E419CDF99821060009CDF498CD64
:2042E0001899CAEB42CDF298C3F142C3BB4221FFFF7CB5CDE49A0200CD9E9AFEFFC52A0774
:20430000E82323CDF498E5CDA042D1D1CDFD9811FFFFCD2099CA2B43CDF298110500CD9FD8
:2043200099EB2167E41936FF2336FFCDE49A0200CD9E9AFEFF69603600233600CDF29811D8
:204340000800CD2699C25743C3CB43C5CDF29823D1CDFD98C33C43CDF298110500CD9F9976
:20436000EB2167E419CDF49823CD9499CAC843CDF298110500CD9F99EB2167E419E52A078A
:20438000E82323CDF498D1CDFD98CDF298110500CD9F99EB2167E4192323E521060009CD59
:2043A000F498D17D12CDF298110500CD9F99EB2167E419232323E52A07E811040019CDF4D9
:2043C00098D1CDFD98C3CB43C34B43CDE49A0200CD9E9AFEFF69603600233600CDF29811E1
:2043E0000800CD2699C2F743C30D44C5CDF29823D1CDFD98C3DC43CDF298110500CD9F9953
:20440000EB2167E41936FF2336FFC3EB43CDE49A0200100008000800080008000800080021
:204420000800080008000400040004000400040004000400040002000200020002000200 3A
:20444000010000000000000000000000000000000104070408040904 0A040B040C040D040E04E2
:20446000210000229 9E421FFFF2297E4210000229BE4210000229DE4210000229FE4210251
:204480000022A1E421020022A3E421000022A5E421020022A7E421010022ADE421000022F5
:2044A000A9E421000022ABE421FFFF22B1E421FFFF22B5E421FFFF22AFE4C9CD9E9AF8FF54
:2044C000C5210C0009CDF498EB2131E819CDE698D1CDFD9821060009E52A07E82323CDF497
:2044E00098D1CDFD98210C0009CDF498E5CD2A7FD121020009E521060009CDF498E5CDF8F2
:2045000022D1D1CDFD98CDF298CD9499CA1F4521020009CDF498110008CD1199CD9499C225
:204520003E45CDF298110000CD2099CA3E4521020009CDF498110004CD1199CD9499CA47A1
:2045400045CD2346C399452A07E811060019E5CDF29811090019D1CDFD98C5CDF29829EB24
:20456000214E4419CDF498D1CDFD982A07E811040019E5CDF298D1CDFD98CDF298E5CDF232
:2045800098110104CD1899CA9045211000C3934521110 0E5CD3946D1D1CDE49A0800CD9EC1
:2045A0009AFCFF21020009E52A07E82323CDF498D1CDFD98C521080009CDF498EB2131E8F5
:2045C00019CDE698D1CDFD9821080009CDF498E5CD2A7FD121020009CDF498E5CDF822D16B
:2045E000110010CD1199CD9499CAF245CD2346C31E462A07E811060019E5CDF29811110024
:2046000019D1CDFD982A07E81104001936022336042102 04E5211200E5CD3946D1D1CDE4AF
:204620009A04002A07E81106001936002336002A07E81109001936 20C9CD9E9AFEFF2A0766
:20464000E811060019E5CDF498E521060009CDF498110800CD6E99D1CD0399D1CDFD98C577
:2046600021080009CDF498E5CD1E4FD1D1CDFD9823CD9499CA8A462A07E81109001936 1F34
:204680002A9DE423229DE4C3BE46CDF29811090019E521060009CDF498D17D12CDF2981122
:2046A000060019E5CDF49811FF00CD1199D1CDFD982A07E82323CDF498E5CD1288D1CDE45D
:2046C0009A0200CD663023CD9499CAD7462A9DE42B229DE4C3FF462A07E811040019CDF44E
:2046E00098E52A07E811060019CDF99821080 0CD5F99E5CD3946D1D12A9DE42B229DE4C993
:20470000CD9E9AF8FF21040009E52A07E811060019CDF498D1CDFD98CDFE3823CD9499CACB
:204720004F472A9BE4E521040009CDF49829EB21124419CDF498CD8D99D1CD1199229BE4F5
:20474000CD55512A07E811090019 36FFC3C3482102000936 01233600C521040009CDF4988F
:2047600029EB21124419CDF498D1CDFD982A9BE4EBCDF298CD0399229BE4CDF29829EB2A7F
:204780009BE4CD2699CAC048CDF298EB2A99E4CD2699CAC048CDF298E5CDEF59D1CD9499D9
:2047A000C2C348210C0009CDF498C37948CD555123CD9499C2C348217E00E5CDD502D121A2
:2047C0000F24E5CDD502D1210001E5CD284DD1CDC848C38C48CD555123CD9499C2C3482140
:2047E0000 20009E521040009CDF49811F7FF192BEB21020009CDF498CD6E99D1CDFD98215F
:204800000F24E5CDD502D1213400E5CDD502D121020009CDF498E5CD284DD1CDC848C38C83
:2048200048CDD950210F24E5CDD502D121020009E521040009CDF49811EFFF192BEB2102A3
:204840000009CDF498CD6E99D1CDFD9821020009CDF498110002191100 2019E5CDD502D19A
:20486000217A00E5CDD502D1210001E5CD284DD121010022A5E4C38C48CD349A0300120015
:2048800021481100D5471000AD478C48210C0009CDF49811120 0CD1899CAAE48CDF2982241
:2048A00099E42A07E811090019 3613C3BD482120002299E42A07E811090019 361EC3C348D0
:2048C000CDD950CDE49A0800CD9E9AFEFFC52A07E811080019CDE698D1CDFD98210204E5F3
:2048E000CDF298E5CDD001D1D1CD0C02CDF298E5210100E5210000E5CD5F1AD1D1D1CDE4AE
:204900009A0200CD9E9AFCFFC52A07E811060019CDF99821080 0CD5F99D1CDFD98CDF29817
:20492000CD9499CA724921020009E5CD8B36D1CDFD9811FFFFCD2099CA6F492A07E8110 6DF
:204940000019E5CDF498E521020009CDF49823110001CD9F99D119D1CDFD9821020009CD46
:20496000F498E5210F00E5CDD238D1D1CD6119C3BE49211800E5CD7119D123CD9499CABE3C
:2049800049CDF2982BE5CD2A7FD12A07E811060019E5CDF49811FF00CD1199D1CDFD982AB5
:2049A0007E811060019CDF49829EB21124419CDF4982299E42A07E811090019 3613CDE49D
:2049C0009A0400CD9E9AF2FF210A0009E52A07E811040019CDF498D1CDFD9821080009E540
:2049E0002A07E811060019CDF498D1CDFD9821020009E52A07E82323CDF498D1CDFD9821C5
:204A0000040009E52A07E811080019CDE698D1CDFD98CD376623CD9499CA504A210000E5EA
:204A2000CD6A93D121020009CDF498E5210A0009CDF498E5CD5688D1D1CD43652A9BE4E5AF
:204A40002A4044CD8D99D1CD1199229BE4C30D4CCDFE38CD9499CAE64BC521080009CDF400
:204A60009829EB21124419CDF498D1CDFD982A9BE4EBCDF298CD0399229BE4CDF29829EB0E
:204A80002A9BE4CD2699CAE34BCDF298EB2A99E4CD3099CAE34B21060009E5CDC85929EB5B
```

:204AA0002128FA19CDF498E52A09E8E5CD6677D1D1D1CDFD9821060009CDF4981109001921
:204AC000CDEC9821FFFFCD2099CA1C4B21040009CDF498E5CD124CD1CD9499CA1C4B210CEF
:204AE0000009E5210A0009CDF498E5CDA042D1D1CDFD9823CD9499C20D4C210C0009CDF474
:204B0000981105000CD9F99EB2167E4192323CDE698E5CD124CD1CD9499C20D4C21060009BB
:204B2000CDF4981109001936172A9BE4E5CDF298CD8D99D1CD1199229BE4CDF2982299E4E5
:204B4000CD555123CD9499C20D4C2A9FE4110002CD2099CA5F4B2A9FE4110000CD2099CAE2
:204B6000654BCD754E210002E5CD544DD1210000E5CDD502D1210F24E5CDD502D12106005E
:204B800009CDF4982323CDF49811000419E521040009CDF498E5CDD001D1D1CD0C02210455
:204BA0000009CDF498E5210100E5210000E5CD5F1AD1D1D12A07E811090019360E21010036
:204BC00022ADE421020009CDF498E5210A0009CDF498E5CD5688D1D1210100E5CD6A93D157
:204BE000C30D4CC30D4C2A9BE4E521080009CDF49829EB21124419CDF498CD8D99D1CD11C5
:204C000099229BE42A07E811090019 36FFCDE49A0E00CD9E9AFCFF21020009E5CDC859D1B0
:204C2000CDFD98C52A09E8D1CDFD98CDF29811FFFFCD2099C2484CC3A34CC5CDF298CDF42E
:204C400098D1CDFD98C32B4CCDF29811080019CDEC9821080009CDF498CD1899CA7C4CCD0D
:204C6000F29811090019CDE698110E00CD1899CA7C4CCDF298EB2A07E8CD2099CAA04CCD99
:204C8000F2982323CDF498E5CDD659D1EB21020009CDF498CD1899CAA04C21FFFFC3A64CC1
:204CA000C33A4C2100007CB5CDE49A0400CD739A2A9FE4CD9499CAC34C21040009CDF49829
:204CC000C3244D2A9FE4EB21040009CDF498CD2099CA214D21040009CDF498110001CD1845
:204CE00099CAEE4C21040009CDF498C3244D2A9FE4EB21040009CDF498CD1199EB210400B6
:204D000009CDF498CD1899CA144D21040009CDF498C3244DCD754E21040009CDF498C324CF
:204D20004D21FFFF7CB5C1C9CD9E9AFEFFC521060009CDF498E5CDAD4CD1D1CDFD9811FF3D
:204D4000FFCD2099CA4F4DCDF298E5CD544DD1CDE49A0200CD9E9AFEFF21060009CDF49815
:204D6000C3534EC3664E2A07E82323CDF49811000419E5210000E5CDD001D1D1210100E540
:204D8000CD4E02D1C3664E69603600233360CCDF29811 8C0CCD2699C2AA4DC3D44DC5CDF29D
:204DA0009823D1CDFD982BC38E4DCDF298E5210000E5CDD001D1D1210100E5CD4E02D1CDF8
:204DC000F298111F00CD1199CD9499CAD14DCDC602C39D4DC3664E696036042336 00CDF2EC
:204DE00098110002CD2699C2FA4DC3504EC5CDF29823D1CDFD982BC3DE4DCDF2981105001A
:204E0000CD9F99EB2100F01911040019CDEC9821060009CDF498CD1199110000CD2099CA98
:204E20004D4ECDF29811000419E5210000E5CDD001D1D1210100E5CD4E02D1CDF298111FAB
:204E400000CD1199CD9499CA4D4ECDC602C3ED4DC3664ECD349A03000001874D0002664D4B
:204E600000004634DD74D21060009CDF498229FE4CDE49A0200CD9E9AFEFF69603600233685
:204E80000CCDF29811 8C0CCD2699C29D4EC3C74EC5CDF29823D1CDFD982BC3814ECDF2986F
:204EA000E5210000E5CDD001D1D1210200E5CD4E02D1CDF298111F00CD1199CD9499CAC44B
:204EC0004ECDC602C3904E210000229FE4CDE49A0200CD9E9AFEFFCD754E210000E5CDD501
:204EE00002D1C52A14E0D1CDFD98CDF298E5CD4D19D1110200CD2699C2EA4E210300E5CD1A
:204F00007302D1110800CD1199CD9499CA194F2A12E0232212E0CD754ECDE49A0200CD9EF4
:204F20009AFEFFC521060009CDF498E52A09E8E5CD6677D1D1D1CDFD98CDF29823CD9499B4
:204F4000C2664FCDF29811090019CDEC9821FFFFCD2099CA664FCDF29811090019CDEC9800
:204F60002108 00CD2099CA6F4F21FFFFC3B14FCDF29811080019E52A07E811080019CDE6AC
:204F800098D17D12CDF29811040019E52A07E82323CDF498D1CDFD98CDF29811060019E558
:204FA0002A07E811060019CDF498D1CDFD98CDF2987CB5CDE49A0200CD9E9AFAFFC52A0753
:204FC000E82323CDF498D1CDFD9821020009E52A07E811080019CDE698D1CDFD982A42448D
:204FE0002299E42A07E811090019CDE698110E00CD1899CA6650CDF29811000419E52100D3
:2050000000E5CDD001D1D1210200E5CD4E02D121040009E5CDC85929EB2128FA19CDF498AB
:20502000E52A09E8E5CD6677D1D1D1CDFD9821040009CDF4982323CDF498E521020009CD08
:20504000F498E5210000E5CD613CD1D1D121040009CDF49811090019 36FF2A07E8110900DA
:205060001936FFC3D4502A9BE4CD9499CA75502A9DE4CD9499CA8C50210F24E5CDD502D1D0
:20508000CDD24ECD5551210000 22A5E4210200E521020009CDF498E5210000E5CD613CD131
:2050A000D1D121040009E5210200E52A09E8E5CD6677D1D1D1CDFD9821040009CDF498111C
:2050C00009001936FF21010022ADE42A07E811090019 36FFCDE49A0600CD9E9AF4FF210AAF
:2050E0000009E52A07E811080019CDE698D1CDFD982A97E423CD9499CA2751210A0009CDF4
:20510000F4982297E4210304E52A97E4E5CDD001D1D1CD0C022A97E4E5210100E521000002
:20512000E5CD5F1AD1D1D12A07E811080019CDEC982A97E4CD2099CA50512A97E4E5210AEA
:205140000009CDF498E5210100E5CD2952D1D1D1CDE49A0C00CD9E9AFAFF21020009E52AB6
:2051600007E811080019CDE698D1CDFD9821020009CDF498EB2A97E4CD2099CA8451210233
:205180000C322521040009E5210204E52A09E8E5CD6677D1D1D1CDFD982A9BE4CD949997
:2051A000CAC85121040009CDF49811090019CDEC98211300CD2099CAC85121040009CDF475
:2051C00098EB2A07E8CD2099CAE651210300E52A97E4E5210000E5CD613CD1D1D121FFFF17
:2051E0002297E4C31F52CDFE38CD9499CA1F52C5CD9E19D1CDFD9811FFFFCD2099CA195260
:20520000CDF298E521020009CDF498E5210200E5CD2952D1D1D1C31F5221FFFFC32252217A
:2052200002007CB5CDE49A0600CD9E9AFAFF21040009E52A07E811040019CDF498D1CDFD9E
:20524000982102009E5CD2D39D1CDFD9811FFFFCD2099CA9652 21020009CDF4981105005D
:20526000CD9F99EB2167E4192323E5210E0009CDF498D17D1221020009CDF49811050 0CD35
:205280009F99EB2167E419232323E521040009CDF498D1CDFD98C52A09E8D1CDFD98CDF28C
:2052A000981 1FFFFCD2099C2BB52C33253C5CDF298CDF498D1CDFD98C39E52CDF2981108DF
:2052C0000019CDEC98210C0009CDF498CD1899CA2F53210A0009CDF4982BCD9499CA075335
:2052E000CDF29811040019E521040009CDF498D1CDFD98CDF298E5210E0009CDF498E5CD0B
:205300003753D1D1C32F53CDF29811040019CDF99821040009CDF498CD1899CA2F53CDF229
:2053200098E5210E0009CDF498E5CD3753D1D1C3AD52CDE49A0600CD9E9AFAFF2104000942
:20534000E5210C0009CDF49811090019CDE698D1CDFD98C5210C0009CDF4982323CDF49835
:20536000D1CDFD9821040009CDF498110F00CD1899CA8653C52A08FAD1CDFD98210A0009DA
:20538000CDF498221DE82102000936002336 0021040009CDF498110C00CD1899C2D35321A7

:2053A000040009CDF498111600CD1899C2D35321040009CDF498110D00CD1899CAD35321C6
:2053C0000C0009CDF49811060019CDF498110200CD1899CADF532102000936012336002 16C
:2053E000040009CDF498111000CD2099CA1C5421040009CDF498111100CD2099CA1C5421DC
:20540000040009CDF498111200CD2099CA1C5421040009CDF498111400CD2099CA4954CDDD
:20542000F298E5210C0009CDF49811080019CDE698E5210A0009CDF498E521020009CDF4AD
:2054400098E5CD6454D1D1D1D1210C0009CDF49811080019E5210A0009CDF498D17D12CDA6
:20546000E49A0600CD739A21080009CDF498E521FFFFE521040009CDF498CD8899E5CD5FD4
:205480001AD1D1D1210A0009CDF49811000419E521060009CDF498E5CDD001D1D1CD0C0256
:2054A00021060009CDF498E5210100E521040009CDF498E5CD5F1AD1D1D1C1C9CD9E9AFEC5
:2054C000FFC52A1244D1CDFD98210300E5CD7302D1110400CD1199CD9499CAE7542A99E407
:2054E000EBCDF298CD2099CA41552A9BE4EBCDF298CD0399229BE4CDF29829EB2A9BE4CDAE
:205500002699CA4155CDF298EB2A99E4CD2699CA4155CDF298E5CDEF59D1CD9499C29E55C6
:20552000217800E5CDD502D1210F24E5CDD502D1210001E5CD284DD121010022A1E4C39E86
:20554000552A99E4EBCDF298CD2099CA545521020022A1E4210300E5CD7302D1110400CD4C
:20556000119911000 0CD2099CA72552AA1E42BCD9499CA9E552A42442299E42A9BE4CD946F
:2055800099CA8A552A9DE4CD9499CA9E55CDD24E210F24E5CDD502D121010022ADE4CDE446
:2055A0009A0200CD9E9AFEFF2AA5E4CD9499CABA552AA7E4110200CD1899CAC555210F2449
:2055C000E5CDD502D1C52A3E44D1CDFD98210300E5CD7302D1110100CD1199CD9499CA67FD
:2055E000562AAFE423CD9499CAF4552A14E022AFE4C3E2562AAFE4E5CD4D19D1110600CD10
:205600002F99CA0F562A99E4EBCDF298CD2099CA64562A9BE4EBCDF298CD0399229BE4CDDE
:20562000F29829EB2A9BE4CD2699CA6156CDF298EB2A99E4CD2699CA6156CDF298E5CDEF28
:2056400059D1CD9499C2E256217A00E5CDD502D1210001E5CD284DD121010022A3E4C3E2AD
:2056600056C36756C3E2562A99E4EBCDF298CD2699CA805621020022A3E421FFFF22AFE4A4
:20568000210300E5CD7302D1110100CD1199110000CD2099CAE2562AA3E42BCD9499CAC861
:2056A000562A42442299E42A9BE4CD9499CAB6562A9DE4CD9499CABC56CDD24E2102002219
:2056C000A3E421010022ADE4C3DC562A9BE4E5CDF298CD8D99D1CD1199229BE421FFFF2277
:2056E000AFE4CDE49A0200CD9E9AFCFF210100E5CD7302D1CD8D9911FF00CD119922A9E487
:2057000021020009E52AA9E4E5211444E5CD2B59D1D1D1CDFD982AA9E4110000CD2099CA40
:2057200075582AA7E4110200CD1899CA33582AB1E423CD9499CA41572A14E022B1E4C32605
:20574000592AB1E4E5CD4D19D1110600CD2F99CA305821020009CDF498EB2AABE4CD20999B
:20576000CA74572A9BE4E52AABE4CD8D99D1CD1199229BE421020009CDF49822ABE42A9B76
:20578000E4EB2AABE4CD0399229BE42AABE429EB2A9BE4CD2699CA30582AABE4EB2A99E4D8
:2057A000CD2699CA30582AABE4E5CDEF59D1CD9499C22659210F24E5CDD502D1213000E568
:2057C000CDD502D12AA9E4E5CD284DD12A02FA110000CD2799CAE1572A02FA110500CD26B0
:2057E00099CA0358C52A02FA2B110100CD6D99D1CDFD98CDF2981100021911002019E5CD3E
:20580000D502D1212022E5CDD502D121000022ABE421010022A7E42A14E022B5E42AA9E4F2
:20582000E52152FAE5CD2B59D1D122B3E4C32659C372582A99E4EB21020009CDF498CD26AC
:2058400099CA725821020022A7E421000022A9E42A9BE4E52A3E44CD8D99D1CD1199229B49
:20586000E421FFFF22B1E4212024E5CDD502D1C32659C326592AA7E4110200CD1899CA8A91
:20588000592AABE4110000CD2099CABB582A9BE4E52AABE4CD8D99D1CD1199229BE4E52A51
:2058A0003E44CD8D99D1CD1199229BE421000022ABE421FFFF22B1E4C326592AA7E42BCDF3
:2058C0009499CA26592AB5E4E5CD4D19D1EB2AB3E4CD3999C226592A42442299E42A9BE422
:2058E000E52A3E44CD8D99D1CD1199229BE4212F24E5CDD502D12A9BE4CD9499CA05592A78
:205900009DE4CD9499CA0B59CDD24E21020022A7E421000022A9E421FFFF22B1E421010059
:2059200022ADE4C32659CDE49A0400CD9E9AFAFF2104000936002336006960360023360010
:20594000CDF298110800CD2699C25C59C3BA59C5CDF29823D1CDFD982BC34059210C0009CF
:20596000CDF498EBCDF298CD5F99110100CD1199110000CD2099CAB75921020009E5CDF2FD
:205980009829EB210A0009CDF49819CDF498D1CDFD9821020009CDF498EB21040009CDF4CA
:2059A00098CD2699CAB75921040009E521020009CDF498D1CDFD98C34F5921040009CDF4C4
:2059C000987CB5CDE49A06002A07E82323CDF498E5CDD659D1C9CD739A21040009CDF49819
:2059E0001109001911190 0EBCDC3997CB5C1C9CD739A2AADE42BCD9499CA085A2102002250
:205A0000ADE4210000C32A5A2A9BE4E521040009CDF498CD8D99D1CD1199229BE421040077
:205A200009CDF4982299E421FFFF7CB5C1C9210300E5CD7302D1111000CD1199CD9499CA13
:205A40004B5A2A99E4118000CD2099CA705A2180002299E421020022ADE4CD754E21000088
:205A6000E5CDD502D1210F24E5CDD502D1C39F5A210300E5CD7302D1111000CD119911009D
:205A800000CD2099CA905A2A99E4118000CD1899CA9F5A2100002299E421010022ADE4C9F5
:205AA000CD9E9AF8FF21040009E52A07E811080019CDE698D1CDFD9821020009E52A07E8E4
:205AC0002323CDF49811000419E521040009CDF498E5CDD001D1D1111800CD1199D1CDFD2D
:205AE000982A07E811060019CDF998210080CD1199110000CD2099CA065B2A6EFAE5CD71D8
:205B000019D123CD9499CA215B2A07E811060019E5CDF49811FF7FCD1199D1CDFD98CD0C9F
:205B2000022A07E811060019CDF99821FF00CD1199C36E5DC5CDC85DD1CDFD98110200CDCD
:205B40001899CA545B2A07E81106001936012336 00C3835BCDF2982BCD9499CA835B2A074C
:205B6000E811060019360223360 02A07E811080019CDE698E5210000E5210100E5CD5F1AAE
:205B8000D1D1D1C39D5DCDFE38CD9499C29D5D21040009CDF49829EB21C9E319CDF4982B17
:205BA000CD9499C2B25B210600E5CD0E5ED123CD9499CAC05B210000E5CDA25DD1C3CF5B74
:205BC000CD61192A07E811060019360523 3600C39D5D21020009CDF498111800CD2099CAE6
:205BE000EA5B210100E5CDA25DD1C39D5D21020009CDF498111800CD2099CA0C5CCD611952
:205C00002A07E811060019360423 3600C39D5D2A62FAE5CD7119D123CD9499CA275C2A078D
:205C2000E8110900193 6FFC39D5DCDFE38CD9499CA425C2A07E81106001936012336 00C356
:205C4000605C2AC0FAE5CD7119D123CD9499CA605CCD785E2A07E81106001936062336 0073
:205C6000C39D5D2A07E811040019E52A00FAD1CDFD98CDA68BCD9499CAC65C21060009E5EB

```
:205C80002A07E811040019CDF498E5CD1E4FD1D1CDFD9821060009CDF4981106001 9E5CDD6
:205CA000189D1CDFD982A07E8E521060009CDF498E5CD858CD1D1CD61192A07E8110600C4
:205CC0001936072336 00C39D5D215046E5CD7119D123CD9499CAE65CCD785E210000E5CDF5
:205CE000A25DD1C39D5DCDFE38CD9499CAFB5C2A07E811060019360823 3600C39D5DC5CDCA
:205D00008B36D1CDFD9811FFFFCD2099CA385DCDF298E521AAAAE5CDD238D1D12A07E81162
:205D2000060019E5CDF2981108 00CD6E991109 0019D1CDFD98CD6119C39D5D216000E5CD7E
:205D40007119D123CD9499CA6B5D2A07E811060019CDF9982108 00CD5F99E5CD2A7FD12A4E
:205D60007E8110600193601233600C39D5DCD349A0A0009003B5D0800FE5C0700C95C06DD
:205D8000006 35C05002A5C04000F5C0300ED5B0200D25B0100865B0000345B9D5DCDE49A1A
:205DA0000800CD739A21040009CDF498E5CDB439D12A07E811090019360D2A07E81106004B
:205DC00019360323 3600C1C921A401E5CD7119D123CD9499CA085E2A07E82323CDF49811A5
:205DE0000004 19E5210000E5CDD001D1D1111800CD11991118 00CD1899CA025E210100C305
:205E00000B5E210200C30B5E21FFFF7CB5C9CD9E9AFEFFC52A09E8D1CDFD98CDF29811FF35
:205E2000FFCD2099C2385EC36E5EC5CDF298CDF498D1CDFD98C31B5ECDF2981108 0019E5A4
:205E40002A07E811080019CDEC98E1CDE698CD1899CA685ECDF2981109 0019CDEC9821066A
:205E60000009CDF498CD1899C26E5EC32A5ECDF2987CB5CDE49A0200CD9E9AFEFFC52106A6
:205E80000E5CD0E5ED1D1CDFD9811FFFFCD2099CAD95ECDF2982323CDF498E5CDF2981107
:205EA000060019CDE698E521000 0E5CD613CD1D1D1CDF2981106 0019CDF99821FF00CD11CB
:205EC0009929EB211FE819E5CDF4982BD1CDFD98CDF2981109001936FFCDE49A0200CD9EC1
:205EE0009AF8FFC52A07E82323CDF498D1CDFD9821040009E5CDF298E5CDF822D1110F003A
:205F0000CD1199D1CDFD982A07E811060019CDF498CD9499CA345F213C00E5CD7119D12351
:205F2000CD9499CA315FCDB84F210000E5CD6A93D1C30760CDFE3823CD9499CA695F2A078B
:205F4000E81106001936002336 00CD6119CDF29811000419E5210000E5CDD001D1D1210280
:205F600000E5CD4E02D1C30760CD376623CD9499CA945F2A07E811060019360023 36002ADE
:205F80007E8110A001936FF2336FFCDB84FCD4365C307602AADE4110200CD1899CA076061
:205FA000CDF29811000419E5210000E5CDD001D1D1210200E5CD4E02D121060009E5CDC891
:205FC0005929EB2128FA19CDF498E52A09E8E5CD6677D1D1D1CDFD9821060009CDF49811A1
:205FE000090019 36FF2A07E811090019 36142A07E811080019CDE698E521FFFFE521000014
:20600000E5CD5F1AD1D1D1CDE49A0800CD9E9AF8FFC52A07E811080019CDE698D1CDFD9805
:2060200021040009E52A07E82323CDF498D1CDFD982A08FA11000419E5CDF298E5CDD00149
:20604000D1D1111800CD1199CD9499CAF66021060009E52A08FA11000419E52A09E8E5CDC3
:206060006677D1D1D1CDFD9821060009CDF4981106 0019E5CDF29829EB21E9E319CDF99801
:20608000E1CDF498CD1899CAF660CDF9012106 0009CDF4981106 0019E5CDF4982BD1CDFDA4
:2060A00098CD9499CAAD6021FFFF221DE821060009CDF498110900193 6FFCDF298E521FFE4
:2060C000FFE521FFFFE5CD5F1AD1D1D121040009CDF498E5210000E5CDD001D1D12102004A
:2060E000E5CD4E02D12A07E81109001936FF210000E5CD6A93D1CDE49A0800CD9E9AF8FF5C
:2061000021040009E52A07E82323CDF498D1CDFD98C521040009CDF49811000419E5210001
:2061200000E5CDD001D1D1111800CD1199D1CDFD982A07E811060019CDF498CD9499CAFE03
:2061400061CDF298CD9499CA5C612A07E811060019360123 3600CD6119C3FB6121040009 99
:20616000CDF498EB2A17E8CD1899CA846121020009E52A19E8E5CD3126D1D1CDFD98110B20
:20618000 00CD1899CAFB61C5CD9E19D1CDFD9811FFFFCD2099CAF86121020009E52A07E8FA
:2061A00011080019CDE698D1CDFD982A07E811080019E5CDF298D17D1221040009CDF498C1
:2061C000E521020009CDF498E5CDF298E5210100E5CD6454D1D1D1D12A19E8E521020009 23
:2061E000CDF498E5CDF298E5210000E5CD6454D1D1D1D12A19E8E5CD1C80D1C36E62210652
:206200000009E52A07E8110A0019CDF498E5CD4D19D1D1CDFD98CDF298CD9499CA4F6221E1
:206220000060009CDF498EB2A0EFACD3099CA4C62CD5A82CDEC8A21040009E52A13E8D1CD09
:20624000FD98B5CA4C6221FFFF2213E8C36E6221060009CDF4981106 00CD2F99CA6262CD1D
:20626000FD8A2A07E811060019360023 3600CDE49A0800CD9E9AFAFF21040009E52A07E842
:2062800011060019CDF498D1CDFD9821040009CDF49811FF00CD1199C37F6421020009E57D
:2062A000CDC85DD1CDFD98110200CD1899CABF622A07E81106001936012336 00C3E62213C
:2062C000020009CDF4982BCD9499CAE2622A07E811090019360D2A07E81106001936 0223F4
:2062E0003600C39A64CD2D3923CD9499CA5163C52A07E811080019CDE698D1CDFD98CDF28C
:2063000098 29EB21C9E319CDF4982BCD9499CA1C632101 00E5CDA25DD1C39A64CDF298293F
:20632000EB21E9E319CDF4982BCD9499CA51632A24FAE5CD7119D123CD9499CA4E632A0752
:20634000E811060019E5CDF49823D1CDFD98C39A64CD6119C39A6421020009E5CD8B36D158
:20636000CDFD9823CD9499C29A6421020009CDF498E5213300E5CDD238D1D12A07E8110692
:206380000019E521020009CDF4981108 00CD6E99232323D1CDFD98CD6119212E00E5CD7138
:2063A00019D1CD9499C29A6421040009CDF4981108 00CD6099E5CD3126D111FF00CD209963
:2063C000C2A8632A07E811060019E5CDF49823D1CDFD98CD6119C521040009CDF498110867
:2063E00000CD6099D1CDFD982A26FAE5CD7119D123CD9499CA5464CDF298E5CD2A7FD12A01
:206400007E811080019CDE698E521FFFFE521FFFFE5CD5F1AD1D1D1210000E5CD6A93D1C9
:206420002A07E811090019 36012A07E811060019E52A07E82323CDF49811000419E52100BF
:2064400000E5CDD001D1D1111B00CD1199D1CDFD98C37C64CDF298E5CD3126D111FF00CD90
:206460002099CA7C64CDF298E5CD2A7FD1CD61192A07E811060019360123 3600C39A64CD88
:20648000349A05000400D66303009A6302005763 0100E56200009B629A64CDE49A0600CDCF
:2064A0009E9AFEFFC52A07E811060019CDF49829EB2112441 9CDF498D1CDFD98EB2A99E47E
:2064C000CD2799CA31652A9BE4EBCDF298CD0399229BE4CDD950C52A07E82323CDF498D196
:2064E000CDFD982A07E811090019E5CDF298110104CD1899CAFD6421100 0C31265CDF29831
:2065000011020 4CD1899CA0F652112 00C312652111 00D17D122A07E811080019CDE698E52E
:2065200021FFFFE5210000E5CD5F1AD1D1D1C33E65CDFE3823CD9499CA3E65CDB84FCDE420
:206540009A0200CD9E9AFAFF21040009E52A07E811080019CDE698D1CDFD9821020009E5B4
```

:206560002A07E82323CDF498D1CDFD9821020009CDF498E5CDF822D1110F00CD1199110363
:2065800000CD1899CA13662A07E8110900193600FC52A08FA11000419E52A09E8E5CD6677F8
:2065A000D1D1D1CDFD98CDF298110900193617 2A1DE823CD9499CAC565CDF298110600196 8
:2065C000360023360 0CDF2981106001 9E5CDF49823D1CDFD9821040009CDF498221DE82142
:2065E000020009CDF498E5210000E5CDD001D1D1210100E5CD4E02D12A08FA11000419E5D8
:2066000021040009CDF498E5CDD001D1D1CD0C02C31C662A07E8110900193600210400 09F2
:20662000CDF498E5210100E5210100E5CD5F1AD1D1D1CDE49A0600CD9E9AF8FF21020009DC
:20664000E52A07E82323CDF498D1CDFD9821040009E52A07E8110800 19CDE698D1CDFD98EE
:20666000C521020009CDF498E5CDF822D1110F00CD1199D1CDFD98CDF298110300CD189980
:20668000CAD56621040009CDF498E82A1DE8CD1899C29B662A1DE823CD9499CAD26621 02A2
:2066A0000009CDF49811000419E521040009CDF498E5CDD001D1D1110300CD119911030 01A
:2066C000CD1899CACC66210000C31F6721FFFFC31F67C31C67CDF298110200CD1899C2E896
:2066E00066CDF2982BCD9499CA1C6721020009CDF49811000419E521040009CDF498E5CD9A
:20670000D001D1D1111800CD1199111800CD1899CA1C67CD0C0221FFFFC31F6721000 07C92
:20672000B5CDE49A0800CD9E9AFAFF21020009E52A07E8110400 19CDF498D1CDFD98210A44
:206740000009CDF498110200CD1899C25967210A0009CDF4982BCD9499CABB6721040009F8
:20676000E521020009CDF498E52A09E8E5CD6677D1D1D1CDFD9821040009CDF49811090 0AA
:2067800019CDE698110800CD1899CAAE6721020009CDF49811000419E5210000E5CDD001E3
:2067A000D1D1111800CD1199111800CD1899CABB67210A0009CDF498C3BE67210000 7CB53D
:2067C000CDE49A0600C9CD9E9AFEFF21060009CDF498E5CD6825D123CD9499CA1168C5CD12
:2067E0002768D1CDFD9821B0E3E5211668E5210800E5CDF298E5210400E5CDAA93EB210A46
:206800000039F9EBCD5F2BE521B0E3E5CD0429D1D1CDE49A02007E20202056 2E253033644F
:2068200020202530347800C52100000100001100000A5F190CC23168043EA0B8C23168C180
:20684000C9CD9E9AF8FF210C0009CDF498E5CD6825D123CD9499CA28696960360023360004
:20686000CDF298110200CD2699C27B68C31B69C5CDF29823D1CDFD98C360682104000936D5
:20688000002336002106 0009E5CDF298110008CD9F99110500CD9F99EB2100F019D1CDFD4A
:2068A0009821020009360023360021020009CDF498110008CD2699C2CD68C3F6682102 0020
:2068C0 0009E5CDF49823D1CDFD98C3AA6821040009E5CDF498E521060009E5CDF49823D193
:2068E000CDFD982BCDEC9821FF00CD1199D119D1CDFD98C3BD68CDF298292 9EB21B0E319BD
:20690000E5212D69E521040009CDF498E5210300E5CDAA93D1D1D1D1C36F68CD5F2BE5213C
:20692000B0E3E5CD0429D1D1CDE49A080025303478 00CD739A21040009CDF498E5CD68254F
:20694000D123CD9499CA5E6921040009CDF498E5210300E5216069E5CDC11CD1D1D1C1C9CD
:20696000504859532E204E554D4245523F00CD739A21040009CDF49829EB211DE419CDF40C
:206980009822B9E42A07E8110800 19CDE69822BBE421050022BDE4E5CD7302D122BFE42A79
:2069A0007E811090019 36152A07E811040019E521040009CDF498D1CDFD98CDC069C1C904
:2069C00021B0E3E5212E6AE52AB9E4E52ABBE4E5210400E5CDAA93EB210A0039F9EB2ABDF9
:2069E000E4E5210900E5CD3A6AD1D12ABFE4E5210C00E5CD3A6AD1D12A05E8110A00EBCDEB
:206A0000C399113000197D32BFE32A05E8110A00EBCDC399EB113000197D32C0E3CD5F2B38
:206A2000E521B0E3E5CD0429D1D1CD6119C97E2530347520253032752000CD739A21040075
:206A400009CDF498EB21B0E319E521636AE521060009CDF498E5210300E5CDAA93D1D1D170
:206A6000D1C1C9253032782000CD9E9AFCFF21020009E52A07E8110400 19CDF498D1CDFD50
:206A800098CD663023CD9499CA9A6A21020009CDF498E5CD337DD1C3ED6AC521020009CD80
:206AA000F498E5CD3126D1D1CDFD9811FF00CD2099CABF6ACDF298E5CD206BD1C3ED6A2114
:206AC0007800E5CD7119D123CD9499CAED6A2AB9E411000419E52ABBE4E5CDD001D1D12A01
:206AE000BDE4E5CD7302D122BFE4CDC069CDE49A0400CD9E9AFEFFC52AB9E4E52A09E8E580
:206B0000CD6677D1D1D1CDFD98CDF298110900 19E521060009CDF498D17D12CDE49A020051
:206B2000CD9E9AFEFF21060009CDF498C38D6C2ABBE42B22BBE4110000CD2699CA456B2121
:206B40000F0022BBE4CDC069C3C86C2AB9E411000419E52ABBE4E5CDD001D1D1CD0C0221B4
:206B60001700E5CDF26AD1C3C86C2AB9E411000419E52ABBE4E5CDD001D1D1210100E5CD8C
:206B80004E02D1211700E5CDF26AD1C3C86C2AB9E4E52ABBE4E5CDD001D1D1210100E5CD58
:206BA0004E02D1211700E5CDF26AD1C3C86C2AB9E411000419E52ABBE4E5CDD001D1D1CD11
:206BC000F90121FFFFE5CDF26AD1C3C86C2AB9E411000419E52ABBE4E5CDD001D1D12102DB
:206BE00000E5CD4E02D121FFFFE5CDF26AD1C3C86C2AB9E4E52ABBE4E5CDD001D1D1210210
:206C000000E5CD4E02D121FFFFE5CDF26AD1C3C86C2AB9E42322B9E4CDC069C3C86C2ABB31
:206C2000E42322BBE4111000CD1899CA346C21000022BBE4CDC069C3C86C2ABDE42322BDE7
:206C4000E4CDC069C3C86C2ABBE42B22BBE4111000CD1899CA5D6C21000022BBE42ABBE4D1
:206C600023CD9499CA6D6C210F0022BBE4CDC069C3C86C2AB9E42B22B9E4CDC069C3C86CD8
:206C80002ABDE42B22BDE4CDC069C3C86CCD349A0D000C00806C0B00736C0A00476C0900FE
:206CA0003A6C08001E6C0700116C0600F16B0500CD6B0400AE6B03008E6B02006A6B010038
:206CC0004B6B00002F6BC86CCDE49A0200CD739A2A07E811040019E521040009CDF49829 2D
:206CE000EB211DE419CDF498D1CDFD98CD5F2BE521116DE5210000E5CD0126D1D1D1210490
:206D00000009CDF498E5210500E5CDC41DD1D1C1C97E434F4E4E454354494F4E2054494DCF
:206D2000453F00CD9E9AFEFF21060009CDF49829EB211DE419CDF49822C1E42A07E81106A5
:206D4000001936402336 1F2A07E811090019361921060009CDF498E5CD2A7FD1CD5F2B2B5A
:206D600029EB21AAE319360023360 0CDBC11CDE49A0200CD9E9AF6FF21040009E52A07E89C
:206D80002323CDF498D1CDFD9821060009E52A07E811040019CDF498D1CDFD9821080009 07
:206DA000E52A07E811060019CDF498D1CDFD98CD663023CD9499CAE46DC521060009CDF4C3
:206DC00098E52A09E8E5CD6677D1D1D1CDFD98CDF2981109001936FF2A07E8110900193675
:206DE000FFC383702108 0009CDF49811401FCD1899CA416EC521060009CDF498E52A09E89E
:206E0000E5CD6677D1D1D1CDFD98CDF29811090019361721060009CDF49811000419E5217A
:206E2000000000E5CDD001D1D1CD0C02CD61192A07E811060019E5CDF49823D1CDFD98C383E8

:206E40007021080009CDF49811411FCD1899CA746E213C00E5CD7119D1CD9499C283702162
:206E60008000936FF2336FF2A07E81106001936FF2336FF21020009E521060009CDF49804
:206E800011000419E5210000E5CDD001D1D1111800CD1199D1CDFD9821020009CDF4981130
:206EA0001800CD1899CAF46F21080009CDF49823CD9499CA076F2AC1E4CD9499CAC56E2140
:206EC000B40022C1E42A07E811060019360023360021060009CDF49811000419E5210000A2
:206EE000E5CDD001D1D1CD0C0221040009CDF49811000419E5210000E5CDD001D1D1CD0CD9
:206F000002CD6119C383702AC1E42929E5CD7119D123CD9499CA276F2A07E81106001936 48
:206F2000FF2336FFC3F16F2AC1E4E5CD7119D123CD9499CAF16F21080009CDF49811110007
:206F4000CD2699CA666F2A07E811060019E5CDF49823D1CDFD9821080009E5CDF49823D1C5
:206F6000CDFD98CD611921080009CDF498111000CD2699CAB16F21060009CDF498110004A8
:206F800019E521080009CDF498E5CDD001D1D1CD0C0221040009CDF49811000419E52108A5
:206FA0000009CDF498E5CDD001D1D1CD0C02C3F16F21080009CDF498111000CD1899CAF167
:206FC0006F21060009CDF49811000419E5210000E5CDD001D1D1CDF90121040009CDF49812
:206FE00011000419E5210000E5CDD001D1D1CDF901C38370210 20009CDF498CD9499CA83EF
:207000007021080009CDF49811FFFFCD2099CA8370C521060009CDF498E52A09E8E5CD66BD
:2070200077D1D1D1CDFD98CDF2981109001936FF21060009CDF49811000419E5210000E5A3
:20704000CDD001D1D1CDF9012A07E811040019E5CDF49823D1CDFD982A07E811040019CD3A
:20706000F998210002CD3099CA77702A07E81104001936052336002A07E81106001936407B
:2070800023361FCDE49A0A00CD9E9AFEFF2A07E8110A0019E521060009CDF498D1CDFD9833
:2070A0002A07E811040019E521060009CDF49829EB211DE419CDF498D1CDFD982A07E81116
:2070C000900193622C52A07E811040019CDF498E52A09E8E5CD6677D1D1D1CDFD98CDF2AE
:2070E0009811090019361 7CDE49A0200CD9E9AFCFFC52A07E8110A0019CDF498D1CDFD988D
:20710000CD663023CD9499CA3F7121020009E52A07E811040019CDF498E52A09E8E5CD66AC
:2071200077D1D1D1CDFD9821020009CDF4981109001936FFCDF298E5CD337DD1C381712AAD
:2071400007E811040019CDF49811000419E5210000E5CDD001D1D1110300CD11992BCD9449
:2071600099CA7471CDF298E5210D00E5CD2902D1D1C38171CDF298E5210F00E5CD2902D10F
:20718000D1CDE49A0400CD739A21040009CDF498E5210F00E5CD2902D1D12A1BE823CD9429
:2071A00099CAE27121040009CDF498E521FF1FE5CDD238D1D12A07E82323CDF498221BE833
:2071C0002A07E811040019E521040009CDF498D1CDFD9821040009CDF498E5CD5975D1C32E
:2071E000EE7121040009CDF498E5CD2A7FD12A07E811090019361AC1C9CD9E9AFEFF69608C
:20720000360023360CDF298114000CD2699C22172C32E72C5CDF29823D1CDFD982BC3058E
:2072200072CDF298EB21C3E41936FFC31472CDE49A0200CD9E9AFEFF2A07E82323CDF9982F
:207240002A1BE8CD1899CA8D72215000E5CD7119D123CD9499CA8A722A07E81106001936DA
:2072600001233600CD61192A07E811090019E52A07E811040019CDF4987CB5CA8472210486
:2072800000C38772210300D17D12C3C7722A1BE823CD9499CABD72C5CD8B36D1CDFD9811D8
:2072A000FFFFCD2099CABA72CDF298E5CD8671D1CDF298EB212FE8193618C3C772CD663043
:2072C00023CD9499CAC772CDE49A0200CD739A2A03E5110700CD2799CAE4722A03E5113E2F
:2072E00000CD2699CA08732A03E5232203E52BEB21C3E419360A2A03E5EB21C3E419360033
:2073000021C3E4E5CDA801D121FFFF221BE8C1C9CD739A21040009CDF498EB2131E819CD3F
:20732000E69811300019E5CDC473D1C1C9CD739A215100E5CDC473D1C1C9CD739A212E0078
:20734000E5CDC473D1C1C9CD739A210700E5213B00E5213C00E521040009CDF498E5CDED59
:2073600073D1D1D1D1C1C9CD739A210600E5213C00E5213D00E521040009CDF498E5CDED3B
:2073800073D1D1D1D1C1C9CD739A210600E5213D00E5213E00E521040009CDF498E5CDED19
:2073A00073D1D1D1D1C1C9CD739A215A00E5CDC473D1C1C9CD739A3A06FACDE798E5CDC41D
:2073C00073D1C1C9CD739A2A03E5113E00CD2699CAEB732A03E5232203E52BEB21C3E419BA
:2073E000E521040009CDE698D17D12C1C9CD9E9AFEFFC521060009CDF498EB2131E819CDEA
:20740000E698D1CDFD98CDF298110300CD9F99E5CDF298EB210C0009CDF498CD2F99CA2B0B
:2074200074210A0009CDE698C3327421080009CDE698D119E5CDC473D1CDE49A0200CD7342
:207440009A21040009CDF498E521FF1FE5CDD238D1D1CD61192A07E811090019361AC1C91C
:20746000CD739A2A03E5113E00CD2699CA7C742A03E5EB21C3E419360AC38374210A007D0B
:207480003201E52A03E5232203E5EB21C3E419360021C3E4E5CDA801D121040009CDF49818
:2074A000E5CD5975D1C1C9CD739A2A03E5113E00CD2699CAE4742A03E5EB21C3E4193620D4
:2074C0002A03E5232203E521040009CDF498EB2131E819CDE698E521040009CDF498E5CD3F
:2074E000827ED1D1C1C9CD739A2A03E52B2203E52A03E5110600CD2099C20975C330752ABE
:2075000003E52B2203E5C3F0742A03E5EB21C3E419CDE698112000CD1899CA2A752A03E5D4
:20752000EB21C3E41936FFC32D75C33075C3FF742A03E5EB21C3E41936FF21040009CDF445
:2075400098EB2131E819CDE698E521040009CDF498E5CD827ED1D1C1C9CD739ACDF971218E
:20756000C3E4E5218875E52A07E82323CDF498E5CD6222D1E5210300E5CDAA93D1D1D1D181
:20758000210700 2203E5C1C93C2025303475200031 0000CD8B76CDC602CD481BCDA01BCD9C
:2075A0006C18CDC602CD110CCDC602CDEB1BCDC602CDD043CD6044CDB0922100002225E41F
:2075C0002100002227E421000022AAE321000022ACE321000022AEE321FFFF7D3231E821DF
:2075E000FFFF7D3232E821FFFF2217E821FFFF221BE421FFFF2213E821000022 15E82103A4
:2076000000220FE821FFFF221DE821FFFF2218E8210300E5217C76E5CD0429D1D121010008
:20762000E5210100E5CD8D2CD1D1210200E5210100E5CD8D2CD1D1CD0D2121FFFF2207E8D4
:20764000CDC602CD83022A14E02211E8CD2E5ACDB62ACD7228CDBC54CDA355CDE7562A11E7
:20766000E8E5CD4D19D1110600CD2699CA7876CDBD78CD1D83C35E76C34076C92054656C51
:207680006563656E7465722049 5600CD9E9AFEFF2100002205E821FFFF2209E821FFFF22A0
:2076A00007E82105E5220BE8696036002 33600CDF298113F00CD3099C2CB76C35B77C5CDFC
:2076C000F29823D1CDFD982BC3AF76CDF298110C00CD9F99EB2105E519E5CDF29823110CB3
:2076E00000CD9F99EB2105E519D1CDFD98CDF298110C00CD9F99EB2105E51923 2336FF231D
:2077000036FFCDF298110C00CD9F99EB2105E51911040019 36FF2336FFCDF298110C00CDB0
:207720009F99EB2105E5191106001936FF2336FFCDF298110C00CD9F99EB2105E5191108A4

:20774000001936FFCDF298110C00CD9F99EB2105E5191109001936FFC3BE7621FFFF22F9BA
:20776000E7CDE49A0200CD9E9AFEFF21060009CDF49823CD9499C28F7721060009CDF498DC
:207780002323CDF99821080009CDF498CD2699CA9B772A05E8114000CD2699CAAE77C52189
:2077A00009E8E5CD6578D1D1CDFD98C3417821060009CDF49811FFFFCD2099CA1E78210624
:2077C0000009CDF4982323CDF99821080009CDF498CD1899CAE17721060009CDF498C35ECE
:2077E00078C521060009CDF498CDF498D1CDFD98CDF29823CD9499C20C78CDF2982323CD13
:20780000F99821080009CDF498CD2699C21E7821060009E5CDF298D1CDFD98C3AE772A05B2
:20782000E8114000CD1899CA307821FFFFC35E78C521060009CDF498E5CD6578D1D1CDFD1E
:2078400098CDF2982323E521080009CDF498D1CDFD98CDF2981109001936FFCDF2987CB509
:20786000CDE49A0200CD9E9AFEFFC52A0BE8D1CDFD982A0BE8CDF498220BE8CDF298E5218C
:2078800060009CDF498CDF498D1CDFD9821060009CDF498E5CDF298D1CDFD982A05E823C2
:2078A0002205E8EB2A10E0CD2699CAB3782A05E82210E0CDF2987CB5CDE49A02002A05E81E
:2078C000CD9499CACC78CD8B76C3887A2A07E823CD9499CAE2782A09E82207E82109E82253
:2078E00033E82A07E81109001 9CDE698C3EA79CDED92C3797ACDF87AC3797A210000E5CDE6
:20790000337DD1C3797A210100E5CD337DD1C3797A210000E5CDD283D1C3797A210100E56F
:20792000CDD283D1C3797ACD2435C3797ACDDB33C3797ACD9989C3797ACD6630C3797ACDA6
:207940000C31C3797ACDD18CC3797ACD1E83C3797ACDF18EC3797A210000E5CDDA31D1C3BC
:20796000797A210100E5CDDA31D1C3797ACDF860C3797ACDA05AC3797ACDDE5EC3797ACDC7
:20798000C60C3797A2A07E81109001 9CDE698E5CD0047D1C3797ACD0349C3797ACD9F640F
:2079A000C3797ACDC349C3797ACD696AC3797ACDEC70C3797ACD7362C3797ACDC567C379C0
:2079C0007ACD736DC3797ACD3372C3797ACDC346C3797ACD9B3CC3797A2A33E82207E82A3C
:2079E00033E8E5CD897AD1C3797ACD349A22002100D3791F00CD791A00C7791900C17917DD
:207A00000BB791600B5792200AF791500A9791400A37913009D791E00977912008579 11C5
:207A2000085791000857 90F007F790E0079790D0073790C006D79200062790B0057790A68
:207A400005179090 04B7908004579020 03F790700397906003379 1D002D791C0027791B0A
:207A60001C790500117904000 6790300FB780100F5780000EF78D9792A07E82233E82A42
:207A8000 7E8CDF4982207E8C9CD9E9AFEFFC521060009CDF498CDF498D1CDFD98CDF29891
:207AA000232336FF2336FFCDF2981106001936FF2336FFCDF2981104001936FF2336FFCD00
:207AC000F2981108001936FF21060009CDF498E5CDF298CDF498D1CDFD98CDF298E52A0BF3
:207AE000E8D1CDFD98CDF298220BE82A05E82B2205E823CDE49A0200CD9E9AF0FF21060023
:207B00009E52A07E82323CDF498D1CDFD9821040009E52A07E81106001 9CDF498D1CDFD3C
:207B20009821080009E521060009CDF498E5CDF822D1D1CDFD9821080009CDF49811FF00A2
:207B4000CD1199CD9499CA557B2A07E811090019 3600C3B17C21020009E521080009CDF4A4
:207B600098110F00CD1199D1CDFD98210A0009E521040009CDF498110300CD1199D1CDFDDD
:207B800098110300CD2099CAAB7B21060009CDF498E521080009CDF498E5210A0009CDF4F0
:207BA00098E5CDB67CD1D1D1C3B17C21040009CDF498111800CD1199111800CD1899C2CE88
:207BC0007B21020009CDF498110500CD1899CAA87C21020009CDF498C3867C21060009CDDC
:207BE000F498E521080009CDF498E5210000E5CDB67CD1D1D1C3A57CC5CD9E19D1CDFD98CC
:207C000011FFFFCD2099CA487C2A07E81108001 9E5CDF298D17D122A07E811060019 3600DB
:207C2000233600CD61192A07E811090019360ACDF298E5210100E5210100E5CD5F1AD1D1E6
:207C4000D12A08E0232208E0C3A57CCD362F11FFFFCD2099CA837CCD972F21020009CDF420
:207C600098110500CD1899CA747C2A06E0232206E0C37B7C2A04E0232204E0210100E5CD1E
:207C80006A93D1C3A57CCD349A06000500 4B7C01004B7C0700F87B0400F87B0300DB7B02B1
:207CA00000DB7BA57CC3B17C2A07E81109001 93600CDE49A1000CD739A21080009CDF4981B
:207CC000E521040009CDF498E521060009CDF498E5CD7117D1D1E521040009CDF498E5217C
:207CE00060009CDF498E5CD1118D1D1E5CD6C0DD1D1D111FFFFCD2099CA317D2A07E811CA
:207D00009001936 08CDBC11CD61192A07E811060019360023360 02A0AE023220AE02A07D6
:207D2000E811040019E521040009CDF498D1CDFD98C1C9CD9E9AFCFF21020009E52A07E8DA
:207D40002323CDF498D1CDFD98CD663023CD9499CACF7D21080009CDF498E5CD2A7FD12ADA
:207D60001BE8EB21020009CDF498CD1899CA7C7D21080009CDF498E5CDCC72D12A1BE4EBEF
:207D800021020009CDF498CD1899CA937D21FFFF221BE4C52A07E81106001 9CDF99821013S
:207DA0000CD5F99110300CD1199D1CDFD98CDF2981100 00CD2099CACC7DCDF2982B29EBA9
:207DC00021AAE31936002336 00CDBC11C37D7EC521080009CDF498E5CD3126D1D1CDFD9898
:207DE00011FF00CD2099CA137E21080009CDF498EB2131E819E5CDF298D17D12CD6119CD19
:207E0000F298E521080009CDF498E5CD927ED1D1C37D7E2A07E81106001 9CDF998210100 8D
:207E2000CD1199CD9499CA7D7E2A0CFA117800CD2F99CA417E2A0CFAE5CD7119D123CD9474
:207E400099C26B7E21100EE5CD7119D123CD9499CA6B7E21020009CDF498E5CDF822D1118F
:207E60000F00CD1199110500CD1899CA7D7E21080009CDF498E5CD2A7FD1CD548CCDE49A74
:207E8000400CD9E9AFCFFC521080009CDF498EB212FE819CDE69829EB21D70819CDF49881
:207EA000D1CDFD98C3B77EC5CDF2981105001 9D1CDFD9811FBFF19CDF298CDEC98210A0022
:207EC0009CDF498CD4199CADB7ECDF29823CDEC98210A0009CDF498CD4299CA227F2108E2
:207EE0000009CDF498EB212FE819E5CDF2982323CDE698D17D1221020009E5CDF298232309
:207F00023CDF498D1CDFD9821020009CDF498E521080009CDF498E3E5211E7FE3E9D1C3D7
:207F2000257FC3A77ECDE49A0400CD739A21040009CDF498E52A07E811080019CDE698E5A5
:207F40002 10000E5CD613CD1D1D121040009CDF498E5210F00E5CD2902D1D121040009CD28
:207F6000F49829EB210DE4193600233600C1C9CD9E9AFEFF21060009CDF498E5CD151CD1DE
:207F8000C521060009CDF498EB2131E819CDE69829EB2110FA19CDF498D1CDFD98CDF298CF
:207FA000110002CD2699CAE17F2A07E811040019E5CDF298D1CDFD982A07E811060019E514
:207FC000CDF298E5CDF822D1D1CDFD982A07E81109001 93605210600 09CDF498E5CD2A7FCF
:207FE000D1CDE49A0200CD739A2A07E811040019E521040009CDF49829EB211DE419CDF4C6
:2080000098D1CDFD9821040009CDF498E5CD2A7FD12A07E81109001 93609C1C9CD9E9AF4D4

:20802000FF21040009E52A07E82323CDF498D1CDFD9821080009E521040009CDF498E5CDF3
:20804000A042D1D1CDFD9811FFFFCD2099CA4D8121100009CDF498E5CD2A7FD121080009 1C
:20806000CDF498E5CDF041D121080009E52A07E811080019CDE698D1CDFD9821080009CD14
:20808000F49829E821C9E319CDF498110200CD1899CA4A8121 0A0009E52A09E8D1CDFD9874
:2080A000210A0009CDF49811FFFFCD2099C2C980C34A81210A0009E5210A0009CDF498CD92
:2080C000F498D1CDFD98C3A080210A0009CDF49811080019CDEC9821080009CDF498CD187E
:2080E00099CAF880210A0009CDF49811090019CDE698110D00CD1899CA4781210A0009CD6B
:20810000F49811060019E5CDF49811008 0CD0399D1CDFD98210A0009CDF498110A0019E592
:208120002A14E0D1CDFD98210A0009CDF4982323CDF49811000419E5210000E5CDD001D13A
:20814000D1CDF901C34A81C38380C3558221060009E521040009CDF498E5CDF822D1D1CD92
:20816000FD9821020009E5CD5F2BD1CDFD982108000936002336002110 0009CDF498E52175
:20818000F00E5CD2902D1D121020009CDF498110000CD2099CAAF81C521020009CDF498F1
:2081A000E5CD7A82D1D1CDFD9811FFFFCD2099CAD8812108000936FF2336FF2A07E8110468
:2081C0000019E5CDF298E5CD6222D1D1CDFD982A07E81109001936092A6AFA2BCD9499CA08
:2081E0000E822106 0009CDF498110F00CD11992BCD9499CA0E822A17E823CD9499C20E82B8
:208200002A17E8EB21040009CDF498CD1899CA258221040009CDF4982217E821100009CD25
:20822000F4982219E821080009CDF498CD9499CA3882CD548CC355822A17E8EB21040009FD
:20824000CDF498CD2099CA558221100009CDF498E5CD2A7FD1CDE49A0C002A07E82323CD5C
:20826000F9982A17E8CD1899CA79822A19E8E5CD2A7FD121FFFF2217E8C9CD9E9AFEFFC5DA
:20828000210100E521060009CDF498E5210100E5CDC00CD1D1D1D1CDFD9811FFFFCD20998E
:2082A000CAA982CDF298C3BF8221010 0E521060009CDF498E5210000E5CDC00CD1D1D17C6B
:2082C000B5CDE49A0200CD9E9AFEFFC52A07E82323CDF498D1CDFD9821060009CDF498E57C
:2082E000CD2A7FD1CDF298E5CDF822D1110F00CD11992BCD9499CA02832A6CFA110000CDCA
:208300002099CA1383CDF2982213E8CDF298E5CD1288D1CDE49A0200CD739AC1C9C9CD9E77
:208320009AFAFF21020009E5CD5F2BD1CDFD98C52A07E811040019CDF498E5CD7E22D1D1B6
:20834000CDFD98CDF298E5CDF822D1114F00CD1199CD9499CA5E83696036FF2336FF2A07C4
:20836000E811040019E5CDF298D1CDFD982A07E81109001936052102 0009CDF4981100005B
:20838000CD2099CA8F83CDF29811FFFFCD2099CACD8321020009CDF498110100CD1199115 6
:2083A0000000CD2099CAAE83CDF29822A6E321020009CDF498110200CD1199110000CD202D
:2083C00099CACA83CDF29822A8E3CDBC11CDE49A0600CD9E9AF0FFCD663023CD9499C2F1D7
:2083E000832114000 9CDF498E5CD1836D123CD9499C20D8821080009E52A07E811040019C0
:20840000CDF498D1CDFD98210A0009E52A07E82323CDF498D1CDFD9821060009E52A07E89E
:2084200011080019CDE698D1CDFD9821020009E521080009CDF498E5CDF822D1D1CDFD9820
:20844000C521080009CDF498E52A09E8E5CD6677D1D1D1CDFD98CDF29823CD9499CA663440
:20846000CD548CC30D8821040009E521020009CDF498110F00CD1199D1CDFD9821020009 69
:20848000CDF498114000CD1199110000CD2099C29F8421040009CDF498110300CD1899CA5C
:2084A000B78421040009E521040009CDF498E5CD2667D1D1CDFD9821040009CDF498C391C9
:2084C000872A07E8E5CDF298E5CD858CD1D1CDF29811060019E5CD0189D1CDFD98C3B48767
:2084E00021040009CDF498110700CD1899CA8285C300852108 0009E5CDF49823D1CDFD9880
:2085000021060009CDF498E5CDF822D1110F00CD1199110700CD2099CA2185CD2346C30D88
:2085200088210800 09CDF498E5CD6222D1EB210A0009CDF498CD1899C23E85C3F384C52186
:20854000080009CDF498E52A09E8E5CD6677D1D1D1CDFD98CDF29811090019CDEC9821FF52
:20856000FFCD2099CA7F852A07E811060019360023360 02A07E81109001936 0BC30D88C328
:20858000B685210A0009CDF498E5CDF822D1110001CD1199CD9499CAB68521020009CDF401
:2085A0009811000 1CD1199110000CD2099CAB685CD2346C30D882A07E8E5CDF298E5CD85E4
:2085C0008CD1D1CDF29811090019360DCDF29811060019360123360021 0A0009CDF498E517
:2085E000CDF822D1110002CD1199CD9499CA03862102 0009CDF498110002CD1199110000CC
:20860000CD2099CA2786CDF29811090019361 72A07E811090019362 12A07E811060019366 4
:20862000000233600C30D8821080009CDF49811000419E521060009CDF498E5CDD001D1D13D
:20864000CD0C022A0CE023220CE0C3B487210C0009E521020009CDF498110800CD6099116A
:208660001F00CD1199D1CDFD98210E0009E521020009CDF498110D00CD6099110700CD11B5
:2086800099D1CDFD98210A0009CDF498E5CDF822D1110008CD1199110000CD2099C2EF8686
:2086A000210C0009CDF498CD9499CAB786210E0009CDF498CD9499C2EF86210C0009CDF471
:2086C0009827EB2170FA19CDF498E5CD8288D123CD9499C2EF86210E0009CDF49829EB214A
:2086E000B0FA19CDF498E5CD8288D123CD9499CA33872A07E8E5CDF298E5CD858CD1D1CDA9
:20870000F29811090019360DCDF29811060019360123360021080009CDF49811000419E5A4
:2087200021060009CDF498E5CDD001D1D1CD0C02C33987CD2346C30D88C3B487C521080083
:2087400009CDF498E5CD1E4FD1D1CDFD98CDF29811090019361 4CDF29811060019361723C9
:2087600036002A1DE8EB21060009CDF498CD1899CA8287CDF298110A0019360123360 0C3F1
:208780008E87CDF298110A00193600233600C3B487CD349A070000003C8706004D86070067
:2087A000E0840500E0840400E0840200C1840100C184B48721040009CDF498110000CD2037
:2087C00099CA018821080009CDF498E5210A0009CDF498E5CD5688D1D1217BE1E5214000BB
:2087E000E521080009CDF498E5210100E5CDE42CD1D1D1D1210200E5217BE1E5CDF02ED1D6
:20880000D1210A0009CDF498E5CD1288D1CDE49A1000CD739A2A07E81106001936002336D0
:20882000000021040009CDF498E5CDF822D1110F00CD1199110500CD1899CA4B882A07E81122
:208840000090019361 6CD6119C354882A07E81109001936 0CC1C9CD739A21060009CDF49849
:20886000E521040009CDF498E5CDF822D1E5CD1F93D1E5210100E5CD820FD1D1D1CDBC1163
:20888000C1C9CD9E9AFAFFC5210A0009CDF49811FF07CD1199D1CDFD9821020009E5210A01
:2088A000000009CDF498110B00CD6099113F00CD1199D1CDFD9821040009E52A07E82323CD3B
:2088C000F998CDF298CD8199D1CDFD9821040009CDF498110000CD2F99CAEE8821040009FB
:2088E000CDF498EB21020009CDF498CD2F99CAF78821FFFFC3FA882100007CB5CDE49A06CA

```
:2089000000CD9E9AFCFFC52A14E0110500CD759923110700CD1199D1CDFD9821020009363C
:20892000002336002102000 9CDF49811080 0CD2699C24789C388E92102000 9E5CDF49823C1
:20894000D1CDFD98C32489CDF29829EB211FE819CDF998210200CD2799CA7489CDF2982973
:20896000EB211FE819E5CDF49823D1CDFD98CDF298C39289C5CDF29823110800EBCDC39996
:20898000EBD1CDFD98C33789 2A2BE823222BE82106007CB5CDE49A0400CD9E9AF8FF2106D7
:2089A00000009E52A07E811080019CDE698D1CDFD9821040009E52A07E811060019CDF99846
:2089C00021FF00CD1199D1CDFD9821020009E52A07E82323CDF4981100041 9E521060009C1
:2089E000CDF498E5CDD001D1D1D1CDFD98CDFE3823CD9499CA038A210D00E5CD0E5ED1230F
:208A0000CD9499CA278A210000E5CDB439D1210400 09CDF49829EB211FE819E5CDF4982B0B
:208A2000D1CDFD98C3E78A21020009CDF498111800CD1199111800CD1899CAB28A2A07E8E4
:208A400011060019E5CDF4981100 0119D1CDFD982A07E811060019CDF998210003CD3099E9
:208A6000CAAF8A2A07E81109001936 0C2A07E8110600193600233600210400 09CDF49829DD
:208A8000EB211FE819E5CDF4982BD1CDFD98CD0C022106000 9CDF498E5210000E52101009D
:208AA000E5CD5F1AD1D1D1210100E5CD6A93D1C3C78A2A07E811060019E5CDF49811FF00CB
:208AC000CD1199D1CDFD982A14E0110500CD7599110700CD1199EB21040009CDF498CD18F7
:208AE00099CAE78ACD0C02CDE49A0800210100E5CDEC39D1210100E5CDB439D1C9CD9E9A4A
:208B0000FCFFC52A07E82323CDF498D1CDFD98CDF298E5CDF822D1110F00CD1199110100 0D
:208B2000CD2099C2A18BCD5A82CDF298E5CDA042D111FFFFCD2099CA458B210000E5CDEC6E
:208B400039D1C3A18B21020009E52A07E811040019CDF498E52A09E8E5CD6677D1D1D1CD9C
:208B6000FD9821020009CDF49811090019CDE698111400CD1899C2A18BCD2D3911FFFFCDBD
:208B80002099C2A18BCD362F23CD9499C2A18B2A07E811080019CDE698E5CD3043D1CD9701
:208BA0002FCDE49A0400CD9E9AFCFFC3BE8B2A07E811040019E5CDF49823D1CDFD9821022D
:208BC00000009E52A07E811040019CDF498D1CDFD98C521020009CDF498E52A09E8E5CD6672
:208BE00077D1D1D1CDFD98CDF2981109 0019CDE69823CD9499C2238CCDF29811090019CD6F
:208C0000E698110800CD1899C2238C21020009CDF498E5CDF822D1110F00CD119911070 0FD
:208C2000CD1899CA2C8C210000C34D8C21020009CDF498E5CDF822D1118000CD1199CD94EC
:208C400099CA4A8C21FFFFC34D8CC3AE8B7CB5CDE49A04002A07E82323CDF498E5CDF82220
:208C6000D1110F00CD1199110500CD1899CA7B8C210100E5CDA25DD1C3848C2A07E811097D
:208C800000193607C9CD739A21040009CDF49811090019360621040009CDF4981108001 92C
:208CA000E521060009CDF49811080019CDE698D17D1221060009CDF49811080019CDE698 63
:208CC000E5210100E5210000E5CD5F1AD1D1D1C1C9CD9E9AF8FF21060009E52A07E82323EF
:208CE000CDF498D1CDFD98C521060009CDF49811000419E5210000E5CDD001D1D1D1CDFDA6
:208D000098210200 09E521060009CDF498E5CDF822D1D1CDFD98CDF29811030 0CD119911 5E
:208D20000300CD1899CA378DCDF298111800CD1199111800CD2099CAC88D2A07E81106002F
:208D400019CDF498110200CD1899CABC8D21040009E52A07E811040019CDF998210300CD54
:208D60001199D1CDFD9821040009CDF498110300CD1899CA7F8D21040009360023360021 49
:208D80000060009CDF498E521040009CDF498E521020009CDF498E5CD7117D1D1E5210400AF
:208DA0000 9CDF498E521020009CDF498E5CD1118D1D1E5CD820FD1D1D1CDBC112A07E811F0
:208DC00009001936FFC3EC8E2A07E811060019CDF498CD9499CA6F8E21F000E5CD7119D17E
:208DE00023CD9499CA6F8E2A07E8110600193601233600210200 09CDF498110F00CD11999A
:208E0000110200CD1899C2158ECDF298110300CD1199CD9499CA2B8E21020009CDF4981167
:208E200000002CD1199110000CD2099C2518ECDF298110300CD11992BCD9499CA518E2102AE
:208E40000009CDF498110020CD1199110000CD2099CA608E2A07E811060019360223 3600DF
:208E60002A07E811040019E5CDF298D1CDFD9821040009E52A07E811040019CDF998210360
:208E800000CD1199D1CDFD98E5CDF298110300CD1199D1CD2099CAEC8E21040009E5CDF2F4
:208EA0009811030 0CD1199D1CDFD9821040009CDF498110300CD2099CAEC8E21060009CDFA
:208EC000F498E521020009CDF498E521040009CDF498E5CDB67CD1D1D12A07E811040019 92
:208EE000E521040009CDF498D1CDFD98CDE49A0800CD9E9AF6FF21060009E52A07E8232312
:208F0000CDF498D1CDFD9821080009E521060009CDF498E5CDF822D1110F00CD1199D1CD53
:208F2000FD9821040009E52A07E811080019CDE698D1CDFD9821060009CDF4981100041909
:208F4000E5210000E5CDD001D1D1111800CD1199111800CD1899CA5C8FCD6119215802E543
:208F6000CD7119D123CD9499CA798FCD08922101 00E5CDB439D1C34F912A07E811060019F5
:208F8000CDF498110600CD1899CA9C90C52A07E811040019CDF498E52A09E8E5CD6677D128
:208FA000D1D1CDFD98CDF29811090019CDE698110C00CD1899CA059021060009CDF4981144
:208FC00000000419E521040009CDF498E5CDD001D1D1CD0C0221040009CDF498E5210000E596
:208FE00021FFFFE5CD5F1AD1D1D12A07E81106001936002336002A07E811090019360DCD80
:20900000892C399902108000 9CDF498110400CD1899CA1E902A13E811FFFFCD2099CA9917
:2090200009021040009CDF498E521FFFFE521FFFFE5CD5F1AD1D1D1C52A13E8E52A09E8E5A4
:20904000CD6677D1D1D1CDFD9821040009E5CDF29811080019CDE698D1CDFD982A07E8114D
:209060000080019E521040009CDF498D17D122A07E811040019E52A13E8D1CDFD982104005A
:20908000 09CDF498E5210100E5210100E5CD5F1AD1D1D121FFFF2213E8C34F9121080009B1
:2090A000CDF498110400CD1899CABE902A07E811040019E52A00FAD1CDFD98C3D6902A07CF
:2090C000E811040019E521060009CDF498E5CD6222D1D1CDFD9821080009CDF498E5CD5441
:2090E00091D1CD9499CA4F912A07E8110600193606233600C52A07E811040019CDF498E542
:20910000CD1E4FD1D1CDFD98CDF29811060019E5CD0189D1CDFD982A07E8E5CDF298E5CD14
:20912000858CD1D121080009CDF498110400CD1899CA3D912A6CFA110000CD2099CA4F91F5
:209140002A15E8232215E8211022E5CDD502D1CDE49A0A00CD9E9AFEFFC5CDA68BD1CDFD44
:20916000098CDF298CD9499CA7091CDF298C3019221060009CDF498110700CD1899CAAA916A
:209180002A6CFA2BCD9499CA909121FFFFC301922A07E811040019E52A00FAD1CDFD982116
:2091A0000400E5CD5491D1C301922A07E811040019E5CDF49823D1CDFD982A07E811040 0E4
:2091C00019CDF498E5CDF822D1110F00CD11992BCD9499C2EC91C3FE912A07E811040019EC
```

```
:2091E000E5CDF49823D1CDFD98C3BA91CDA68BCD9499CAFB91210000C30192C3D99121FFBB
:20920000FF7CB5CDE49A02002A15E8110000CD2099CA29922A15E82B2215E5CD9499CA2930
:209220009221102 4E5CDD502D1C9CD9E9AFEFF2A0FE81100FC19220FE8E52A35E8E5CD667E
:2092400077D1D12235E811FFFFCD2099CA5D922A35E81109001 9CDE69823CD9499CAA5927F
:20926000C52A0FE81100041 9E5210000E5CDD001D1D1111B00CD1199D1CDFD98CDF298EB97
:209280003A37E8CDE798CD2099C2AB922A35E81106001 9E5CDF298D1CDFD982A35E811095D
:2092A000001936012A02E0232202E0CDE49A0200CD9E9AFEFF69603600233600CDF298111C
:2092C0000800CD2699C2D792C3E892C5CDF29823D1CDFD98C3BC92CDF29829EB211FE81763
:2092E0003600233600C3CB92CDE49A02002A07E82323CDF498110004 19E5210000E5CDD004
:2093000001D1D1111800CD1199111800CD2099CA1E93CDF9012A07E81109001936FFC9CD02
:209320009E9AFEFF69603600233600210600 09CDF49811004 0CD1199B5CA4593C5CDF298DC
:2093400023D1CDFD98210600 09CDF49811008 0CD1199B5CA6093C5CDF2982323D1CDFD981F
:20936000CDF2987CB5CDE49A0200CD739A217BE1E5214000E52A07E82323CDF498E52104D4
:209380000009CDF498E5CDE42CD1D1D1D1EB21040009CDF498CD2099CAA8932102 00E5213F
:2093A0007BE1E5CDF02ED1D1C1C9CD559A21040009CDF49829EB2104000 91922F4E8CDF4F8
:2093C0009822F6E8360021DD93E52AF6E8E52AF4E8282BE5CD1494D1D1D1CDAB9ACD739A47
:2093E00021040009E5CDF49823D1CDFD982BCDE6987CB5C2E09321040009CDF4982BE52117
:20940000060009CDE698D17D1221040009CDF4983600C1C9CD7D9A80FF21860009CDF498DF
:2094200022F6E8218800 09CDF49822F4E8218400 09CDF49822FCE82B2B22FCE82323CDF4B3
:209440009822E4E82AE4E82322E4E82BCDE69822FAE87CB5CACF962AFAE8112500CD1899E5
:20946000CAB796696022F8E821060022F2E821000022EAE822ECE82AE4E8CDE698112D005D
:20948000CD1899CA93942AE4E82322E4E8210100 22ECE82AE4E8CDE6981130 00CD1899CA74
:2094A000A8942130 00C3AB94212000 22EEE82AE4E8CDE698E5CDD398D1CAC79421E4E8E5BE
:2094C000CDF197D1C3CA9421000022F0E82AE4E82322E4E82BCDE69822FAE8112E00CD1885
:2094E00099CA039521E4E8E5CDF197D122F2E8210100 22EAE82AE4E82322E4E82BCDE698EA
:2095000022FAE82AFAE8E5CD9F98D1C3959621F6FF22E8E8C32F95210A0022E8E8C32F9560
:209520002110 0022E8E8C32F95210800 22E8E82AFCE82B2B22FCE82323CDF498E52AF8E86E
:20954000E52AE8E8E5CDD496D1D1D12AF0E8E52AF8E8E5CD8898D1D1CD819922F0E8C3E9AB
:20956000952AF8E82322F8E82BE52AFCE82B2B22FCE82323CDF498D17D122AF0E82B22F06F
:20958000E8C3E4952AEAE8CD9499CA9395218000 22F2E82AFCE82B2B22FCE82323CDF49819
:2095A00022E6E82AE6E8CDE6987CB5CAB9952AF2E87CB5CAB99521010 0CAE4952AF8E82350
:2095C00022F8E82BE52AE6E82322E6E82BCDE698D17D122AF2E82B22F2E82AF0E82B22F02E
:2095E000E8C3A3952AF8E83600696022F8E82AECE8CD9499CA1F962AF0E82B22F0E81100CE
:209600000 0CD2F99CA1F962AF4E8E52AEEE8E3E52AF6E8E3E5211A96E3E9D1D1C3F7952AFB
:20962000F8E8CDE6987CB5CA4A962AF4E8E52AF8E82322F8E82BCDE698E3E52AF6E8E3E5FC
:2096400021459 6E3E9D1D1C31F962AECE87CB5CA7A962AF0E82B22F0E8110000CD2F99CA88
:209660007A962AF4E8E52AEEE8E3E52AF6E8E3E521759 6E3E9D1D1C35296C3B4962AF4E8FF
:20968000E52AFAE8E3E52AF6E8E3E5219096E3E9D1D1C3B496CD349A0600530084954300 2F
:2096A00061954F00299558002095550017954400 0E957D96C3CC962AF4E8E52AFAE8E3E5BB
:2096C0002AF6E8E3E521CA96E3E9D1D1C34494CDC49A8000CD559A21080009CDF49811002D
:2096E00000CD2699CAF49621040009CDF49811F6FFCD1899CA0D972101 0022FAE8210800C2
:2097000009CDF498CD889922F4E8C31D972100 0022FAE8210800 09CDF49822F4E8210400B1
:2097200009CDF49811F6FFCD1899CA36972104000936 0A2336002106000 9CDF49822F8E35A
:2097400022F6E82AF6E8E52AF4E8EB21040009CDF498CDF599EB113000 19D17D121139005A
:20976000CD2799CA74972AF6E8E5CDE69811070019D17D122AF6E82322F6E82AF4E8EB2181
:20978000040009CDF498CDF59922F4E8110000CD3999C243972AFAE87CB5CAA7972AF6E871
:2097A0002322F6E82B362D2AF6E836002AF6E82B22F6E8EB2AF8E8CD3899CAE5972AF8E8A4
:2097C000CDE69822FCE82AF8E82322F8E82BE52AF6E8CDE698D17D122AF6E8E52AFCE8D17A
:2097E0007D12C3AC97210600 09CDF4987CB5CDAB9ACD559A21000022F4E8210400 09CDF43E
:2098000098CDF49822F6E82AF6E8CDE698E5CDD398D1CA36982AF4E8110A00CD9F99E52A49
:20982000F6E82322F6E82BCDE698D11911D0FF1922F4E8C30798210400 09CDF498E52AF6E2
:20984000E8D1CDFD982AF4E87CB5CDAB9ACD559A210600 09CDF49822F4E82AF4E8E5210451
:20986000000009E5CDF49823D1CDFD982BCDE698D17D12B4CA80982AF4E82322F4E8C35A9803
:209880002AF4E87CB5CDAB9A210200395E2356210000 1A87CA9C981323C392987CB5C9CD72
:2098A000559A21040009CDF49822F4E8116100CD2F99CABE982AF4E8117A00CD3099CACB51
:2098C000982AF4E811E0FF19C3CE982AF4E87CB5CDAB9A21020039 7EFE30DAE098FE3AD805
:2098E000AF676FC969607E6F079F67C97E5F079F57C969607E23666FC95E2356C97D1213A1
:209900007C12C97DB36F7CB267C97DAB6F7CAA67C97DA36F7CA267C9CD5499C24A99B5C94C
:20992000CD5499C02DC9EBCD4C99D24A99B5C9EBCD4C99DA4A99B5C9EBCD5499D24A99B500
:20994000C9EBCD5499DA4A99B5C92DC97AEE80577CEE80677ABCC25B997BBD210100C9EBDE
:209960001DF87C177C1F677D1F6FC36099EB1DF829C36E99EB1DF87C871F677D1F6FC37587
:20998000997B956F7A9C67C9CD8D9923C97C2F677D2F6FC97CB5CA9D99AF676FC92CC9C55B
:2099A000444D210000790FD2AB9919AF781F47791F4FB0CAC199AF7B175F7A1757B3C2A554
:2099C00099C1C97CB5C2CB995D54C9C57CAAF57CB7F2D799CD88997AB7F5F2E299EBCD885D
:2099E00099EBCDFD99F1F2EE99EBCD8899EBF1C1F0CD8899C97CB5C2FD995D54C9C5444DA0
:209A00003E10F5EB110000297B175F7A1757B3CA299A7AB8DA299AC21F9A7BB9DA299A7D2D
:209A2000F6016F7B915F7A9857F13DCA329AF5C3079AC1C9EBE1C54E230DFA4E9A237EBBF8
:209A400023C2499A7EBACA4E9A2323C3399A237E23666FC1E9D1C5210000 39444D2AF4E8AE
:209A6000E52AF6E8E52AF8E8E52AFAE8E52AFCE8E5E8E9D1C5210000 39444DEBE9E1C55E14
:209A80002356 23EB39F9444D2AF4E8E52AF6E8E52AF8E8E52AFAE8E52AFCE8E5EBE9E1C557
:209AA0005E235623EB39F9444DEBE9EBE1E122FCE8E122FAE8E122F8E8E122F6E8E122F4D7
:209AC000E8EBC1C9EBC1E122FCE8E122FAE8E122F8E8E122F6E8E122F4E80A6F030A6739E8
```

:0F9AE00CF9EBC1C9EBE17E23666F39F9EBC1C920
:00759001FA

APPENDIX V.

STANDARD EEPROM PROGRAMMING
EQUIPMENT LIST: SC25 0,1
SCC25 1
LLM16 0,1
PCH 10-11-85
FILE NAME: STD2.DAT
Ks

| | | | | |
|---|---|---|---|---|
| 0 | N:9999 | A: | B: | Z:1 |
| 1 | N:10000 | A: | B: | Z:1 |
| 2 | N:10001 | A: | B: | Z:1 |
| 3 | N:10002 | A: | B: | Z:1 |
| 4 | N:10003 | A: | B: | Z:1 |
| 5 | N: 105 | A:1 | B:12345678 | Z:1 |
| 6 | N: 106 | A:1 | B:12345678 | Z:1 |
| 7 | N: 107 | A:1 | B:12345678 | Z:1 |
| 8 | N: 108 | A:1 | B:12345678 | Z:1 |
| 9 | N: 109 | A:1 | B:12345678 | Z:1 |
| 10 | N: 110 | A:1 | B:12345678 | Z:1 |
| 11 | N: 111 | A:1 | B:12345678 | Z:1 |
| 12 | N: 112 | A:1 | B:12345678 | Z:1 |
| 13 | N: 113 | A:1 | B:12345678 | Z:1 |
| 14 | N: 114 | A:1 | B:12345678 | Z:1 |
| 15 | N: 115 | A:1 | B:12345678 | Z:1 |
| 16 | N: 116 | A: 2 7 | B: 345 78 | Z:1 |
| 17 | N: 117 | A: 2 7 | B: 345 78 | Z:1 |
| 18 | N: 118 | A: 2 7 | B: 345 78 | Z:1 |
| 19 | N: 119 | A: 2 7 | B: 345 78 | Z:1 |
| 20 | N: 120 | A: 2 7 | B: 345 78 | Z:1 |
| 21 | N: 121 | A: 2 7 | B: 345 78 | Z:1 |
| 22 | N: 122 | A: 2 7 | B: 345 78 | Z:1 |
| 23 | N: 123 | A: 2 7 | B: 345 78 | Z:1 |
| 24 | N: 124 | A: 2 7 | B: 345 78 | Z:1 |
| 25 | N: 125 | A: 2 7 | B: 345 78 | Z:1 |
| 26 | N: 126 | A: 2 7 | B: 345 78 | Z:1 |
| 27 | N: 127 | A: 2 7 | B: 345 78 | Z:1 |
| 28 | N: 128 | A: 2 7 | B: 345 78 | Z:1 |
| 29 | N: 129 | A: 2 7 | B: 345 78 | Z:1 |
| 30 | N: 130 | A: 2 7 | B: 345 78 | Z:1 |
| 31 | N: 131 | A: 2 7 | B: 345 78 | Z:1 |
| 32 | N: 132 | A: 7 | B: 345 78 | Z:1 |
| 33 | N: 133 | A: 7 | B: 345 78 | Z:1 |
| 34 | N: 134 | A: 7 | B: 345 78 | Z:1 |
| 35 | N: 135 | A: 7 | B: 345 78 | Z:1 |
| 36 | N: 136 | A: 7 | B: 345 78 | Z:1 |
| 37 | N: 137 | A: 7 | B: 345 78 | Z:1 |
| 38 | N: 138 | A: 7 | B: 345 78 | Z:1 |
| 39 | N: 139 | A: 7 | B: 345 78 | Z:1 |
| 40 | N: 140 | A: 7 | B: 345 78 | Z:1 |
| 41 | N: 141 | A:12 | B: 345 78 | Z:1 |
| 42 | N: 142 | A:12 | B: 345 78 | Z:1 |
| 43 | N: 143 | A:12 | B: 345 78 | Z:1 |
| 44 | N: 144 | A:12 | B: 345 78 | Z:1 |
| 45 | N: 145 | A:12 | B: 345 78 | Z:1 |
| 46 | N: 146 | A:12 | B: 345 78 | Z:1 |
| 47 | N: 147 | A:12 | B: 345 78 | Z:1 |
| 48 | N: 148 | A:12 | B: 345 78 | Z:1 |
| 49 | N: 149 | A:12 | B: 345 78 | Z:1 |

| | | | | |
|---|---|---|---|---|
| 50 | N: 150 | A:12 | B: 345 78 | Z:1 |
| 51 | N: 151 | A:12 | B: 345 78 | Z:1 |
| 52 | N: 152 | A:12 | B: 345 78 | Z:1 |
| 53 | N: 153 | A:12 | B: 345 78 | Z:1 |
| 54 | N: 154 | A:12 | B: 345 78 | Z:1 |
| 55 | N: 155 | A:12 | B: 345 78 | Z:1 |
| 56 | N: 156 | A:12 | B: 345 78 | Z:1 |
| 57 | N: 157 | A:12 | B: 345 78 | Z:1 |
| 58 | N: 158 | A:12 | B: 345 78 | Z:1 |
| 59 | N: 159 | A:12 | B: 345 78 | Z:1 |
| 60 | N: 160 | A:12 | B: 345 78 | Z:1 |
| 61 | N: 161 | A:12 | B: 345 78 | Z:1 |
| 62 | N: 162 | A:12 | B: 345 78 | Z:1 |
| 63 | N: 163 | A:12 | B: 345 78 | Z:1 |
| 64 | N: 164 | A:12 | B: 345 78 | Z:1 |
| 65 | N: 165 | A:12 | B: 345 78 | Z:1 |
| 66 | N: 166 | A:12 | B: 345 78 | Z: 2 |
| 67 | N: 167 | A:12 | B: 345 78 | Z: 2 |
| 68 | N: 168 | A:12 | B: 345 78 | Z: 2 |
| 69 | N: 169 | A:12 | B: 345 78 | Z: 2 |
| 70 | N: 170 | A:12 | B: 345 78 | Z: 2 |
| 71 | N: 171 | A:12 | B: 345 78 | Z: 2 |
| 72 | N: 172 | A:12 | B: 345 78 | Z: 2 |
| 73 | N: 173 | A:12 | B: 345 78 | Z: 2 |
| 74 | N: 174 | A:12 | B: 345 78 | Z: 2 |
| 75 | N: 175 | A:12 | B: 345 78 | Z: 2 |
| 76 | N: 176 | A:12 | B: 345 78 | Z: 2 |
| 77 | N: 177 | A:12 | B: 345 78 | Z: 2 |
| 78 | N: 178 | A:12 | B: 345 78 | Z: 2 |
| 79 | N: 179 | A:12 | B: 345 78 | Z: 2 |
| 80 | N: 180 | A:12 | B: 345 78 | Z: 2 |
| 81 | N: 181 | A:12 | B: 345 78 | Z: 2 |
| 82 | N: 182 | A:12 | B: 345 78 | Z: 2 |
| 83 | N: 183 | A:12 | B: 345 78 | Z: 2 |
| 84 | N: 184 | A:12 | B: 345 78 | Z: 2 |
| 85 | N: 185 | A:12 | B: 345 78 | Z: 2 |
| 86 | N: 186 | A:12 | B: 345 78 | Z: 2 |
| 87 | N: 187 | A:12 | B: 345 78 | Z: 2 |
| 88 | N: 188 | A:12 | B: 345 78 | Z: 2 |
| 89 | N: 189 | A:12 | B: 345 78 | Z: 2 |
| 90 | N: 190 | A:12 | B: 345 78 | Z: 2 |
| 91 | N: 191 | A:12 | B: 345 78 | Z: 2 |
| 92 | N: 192 | A:12 | B: 345 78 | Z: 2 |
| 93 | N: 193 | A:12 | B: 345 78 | Z: 2 |
| 94 | N: 194 | A:12 | B: 345 78 | Z: 2 |
| 95 | N: 195 | A:12 | B: 345 78 | Z: 2 |
| 96 | N: 196 | A:12 | B: 345 78 | Z: 2 |
| 97 | N: 197 | A:12 | B: 345 78 | Z: 2 |
| 98 | N: 198 | A:12 | B: 345 78 | Z: 2 |
| 99 | N: 199 | A:12 | B: 345 78 | Z: 2 |
| 100 | N: 200 | A:12 | B: 345 78 | Z: 3 |
| 101 | N: 201 | A:12 | B: 345 78 | Z: 3 |
| 102 | N: 202 | A:12 | B: 345 78 | Z: 3 |
| 103 | N: 203 | A:12 | B: 345 78 | Z: 3 |
| 104 | N: 204 | A:12 | B: 345 78 | Z: 3 |
| 105 | N: 205 | A:12 | B: 345 78 | Z: 3 |
| 106 | N: 206 | A:12 | B: 345 78 | Z: 3 |
| 107 | N: 207 | A:12 | B: 345 78 | Z: 3 |

| | | | | | | | |
|---|---|---|---|---|---|---|---|
| 108 | N: | 208 | A:12 | B: | 345 78 | Z: | 3 |
| 109 | N: | 209 | A:12 | B: | 345 78 | Z: | 3 |
| 110 | N: | 210 | A:12 | B: | 345 78 | Z: | 3 |
| 111 | N: | 211 | A:12 | B: | 345 78 | Z: | 3 |
| 112 | N: | 212 | A:12 | B: | 345 78 | Z: | 3 |
| 113 | N: | 213 | A:12 | B: | 345 78 | Z: | 3 |
| 114 | N: | 214 | A:12 | B: | 345 78 | Z: | 3 |
| 115 | N: | 215 | A:12 | B: | 345 78 | Z: | 3 |
| 116 | N: | 216 | A:12 | B: | 345 78 | Z: | 3 |
| 117 | N: | 217 | A:12 | B: | 345 78 | Z: | 3 |
| 118 | N: | 218 | A:12 | B: | 345 78 | Z: | 3 |
| 119 | N: | 219 | A:12 | B: | 345 78 | Z: | 3 |
| 120 | N: | 220 | A:12 | B: | 345 78 | Z: | 3 |
| 121 | N: | 221 | A:12 | B: | 345 78 | Z: | 3 |
| 122 | N: | 222 | A:12 | B: | 345 78 | Z: | 3 |
| 123 | N: | 223 | A:12 | B: | 345 78 | Z: | 3 |
| 124 | N: | 224 | A:12 | B: | 345 78 | Z: | 3 |
| 125 | N: | 225 | A:12 | B: | 345 78 | Z: | 3 |
| 126 | N: | 226 | A:12 | B: | 345 78 | Z: | 3 |
| 127 | N: | 227 | A:12 | B: | 345 78 | Z: | 3 |
| 128 | N: | 228 | A:12 | B: | 345 78 | Z: | 3 |
| 129 | N: | 229 | A:12 | B: | 345 78 | Z: | 3 |
| 130 | N: | 230 | A:12 | B: | 345 78 | Z: | 3 |
| 131 | N: | 231 | A:12 | B: | 345 78 | Z: | 3 |
| 132 | N: | 232 | A:12 | B: | 345 78 | Z: | 3 |
| 133 | N: | 233 | A:12 | B: | 345 78 | Z: | 3 |
| 134 | N: | 234 | A:12 | B: | 345 78 | Z: | 3 |
| 135 | N: | 235 | A:12 | B: | 345 78 | Z: | 3 |
| 136 | N: | 236 | A:12 | B: | 345 78 | Z: | 3 |
| 137 | N: | 237 | A:12 | B: | 345 78 | Z: | 3 |
| 138 | N: | 238 | A:12 | B: | 345 78 | Z: | 3 |
| 139 | N: | 239 | A:12 | B: | 345 78 | Z: | 3 |
| 140 | N: | 240 | A:12 | B: | 345 78 | Z: | 3 |
| 141 | N: | 241 | A:12 | B: | 345 78 | Z: | 3 |
| 142 | N: | 242 | A:12 | B: | 345 78 | Z: | 3 |
| 143 | N: | 243 | A:12 | B: | 345 78 | Z: | 3 |
| 144 | N: | 244 | A:12 | B: | 345 78 | Z: | 3 |
| 145 | N: | 245 | A:12 | B: | 345 78 | Z: | 3 |
| 146 | N: | 246 | A:12 | B: | 345 78 | Z: | 3 |
| 147 | N: | 247 | A:12 | B: | 345 78 | Z: | 3 |
| 148 | N: | 248 | A:12 | B: | 345 78 | Z: | 3 |
| 149 | N: | 249 | A:12 | B: | 345 78 | Z: | 3 |
| 150 | N: | 250 | A:12 | B: | 345 78 | Z: | 4 |
| 151 | N: | 251 | A:12 | B: | 345 78 | Z: | 4 |
| 152 | N: | 252 | A:12 | B: | 345 78 | Z: | 4 |
| 153 | N: | 253 | A:12 | B: | 345 78 | Z: | 4 |
| 154 | N: | 254 | A:12 | B: | 345 78 | Z: | 4 |
| 155 | N: | 255 | A:12 | B: | 345 78 | Z: | 4 |
| 156 | N: | 256 | A:12 | B: | 345 78 | Z: | 4 |
| 157 | N: | 257 | A:12 | B: | 345 78 | Z: | 4 |
| 158 | N: | 258 | A:12 | B: | 345 78 | Z: | 4 |
| 159 | N: | 259 | A:12 | B: | 345 78 | Z: | 4 |
| 160 | N: | 260 | A:12 | B: | 345 78 | Z: | 4 |
| 161 | N: | 261 | A:12 | B: | 345 78 | Z: | 4 |
| 162 | N: | 262 | A:12 | B: | 345 78 | Z: | 4 |
| 163 | N: | 263 | A:12 | B: | 345 78 | Z: | 4 |
| 164 | N: | 264 | A:12 | B: | 345 78 | Z: | 4 |
| 165 | N: | 265 | A:12 | B: | 345 78 | Z: | 4 |
| 166 | N: | 266 | A:12 | B: | 345 78 | Z: | 4 |

| | | | | |
|---|---|---|---|---|
| 167 | N: 267 | A:12 | B: 345 78 | Z: 4 |
| 168 | N: 268 | A:12 | B: 345 78 | Z: 4 |
| 169 | N: 269 | A:12 | B: 345 78 | Z: 4 |
| 170 | N: 270 | A:12 | B: 345 78 | Z: 4 |
| 171 | N: 271 | A:12 | B: 345 78 | Z: 4 |
| 172 | N: 272 | A:12 | B: 345 78 | Z: 4 |
| 173 | N: 273 | A:12 | B: 345 78 | Z: 4 |
| 174 | N: 274 | A:12 | B: 345 78 | Z: 4 |
| 175 | N: 275 | A:12 | B: 345 78 | Z: 4 |
| 176 | N: 276 | A:12 | B: 345 78 | Z: 4 |
| 177 | N: 277 | A:12 | B: 345 78 | Z: 4 |
| 178 | N: 278 | A:12 | B: 345 78 | Z: 4 |
| 179 | N: 279 | A:12 | B: 345 78 | Z: 4 |
| 180 | N: 280 | A:12 | B: 345 78 | Z: 4 |
| 181 | N: 281 | A:12 | B: 345 78 | Z: 4 |
| 182 | N: 282 | A:12 | B: 345 78 | Z: 4 |
| 183 | N: 283 | A:12 | B: 345 78 | Z: 4 |
| 184 | N: 284 | A:12 | B: 345 78 | Z: 4 |
| 185 | N: 285 | A:12 | B: 345 78 | Z: 4 |
| 186 | N: 286 | A:12 | B: 345 78 | Z: 4 |
| 187 | N: 287 | A:12 | B: 345 78 | Z: 4 |
| 188 | N: 288 | A:12 | B: 345 78 | Z: 4 |
| 189 | N: 289 | A:12 | B: 345 78 | Z: 4 |
| 190 | N: 290 | A:12 | B: 345 78 | Z: 4 |
| 191 | N: 291 | A:12 | B: 345 78 | Z: 4 |
| 192 | N: 292 | A:12 | B: 345 78 | Z: 4 |
| 193 | N: 293 | A:12 | B: 345 78 | Z: 4 |
| 194 | N: 294 | A:12 | B: 345 78 | Z: 4 |
| 195 | N: 295 | A:12 | B: 345 78 | Z: 4 |
| 196 | N: 296 | A:12 | B: 345 78 | Z: 4 |
| 197 | N: 297 | A:12 | B: 345 78 | Z: 4 |
| 198 | N: 298 | A:12 | B: 345 78 | Z: 4 |
| 199 | N: 299 | A:12 | B: 345 78 | Z: 4 |
| 200 | N: 300 | A:12 | B: 345 78 | Z: 5 |
| 201 | N: 301 | A:12 | B: 345 78 | Z: 5 |
| 202 | N: 302 | A:12 | B: 345 78 | Z: 5 |
| 203 | N: 303 | A:12 | B: 345 78 | Z: 5 |
| 204 | N: 304 | A:12 | B: 345 78 | Z: 5 |
| 205 | N: 305 | A:12 | B: 345 78 | Z: 5 |
| 206 | N: 306 | A:12 | B: 345 78 | Z: 5 |
| 207 | N: 307 | A:12 | B: 345 78 | Z: 5 |
| 208 | N: 308 | A:12 | B: 345 78 | Z: 5 |
| 209 | N: 309 | A:12 | B: 345 78 | Z: 5 |
| 210 | N: 310 | A:12 | B: 345 78 | Z: 5 |
| 211 | N: 311 | A:12 | B: 345 78 | Z: 5 |
| 212 | N: 312 | A:12 | B: 345 78 | Z: 5 |
| 213 | N: 313 | A:12 | B: 345 78 | Z: 5 |
| 214 | N: 314 | A:12 | B: 345 78 | Z: 5 |
| 215 | N: 315 | A:12 | B: 345 78 | Z: 5 |
| 216 | N: 316 | A:12 | B: 345 78 | Z: 5 |
| 217 | N: 317 | A:12 | B: 345 78 | Z: 5 |
| 218 | N: 318 | A:12 | B: 345 78 | Z: 5 |
| 219 | N: 319 | A:12 | B: 345 78 | Z: 5 |
| 220 | N: 320 | A:12 | B: 345 78 | Z: 5 |
| 221 | N: 321 | A:12 | B: 345 78 | Z: 5 |

| | | | | |
|---|---|---|---|---|
| 222 | N: 322 | A:12 | B: 345 78 | Z: 5 |
| 223 | N: 323 | A:12 | B: 345 78 | Z: 5 |
| 224 | N: 324 | A:12 | B: 345 78 | Z: 5 |
| 225 | N: 325 | A:12 | B: 345 78 | Z: 5 |
| 226 | N: 326 | A:12 | B: 345 78 | Z: 5 |
| 227 | N: 327 | A:12 | B: 345 78 | Z: 5 |
| 228 | N: 328 | A:12 | B: 345 78 | Z: 5 |
| 229 | N: 329 | A:12 | B: 345 78 | Z: 5 |
| 230 | N: 330 | A:12 | B: 345 78 | Z: 5 |
| 231 | N: 331 | A:12 | B: 345 78 | Z: 5 |
| 232 | N: 332 | A:12 | B: 345 78 | Z: 5 |
| 233 | N: 333 | A:12 | B: 345 78 | Z: 5 |
| 234 | N: 334 | A:12 | B: 345 78 | Z: 5 |
| 235 | N: 335 | A:12 | B: 345 78 | Z: 5 |
| 236 | N: 336 | A:12 | B: 345 78 | Z: 5 |
| 237 | N: 337 | A:12 | B: 345 78 | Z: 5 |
| 238 | N: 338 | A:12 | B: 345 78 | Z: 5 |
| 239 | N: 339 | A:12 | B: 345 78 | Z: 5 |
| 240 | N: 340 | A:12 | B: 345 78 | Z: 5 |
| 241 | N: 341 | A:12 | B: 345 78 | Z: 5 |
| 242 | N: 342 | A:12 | B: 345 78 | Z: 5 |
| 243 | N: 343 | A:12 | B: 345 78 | Z: 5 |
| 244 | N: 344 | A:12 | B: 345 78 | Z: 5 |
| 245 | N: 345 | A:12 | B: 345 78 | Z: 5 |
| 246 | N: 346 | A:12 | B: 345 78 | Z: 5 |
| 247 | N: 347 | A:12 | B: 345 78 | Z: 5 |
| 248 | N: 348 | A:12 | B: 345 78 | Z: 5 |
| 249 | N: 349 | A:12 | B: 345 78 | Z: 5 |
| 250 | N: 350 | A:12 | B: 345 78 | Z: 6 |
| 251 | N: 351 | A:12 | B: 345 78 | Z: 6 |
| 252 | N: 352 | A:12 | B: 345 78 | Z: 6 |
| 253 | N: 353 | A:12 | B: 345 78 | Z: 6 |
| 254 | N: 354 | A:12 | B: 345 78 | Z: 6 |
| 255 | N: 355 | A:12 | B: 345 78 | Z: 6 |
| 256 | N: 356 | A:12 | B: 345 78 | Z: 6 |
| 257 | N: 357 | A:12 | B: 345 78 | Z: 6 |
| 258 | N: 358 | A:12 | B: 345 78 | Z: 6 |
| 259 | N: 359 | A:12 | B: 345 78 | Z: 6 |
| 260 | N: 360 | A:12 | B: 345 78 | Z: 6 |
| 261 | N: 361 | A:12 | B: 345 78 | Z: 6 |
| 262 | N: 362 | A:12 | B: 345 78 | Z: 6 |
| 263 | N: 363 | A:12 | B: 345 78 | Z: 6 |
| 264 | N: 364 | A:12 | B: 345 78 | Z: 6 |
| 265 | N: 365 | A:12 | B: 345 78 | Z: 6 |
| 266 | N: 366 | A:12 | B: 345 78 | Z: 6 |
| 267 | N: 367 | A:12 | B: 345 78 | Z: 6 |
| 268 | N: 368 | A:12 | B: 345 78 | Z: 6 |
| 269 | N: 369 | A:12 | B: 345 78 | Z: 6 |
| 270 | N: 370 | A:12 | B: 345 78 | Z: 6 |
| 271 | N: 371 | A:12 | B: 345 78 | Z: 6 |
| 272 | N: 372 | A:12 | B: 345 78 | Z: 6 |
| 273 | N: 373 | A:12 | B: 345 78 | Z: 6 |
| 274 | N: 374 | A:12 | B: 345 78 | Z: 6 |
| 275 | N: 375 | A:12 | B: 345 78 | Z: 6 |
| 276 | N: 376 | A:12 | B: 345 78 | Z: 6 |
| 277 | N: 377 | A:12 | B: 345 78 | Z: 6 |
| 278 | N: 378 | A:12 | B: 345 78 | Z: 6 |
| 279 | N: 379 | A:12 | B: 345 78 | Z: 6 |

| | | | | |
|---|---|---|---|---|
| 280 | N: 380 | A: 12 | B: 345 78 | Z: 6 |
| 281 | N: 381 | A: 12 | B: 345 78 | Z: 6 |
| 282 | N: 382 | A: 12 | B: 345 78 | Z: 6 |
| 283 | N: 383 | A: 12 | B: 345 78 | Z: 6 |
| 284 | N: 384 | A: 12 | B: 345 78 | Z: 6 |
| 285 | N: 385 | A: 12 | B: 345 78 | Z: 6 |
| 286 | N: 386 | A: 12 | B: 345 78 | Z: 6 |
| 287 | N: 387 | A: 12 | B: 345 78 | Z: 6 |
| 288 | N: 388 | A: 12 | B: 345 78 | Z: 6 |
| 289 | N: 389 | A: 12 | B: 345 78 | Z: 6 |
| 290 | N: 390 | A: 12 | B: 345 78 | Z: 6 |
| 291 | N: 391 | A: 12 | B: 345 78 | Z: 6 |
| 292 | N: 392 | A: 12 | B: 345 78 | Z: 6 |
| 293 | N: 393 | A: 12 | B: 345 78 | Z: 6 |
| 294 | N: 394 | A: 12 | B: 345 78 | Z: 6 |
| 295 | N: 395 | A: 12 | B: 345 78 | Z: 6 |
| 296 | N: 396 | A: 12 | B: 345 78 | Z: 6 |
| 297 | N: 397 | A: 12 | B: 345 78 | Z: 6 |
| 298 | N: 398 | A: 12 | B: 345 78 | Z: 6 |
| 299 | N: 399 | A: 12 | B: 345 78 | Z: 6 |
| 300 | N: 400 | A: 12 | B: 345 78 | Z: 7 |
| 301 | N: 401 | A: 12 | B: 345 78 | Z: 7 |
| 302 | N: 402 | A: 12 | B: 345 78 | Z: 7 |
| 303 | N: 403 | A: 12 | B: 345 78 | Z: 7 |
| 304 | N: 404 | A: 12 | B: 345 78 | Z: 7 |
| 305 | N: 405 | A: 12 | B: 345 78 | Z: 7 |
| 306 | N: 406 | A: 12 | B: 345 78 | Z: 7 |
| 307 | N: 407 | A: 12 | B: 345 78 | Z: 7 |
| 308 | N: 408 | A: 12 | B: 345 78 | Z: 7 |
| 309 | N: 409 | A: 12 | B: 345 78 | Z: 7 |
| 310 | N: 410 | A: 12 | B: 345 78 | Z: 7 |
| 311 | N: 411 | A: 12 | B: 345 78 | Z: 7 |
| 312 | N: 412 | A: 12 | B: 345 78 | Z: 7 |
| 313 | N: 413 | A: 12 | B: 345 78 | Z: 7 |
| 314 | N: 414 | A: 12 | B: 345 78 | Z: 7 |
| 315 | N: 415 | A: 12 | B: 345 78 | Z: 7 |
| 316 | N: 416 | A: 12 | B: 345 78 | Z: 7 |
| 317 | N: 417 | A: 12 | B: 345 78 | Z: 7 |
| 318 | N: 418 | A: 12 | B: 345 78 | Z: 7 |
| 319 | N: 419 | A: 12 | B: 345 78 | Z: 7 |
| 320 | N: 420 | A: 12 | B: 345 78 | Z: 7 |
| 321 | N: 421 | A: 12 | B: 345 78 | Z: 7 |
| 322 | N: 422 | A: 12 | B: 345 78 | Z: 7 |
| 323 | N: 423 | A: 12 | B: 345 78 | Z: 7 |
| 324 | N: 424 | A: 12 | B: 345 78 | Z: 7 |
| 325 | N: 425 | A: 12 | B: 345 78 | Z: 7 |
| 326 | N: 426 | A: 12 | B: 345 78 | Z: 7 |
| 327 | N: 427 | A: 12 | B: 345 78 | Z: 7 |
| 328 | N: 428 | A: 12 | B: 345 78 | Z: 7 |
| 329 | N: 429 | A: 12 | B: 345 78 | Z: 7 |
| 330 | N: 430 | A: 12 | B: 345 78 | Z: 7 |
| 331 | N: 431 | A: 12 | B: 345 78 | Z: 7 |
| 332 | N: 432 | A: 12 | B: 345 78 | Z: 7 |
| 333 | N: 433 | A: 12 | B: 345 78 | Z: 7 |
| 334 | N: 434 | A: 12 | B: 345 78 | Z: 7 |
| 335 | N: 435 | A: 12 | B: 345 78 | Z: 7 |
| 336 | N: 436 | A: 12 | B: 345 78 | Z: 7 |

| | | | | |
|---|---|---|---|---|
| 337 | N: 437 | A:12 | B: 345 78 | Z: 7 |
| 338 | N: 438 | A:12 | B: 345 78 | Z: 7 |
| 339 | N: 439 | A:12 | B: 345 78 | Z: 7 |
| 340 | N: 440 | A:12 | B: 345 78 | Z: 7 |
| 341 | N: 441 | A:12 | B: 345 78 | Z: 7 |
| 342 | N: 442 | A:12 | B: 345 78 | Z: 7 |
| 343 | N: 443 | A:12 | B: 345 78 | Z: 7 |
| 344 | N: 444 | A:12 | B: 345 78 | Z: 7 |
| 345 | N: 445 | A:12 | B: 345 78 | Z: 7 |
| 346 | N: 446 | A:12 | B: 345 78 | Z: 7 |
| 347 | N: 447 | A:12 | B: 345 78 | Z: 7 |
| 348 | N: 448 | A:12 | B: 345 78 | Z: 7 |
| 349 | N: 449 | A:12 | B: 345 78 | Z: 7 |
| 350 | N: 450 | A:12 | B: 345 78 | Z: 8 |
| 351 | N: 451 | A:12 | B: 345 78 | Z: 8 |
| 352 | N: 452 | A:12 | B: 345 78 | Z: 8 |
| 353 | N: 453 | A:12 | B: 345 78 | Z: 8 |
| 354 | N: 454 | A:12 | B: 345 78 | Z: 8 |
| 355 | N: 455 | A:12 | B: 345 78 | Z: 8 |
| 356 | N: 456 | A:12 | B: 345 78 | Z: 8 |
| 357 | N: 457 | A:12 | B: 345 78 | Z: 8 |
| 358 | N: 458 | A:12 | B: 345 78 | Z: 8 |
| 359 | N: 459 | A:12 | B: 345 78 | Z: 8 |
| 360 | N: 460 | A:12 | B: 345 78 | Z: 8 |
| 361 | N: 461 | A:12 | B: 345 78 | Z: 8 |
| 362 | N: 462 | A:12 | B: 345 78 | Z: 8 |
| 363 | N: 463 | A:12 | B: 345 78 | Z: 8 |
| 364 | N: 464 | A:12 | B: 345 78 | Z: 8 |
| 365 | N: 465 | A:12 | B: 345 78 | Z: 8 |
| 366 | N: 466 | A:12 | B: 345 78 | Z: 8 |
| 367 | N: 467 | A:12 | B: 345 78 | Z: 8 |
| 368 | N: 468 | A:12 | B: 345 78 | Z: 8 |
| 369 | N: 469 | A:12 | B: 345 78 | Z: 8 |
| 370 | N: 470 | A:12 | B: 345 78 | Z: 8 |
| 371 | N: 471 | A:12 | B: 345 78 | Z: 8 |
| 372 | N: 472 | A:12 | B: 345 78 | Z: 8 |
| 373 | N: 473 | A:12 | B: 345 78 | Z: 8 |
| 374 | N: 474 | A:12 | B: 345 78 | Z: 8 |
| 375 | N: 475 | A:12 | B: 345 78 | Z: 8 |
| 376 | N: 476 | A:12 | B: 345 78 | Z: 8 |
| 377 | N: 477 | A:12 | B: 345 78 | Z: 8 |
| 378 | N: 478 | A:12 | B: 345 78 | Z: 8 |
| 379 | N: 479 | A:12 | B: 345 78 | Z: 8 |
| 380 | N: 480 | A:12 | B: 345 78 | Z: 8 |
| 381 | N: 481 | A:12 | B: 345 78 | Z: 8 |
| 382 | N: 482 | A:12 | B: 345 78 | Z: 8 |
| 383 | N: 483 | A:12 | B: 345 78 | Z: 8 |
| 384 | N: 484 | A:12 | B: 345 78 | Z: 8 |
| 385 | N: 485 | A:12 | B: 345 78 | Z: 8 |
| 386 | N: 486 | A:12 | B: 345 78 | Z: 8 |
| 387 | N: 487 | A:12 | B: 345 78 | Z: 8 |
| 388 | N: 488 | A:12 | B: 345 78 | Z: 8 |
| 389 | N: 489 | A:12 | B: 345 78 | Z: 8 |
| 390 | N: 490 | A:12 | B: 345 78 | Z: 8 |
| 391 | N: 491 | A:12 | B: 345 78 | Z: 8 |

| | | | | |
|---|---|---|---|---|
| 392 | N: 492 | A:12 | B: 345 78 | Z: 8 |
| 393 | N: 493 | A:12 | B: 345 78 | Z: 8 |
| 394 | N: 494 | A:12 | B: 345 78 | Z: 8 |
| 395 | N: 495 | A:12 | B: 345 78 | Z: 8 |
| 396 | N: 496 | A:12 | B: 345 78 | Z: 8 |
| 397 | N: 497 | A:12 | B: 345 78 | Z: 8 |
| 398 | N: 498 | A:12 | B: 345 78 | Z: 8 |
| 399 | N: 499 | A:12 | B: 345 78 | Z: 8 |
| 400 | N: 500 | A:12 | B: 345 78 | Z:1 |
| 401 | N: 501 | A:12 | B: 345 78 | Z:1 |
| 402 | N: 502 | A:12 | B: 345 78 | Z:1 |
| 403 | N: 503 | A:12 | B: 345 78 | Z:1 |
| 404 | N: 504 | A:12 | B: 345 78 | Z:1 |
| 405 | N: 505 | A:12 | B: 345 78 | Z:1 |
| 406 | N: 506 | A:12 | B: 345 78 | Z:1 |
| 407 | N: 507 | A:12 | B: 345 78 | Z:1 |
| 408 | N: 508 | A:12 | B: 345 78 | Z:1 |
| 409 | N: 509 | A:12 | B: 345 78 | Z:1 |
| 410 | N: 510 | A:12 | B: 345 78 | Z:1 |
| 411 | N: 511 | A:12 | B: 345 78 | Z:1 |
| 412 | N: 512 | A:12 | B: 345 78 | Z:1 |
| 413 | N: 513 | A:12 | B: 345 78 | Z:1 |
| 414 | N: 514 | A:12 | B: 345 78 | Z:1 |
| 415 | N: 515 | A:12 | B: 345 78 | Z:1 |
| 416 | N: 516 | A:12 | B: 345 78 | Z:1 |
| 417 | N: 517 | A:12 | B: 345 78 | Z:1 |
| 418 | N: 518 | A:12 | B: 345 78 | Z:1 |
| 419 | N: 519 | A:12 | B: 345 78 | Z:1 |
| 420 | N: 520 | A:12 | B: 345 78 | Z:1 |
| 421 | N: 521 | A:12 | B: 345 78 | Z:1 |
| 422 | N: 522 | A:12 | B: 345 78 | Z:1 |
| 423 | N: 523 | A:12 | B: 345 78 | Z:1 |
| 424 | N: 524 | A:12 | B: 345 78 | Z:1 |
| 425 | N: 525 | A:12 | B: 345 78 | Z:1 |
| 426 | N: 526 | A:12 | B: 345 78 | Z:1 |
| 427 | N: 527 | A:12 | B: 345 78 | Z:1 |
| 428 | N: 528 | A:12 | B: 345 78 | Z:1 |
| 429 | N: 529 | A:12 | B: 345 78 | Z:1 |
| 430 | N: 530 | A:12 | B: 345 78 | Z:1 |
| 431 | N: 531 | A:12 | B: 345 78 | Z:1 |
| 432 | N: 532 | A:12 | B: 345 78 | Z:1 |
| 433 | N: 533 | A:12 | B: 345 78 | Z:1 |
| 434 | N: 534 | A:12 | B: 345 78 | Z:1 |
| 435 | N: 535 | A:12 | B: 345 78 | Z:1 |
| 436 | N: 536 | A:12 | B: 345 78 | Z:1 |
| 437 | N: 537 | A:12 | B: 345 78 | Z:1 |
| 438 | N: 538 | A:12 | B: 345 78 | Z:1 |
| 439 | N: 539 | A:12 | B: 345 78 | Z:1 |
| 440 | N: 540 | A:12 | B: 345 78 | Z:1 |
| 441 | N: 541 | A:12 | B: 345 78 | Z:1 |
| 442 | N: 542 | A:12 | B: 345 78 | Z:1 |
| 443 | N: 543 | A:12 | B: 345 78 | Z:1 |
| 444 | N: 544 | A:12 | B: 345 78 | Z:1 |
| 445 | N: 545 | A:12 | B: 345 78 | Z:1 |
| 446 | N: 546 | A:12 | B: 345 78 | Z:1 |
| 447 | N: 547 | A:12 | B: 345 78 | Z:1 |
| 448 | N: 548 | A:12 | B: 345 78 | Z:1 |
| 449 | N: 549 | A:12 | B: 345 78 | Z:1 |

| | | | | |
|---|---|---|---|---|
| 450 | N: 550 | A:12 | B: 345 78 | Z: 2 |
| 451 | N: 551 | A:12 | B: 345 78 | Z: 2 |
| 452 | N: 552 | A:12 | B: 345 78 | Z: 2 |
| 453 | N: 553 | A:12 | B: 345 78 | Z: 2 |
| 454 | N: 554 | A:12 | B: 345 78 | Z: 2 |
| 455 | N: 555 | A:12 | B: 345 78 | Z: 2 |
| 456 | N: 556 | A:12 | B: 345 78 | Z: 2 |
| 457 | N: 557 | A:12 | B: 345 78 | Z: 2 |
| 458 | N: 558 | A:12 | B: 345 78 | Z: 2 |
| 459 | N: 559 | A:12 | B: 345 78 | Z: 2 |
| 460 | N: 560 | A:12 | B: 345 78 | Z: 2 |
| 461 | N: 561 | A:12 | B: 345 78 | Z: 2 |
| 462 | N: 562 | A:12 | B: 345 78 | Z: 2 |
| 463 | N: 563 | A:12 | B: 345 78 | Z: 2 |
| 464 | N: 564 | A:12 | B: 345 78 | Z: 2 |
| 465 | N: 565 | A:12 | B: 345 78 | Z: 2 |
| 466 | N: 566 | A:12 | B: 345 78 | Z: 2 |
| 467 | N: 567 | A:12 | B: 345 78 | Z: 2 |
| 468 | N: 568 | A:12 | B: 345 78 | Z: 2 |
| 469 | N: 569 | A:12 | B: 345 78 | Z: 2 |
| 470 | N: 570 | A:12 | B: 345 78 | Z: 2 |
| 471 | N: 571 | A:12 | B: 345 78 | Z: 2 |
| 472 | N: 572 | A:12 | B: 345 78 | Z: 2 |
| 473 | N: 573 | A:12 | B: 345 78 | Z: 2 |
| 474 | N: 574 | A:12 | B: 345 78 | Z: 2 |
| 475 | N: 575 | A:12 | B: 345 78 | Z: 2 |
| 476 | N: 576 | A:12 | B: 345 78 | Z: 2 |
| 477 | N: 577 | A:12 | B: 345 78 | Z: 2 |
| 478 | N: 578 | A:12 | B: 345 78 | Z: 2 |
| 479 | N: 579 | A:12 | B: 345 78 | Z: 2 |
| 480 | N: 580 | A:12 | B: 345 78 | Z: 2 |
| 481 | N: 581 | A:12 | B: 345 78 | Z: 2 |
| 482 | N: 582 | A:12 | B: 345 78 | Z: 2 |
| 483 | N: 583 | A:12 | B: 345 78 | Z: 2 |
| 484 | N: 584 | A:12 | B: 345 78 | Z: 2 |
| 485 | N: 585 | A:12 | B: 345 78 | Z: 2 |
| 486 | N: 586 | A:12 | B: 345 78 | Z: 2 |
| 487 | N: 587 | A:12 | B: 345 78 | Z: 2 |
| 488 | N: 588 | A:12 | B: 345 78 | Z: 2 |
| 489 | N: 589 | A:12 | B: 345 78 | Z: 2 |
| 490 | N: 590 | A:12 | B: 345 78 | Z: 2 |
| 491 | N: 591 | A:12 | B: 345 78 | Z: 2 |
| 492 | N: 592 | A:12 | B: 345 78 | Z: 2 |
| 493 | N: 593 | A:12 | B: 345 78 | Z: 2 |
| 494 | N: 594 | A:12 | B: 345 78 | Z: 2 |
| 495 | N: 595 | A:12 | B: 345 78 | Z: 2 |
| 496 | N: 596 | A:12 | B: 345 78 | Z: 2 |
| 497 | N: 597 | A:12 | B: 345 78 | Z: 2 |
| 498 | N: 598 | A:12 | B: 345 78 | Z: 2 |
| 499 | N: 599 | A:12 | B: 345 78 | Z: 2 |
| 500 | N: 600 | A:12 | B: 345 78 | Z: 3 |
| 501 | N: 601 | A:12 | B: 345 78 | Z: 3 |
| 502 | N: 602 | A:12 | B: 345 78 | Z: 3 |
| 503 | N: 603 | A:12 | B: 345 78 | Z: 3 |
| 504 | N: 604 | A:12 | B: 345 78 | Z: 3 |
| 505 | N: 605 | A:12 | B: 345 78 | Z: 3 |
| 506 | N: 606 | A:12 | B: 345 78 | Z: 3 |
| 507 | N: 607 | A:12 | B: 345 78 | Z: 3 |
| 508 | N: 608 | A:12 | B: 345 78 | Z: 3 |
| 509 | N: 609 | A:12 | B: 345 78 | Z: 3 |
| 510 | N: 610 | A:12 | B: 345 78 | Z: 3 |
| 511 | N: 611 | A:12 | B: 345 78 | Z: 3 |

```
STANDARD EEPROM PROGRAMMING
EQUIPMENT LIST: SC25  0,1
                SCC25 1
                LLM16 0,1
PCH  10-11-85
FILE NAME: STD2.DAT
Ms64000  5
64002  4
64004  0
64006  0
64008  4
64010  3
64012  600
64014  50
64016  1000
64018  1000
64020  1000
64022  1000
64024  1000
64026  1000
64028  1000
64030  1000
64032  1000
64034  1000
64036  600
64038  600
64040  2
64042  2
64044  2
64046  2
64048  2
64050  2
64052  2
64054  2
64056  2
64058  2
64060  2
64062  2
64064  2
64066  2
64068  2
64070  2
64072  2
64074  2
64076  2
64078  2
64080  2
64082  300
64084  300
64086  300
64088  300
64090  300
64092  300
64094  300
64096  300
64098  180
64100  0
64102  60
64104  600
64106  1
64108  0
64110  60
64112  0
64114  0
64116  0
64118  0
64120  0
64122  0
64124  0
64126  0
64128  0
64130  0
64132  0
64134  0
64136  0
64138  0
64140  0
64142  0
64144  0
64146  0
64148  0
64150  0
64152  0
64154  0
64156  0
64158  0
64160  0
64162  0
64164  0
64166  0
64168  0
64170  0
64172  0
64174  0
64176  0
64178  0
64180  0
64182  0
64184  0
64186  0
64188  0
64190  0
64192  1200
64194  0
64196  0
64198  0
64200  0
64202  0
64204  0
64206  0
64208  0
64210  0
64212  0
64214  0
64216  0
64218  0
64220  0
64222  0
64224  0
64226  0
64228  0
64230  0
64232  0
64234  0
64236  0
64238  0
64240  0
64242  0
64244  0
64246  0
64248  0
64250  0
64252  0
64254  0
64256  0
64258  0
64260  0
64262  0
64264  0
64266  0
64268  0
64270  0
64272  0
64274  0
64276  0
64278  0
64280  0
64282  0
64284  0
64286  0
64288  0
64290  0
64292  0
64294  0
64296  0
64298  0
64300  0
64302  0
64304  0
64306  0
64308  0
64310  0
64312  0
64314  0
64316  0
64318  0
64320  0
64322  0
64324  0
64326  0
64328  0
64330  0
64332  0
64334  0
64336  0
64338  0
64340  0
64342  0
64344  0
64346  0
64348  0
64350  0
64352  0
64354  0
64356  0
64358  0
64360  0
64362  0
64364  0
64366  0
64368  0
64370  0
64372  0
64374  0
64376  0
64378  0
64380  0
64382  0
64384  0
64386  0
64388  0
64390  0
64392  0
64394  0
64396  0
64398  0
64400  0
64402  0
64404  0
64406  0
64408  0
64410  0
64412  0
64414  0
64416  0
64418  0
64420  0
64422  0
64424  0
64426  0
64428  0
64430  0
64432  0
64434  0
64436  0
64438  0
64440  0
64536  0
64538  0
64540  0
64636  0
64638  0
64640  0
64736  0
64738  0
64740  0
64836  0
64838  0
64840  0
```

| | | | | | | | | | |
|---|---|---|---|---|---|---|---|---|---|
| 64442 | 0 | 64542 | 0 | 64642 | 0 | 64742 | 0 | 64842 | 0 |
| 64444 | 0 | 64544 | 0 | 64644 | 0 | 64744 | 0 | 64844 | 0 |
| 64446 | 0 | 64546 | 0 | 64646 | 0 | 64746 | 0 | 64846 | 0 |
| 64448 | 0 | 64548 | 0 | 64648 | 0 | 64748 | 0 | 64848 | 0 |
| 64450 | 0 | 64550 | 0 | 64650 | 0 | 64750 | 0 | 64850 | 0 |
| 64452 | 0 | 64552 | 0 | 64652 | 0 | 64752 | 0 | 64852 | 0 |
| 64454 | 0 | 64554 | 0 | 64654 | 0 | 64754 | 0 | 64854 | 0 |
| 64456 | 0 | 64556 | 0 | 64656 | 0 | 64756 | 0 | 64856 | 0 |
| 64458 | 0 | 64558 | 0 | 64658 | 0 | 64758 | 0 | 64858 | 0 |
| 64460 | 0 | 64560 | 0 | 64660 | 0 | 64760 | 0 | 64860 | 0 |
| 64462 | 0 | 64562 | 0 | 64662 | 0 | 64762 | 0 | 64862 | 0 |
| 64464 | 0 | 64564 | 0 | 64664 | 0 | 64764 | 0 | 64864 | 0 |
| 64466 | 0 | 64566 | 0 | 64666 | 0 | 64766 | 0 | 64866 | 0 |
| 64468 | 0 | 64568 | 0 | 64668 | 0 | 64768 | 0 | 64868 | 0 |
| 64470 | 0 | 64570 | 0 | 64670 | 0 | 64770 | 0 | 64870 | 0 |
| 64472 | 0 | 64572 | 0 | 64672 | 0 | 64772 | 0 | 64872 | 0 |
| 64474 | 0 | 64574 | 0 | 64674 | 0 | 64774 | 0 | 64874 | 0 |
| 64476 | 0 | 64576 | 0 | 64676 | 0 | 64776 | 0 | 64876 | 0 |
| 64478 | 0 | 64578 | 0 | 64678 | 0 | 64778 | 0 | 64878 | 0 |
| 64480 | 0 | 64580 | 0 | 64680 | 0 | 64780 | 0 | 64880 | 0 |
| 64482 | 0 | 64582 | 0 | 64682 | 0 | 64782 | 0 | 64882 | 0 |
| 64484 | 0 | 64584 | 0 | 64684 | 0 | 64784 | 0 | 64884 | 0 |
| 64486 | 0 | 64586 | 0 | 64686 | 0 | 64786 | 0 | 64886 | 0 |
| 64488 | 0 | 64588 | 0 | 64688 | 0 | 64788 | 0 | 64888 | 0 |
| 64490 | 0 | 64590 | 0 | 64690 | 0 | 64790 | 0 | 64890 | 0 |
| 64492 | 0 | 64592 | 0 | 64692 | 0 | 64792 | 0 | 64892 | 0 |
| 64494 | 0 | 64594 | 0 | 64694 | 0 | 64794 | 0 | 64894 | 0 |
| 64496 | 0 | 64596 | 0 | 64696 | 0 | 64796 | 0 | 64896 | 0 |
| 64498 | 0 | 64598 | 0 | 64698 | 0 | 64798 | 0 | 64898 | 0 |
| 64500 | 0 | 64600 | 0 | 64700 | 0 | 64800 | 0 | 64900 | 0 |
| 64502 | 0 | 64602 | 0 | 64702 | 0 | 64802 | 0 | 64902 | 0 |
| 64504 | 0 | 64604 | 0 | 64704 | 0 | 64804 | 0 | 64904 | 0 |
| 64506 | 0 | 64606 | 0 | 64706 | 0 | 64806 | 0 | 64906 | 0 |
| 64508 | 0 | 64608 | 0 | 64708 | 0 | 64808 | 0 | 64908 | 0 |
| 64510 | 0 | 64610 | 0 | 64710 | 0 | 64810 | 0 | 64910 | 0 |
| 64512 | 85 | 64612 | 0 | 64712 | 0 | 64812 | 0 | 64912 | 0 |
| 64514 | 0 | 64614 | 0 | 64714 | 0 | 64814 | 0 | 64914 | 0 |
| 64516 | 0 | 64616 | 0 | 64716 | 0 | 64816 | 0 | 64916 | 0 |
| 64518 | 0 | 64618 | 0 | 64718 | 0 | 64818 | 0 | 64918 | 0 |
| 64520 | 0 | 64620 | 0 | 64720 | 0 | 64820 | 0 | 64920 | 0 |
| 64522 | 0 | 64622 | 0 | 64722 | 0 | 64822 | 0 | 64922 | 0 |
| 64524 | 0 | 64624 | 0 | 64724 | 0 | 64824 | 0 | 64924 | 0 |
| 64526 | 0 | 64626 | 0 | 64726 | 0 | 64826 | 0 | 64926 | 0 |
| 64528 | 0 | 64628 | 0 | 64728 | 0 | 64828 | 0 | 64928 | 0 |
| 64530 | 0 | 64630 | 0 | 64730 | 0 | 64830 | 0 | 64930 | 0 |
| 64532 | 0 | 64632 | 0 | 64732 | 0 | 64832 | 0 | 64932 | 0 |
| 64534 | 0 | 64634 | 0 | 64734 | 0 | 64834 | 0 | 64934 | 0 |

| | | | | | | | | | | | |
|---|---|---|---|---|---|---|---|---|---|---|---|
| 64936 | 0 | 65036 | 0 | 65136 | 0 | 65236 | 0 | 65336 | 0 | 65436 | 0 |
| 64938 | 0 | 65038 | 0 | 65138 | 0 | 65238 | 0 | 65338 | 0 | 65438 | 0 |
| 64940 | 0 | 65040 | 0 | 65140 | 0 | 65240 | 0 | 65340 | 0 | 65440 | 0 |
| 64942 | 0 | 65042 | 0 | 65142 | 0 | 65242 | 0 | 65342 | 0 | 65442 | 0 |
| 64944 | 0 | 65044 | 0 | 65144 | 0 | 65244 | 0 | 65344 | 0 | 65444 | 0 |
| 64946 | 0 | 65046 | 0 | 65146 | 0 | 65246 | 0 | 65346 | 0 | 65446 | 0 |
| 64948 | 0 | 65048 | 0 | 65148 | 0 | 65248 | 0 | 65348 | 0 | 65448 | 0 |
| 64950 | 0 | 65050 | 0 | 65150 | 0 | 65250 | 0 | 65350 | 0 | 65450 | 0 |
| 64952 | 0 | 65052 | 0 | 65152 | 0 | 65252 | 0 | 65352 | 0 | 65452 | 0 |
| 64954 | 0 | 65054 | 0 | 65154 | 0 | 65254 | 0 | 65354 | 0 | 65454 | 0 |
| 64956 | 0 | 65056 | 0 | 65156 | 0 | 65256 | 0 | 65356 | 0 | 65456 | 0 |
| 64958 | 0 | 65058 | 0 | 65158 | 0 | 65258 | 0 | 65358 | 0 | 65458 | 0 |
| 64960 | 0 | 65060 | 0 | 65160 | 0 | 65260 | 0 | 65360 | 0 | 65460 | 0 |
| 64962 | 0 | 65062 | 0 | 65162 | 0 | 65262 | 0 | 65362 | 0 | 65462 | 0 |

| | | | | | | | | | | | |
|---|---|---|---|---|---|---|---|---|---|---|---|
| 64964 | 0 | 65064 | 0 | 65164 | 0 | 65264 | 0 | 65364 | 0 | 65464 | 0 |
| 64966 | 0 | 65066 | 0 | 65166 | 0 | 65266 | 0 | 65366 | 0 | 65466 | 0 |
| 64968 | 0 | 65068 | 0 | 65168 | 0 | 65268 | 0 | 65368 | 0 | 65468 | 0 |
| 64970 | 0 | 65070 | 0 | 65170 | 0 | 65270 | 0 | 65370 | 0 | 65470 | 0 |
| 64972 | 0 | 65072 | 0 | 65172 | 0 | 65272 | 0 | 65372 | 0 | 65472 | 0 |
| 64974 | 0 | 65074 | 0 | 65174 | 0 | 65274 | 0 | 65374 | 0 | 65474 | 0 |
| 64976 | 0 | 65076 | 0 | 65176 | 0 | 65276 | 0 | 65376 | 0 | 65476 | 0 |
| 64978 | 0 | 65078 | 0 | 65178 | 0 | 65278 | 0 | 65378 | 0 | 65478 | 0 |
| 64980 | 0 | 65080 | 0 | 65180 | 0 | 65280 | 0 | 65380 | 0 | 65480 | 0 |
| 64982 | 0 | 65082 | 0 | 65182 | 0 | 65282 | 0 | 65382 | 0 | 65482 | 0 |
| 64984 | 0 | 65084 | 0 | 65184 | 0 | 65284 | 0 | 65384 | 0 | 65484 | 0 |
| 64986 | 0 | 65086 | 0 | 65186 | 0 | 65286 | 0 | 65386 | 0 | 65486 | 0 |
| 64988 | 0 | 65088 | 0 | 65188 | 0 | 65288 | 0 | 65388 | 0 | 65488 | 0 |
| 64990 | 0 | 65090 | 0 | 65190 | 0 | 65290 | 0 | 65390 | 0 | 65490 | 0 |
| 64992 | 0 | 65092 | 0 | 65192 | 0 | 65292 | 0 | 65392 | 0 | 65492 | 0 |
| 64994 | 0 | 65094 | 0 | 65194 | 0 | 65294 | 0 | 65394 | 0 | 65494 | 0 |
| 64996 | 0 | 65096 | 0 | 65196 | 0 | 65296 | 0 | 65396 | 0 | 65496 | 0 |
| 64998 | 0 | 65098 | 0 | 65198 | 0 | 65298 | 0 | 65398 | 0 | 65498 | 0 |
| 65000 | 0 | 65100 | 0 | 65200 | 0 | 65300 | 0 | 65400 | 0 | 65500 | 0 |
| 65002 | 0 | 65102 | 0 | 65202 | 0 | 65302 | 0 | 65402 | 0 | 65502 | 0 |
| 65004 | 0 | 65104 | 0 | 65204 | 0 | 65304 | 0 | 65404 | 0 | 65504 | 0 |
| 65006 | 0 | 65106 | 0 | 65206 | 0 | 65306 | 0 | 65406 | 0 | 65506 | 0 |
| 65008 | 0 | 65108 | 0 | 65208 | 0 | 65308 | 0 | 65408 | 0 | 65508 | 0 |
| 65010 | 0 | 65110 | 0 | 65210 | 0 | 65310 | 0 | 65410 | 0 | 65510 | 0 |
| 65012 | 0 | 65112 | 0 | 65212 | 0 | 65312 | 0 | 65412 | 0 | 65512 | 0 |
| 65014 | 0 | 65114 | 0 | 65214 | 0 | 65314 | 0 | 65414 | 0 | 65514 | 0 |
| 65016 | 0 | 65116 | 0 | 65216 | 0 | 65316 | 0 | 65416 | 0 | 65516 | 0 |
| 65018 | 0 | 65118 | 0 | 65218 | 0 | 65318 | 0 | 65418 | 0 | 65518 | 0 |
| 65020 | 0 | 65120 | 0 | 65220 | 0 | 65320 | 0 | 65420 | 0 | 65520 | 0 |
| 65022 | 0 | 65122 | 0 | 65222 | 0 | 65322 | 0 | 65422 | 0 | 65522 | 0 |
| 65024 | 0 | 65124 | 0 | 65224 | 0 | 65324 | 0 | 65424 | 0 | 65524 | 0 |
| 65026 | 0 | 65126 | 0 | 65226 | 0 | 65326 | 0 | 65426 | 0 | 65526 | 0 |
| 65028 | 0 | 65128 | 0 | 65228 | 0 | 65328 | 0 | 65428 | 0 | 65528 | 0 |
| 65030 | 0 | 65130 | 0 | 65230 | 0 | 65330 | 0 | 65430 | 0 | 65530 | 0 |
| 65032 | 0 | 65132 | 0 | 65232 | 0 | 65332 | 0 | 65432 | 0 | 65532 | 0 |
| 65034 | 0 | 65134 | 0 | 65234 | 0 | 65334 | 0 | 65434 | 0 | 65534 | 0 |

What is claimed is:

1. A communication system comprising, in combination, at least one audio link for establishing an audio communication path, a plurality of stations for receiving and transmitting audio signals, and having means for requesting a connection to said audio link, at least one respective access circuit being connected to each station, each access circuit including means for selectively connecting and disconnecting its respective station to the audio link, and also having means for receiving a request for connection from its respective station, a computer for supervising the connecting and disconnecting of said stations to said audio link, and including means for addressing a selected one of said access circuits, interrogating the addressed access circuit to determine whether said addressed access circuit is receiving said request for connection, and in response to said interrogation commanding said addressed access circuit to selectively connect its respective station to said link, and means interconnecting said computer to said access circuits including a bidirectional control line for both conveying connection and disconnection commands from said computer to said access circuits and for conveying connection requests from said access circuits to said computer, and means for selectively connecting said control line to said addressed access circuit.

2. The communication system as claimed in claim 1 wherein said means for selectively connecting said control line includes at least one analog multiplexer having a multiplex terminal wired to said control line, and a plurality of select inputs wired to respective select lines from said computer.

3. The communication system as claimed in claim 1, wherein said means for selectively connecting said control line include a plurality of analog multiplexers, each having a multiplex input wired in parallel to said control line, a plurality of select inputs wired in parallel to respective select lines from said computer, and an enable input receiving a respective enable signal from said computer.

4. The communication system as claimed in claim 3, wherein said means for selectively connecting said control line include at least one decoder having inputs connected to a plurality of respective select lines from said computer, and having at least one output connected to a respective one of said multiplexer enable inputs.

5. The communication system as claimed in claim 1, wherein said computer includes an input/output circuit wired to said control line and including means for selectively applying first and second voltage potentials to transmit connect and disconnect signals to said access circuits, and at least one voltage comparator responsive to the voltage on said control line for receiving said connection requests.

6. The communication system as claimed in claim 1, wherein said computer includes an input/output circuit wired to said control line, and said input/output circuit includes at least two voltage comparators for receiving both low and high priority connection requests.

7. The communication system as claimed in claim 1, wherein said stations include telephone stations and intercom stations.

8. A communication system for providing two-way communication between a telephone having a means for entering numbers, and a selected one of a plurality of intercom speakers being selected by entering a corresponding number from said telephone, said communication system comprising, in combination, a voice controlled amplifier connecting said telephone to a speaker audio bus for establishing an audio communication path, for each of said speakers, an access circuit including means for selectively connecting and disconnecting the speaker to the speaker audio bus, a computer for supervising the connection and disconnection of said speakers to said speaker audio bus, and including means for receiving a number from said means for entering numbers, and addressing a corresponding one of said access circuits to connect its respective speaker to said speaker audio bus, and means interconnecting said computer to said access circuits including at least one control line for transmitting connection and disconnection commands from said computer to said access circuits, wherein said connection and disconnection commands are in the form of pulses of a first and a second polarity, and wherein each access circuit has a latching relay being energized for connecting its respective speaker to said speaker audio bus by said pulse of said first polarity, and being energized for disconnecting its respective speaker from said speaker audio bus by said pulse of said second polarity, and further comprising means for selectively connecting said control line to said addressed access circuit comprising an analog multiplexer, so that one control line carries the connection and disconnection commands to a number of access circuits.

9. The communication system as claimed in claim 8, wherein said control line is a bidirectional line for also transmitting connection requests from switches associated with said speakers to said computer, and wherein said computer repetitively interrogates said switches for displaying connection requests to the user of said telephone and interrogates a selected one of said switches by addressing said analog multiplexer for selectively connecting the selected switch to said control line.

10. The communication system as claimed in claim 9, wherein each speaker has associated with it two switches, a first one of which applies a first signal level to said control line when it is selected by said multiplexer and activated by a person to transmit a low priority connection request, and a second one of which applies a second signal level to said control line when it is selected by said multiplexer and activated by a person to transmit a high priority connection request, and wherein said computer uses means for sensing and discriminating between the first and second signal levels in order to display both low and high priority connection requests to the user of said telephone.

11. A communication system comprising, in combination, a plurality of audio links for establishing simultaneous and independent audio communication paths, a plurality of telephones for receiving and transmitting audio signals, and including means for entering numbers for requesting connection to other of said telephones, each of said telephones having an access circuit including means for selectively connecting and disconnecting the telephone to a selected one of the audio links, and a computer for receiving the numbers entered by said means for entering numbers and in response thereto supervising the connection and disconnection of said telephones to said audio links, wherein each access circuit includes a transformer for converting a balanced audio signal from the line of the telephone to an unbalanced signal having a ground which is common for the unbalanced signals from all of the telephones, the unbalanced signal being connected to a selected one of said audio links through an analog multiplexer integrated circuit having select inputs receiving link select signals from a latch circuit storing the link select signals and having received the link select signals from the computer.

12. The communication system as claimed in claim 11, wherein each of said access circuits further comprises a circuit including a memory element for receiving and storing connection and disconnection commands from said computer, and also including a circuit for detecting whether the corresponding telephone is on-hook or off-hook, and wherein said communication system further comprises a bidirectional multiplexed control line for sending connection and disconnection commands from said computer to selected ones of said access circuits, and for sending on-hook and off-hook signals from selected ones of the access circuits to said computer, and wherein said communication system further comprises an analog multiplexer for accessing said selected ones of said access circuits and receiving said bidirectional multiplexed control line on a common multiplex terminal.

13. In an administrative communication system the combination comprising at least one dialable administrative telephone having dialing means, a plurality of dialless staff stations, and a control computer for supervising connections between the administrative telephone and staff stations, the administrative telephone being dialed to establish communication between a selected staff station and the administrative telephone, and the staff stations having switches for requesting communication with the administrative telephone, the control computer having means for scanning said switches to determine stations requesting communication, and at least one remote display being connected to said central computer and being provided for displaying numbers corresponding to the stations requesting communication, wherein binary data including said numbers are transmitted as a pulse-width modulated binary signal from said control computer to said remote display so that said remote display can be located at least one thousand feet from said control computer.

14. The combination as claimed in claim 13, wherein said display is mounted on said administrative telephone, and wherein said pulse-width binary signal is a balanced signal transmitted over a pair of wires in a phone line connecting said administrative telephone to said control computer, and wherein said display including circuits for demodulating and decoding said pulse-width modulated signal is powered by rectification and filtering of said pulse-width modulated signal.

15. The combination as claimed in claim 13, wherein the individual pulses in said pulse-width modulated signal are generated by execution of a sequence of successive steps in an interrupt program of said computer, and wherein only one of said pulses is generated each time that said interrupt program is executed.

16. In an administrative telephone and intercom system having a plurality of stations including multi-link dialable telephones having dialing means, dialess multi-link telephones, dialess single-link telephones, and intercom speakers, connections between said stations being supervised by a control computer, each of said stations being selectively addressable by said control computer transmitting corresponding preassigned physical numbers to said respective stations, and a selected one of said stations being connected to a multi-link dialable telephone in response to dialing from said multi-link dialable telephone a preprogrammed architectural number corresponding to the physical number of the selected station, said control computer having data stored in electrically alterable memory for said physical numbers identifying the architectural number associated with each physical number and whether a multi-link dialable dialless telephone or single line telephone or intercom speaker is addressable at said physical number, at least one of said multi-link dialable telephones having an associated display for displaying numbers transmitted from said control computer, said control computer being programmed to receive numbers dialed from said telephone associated with said display to permit user programming of said control computer, a method of operating said control computer for user programming comprising the steps of:

(a) receiving a first number dialed from said multi-link dialable telephone associated with said display, testing the first number to determine whether the first number corresponds to a preassigned number for user programming, and upon receipt of said number for user programming thereafter (b) receiving a second number dialed from said multi-link dialable telephone associated with said display to identify a physical number for which reprogramming of said electrically alterable memory is desired, and thereafter (c) displaying said data stored in said electrically alterable memory associated with the physical number identified by said second number received in step b), and thereafter (d) receiving a third number dialed from said multi-link dialable telephone associated with said display and changing said data stored in said electrically alterable memory in response to said third number.

17. The method of operating said computer as claimed in claim 16, wherein the data for each physical number identifying whether one of said multi-link dialable or dialess telephone or single link telephone or intercom speaker is associated with the physical number is encoded as an ordered series of bits, and wherein said step (c) of displaying said data displays said data encoded as an ordered sequence of digits or blanks, a digit or blank being selectively displayed in response to whether a corresponding bit is set or cleared, and wherein said step (d) of receiving said third number comprises receiving a digit dialed from said telephone and changing the value of the bit corresponding to the digit dialed from said telephone.

18. The method of operating said computer as claimed in claim 16, wherein said data stored in said electrically alterable memory further includes data identifying whether both one of said intercom speakers and one of said telephones is associated with a physical number, and wherein said computer directs calls to said physical number to said speaker associated with said physical number, unless said telephone associated with said physical number goes off-hook during a call directed to said physical number whereupon the call is directed to said telephone associated with said physical number.

19. The method of operating said computer as claimed in claim 16, wherein a physical number is associated with both one of said speakers and one of said telephones, and said data stored in said electrically alterable memory and associated with said physical number includes a bit identifying whether a call directed to the physical number is first directed to the speaker or is first directed to the telephone associated with the physical number.

20. The method of operating said computer as claimed in claim 16 wherein mechanically operated electrical switches are provided for preselecting the physical numbers associated with particular ones of the telephones and speakers.

* * * * *